US009979625B2

(12) United States Patent
McLaughlin et al.

(10) Patent No.: US 9,979,625 B2
(45) Date of Patent: May 22, 2018

(54) UNIFORM COMMUNICATION PROTOCOLS FOR COMMUNICATION BETWEEN CONTROLLERS AND ACCESSORIES

(71) Applicant: Apple Inc., Cupertino, CA (US)

(72) Inventors: Kevin P. McLaughlin, Mountain View, CA (US); Andrew Burks, Sunnyvale, CA (US); Srinivas Rama, Cupertino, CA (US); Anush Nadathur, San Jose, CA (US); Joe Abuan, Cupertino, CA (US); Bob Bradley, San Jose, CA (US); Craig Dooley, Los Gatos, CA (US); Gregg Golembeski, Jr., San Francisco, CA (US); Arun Mathias, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 14/614,914

(22) Filed: Feb. 5, 2015

(65) Prior Publication Data

US 2015/0222517 A1 Aug. 6, 2015

Related U.S. Application Data

(60) Provisional application No. 61/935,967, filed on Feb. 5, 2014.

(51) Int. Cl.
*H04L 29/06* (2006.01)
*H04L 12/26* (2006.01)
(Continued)

(52) U.S. Cl.
CPC .......... *H04L 43/10* (2013.01); *G06F 11/3051* (2013.01); *H04L 63/061* (2013.01);
(Continued)

(58) Field of Classification Search
CPC .......... H04L 65/00; G06F 21/00; G08G 1/093
See application file for complete search history.

(56) References Cited

U.S. PATENT DOCUMENTS 5,059,871 A 1/1991 Pearlman et al.
5,086,385 A 2/1992 Launey
(Continued)

FOREIGN PATENT DOCUMENTS

CN 101527911 A 9/2009
CN 102387501 A 3/2012
(Continued)

OTHER PUBLICATIONS

International Search Report and Written Opinion dated Mar. 6, 2015 in PCT/US2015/014639, 10 pages.
(Continued)

*Primary Examiner* — Joseph P Hirl
*Assistant Examiner* — Leynna Truvan
(74) *Attorney, Agent, or Firm* — Kilpatrick Townsend & Stockton LLP

(57) ABSTRACT

A uniform protocol can facilitate secure, authenticated communication between a controller device and an accessory device that is controlled by the controller. An accessory and a controller can establish a pairing, the existence of which can be verified at a later time and used to create a secure communication session. The accessory can provide an accessory definition record that defines the accessory as a collection of services, each service having one or more characteristics. Within a secure communication session, the controller can interrogate the characteristics to determine accessory state and/or modify the characteristics to instruct the accessory to change its state.

22 Claims, 71 Drawing Sheets

(51) Int. Cl.

| | |
|---|---|
| ***G06F 11/30*** | (2006.01) |
| ***H04L 29/08*** | (2006.01) |
| ***H04W 12/04*** | (2009.01) |
| *H04W 12/06* | (2009.01) |

(52) U.S. Cl.

CPC .............. *H04L 67/02* (2013.01); *H04L 67/04* (2013.01); *H04L 67/12* (2013.01); *H04L 67/303* (2013.01); *H04W 12/04* (2013.01); *H04L 63/0442* (2013.01); *H04L 63/0823* (2013.01); *H04L 63/18* (2013.01); *H04W 12/06* (2013.01)

(56) References Cited

U.S. PATENT DOCUMENTS

| | | | |
|---|---|---|---|
| 5,471,190 | A | 11/1995 | Zimmermann |
| 5,621,662 | A | 4/1997 | Humphries et al. |
| 5,907,279 | A | 5/1999 | Bruins et al. |
| 6,756,998 | B1 | 6/2004 | Bilger |
| 6,834,208 | B2 | 12/2004 | Gonzales et al. |
| 6,912,429 | B1 | 6/2005 | Bilger |
| 6,980,080 | B2 | 12/2005 | Christensen et al. |
| 7,047,092 | B2 | 5/2006 | Wimsatt |
| 7,139,716 | B1 | 11/2006 | Gaziz |
| 7,394,393 | B2 | 7/2008 | Zhang et al. |
| 7,415,310 | B2 | 8/2008 | Bovee et al. |
| 7,574,417 | B1 | 8/2009 | McGreevy et al. |
| 7,912,447 | B2 | 3/2011 | Bennett, III et al. |
| 8,042,048 | B2 | 10/2011 | Wilson et al. |
| 8,156,334 | B2 | 4/2012 | Ho |
| 8,190,275 | B2 | 5/2012 | Chang |
| 8,261,089 | B2 | 9/2012 | Leon Cobos et al. |
| 8,375,118 | B2 | 2/2013 | Hao et al. |
| 8,422,401 | B1 | 4/2013 | Choong et al. |
| 8,473,325 | B2 | 6/2013 | Barnhill, Jr. et al. |
| 8,516,087 | B2 | 8/2013 | Wilson et al. |
| 8,671,099 | B2 | 3/2014 | Kapoor |
| 8,750,797 | B2 * | 6/2014 | Ketari ................ G08B 13/1427 455/41.2 |
| 9,575,472 | B1 | 2/2017 | Clayton et al. |
| 2002/0044042 | A1 | 4/2002 | Christensen et al. |
| 2002/0095568 | A1 | 7/2002 | Norris et al. |
| 2002/0180581 | A1 | 12/2002 | Kamiwada et al. |
| 2004/0260407 | A1 | 12/2004 | Wimsatt |
| 2006/0168618 | A1 | 7/2006 | Choi |
| 2007/0112939 | A1 | 5/2007 | Wilson et al. |
| 2008/0009324 | A1 | 1/2008 | Patel |
| 2008/0222711 | A1 | 9/2008 | Michaelis et al. |
| 2008/0238661 | A1 | 10/2008 | Camp et al. |
| 2009/0222659 | A1 | 9/2009 | Miyabayashi |
| 2009/0307255 | A1 | 12/2009 | Park |
| 2009/0326800 | A1 | 12/2009 | Kalaboukis |
| 2010/0019920 | A1 | 1/2010 | Ketari |
| 2010/0262829 | A1 | 10/2010 | Brown |
| 2011/0153279 | A1 | 6/2011 | Zhang et al. |
| 2011/0195664 | A1 | 8/2011 | Keirstead et al. |
| 2012/0324124 | A1 | 12/2012 | Locker et al. |
| 2013/0029596 | A1 | 1/2013 | Preston |
| 2013/0034230 | A1 | 2/2013 | Takahashi |
| 2013/0101121 | A1 * | 4/2013 | Nordholt ............... H04L 9/0852 380/279 |
| 2013/0169407 | A1 | 7/2013 | Chen et al. |
| 2013/0198516 | A1 * | 8/2013 | Fenton ................ H04L 63/0869 713/168 |
| 2013/0225132 | A1 | 8/2013 | Payan et al. |
| 2014/0006587 | A1 | 1/2014 | Kusano |
| 2014/0022061 | A1 | 1/2014 | Apte et al. |
| 2014/0085093 | A1 | 3/2014 | Mittleman et al. |
| 2014/0098247 | A1 | 4/2014 | Rao et al. |
| 2014/0118148 | A1 | 5/2014 | Edlund |
| 2014/0143695 | A1 | 5/2014 | Sundermeyer et al. |
| 2014/0222954 | A1 | 8/2014 | Vaccari |
| 2014/0321297 | A1 | 10/2014 | Yee et al. |
| 2015/0334516 | A1 | 11/2015 | Shon et al. |
| 2015/0341184 | A1 | 11/2015 | Tatzel et al. |
| 2015/0350031 | A1 | 12/2015 | Burks et al. |
| 2015/0351145 | A1 | 12/2015 | Burks et al. |
| 2016/0100369 | A1 | 4/2016 | Chhabra |
| 2016/0315688 | A1 | 10/2016 | Bhargava et al. |

FOREIGN PATENT DOCUMENTS

| | | | |
|---|---|---|---|
| EP | 1 125 414 | A2 | 8/2001 |
| EP | 1 133 120 | A2 | 12/2001 |
| EP | 1 381 201 | A2 | 1/2004 |
| EP | 1 659 739 | A2 | 5/2006 |
| EP | 1659739 | A2 | 5/2006 |
| EP | 2148308 | A2 | 1/2010 |
| EP | 2 784 986 | A1 | 10/2014 |
| EP | 2 881 676 | A1 | 6/2015 |
| GB | 2 339 367 | A | 1/2000 |
| JP | 2004236215 | A | 8/2004 |
| JP | 2009212732 | A | 9/2009 |
| JP | 5474238 | B1 | 4/2014 |
| TW | 200937931 | A | 9/2009 |
| TW | 201250481 | A | 12/2012 |
| TW | 201540034 | | 10/2015 |
| WO | 2013/049007 | A1 | 4/2013 |
| WO | 2013/174540 | A1 | 11/2013 |
| WO | 2013/0184108 | A1 | 12/2013 |
| WO | 2014/004133 | A1 | 1/2014 |
| WO | 2014/020880 | A1 | 2/2014 |
| WO | 2015120161 | | 8/2015 |
| WO | 2015184387 | | 12/2015 |

OTHER PUBLICATIONS

Asensio, Angel, et al., “Protocol and Architecture to Bring Things into Internet of Things,” Hindawi Publishing Corporation, International Journal of Distributed Sensor Networks, Apr. 13, 2014, vol. 2014, Article ID 158252, 19 pages.

Shelby, Z., et al., “The Constrained Application Protocol (CoAP),” Internet Engineering Task Force (IETF), Jun. 2014, ISSN: 2070-1721, 112 pages.

Isomaki, Markus, et al., “On interworking between rapidly evolving Internet of Things and Open Web Platform,” Feb. 20, 2014, [online], Word Wide Web Consortium, <URL: http://www.w3.org/2014/02/wot/papers/isomaki.pdf>, 5 pages.

Koch, Ed, et al., “Hardware/Software Solution Unifying DALI, IBECS, and BACnet Final Report,” [online], Lawrence Berkeley National Laboratory, 2004, LBNL-57686, <URL: http://eetd.lbl.gov/node/51279>, 25 pages.

Andersson, Mats, “Use case possibilities with Bluetooth low energy in IoT applications,” White Paper, May 20, 2015, [online], <URL: www.u-blox.com>, 16 pages.

Echevarria, Juan Jose, et al., “WebTag: Web Browsing into Sensor Tags over NFC,” Sensors, 2012, vol. 12, pp. 8675-8690.

Non-Final Office Action dated Jun. 23, 2016 in U.S. Appl. No. 14/725,891. 15 pages.

International Search Report and Written Opinion dated Nov. 25, 2015, in PCT/US2015/050433. 10 Pages.

International Search Report and Written Opinion dated Aug. 7, 2015 in PCT/US2015/033376, 22 pages.

Fielding, Roy T., et al., “Principled Design of the Modern Web Architecture,” ACM Transactions on Internet Technology, May 2002, vol. 2, No. 2, 36 pages.

“Bluetooth low energy,” Wikipedia, [online], [retrieved Apr. 24, 2015], retrieved from the Internet: <URL: http://en.wikipedia.org/wiki/Bluetooth_low_energy>, 9 pages.

“Introduction to bluetooth low energy,” Product Guide [online], Adafruit Industries, Apr. 17, 2014, [retrieved Apr. 24, 2015], retrieved from the Internet: <URL: https://learn.adafruit.com/introctuction-to-bluetooth-low-energy/gatt>, 11 pages.

GATT Specifications, [online], Bluetooth Development Portal, [retrieved Apr. 24, 2015], retrieved from the Internet: <URL: https://developer.bluetooth.org/gatt/Pages/default.aspx>, 1 page.

GATT Characteristics, [online], Bluetooth Development Portal, [retrieved Apr. 24, 2015], retrieved from the Internet: <URL:

(56) References Cited

OTHER PUBLICATIONS https://developer.bluetooth.org/gatt/characteristics/Pages/CharacteristicsHome.aspx>, 2 pages.

GATT Descriptors, [online], Bluetooth Development Portal, [retrieved Apr. 24, 2015], retrieved from the Internet: <URL: https://developer.bluetooth.org/gatt/descriptors/Pages/DescriptorsHomePage.aspx>, 1 page.

GATT Services, [online], Bluetooth Development Portal, [retrieved Apr. 24, 2015], retrieved from the Internet: <URL: https://developer.bluetooth.org/gatt/services/Pages/ServicesHome.aspx>, 1 page.

GATT Profiles, [online], Bluetooth Development Portal, [retrieved Apr. 24, 2015], retrieved from the Internet: <URL: https://developer.bluetooth.org/gatt/profiles/Pages/ProfilesHome.aspx>, 1 page.

Rosenberg, J., "A Data Model for Presence," Cisco Systems, Jul. 2006, [retrieved Apr. 24, 2015], retrieved from the Internet: <URL: https://tools.ietf.org/html/rfc4479>, 35 pages.

Epson 802.11n/Bluetooth 2.1 Wireless Interfaces, Datasheet, Epson America, Inc., 2013, 2 pages.

International Search Report and Written Opinion dated Jan. 19, 2016, in PCT/US2015/033369. 375 pages.

Notification of the First Office Action dated Mar. 3, 2017 in Chinese Patent Application No. or Patent No. 201580007365.X. 29 pages (with English translation).

Notice of Acceptance from the Australian Government dated Aug. 29, 2016 in Application No. 2015214079. 3 pages.

Notice of Allowance mailed in Korean Patent Application No. 10-2016-7021392 dated Nov. 7, 2016. 12 pages.

Second Office Action dated Oct. 10, 2017 in Chinese Application No. 201580007365.X. 7 pages.

Office Action dated Nov. 13, 2017 in European Application No. 15 731 760.3. 6 pages.

Notice of Allowance dated Dec. 19, 2017 in Korean Patent Application No. 104104409. 13 pages (includes English translation of the allowed claims).

Japanese Office Action dated Mar. 21, 2017 in Japanese Patent Application No. 2016-549775. 11 pages (includes English translation of claims).

Office Action and Search Report dated Mar. 17, 2017 in ROC (Taiwan) Patent Application No. 10410409. 4 pages (includes English translation of non-compliant subject matter or essential features in Claim—Rule 18.2).

Fibaro, "Home Intelligence Advanced User's Guide.". 8.V111.2012 ver. 1.02\beta. Aug. 14, 2012. 102 pages.

Honeywell, "Tuxedo Touch WIFI Home Automation System Installation and Setup Guide." Aug. 4, 2012. 49 pages.

Non-Final Office Action dated Jun. 2, 2017 in U.S. Appl. No. 14/725,912. 18 pages.

Notice of Decision to Grant dated Jun. 5, 2017 in JP2016-549775. 10 pages (English translation of allowed claims provided).

Skelton, "Fibaro Z-Wave Home Center 2 Mega Review." Sep. 10, 2012. 37 pages.

Behrang Fouladi, "Security Evaluation of the Z-Wave Wireless Protocol." Oct. 5, 2012. 7 pages.

International Application No. PCT/US2015/014639, International Preliminary Report on Patentability dated Aug. 18, 2016, 7 pages.

Wu, T., "The Secure Remote Password Protocol," Computer Science Department, Stanford University. Nov. 11, 1997. 1998 Internet Symposium on Network and Distributed System Security.

* cited by examiner

| CHARACTERISTIC | PROPERTY | VALUE |
|---|---|---|
| On 201 | Type | com.proto.ch.on |
| | Permissions | Paired Read, Paired Write |
| | Format | <boolean> |
| Outlet in Use 202 | Type | com.proto.ch.outlet-in-use |
| | Permissions | Paired Read |
| | Format | <boolean> |
| Brightness 203 | Type | com.proto.ch.brightness |
| | Permissions | Paired Read, Paired Write |
| | Format | <integer> |
| | Min, Max, Step | 0, 100, 1 |
| | Unit | percentage |
| Hue 204 | Type | com.proto.ch.hue |
| | Permissions | Paired Read, Paired Write |
| | Format | <float> |
| | Min, Max, Step | 0, 360, 1 |
| | Unit | arcdegrees |
| Saturation 205 | Type | com.proto.ch.saturation |
| | Permissions | Paired Read, Paired Write |
| | Format | <float> |
| | Min, Max, Step | 0, 100, 1 |
| | Unit | percentage |
| Audio Feedback 206 | Type | com.proto.ch.audio-feedback |
| | Permissions | Paired Read, Paired Write |
| | Format | <boolean> |
| Output Volume 207 | Type | com.proto.ch.volume.output |
| | Permissions | Paired Read, Paired Write |
| | Format | <float> |
| | Min, Max, Step | 0, 100, 1 |
| | Unit | percentage |
| Logs 208 | Type | com.proto.ch.logs |
| | Permissions | Paired Read |
| | Format | <tlv> |

*FIG. 2A*

| CHARACTERISTIC | PROPERTY | VALUE |
|---|---|---|
| Current Temperature 209 | Type | com.proto.ch.temp.current |
| | Permissions | Paired Read |
| | Format | <float> |
| | Min, Max, Step | 0, 100, 0.1 |
| | Unit | celsius |
| Target Temperature 210 | Type | com.proto.ch.temp.target |
| | Permissions | Paired Read, Paired Write |
| | Format | <float> |
| | Min, Max, Step | 10, 38, 0.1 |
| | Unit | celsius |
| Temperature Units 211 | Type | com.proto.ch.temp.units |
| | Permissions | Paired Read, Paired Write |
| | Format | <enum> |
| | Valid values | "Celsius", "Fahrenheit" |
| Current Heat/Cool Status 212 | Type | com.proto.ch.heat-cool.current |
| | Permissions | Paired Read |
| | Format | <enum> |
| | Valid values | "Heat","Cool", "Off" |
| Target Heat/Cool Mode 213 | Type | com.proto.ch.heat-cool.target |
| | Permissions | Paired Read, Paired Write |
| | Format | <enum> |
| | Valid values | "Heat","Cool", "Auto", "Off" |
| Cooling Threshold Temperature 214 | Type | com.proto.ch.temp.cool-threshold |
| | Permissions | Paired Read, Paired Write |
| | Format | <float> |
| | Min, Max, Step | 10, 35, 0.1 |
| | Unit | celsius |
| Heating Threshold Temperature 215 | Type | com.proto.ch.temp.heat-threshold |
| | Permissions | Paired Read, Paired Write |
| | Format | <float> |
| | Min, Max, Step | 0, 25, 0.1 |
| | Unit | celsius |

*FIG. 2B*

| CHARACTERISTIC | PROPERTY | VALUE |
|---|---|---|
| Current Door State 216 | Type | com.proto.ch.door-state.current |
| | Permissions | Paired Read |
| | Format | <enum> |
| | Valid values | Open, Opening, Closed, Closing, Stopped |
| Target Door State 217 | Type | com.proto.ch.door-state.target |
| | Permissions | Paired Read, Paired Write |
| | Format | <enum> |
| | Valid values | Open, Closed |
| Motion Detected 218 | Type | com.proto.ch.motion-detected |
| | Permissions | Paired Read |
| | Format | <boolean> |
| Obstruction Detected 219 | Type | com.proto.ch.obstruction-detected |
| | Permissions | Paired Read |
| | Format | <boolean> |
| Lock Mechanism Current State 220 | Type | com.proto.ch.lock-mech.current-state |
| | Permissions | Paired Read |
| | Format | <enum> |
| | Valid values | Unsecured, Secured, Jammed, Unknown |
| Lock Mechanism Target State 221 | Type | com.proto.ch.lock-mech.target-state |
| | Permissions | Paired Read, Paired Write |
| | Format | <enum> |
| | Valid values | Unsecured, Secured |
| Lock Mechanism Last Action 222 | Type | com.proto.ch.lock-mech.last-action |
| | Permissions | Paired Read, Paired Write |
| | Format | <enum> |
| | Valid values | Secured/Unsecured, Physical/Remote, Interior/ Exterior, etc. |
| Lock Management Auto Timeout 223 | Type | com.proto.ch.lock-mgt.auto-timeout |
| | Permissions | Paired Read, Paired Write |
| | Format | <int> |
| | Min, Max, Step | 0, intmax, 1 |
| Lock Management Control Point 224 | Type | com.proto.ch.lock-mgt.control-point |
| | Permissions | Paired Write |
| | Format | <tlv> |

*FIG. 2C*

| CHARACTERISTIC | PROPERTY | VALUE |
|---|---|---|
| Rotation Direction 225 | Type | com.proto.ch.rotation-direction |
| | Permissions | Paired Read, Paired Write |
| | Format | <enum> |
| | Valid Values | Clockwise, Counterclockwise |
| Rotation Speed 226 | Type | com.proto.ch.brightness |
| | Permissions | Paired Read, Paired Write |
| | Format | <integer> |
| | Min, Max, Step | 0, 100, 1 |
| | Unit | percentage |
| Name 227 | Type | com.proto.ch.name |
| | Permissions | Paired Read |
| | Format | <string> |
| Administrator-Only Access 228 | Type | com.proto.ch.admin-only-access |
| | Permissions | Paired Read, Admin Write |
| | Format | <boolean> |
| Version 229 | Type | com.proto.ch.version |
| | Permissions | Paired Read |
| | Format | <string> |

*FIG. 2D*

| | PROPERTY | FORMAT |
|---|---|---|
| 230 | type | <string> |
| 231 | permissions | Array of <string> |
| 232 | notificationMode | Array of <string> |
| 233 | format | <string> |
| 234 | value | [as specified by *format* property] |
| 235 | minValue (Min) | <number> |
| 236 | maxValue (Max) | <number> |
| 237 | stepSize (Step) | <number> |
| 238 | validValues | Array of <string> |
| 239 | unit | <string> |
| 240 | userDescriptor | <string> |
| 241 | owner | <string> |

*FIG. 2E*

| PROPERTY | Strobe (242) | Direction (243) | Speed (244) |
|---|---|---|---|
| type | com.discoball.ch.strobe | com.discoball.ch.rotate.direction | com.discoball.ch.rotate.speed |
| permissions | PR, PW | PR, PW | PR, PW |
| notificationMode | Events | Events | Events |
| format | boolean | enum | <int> |
| value | false | not rotating | 1 |
| minValue | -- | -- | 0 |
| maxValue | -- | -- | 1 |
| stepSize | -- | -- | 1 |
| validValues | -- | Not rotating, Clockwise, Counterclockwise | -- |
| unit | -- | -- | -- |
| userDescriptor | Strobe on or off | Rotation direction for ball | Rotation speed for ball |
| owner | Discoball Inc. | Discoball Inc. | Discoball Inc. |

*FIG. 2F*

| SERVICE | PROPERTY | VALUE |
|---|---|---|
| Light bulb 251 | Type | com.proto.svc.lightbulb |
| | Required Ch. | com.proto.ch.on |
| | Optional Ch. | com.proto.ch.brightness |
| | | com.proto.ch.hue |
| | | com.proto.ch.saturation |
| | | com.proto.ch.name |
| Thermostat 252 | Type | com.proto.svc.thermostat |
| | Required Ch. | com.proto.ch.heat-cool.current |
| | | com.proto.ch.heat-cool.target |
| | | com.proto.ch.temp.current |
| | | com.proto.ch.temp.target |
| | | com.proto.ch.temp.units |
| | Optional Ch. | com.proto.ch.temp.cool-threshold |
| | | com.proto.ch.temp.heat-threshold |
| | | com.proto.ch.name |
| Garage Door Opener 253 | Type | com.proto.svc.garage-door-opener |
| | Required Ch. | com.proto.ch.door-state.current |
| | | com.proto.ch.door-state.target |
| | | com.proto.ch.obstruction-detected |
| | Optional Ch. | com.proto.ch.lock-mech.current-state |
| | | com.proto.ch.lock-mech.target-state |
| | | com.proto.ch.name |
| Lock Mechanism 254 | Type | com.proto.svc.lock-mech |
| | Required Ch. | com.proto.ch.lock-mech.current-state |
| | | com.proto.ch.lock-mech.target-state |
| | Optional Ch. | com.proto.ch.name |

*FIG. 2G*

| SERVICE | PROPERTY | VALUE |
|---|---|---|
| Lock Management 255 | Type | com.proto.svc.lock-mgt |
| | Required Ch. | com.proto.ch.lock-mgt.control-point |
| | | com.proto.ch.version |
| | Optional Ch. | com.proto.ch.logs |
| | | com.proto.ch.audio-feedback |
| | | com.proto.ch.admin-only-access |
| | | com.proto.ch.lock-mgt.auto-timeout |
| | | com.proto.ch.lock-mech.last-action |
| | | com.proto.ch.door-state.current |
| | | com.proto.ch.motion-detected |
| | | com.proto.ch.name |
| Outlet 256 | Type | com.proto.svc.outlet |
| | Required Ch. | com.proto.ch.on |
| | | com.proto.ch.outlet-in-use |
| | Optional Ch. | com.proto.ch.name |
| Switch 257 | Type | com.proto.svc.switch |
| | Required Ch. | com.proto.ch.on |
| | Optional Ch. | com.proto.ch.name |
| Fan 258 | Type | com.proto.svc.fan |
| | Required Ch. | com.proto.ch.on |
| | Optional Ch. | com.proto.ch.rotation.direction |
| | | com.proto.ch.rotation.speed |
| | | com.proto.ch.name |

FIG. 2H

| SERVICE | PROPERTY | VALUE |
|---|---|---|
| Accessory Information 261 | Type | com.proto.svc.accessory-info |
| | Required Ch. | com.proto.ch.identify |
| | | com.proto.ch.manufacturer |
| | | com.proto.ch.model |
| | | com.proto.ch.name |
| | | com.proto.ch.serial-number |
| | Optional Ch. | com.proto.ch.firmware-revision |
| | | com.proto.ch.hardware-revision |
| | | com.proto.ch.software-revision |

*FIG. 2I*

| CHARACTERISTIC | PROPERTY | VALUE |
|---|---|---|
| Identify 271 | Type | com.proto.ch.identify |
| | Permissions | Paired Write |
| | Format | <boolean> |
| Manufacturer Name 272 | Type | com.proto.ch.manufacturer |
| | Permissions | Paired Read |
| | Format | <string> |
| Model Name 273 | Type | com.proto.ch.model |
| | Permissions | Paired Read |
| | Format | <string> |
| Serial Number 274 | Type | com.proto.ch.serial-number |
| | Permissions | Paired Read |
| | Format | <string> |
| Firmware Revision 275 | Type | com.proto.ch.firmware-rev |
| | Permissions | Paired Read |
| | Format | <string> |
| Hardware Revision 276 | Type | com.proto.ch.hardware-rev |
| | Permissions | Paired Read |
| | Format | <string> |
| Software Revision 277 | Type | com.proto.ch.software-rev |
| | Permissions | Paired Read |
| | Format | <string> |

```
{
   "services" : [
      {
         "type" : "com.proto.svc.accessory-info",
         "instanceID" : 1
         "characteristics" : [
            {
               "type" : "com.proto.ch.name",
               "value" : "Acme Garage Door Opener",
               "perms" : [ "PR" ],
               "instanceID" : 2
            },
            {
               "type" : "com.proto.ch.manufacturer",
               "value" : "Acme",
               "perms" : [ "PR" ],
               "instanceID" : 3
            },
            {
               "type" : "com.proto.ch.model",
               "value" : "A1234",
               "perms" : [ "PR" ],
               "instanceID" : 4
            },
            {
               "type" : "com.proto.ch.serial-number",
               "value" : "1A2B3C4D5E6F",
               "perms" : [ "PR" ],
               "instanceID" : 5
            },
            {
               "type" : "com.proto.ch.identify",
               "value" : null,
               "perms" : [ "PW" ],
               "instanceID" : 6
            },       ]
      },

// continued next page
```

```
// continued from previous page

{
    "type" : "com.proto.svc.garage-door-opener",
    "instanceID" : 7,
    "characteristics" : [
        {
            "type" : "com.proto.ch.door-state.current",
            "value" : 2,
            "perms" : [ "PR", "Events" ],
            "instanceID" : 8
        },
        {
            "type" : "com.proto.ch.door-state.target",
            "value" : 0,
            "perms" : [ "PR", "PW", "Events" ],
            "instanceID" : 9
        },
        {
            "type" : "com.proto.ch.obstruction-detected",
            "value" : true,
            "perms" : [ "PR", "Events" ],
            "instanceID" : 10
        },
        {
            "type" : "com.proto.ch.lock-mech.current",
            "value" : true,
            "perms" : [ "PR", "Events" ],
            "instanceID" : 11
        },
        {
            "type" : "com.proto.ch.lock-mech.target",
            "value" : true,
            "perms" : [ "PR", "PW", "Events" ],
            "instanceID" : 12
        }
    ]
},

// continued next page
```

FIG. 3B

```
// continued from previous page
{
    "type" = com.proto.svc.lightbulb",
    "instanceID" = 13
    "characteristics" : [
        {
            "type" : "com.proto.ch.on",
            "value" : false,
            "perms" : [ "PR", "PW", "Events" ],
            "instanceID" : 14
        },
        {
            "type" : "com.proto.ch.brightness",
            "value" : 100,
            "perms" : [ "PR", "PW", "Events" ],
            "instanceID" : 15
            "maxValue" : 100,
            "minValue" : 20,
            "stepSize": 5,
            "format" : "int",
            "unit" : "percentage"
        }
    ]
}
```

FIG. 3C

```
                ┌ HTTP/1.1 200 OK                                  ┌─530
            532 ┤ Content-Type: application/uap+json
                └ Content-Length: <length>
                ┌ {
                │    "characteristics" = [
                │       {
                │          "type"  : "com.proto.ch.door-state.current",
                │          "value" : 2,
                │          "instanceID" = 8
            534 ┤       },
                │       {
                │          "type"  : "com.proto.door-state.target",
                │          "value" : 0,
                │          "instanceID" : 9
                │       },
                │   //   ...
                │     ]
                └ }
```

546

540

504

542

```
PUT /proto/services/7/characteristics/9 HTTP/1.1
Host: doors.local:12345
Content-Type: application/uap+json
Content-Length: <length>
{
    "value" : 1
}
```

```
PUT /proto/services/7/characteristics HTTP/1.1
Host: doors.local:12345
Content-Type: application/uap+json
Content-Length: <length>
{
   "characteristics" = [
      {
         "type" : "com.proto.ch.door-state.target",
         "instanceID" : 9,
         "value" : 1
      },
      {
         "type" : com.proto.ch.lock-mech.target,
         "instanceID" : 12,
         "value" : false
      }
   ]
}
```

```
HTTP/1.1 200 OK
Content-Type: application/uap+json
Content-Length: <length>
{
   "characteristics" = [
      {
         "type" : com.proto.ch.door-state.target,
         "value" : 0
         "instanceID" : 0,
         "response: : {
            "developerMessage" : "No error occurred.",
            "errorCode" : 0,
            "moreInfo" : null
         }
      },
      {
         "type" : com.proto.ch.lock-mech.target,
         "value" : true
         "instanceID" : 1,
         "response: : {
            "developerMessage" : "No error occurred.",
            "errorCode" : 0,
            "moreInfo" : null
         }
      }
   ]
}
```

```
{
   "type" : com.acme.ch.port.open,
   "perms" : [ "PW" ]
   "value" : null,
   "instanceID" : 33
}
```

```
PUT /proto/services/22/characteristics/33 HTTP/1.1
Host: ipcamera.local:12345
Content-Type: application/uap+json
Content-Length: <length>
{
   "value" : true
}
```

```
HTTP/1.1 200 OK
Content-Type: application/uap+json
Content-Length: <length>
{
   "value" :
      {
         "port" : 45678,
         "status-code" : 0
      }
}
```

```
HTTP/1.1 200 OK
Content-Type: application/uap+json
Content-Length: <length>
{
   "value" :
      {
         "transactionID" : nnnnnnnnnnnnn,
         "transactionDuration" : 5
      }
}
```

```
GET /proto/services/22/characteristics/33 HTTP/1.1
Host: ipcamera.local:12345
Content-Type: application/json
Content-Length: <length>
{
   "value" :
      {
         "transactionID" : nnnnnnnnnnnnn
      }
}
```

FIG. 5K

```
       ⎡ HTTP/1.1 200 OK                                    ⟵ 620
  622 ⎨  Content-Type: application/uap+json
       ⎣  Content-Length: <length>
       ⎡ {
       ⎢    "characteristics" = [
       ⎢       {
       ⎢          "instanceID" = 8,
       ⎢          "value" : 2,
       ⎢       },
  624 ⎨       {
       ⎢          "instanceID" : 9
       ⎢          "value" : 0,
       ⎢       },
       ⎢       ...
       ⎢    ]
       ⎣ }
```

630

```
PUT /characteristics HTTP/1.1
Host: doors.local:12345
Content-Type: application/uap+json
Content-Length: <length>
{
    "characteristics" : [
        {
            "accessory ID" : 1,
            "instance ID" : 8,
            "value" : 1
        },
        {
            "accessory ID" : 1,
            "instance ID" : 10,
            "value" : false
        }
    ]
}
```

```
HTTP/1.1 207 Multi-Status
Content-Type: application/uap+json
Content-Length: <length>
{
    "characteristics" : [
        {
            "accessory ID" : 1,
            "instance ID" : 8,
            "status" : 0          646
        },
        {
            "accessory ID" : 1,
            "instance ID" : 10,
            "status" : -12345     648
        }
    ]
}
```

```
PUT /characteristics HTTP/1.1
Host: doors.local:12345
Content-Type: application/uap+json
Content-Length: <length>
{
     "characteristics" : [
          {
               "accessory ID" : 1,
               "instance ID" : 8,
               "notificationMode" : "ev"
          }
     ]
}
```

```
EVENT/1.0 200 OK
Content-Type: application/uap+json
Content-Length: <length>
{
     "characteristics" : [
          {
               "accessory ID" : 1,
               "instance ID" : 8,
               "value" : 1
          }
     ]
}
```

| CHARACTERISTIC | PROPERTY | VALUE |
|---|---|---|
| Pairing State Request 1201 | Format | <tlv> |
| | Type | com.proto.pairing.state-request |
| | Permissions | UR, UW, PR, PW |
| Feature Flags 1202 | Format | <int> |
| | Type | com.proto.pairing-features |
| | Permissions | UR, PR |
| Pairing Current State 1203 | Format | <tlv> |
| | Type | com.proto.pairing.state-current |
| | Permissions | UR, PR |
| Pairing List 1204 | Format | <tlv> |
| | Type | com.proto.pairing-list |
| | Permissions | PR |
| Pairing ID 1205 | Format | <string> |
| | Type | com.proto.pairing-identifier |
| | Permissions | UR, PR |

| SERVICE | CHARACTERISTICS | IID | VALUE |
|---|---|---|---|
| Accessory Information (instance ID=1) 2102 | com.proto.ch.identify | 2 | null |
| | com.proto.ch.manufacturer | 3 | "Acme" |
| | com.proto.ch.model | 4 | "A-Lock" |
| | com.proto.ch.name | 5 | "A Name" |
| | com.proto.ch.serial-number | 6 | "7353" |
| Lock Mechanism (instance ID=7) 2104 | com.proto.ch.lock-mech.current-state 2110 | 8 | unlocked |
| | com.proto.ch.lock-mech.target-state 2112 | 9 | unlocked |
| | com.proto.ch.name | 10 | "A-Lock-Mech" |
| Lock Management (instance ID=11) 2106 | com.proto.ch.lock-mgt.control-point 2114 | 12 | null |
| | com.proto.ch.version | 13 | 1.2.3 |
| | com.proto.ch.logs | 14 | <tlv> |
| | com.proto.ch.admin-only-access | 15 | false |
| | com.proto.ch.lock-mgt.auto-timeout | 16 | 5 |
| | com.proto.ch.lock-mech.last-action | 17 | 6 |
| | com.proto.ch.door-state.current | 18 | closed |
| | com.proto.ch.name | 19 | "A-Lock-Mgr" |

*FIG. 21*

| SERVICE | PROPERTY | VALUE |
|---|---|---|
| IP Camera Streaming 2501 | Type | com.proto.svc.ip-camera-streaming |
| | Required Ch. | com.proto.ch.on |
| | | com.proto.ch.ip-cam-mgt.session.start |
| | | com.proto.ch.ip-cam-mgt.session.end |
| | | com.proto.ch.video.codec.name |
| | | com.proto.ch.video.codec.parameters |
| | | com.proto.ch.video.attributes |
| | | com.proto.ch.rtp.video-payload-type |
| | | com.proto.ch.rtp.protocol |
| | | com.proto.ch.rtcp.extensions |
| | | com.proto.ch.srtp.crytpo-suite |
| | Optional Ch. | com.proto.ch.audio.codec.name |
| | | com.proto.ch.audio.codec.parameters |
| | | com.proto.ch.audio.codec.channels |
| | | com.proto.ch.audio.attributes |
| | | com.proto.ch.rtp.audio.clock-rate |
| | | com.proto.ch.rtp.audio.payload-type |
| Recording 2502 | Type | com.proto.svc.recording |
| | Required Ch. | com.proto.ch.recording.control |
| | | com.proto.ch.recording.status |
| Playback 2503 | Type | com.proto.svc.playback |
| | Required Ch. | com.proto.ch.playback.control |
| | | com.proto.ch.playback.status |
| | Optional Ch. | com.proto.ch.playback.speed |

FIG. 25A

| SERVICE | PROPERTY | VALUE |
|---|---|---|
| Camera 2504 | Type | com.proto.svc.camera |
| | Required Ch. | com.ch.proto.on |
| | Optional Ch. | com.ch.proto.pan |
| | | com.ch.proto.tilt |
| | | com.ch.proto.zoom |
| | | com.ch.proto.rotate |
| | | com.ch.proto.night-vision |
| | | com.ch.proto.mirror |
| Microphone 2505 | Type | com.proto.svc.microphone |
| | Required Ch. | com.proto.ch.on |
| | | com.proto.ch.volume |
| Speaker 2506 | Type | com.proto.svc.speaker |
| | Required Ch. | com.proto.ch.on |
| | | com.proto.ch.volume |

FIG. 25B

| CHARACTERISTIC | PROPERTY | VALUE |
|---|---|---|
| Session Start 2601 | Type | com.proto.ch.ip-cam-mgt.session.start |
| | Permissions | Paired Write |
| | Format | <object> [see Fig. 22B] |
| Session End 2602 | Type | com.proto.ch.ip-cam-mgt.session.end |
| | Permissions | Paired Write |
| | Format | <object> |
| Video Codec Name 2603 | Type | com.proto.ch.video.codec.name |
| | Permissions | Paired Read |
| | Format | <string> |
| Video Codec Parameters 2604 | Type | com.proto.ch.video.codec.parameters |
| | Permissions | Paired Read |
| | Format | <object> |
| Video Attributes 2605 | Type | com.proto.ch.video.attributes |
| | Permissions | Paired Read |
| | Format | <object> |
| RTP Video Payload Type 2606 | Type | com.proto.ch.rtp.video.payload-type |
| | Permissions | Paired Read |
| | Format | <int> |
| RTP Protocol 2607 | Type | com.proto.ch.rtp.protocol |
| | Permissions | Paired Read |
| | Format | <string> |
| RTCP Extensions 2608 | Type | com.proto.ch.rtp.extensions |
| | Permissions | Paired Read |
| | Format | Array of <string> |
| SRTP Crypto Suite 2609 | Type | com.proto.ch.srtp.crypto-suite |
| | Permissions | Paired Read |
| | Format | <string> |

*FIG. 26A*

| CHARACTERISTIC | PROPERTY | VALUE |
|---|---|---|
| Audio Codec Name 2610 | Type | com.proto.ch.audio.codec.name |
| | Permissions | Paired Read |
| | Format | <string> |
| Audio Codec Parameters 2611 | Type | com.proto.ch.audio.codec.parameters |
| | Permissions | Paired Read |
| | Format | <object> |
| Audio Codec Channels 2612 | Type | com.proto.ch.audio.codec.channels |
| | Permissions | Paired Read |
| | Format | <int> |
| Audio Attributes 2613 | Type | com.proto.ch.audio.attributes |
| | Permissions | Paired Read |
| | Format | <object> |
| RTP Audio Clock Rate 2614 | Type | com.proto.ch.rtp.audio.clock-rate |
| | Permissions | Paired Read |
| | Format | <int> |
| RTP Audio Payload Type 2615 | Type | com.proto.ch.rtp.audio.payload-type |
| | Permissions | Paired Read |
| | Format | <int> |

*FIG. 26B*

| KEY NAME | VALUE TYPE | DESCRIPTION |
|---|---|---|
| "session-id" 2631 | UUID | UUID for the streaming session |
| "controller-IP" 2632 | string | IP address of controller to receive the video stream |
| "controller-port" 2633 | int | Port of controller to receive the video stream |
| "controller-srtp-master-key" 2634 | string | SRTP master key for RTCP sent from controller to camera |
| "controller-srtp-master-salt" 2635 | string | SRTP master salt for RTCP sent from controller to camera |
| "video-max-bandwidth" 2636 | int | Maximum bandwidth for video (kbps) |
| "audio-max-bandwidth" 2637 | int | Maximum bandwidth for audio (kbps) |

*FIG. 26C*

| CHARACTERISTIC | PROPERTY | VALUE |
|---|---|---|
| Night Vision 2651 | Type | com.proto.ch.ip-camera-night-vision |
| | Format | <int> |
| | Permissions | Paired Read, Paired Write |
| Pan 2652 | Type | com.proto.ch.pan |
| | Format | <int> |
| | Permissions | Paired Read, Paired Write |
| Tilt 2653 | Type | com.proto.ch.tilt |
| | Format | <int> |
| | Permissions | Paired Read, Paired Write |
| Rotation 2654 | Type | com.proto.ch.rotation |
| | Format | <int> |
| | Permissions | Paired Read, Paired Write |
| Zoom 2655 | Type | com.proto.ch.zoom |
| | Format | <float> |
| | Permissions | read/write/update |
| Mirror 2656 | Type | com.proto.ch.ip-camera-mirror |
| | Format | <boolean> |
| | Permissions | read/write/update |

*FIG. 26D*

| CHARACTERISTIC | PROPERTY | VALUE |
|---|---|---|
| Recording Control 2661 | Type | com.proto.ch.recording.control |
| | Format | <object> |
| | Permissions | Paired Write |
| Recording Status 2662 | Type | com.proto.ch.recording.status |
| | Format | <object> |
| | Permissions | Paired Read |
| Playback Control 2663 | Type | com.proto.ch.playback.control |
| | Format | <object> |
| | Permissions | Paired Write |
| Playback Status 2664 | Type | com.proto.ch.playback.status |
| | Format | <object> |
| | Permissions | Paired Read |
| Playback Speed 2665 | Type | com.proto.ch.playback.speed |
| | Format | <float> |
| | Permissions | Paired Read, Paired Write |

```
{
   "services" : [
      {
         "type" : "com.proto.svc.accessory-info",
         "instanceID" : 1,
         "characteristics" : [
            {
               "type" : "com.proto.ch.id",
               "value" : "55:44:33:22:11:00",
               "perms" : [ "PR" ],
               "instanceID" : 2
            },
            {
               "type" : "com.proto.ch.name",
               "value" : "Acme IP Camera",
               "perms" : [ "PR" ],
               "instanceID" : 3
            },
            {
               "type" : "com.proto.ch.manufacturer",
               "value" : "Acme",
               "perms" : [ "PR" ],
               "instanceID" : 4
            },
            {
               "type" : "com.proto.ch.model",
               "value" : "Q5678",
               "perms" : [ "PR" ],
               "instanceID" : 5
            },
            {
               "type" : "com.proto.ch.serial-number",
               "value" : "9Z8Y7X6W5V4U",
               "perms" : [ "PR" ],
               "instanceID" : 6
            }
         ]
      },
// Continued next page
```

FIG. 27A

```
// Continued from previous page
{
    "type" : "com.proto.svc.ip-camera-streaming",
    "instanceID" : 7,
    "characteristics" : [
      {
        "type" : "com.proto.ch.on",
        "value" : true,
        "perms" : [ "PR", "PW" ],
        "instanceID" : 8
      },
      {
        "type" : "com.proto.ch.ip-cam-mgt-session.start",
        "value" : null,
        "perms" : [ "PW" ],
        "instanceID" : 9
      },
      {
        "type" : "com.proto.ch.ip-cam-mgt.session.end",
        "value" : null,
        "perms" : [ "PW" ],
        "instanceID" : 10
      },
      {
        "type" : "com.proto.ch.video.codec.name",
        "value" : "H264",
        "perms" : [ "PR" ],
        "instanceID" : 11
      },
      {
        "type" : "com.proto.ch.video.codec.name",
        "value" : "H264",
        "perms" : [ "PR" ],
        "instanceID" : 11
      },
      {
        "type" : "com.proto.ch.video.codec.parameters",
        "value" : {
          "profile-level-ld" : "64001f",
          "packetization-mode" : 0
        }
        "perms" : [ "PR" ],
        "instanceID" : 12
      },
// Continued next page
```

```
// Continued from previous page                                    2700
    {
        "type" : "com.proto.ch.video.attributes",
        "value" : {
            "imgattr" : "send [x=1280,y=720]"
        },
        "perms" : [ "PR" ],
        "instanceID" : 13
    },
    {
        "type" : "com.proto.ch.video.payload-type",
        "value" : 99,
        "perms" : [ "PR" ],
        "instanceID" : 14
    },
    {
        "type" : "com.proto.ch.rtp.protocol",
        "value" : "RTP/SAVPF",
        "perms" : [ "PR" ],
        "instanceID" : 15
    },
    {
        "type" : "com.proto.ch.rtp.extensions",
        "value" : [ "tstr", "tmmbr" ],
        "perms" : [ "PR" ],
        "instanceID" : 16
    },
    {
        "type" : "com.proto.ch.srtp.crypto-suite",
        "value" : "AES_256_CM_HMAC_SHA1_80",
        "perms" : [ "PR" ],
        "instanceID" : 17
    }
  ]
},
// Continued next page
```

```
// Continued from previous page
    {
        "type" : "com.proto.svc.camera",
        "instanceID" = 18,
        "characteristics" :  [
            {
                "type" : "com.proto.ch.on",
                "perms" : [ "PR", "PW" ],
                "value" : true,
                "instanceID" : 19
            },
            {
                "type" : "com.proto.ch.camera.night-vision",
                "perms" : [ "PR", "PW" ],
                "value" : false,
                "instanceID" : 20
            },
            {
                "type" : "com.proto.ch.camera.zoom",
                "perms" : [ "PR", "PW" ],
                "value" : 1.0,
                "instanceID" : 21
            },       ]
    }
    {
        "type" = com.proto.svc.microphone",
        "instanceID" = 22,
        "characteristics" :  [
            {
                "type" : "com.proto.ch.on",
                "perms" : [ "PR", "PW" ],
                "value" : true,
                "instanceID" : 23
            }
        ]
    }
  }
}
// Continued next page
```

```
PUT /characteristics HTTP/1.1
Host: ipcamera.local:12345
Content-Type: application/uap+json
Content-Length: <length>
{
   "characteristics" : [
     {
       "accessory ID" : 1,
       "instance ID" : 9,
       "value" : {
          "session-id" : "1DDD2EEE",
          "controller-ip" : 10.0.1.23",
          "controller-port" : 32032,
          "controller-srtp-master-key" : <string1>,
          "controller-srtp-master-salt" : <string2>
       }
     }
   ]
}
```

```
HTTP/1.1 200 OK
Content-Type: application/uap+json
Content-Length: <length>
{
     "value" :
          {
          "error-code" : 0,
          "accessory-ip" : 10.0.1.101",
          "accessory-port" : 13000,
          "accessory-srtp-master-key" : <string1>,
          "accessory-srtp-master-salt" : <string2>
          }
}
```

```
PUT /characteristics HTTP/1.1
Host: ipcamera.local:12345
Content-Type: application/uap+json
Content-Length: <length>
{
   "characteristics" : [
     {
       "accessory ID" : 1,
       "instance ID" : 10,
       "value" : {
          "session-id" : "1DDD2EEE",
       }
     }
   ]
}
```

```
HTTP/1.1 200 OK
Content-Type: application/uap+json
Content-Length: <length>
{
     "value" :
          {
          "error-code" : 0
          }
}
```

| SERVICE | PROPERTY | VALUE |
|---|---|---|
| IP streaming 3301 | Type | com.proto.svc.stream |
| | Characteristic | com.proto.ch.stream.capability |
| | | com.proto.ch.stream.control.input |
| | | com.proto.ch.stream.control.result |

FIG. 33

| CHARACTERISTIC | PROPERTY | VALUE | |
|---|---|---|---|
| Streaming capabilities 3401 | Type | com.proto.ch.stream.capabilities | |
| | Permissions | Paired Read | |
| | Data Object | protocol | 1=TCP, 2=UDP |
| | | protocol-info | <object> |
| Streaming control input 3402 | Type | com.proto.ch.stream.control.input | |
| | Permissions | Paired Write | |
| | Data Object | request-type | 1=open, 2=close |
| | | stream-id | <string> |
| | | protocol-info | <object> |
| Streaming control result 3403 | Type | com.proto.ch.stream.control.result | |
| | Permissions | Paired Read, Events | |
| | Data Object | stream-id | <string> |
| | | port | <integer> |
| | | transaction-id | <string> |
| | | status-code | <integer> |
| | | protocol-info | <object> |

FIG. 34

UNIFORM COMMUNICATION PROTOCOLS FOR COMMUNICATION BETWEEN CONTROLLERS AND ACCESSORIES

CROSS-REFERENCE TO RELATED APPLICATIONS

This application claims the benefit of U.S. Provisional Application No. 61/935,967, filed Feb. 5, 2014, entitled "Protocols and Specifications for an Accessory Management System," the disclosure of which is incorporated by reference herein in its entirety.

BACKGROUND

The present disclosure relates in general to communication between electronic devices and in particular to uniform communication protocols for communicating between controllers and accessories.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, household appliances, etc.

SUMMARY

At present, it can be difficult for a user to manage multiple electronically controllable devices or systems. For instance, a user's home might have a thermostat, an electronically controllable lighting system, a home security system, and so on. Each such system can be made by a different manufacturer, and each manufacturer may provide a dedicated controller device (e.g., IR-based remote control device) or a controller app that the user can install and run on a general-purpose computing device such as a mobile phone, tablet, or home computer system. Each controller device or app is typically customized for a particular manufacturer's systems and may not be interoperable with systems from other manufacturers or even with other systems from the same manufacturer. Such a piecemeal approach is not readily scalable. A user seeking to create a "smart home" environment or the like, with a disparate array of systems that can be centrally controlled or managed, is confronted with the need to accumulate a plethora of controller devices and/or controller apps.

Certain embodiments of the present invention relate to a "uniform" protocol for communication between a controller device (or "controller") and any number of other electronic devices that are to be controlled (referred to herein as "accessory devices" or simply "accessories"). A controller can be implemented, for example, on a general-purpose computing device such as a desktop computer, laptop computer, tablet computer, mobile phone, other handheld or wearable computing device, by providing the general-purpose computing device with appropriate executable program code; alternatively, a controller can be a special-purpose computing device. An accessory can include any device that is controllable by a controller. Examples of accessories include light fixtures, thermostats, door locks, automatic door openers (e.g., garage door opener), still or video cameras, and so on. Accessories and controllers can communicate with each other via wired or wireless channels using standard transport protocols such as Wi-Fi, Bluetooth, Bluetooth LE, or the like.

In some embodiments, a uniform accessory protocol can define a simple and extensible framework for defining an accessory as a collection of services, with each service being defined as a set of characteristics, each of which has a defined value at any given time. The characteristics can represent various atomic aspects of the accessory's state. For example, in the case of a thermostat, characteristics can include power (whether the thermostat unit is on or off), current temperature (actual temperature measured by the thermostat), and target temperature (a settable temperature the thermostat seeks to maintain). The protocol can further define message formats usable by a controller to send command-and-control messages (requests) to the accessory and for the accessory to send response messages. The requests can allow the controller to interrogate (e.g., read) accessory characteristic and in some instances to modify (e.g., write to) accessory characteristics; for example, a controller can read a power characteristic to determine whether the accessory is on or off and can write to the power characteristic to turn the accessory off or on. Accordingly, any type of accessory, regardless of function, can be controlled by sending appropriate requests. An accessory can provide an accessory definition record to a controller. The accessory definition record can include complete information about all accessible characteristics of the accessory. A controller can use the accessory definition record in determining how to interact with the accessory. For example, information from the accessory definition record can be used by the controller to construct a user interface for operating the accessory as well as to construct request messages to the accessory.

In some embodiments, the protocol can further define notification mechanisms that an accessory can use to notify a controller when a characteristic changes. Examples include passive notification mechanisms, in which the controller can query the accessory as to whether any characteristics have changed; as well as active or event-based notification mechanisms, in which the accessory can selectively generate messages to one or more controllers when a particular characteristic changes. Multiple notification mechanisms can be concurrently supported, and a controller can select a notification mechanism to be used for a particular accessory, service, or characteristic.

In some embodiments, the protocol can define security measures that can be used to prevent unauthorized controllers from operating an accessory. For example, an accessory can be configured to accept requests only from a controller that has previously established a pairing with the accessory and is therefore recognized by the accessory. Establishing a pairing can include exchanging long-term public keys between the accessory and controller in a secure manner, with each device persistently storing the keys. The protocol can specify the pair setup procedure so as to reduce risk of a pairing being established without approval of the accessory's owner/operator. For example, during a pair setup process a user may be required to read a setup code presented by one device (e.g., the accessory) and input the setup code into the other device (e.g., the controller) or to place the devices in physical proximity to each other. Once a pairing is established, the pairing can be leveraged to provide end-to-end message encryption such that only the paired controller and accessory can read messages exchanged between them. For example, when an accessory and controller that previously established a pairing reconnect, they can verify the previous pairing (e.g., by proving that each possesses the other's long-term public key) and generate session-specific encryption keys.

In some embodiments, the protocol can define procedures for a controller to discover and configure compatible accessories in its vicinity. Such procedures can simplify the task of adding new accessories to an automated control system managed by a controller.

The following detailed description together with the accompanying drawings will provide a better understanding of the nature and advantages of the present invention.

BRIEF DESCRIPTION OF THE DRAWINGS

FIGS. 2A-2D show example definitions of accessory characteristics according to an embodiment of the present invention.

FIG. 2E shows examples of properties that can be defined for a characteristic according to an embodiment of the present invention.

FIG. 2F shows examples of extension characteristics that can be defined according to an embodiment of the present invention.

FIGS. 2G-2H show example definitions of accessory services according to an embodiment of the present invention.

FIG. 2I shows an example of an accessory information service that can be defined according to an embodiment of the present invention.

FIG. 2J shows examples of characteristics for an accessory information service that can be defined according to an embodiment of the present invention.

FIGS. 3A-3C show an example of an accessory definition record according to an embodiment of the present invention.

FIGS. 5A-5K show examples of request and response messages according to an embodiment of the present invention.

FIGS. 6A-6E show additional examples of request and response messages according to an embodiment of the present invention.

FIG. 11A shows an example of a request message to subscribe to notifications according to an embodiment of the present invention.

FIG. 11B shows an example of an event message according to an embodiment of the present invention.

FIG. 12 shows example characteristics for a pairing profile for an accessory according to an embodiment of the present invention.

FIG. 21 shows example service definitions for a door lock accessory according to an embodiment of the present invention.

FIGS. 25A-25B show example service definitions for an IP camera accessory according to an embodiment of the present invention.

FIGS. 26A-26E show example definitions for characteristics of services shown in FIG. 25 according to an embodiment of the present invention.

FIGS. 27A-27D show an example of an accessory definition record for an IP camera accessory according to an embodiment of the present invention.

FIG. 29 shows an example of a start media session request according to an embodiment of the present invention.

FIG. 30 shows an example of a start media session response according to an embodiment of the present invention.

FIG. 31 shows an example of an end media session request according to an embodiment of the present invention.

FIG. 32 shows an example of an end media session response according to an embodiment of the present invention.

FIG. 33 shows an example service definition for an IP streaming service according to an embodiment of the present invention.

FIG. 34 shows examples of characteristic definitions for the IP streaming service of FIG. 33 according to an embodiment of the present invention.

DETAILED DESCRIPTION

Certain embodiments of the present invention relate to a "uniform" protocol for communication between a controller device (or "controller") and any number of other electronic devices that are to be controlled (referred to herein as "accessory devices" or simply "accessories"). A controller can be implemented, for example, on a general-purpose computing device such as a desktop computer, laptop computer, tablet computer, mobile phone, other handheld or wearable computing device, by providing the general-purpose computing device with appropriate executable program code; alternatively, a controller can be a special-purpose computing device. An accessory can include any device that is controllable by a controller. Examples of accessories include light fixtures, thermostats, door locks, automatic door openers (e.g., garage door opener), still or video cameras, and so on. Accessories and controllers can communicate with each other via wired or wireless channels using standard transport protocols such as Wi-Fi, Bluetooth, Bluetooth LE, or the like.

Example Environment

Figure 1:
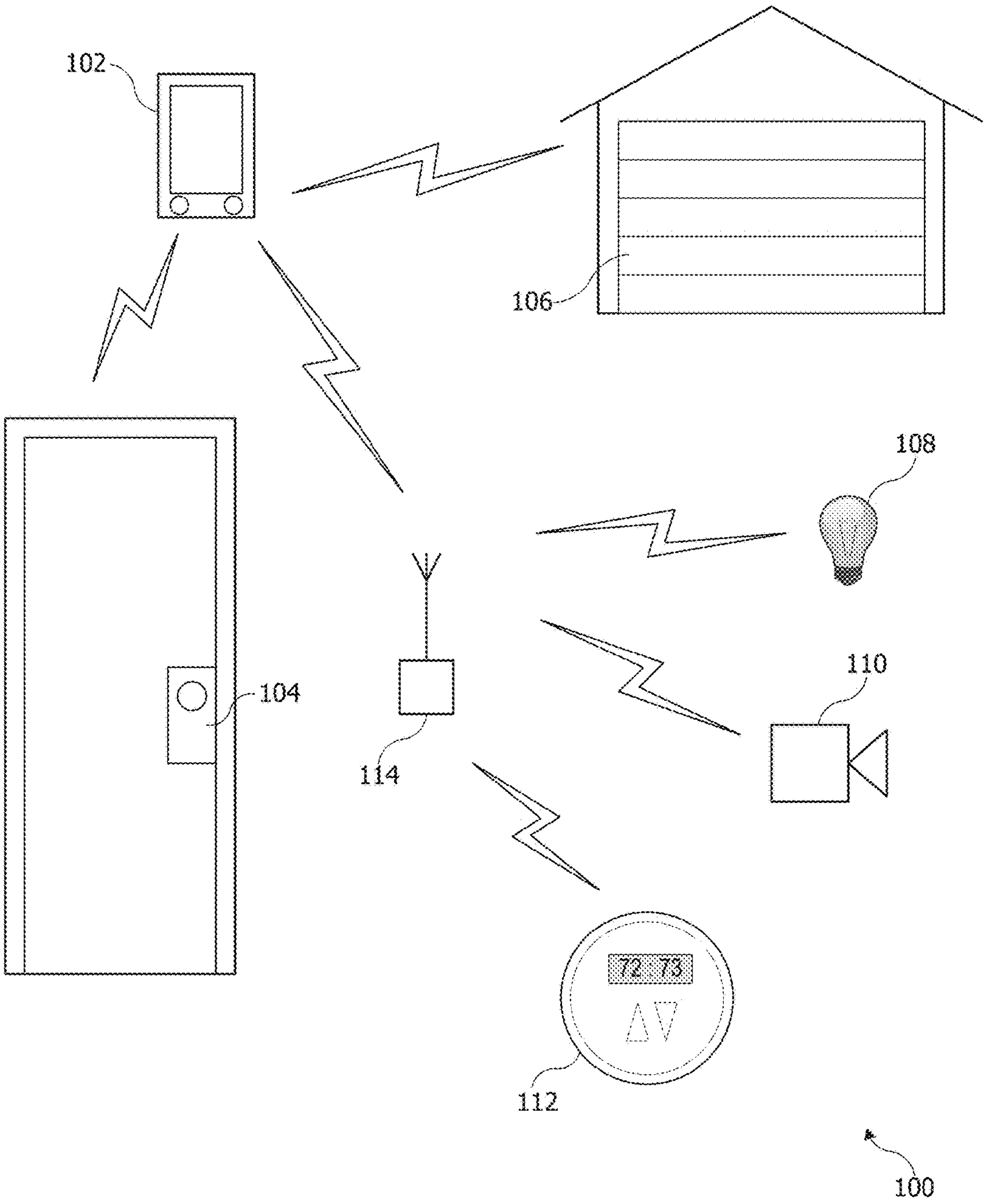
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in environment 100. Controller 102 can include, for example, a desktop computer, laptop computer, tablet computer, smart phone, wearable computing device, personal digital assistant, or any other computing device or set of devices that is capable of communicating command-and-control messages to accessories as described herein and presenting a user interface to allow a user to indicate desired operations on the accessories. In some embodiments, controller 102 can be implemented using multiple discrete devices. For example, there can be a base station that communicates with accessories, which can be installed in a fixed location in environment 100 and one or more mobile remote-control stations (e.g., a handheld or wearable device such as a mobile phone, tablet computer, smart watch, eyeglasses, etc.) that provide a user interface and communicate with the base station to effect control over accessories.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112).

Various communication transports and combinations of transports can be used, and different transports can be used with different devices. One example of a communication transport can be a transport conforming to Bluetooth® communication standards and protocols defined and promulgated by Bluetooth SIG, Inc. (http://www.bluetooth.com); the term "Bluetooth" as used herein refers generally to Bluetooth® communication standards and protocols, and the term "Bluetooth LE" as used herein refers to the Bluetooth® Smart communication standards and protocols. Bluetooth protocols can support direct point-to-point communication between devices within a limited range. Another example of a communication transport can be a transport conforming to Wi-Fi® communication standards and protocols defined and promulgated by the Wi-Fi Alliance® (http://www.wi-fi.org); as used herein "Wi-Fi" refers generally to Wi-Fi® standards and protocols. Wi-Fi protocols can define a wireless network with a central access point that routes communications between different devices on the network. The network can support a standard Internet protocol suite (IP) including, e.g., TCP and HTTP. It is to be understood that Bluetooth and Wi-Fi are used as examples of communication transports and protocols; other transports and protocols can also be used. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can act as a bridge, delivering the messages to light bulb 108 via the wired connection. Other combinations of wired and wireless communication are also possible.

Further, while one controller 102 is shown, home environment 100 can have multiple controller devices. For example, each person who lives in the home may have one or more personal devices (e.g., mobile phone, tablet, laptop, wearable device) that can act as controllers for some or all of accessories 104-112. Different controller devices can be configured to communicate with different subsets of the accessories; for example, a child's controller might be blocked from modifying settings on thermostat 112, while a parent's controller device is permitted to modify the settings. Such permissions can be configured and controlled, for example, using pairing techniques described below.

Certain embodiments of the present invention relate to a uniform accessory protocol that facilitates communication by controllers such as controller 102 with one or more accessories such as any or all of accessories 104-112. The protocol can provide a simple and extensible framework that models an accessory as a collection of services, with each service being defined as a set of characteristics, each of which has a defined value at any given time. The characteristics can represent various atomic aspects of the accessory's state. For example, in the case of thermostat 112, characteristics can include power (whether the thermostat is on or off), current temperature measured by thermostat 112, and target temperature to which thermostat 112 is set. Examples of accessory models using services and characteristics are described below.

The protocol can further define message formats usable by controllers (e.g., controller 102) to send command-and-control messages (requests) to accessories (e.g., thermostat 112) and message formats usable by accessories (e.g., thermostat 112) to send response messages to controllers (e.g., controller 102). The command-and-control messages can allow a controller to interrogate (e.g., read) the current state of accessory characteristics and in some instances to modify (e.g., write to) accessory characteristics. For example, modifying the power characteristic of thermostat 112 can turn thermostat 112 off or on). Accordingly, any type of accessory, regardless of function or manufacturer, can be controlled by sending appropriate messages. The message formats can be uniform across controllers and accessories; examples are described below. In some embodiments, an accessory can provide an accessory definition record to a controller. The accessory definition record can include complete information about all accessible characteristics of the accessory. A controller can use the accessory definition record in determining how to interact with the accessory. For example, the controller can use information from the accessory definition record to construct a user interface for operating the accessory as well as to construct request messages to the accessory.

The protocol can further define notification mechanisms that allow accessory 112 (or other accessories) to selectively notify controller 102 in the event of a state change. Examples include passive notification mechanisms, in which controller 102 can query an accessory (e.g., accessory 112) to find out whether any characteristics have changed; as well as active, advertised or event-based notification mechanisms, in which accessory 112 (or other accessories) can selectively generate messages to one or more controllers and/or broadcast an advertisement when a particular characteristic changes. Multiple notification mechanisms can be concurrently supported, and a controller can select a notification mechanism to be used for a particular accessory, service, or characteristic. Examples are described below.

In some embodiments, communication with a given accessory can be limited to authorized controllers. The protocol can specify one or more mechanisms for establishing a "pairing" between controller 102 and a given accessory (e.g., door lock accessory 104) under circumstances that provide a high degree of confidence that the user intends for controller 102 to be able to control accessory 104, and a controller that has established a pairing with a particular accessory can be considered authorized for that accessory. Pairing can be established, e.g., by establishing a secure cryptographic framework using short-term keys and an out-of-band shared secret. Long-term public keys for the accessory and controller can be exchanged within this framework, and the accessory and controller can persistently store the exchanged keys, thereby establishing the pairing. After the pairing is established, accessory 104 is able to verify whether received communications are from paired controller 102 or another device, and accessory 104 can reject any communications that are not from paired controller 102 (and vice versa). For example, when an accessory and controller that previously established a pairing reconnect, they can verify the previous pairing (e.g., by proving that each possesses the other's long-term public key) and generate session-specific encryption keys to use for communication within a pair-verified session. In some embodiments, multiple controllers can establish pairings with the same accessory, and the accessory can accept and respond to communications from any of its paired controllers while rejecting or ignoring communications from unpaired controllers. Examples of pairing processes are described below.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. A controller can be any device that is used to control one or more other devices (accessories), and an accessory can be any device that allows some or all of its operations to be controlled by a controller. Controller 102 can implement or include any or all of the features described herein as being implemented or included in a controller, and accessories such as accessories 104-112 can implement or include any or all of the features described herein as being implemented or included in an accessory.

In some embodiments, controller 102 can communicate with an accessory (e.g., accessory 108) from a remote location (e.g., anywhere in the world). For example, while located in a remote environment, controller 102 can communicate via a wide-area network (e.g., the Internet) with a server that has the ability to relay messages to accessory 108 (e.g., by communicating with access point 114 located in environment 100, which can communicate locally with accessory 108). The content of the communication between controller 102 and accessory 108 can be opaque to the server; for example, controller 102 and accessory 108 can establish a secure communication session (e.g., a pair-verified session as described herein) in which messages are encrypted, and the server can simply pass along the encrypted data while remaining agnostic as to its content. Thus, accessories can be operated locally (e.g., by a controller able to establish a direct communication path to the accessory) or remotely (e.g., by a controller that communicates indirectly via a relay server or the like).

Example Accessory Model

In some embodiments, a uniform accessory protocol can provide a uniform framework and syntax for modeling any accessory as a collection of "services." A "service" as used herein can refer to a collection of data and associated behaviors for accomplishing a feature, function, or operation of the accessory device (or some portion thereof). Each service can be modeled as a collection of "characteristics," each of which represents an atomic data element or behavior of the accessory (also referred to as an element of accessory state). As described below, an accessory can describe itself to a controller by providing to the controller an accessory definition record, which can be a structured data object that defines the services and characteristics of the accessory. The structured data object can be represented in various specific formats, for instance using JSON (JavaScript Object Notation), the Bluetooth LE Generic Attribute Profile (GATT), or other techniques and formats for representing and communicating structured data. As described below, the controller can use the accessory definition record to determine how to control the accessory.

For example, thermostat accessory 112 of FIG. 1 can include a component that performs the function of regulating the temperature of an area (e.g., a room or building or portion of a building) to maintain a temperature close to some target. For purposes of modeling accessory 112, temperature regulation can be identified as a "thermostat" service. Characteristics of the thermostat service can include: whether the thermostat is on or off; the currently set target temperature; the current measured temperature; and whether the system regulated by the thermostat is currently in heating mode (able to turn on a heater to drive the measured temperature toward a higher target temperature) or cooling mode (able to turn on a cooler to drive the measured temperature toward a lower target temperature). In a more complex example, the thermostat might be programmable, e.g., to choose a different target temperature depending on the time of day and/or day of the week, and in such cases, the characteristics can include programming features such as a set of time ranges and associated target temperature for each time range.

In some instances, an accessory can provide multiple services. For example, garage door accessory 106 may be implemented using an automatic garage door opener that can open and close the door and that also has a light that can be controlled, e.g., to light the interior of the garage. Accordingly, a definition of garage door accessory 106 can include a "door-opener" service that accomplishes the function of opening and closing the garage door and a "light-bulb" service that accomplishes the (different) function of turning the light on or off. Characteristics of the door-opener service can include the current state of the door (e.g., open, closed, in the process of opening, in the process of closing), whether the door is locked (e.g., to prevent the opener from opening the door), and whether the door is obstructed (e.g., whether an obstruction sensor in the door-opener system has detected an obstruction that prevents the door from closing). Characteristics of the light-bulb service can include whether the light is on or off and the current brightness level (if the light has a variable-brightness control).

It is to be understood that any accessory can be modeled as a collection of services, and that different accessories in the same environment can include some or all of the same or similar services. For example, an environment such as home environment 100 can have multiple light bulbs in different locations (e.g., lights in each room), multiple door locks (e.g., a lock on each exterior door, locks on interior doors), and so on. In some embodiments a uniform accessory protocol expressly allows for such overlap by defining a namespace such that each accessory and service can be uniquely identified, allowing instances of the same service on different accessories, or multiple instances of similar services on the same accessory, to be readily distinguished.

In some embodiments, a uniform accessory protocol can define a set of "core" characteristics, which can include characteristics that are expected to be frequently used and/or to be present across a range of different accessory types. The set of characteristics can be made extensible, for instance, accessory manufacturers can be allowed to define manufacturer-specific characteristics (also referred to herein as "extension" characteristics). Thus, accessories are not limited to the core characteristics. Using core characteristics where applicable, however, can facilitate system design and operation. For example, a controller's system software can include code defining properties of the core characteristics, and an accessory that uses only core characteristics can describe itself to the controller by identifying its characteristics and their current values.

FIGS. 2A-2D show some examples of standard characteristics 201-229 that can be defined according to an embodiment of the present invention. Each characteristic 201-229 can have a value (not shown in FIGS. 2A-2D) that represents some aspect of the state of an accessory (or portion of the accessory) that provides the service to which a given instance of the characteristic belongs. In this example, each characteristic 201-229 is described as having a type, permissions, and a format. Depending on format, additional information (e.g., a minimum value, maximum value, step size, unit, or enumerated list of valid values) is also included.

The "type" of a characteristic can be a unique name or identifier assigned to that characteristic (e.g., a character string). In this example, a reverse domain name convention is used to assign types, which can facilitate definition of extension characteristics by accessory manufacturers. For instance, if the promulgator of a uniform accessory protocol that includes the characteristic definitions shown in FIGS. 2A-2D is the owner of an Internet domain called "proto.com," all the core characteristic types can begin with the string "com.proto.ch.", followed by a characteristic-specific name, such as "on", "brightness", and so on. Other naming conventions can be used.

In some embodiments, in addition to or instead of a named type, each characteristic can be assigned a unique numerical identifier (not shown in FIGS. 2A-2D). For example, the unique numerical identifier can be a UUID consisting of 36 hexadecimal digits conforming to Internet Engineering Task Force (IETF) RFC 4122 (all "IETF RFC" documents referenced herein can be accessed via http://ietf.org/rfc.html). The uniform accessory protocol can define a common "base" UUID (e.g., the last 28 hexadecimal digits) for all core characteristics and assign a unique "short" UUID (e.g., first 8 hexadecimal digits) to each characteristic; any numbering scheme can be used. The use of UUIDs, particularly combined with a convention for truncating UUIDs, can allow a controller or accessory to specify a characteristic of interest using a smaller amount of transmitted data relative to using a character string. For example, in some embodiments, a truncation convention can reduce a 36-digit UUID to just two or three hexadecimal digits.

The "permissions" of a characteristic can indicate the manner in which a controller is allowed to interact with the characteristic (e.g., interrogating or modifying the characteristic). In some embodiments, the permissions can be represented as an array of strings, where each string corresponds to a specific manner of interaction. If the string is present, its corresponding manner of interaction is permitted; if the string is absent, then the interaction is not permitted. Some

TABLE 1

| Permission String | Description |
|---|---|
| "Paired Read" ("PR") | Paired controller can read the characteristic (e.g., using HTTP GET request as described below) |
| "Paired Write" ("PW") | Paired controller can write to the characteristic (e.g., using HTTP PUT request as described below) |
| Unpaired Read ("UR") | Unpaired controller can read the characteristic (e.g., using HTTP GET request as described below) |
| Unpaired Write ("UW") | Unpaired controller can write to the characteristic (e.g., using HTTP PUT request as described below) |
| Admin Read ("AR") | Paired controller with administrator permission (see below) can read the characteristic |
| Admin Write ("AW") | Paired controller with administrator permission (see below) can write to the characteristic |

In some embodiments, read permission for a characteristic is granted when it is desired for controllers to find out the corresponding aspect of accessory state, and write permission is granted when it is desired for controllers to be able to instigate a change to the corresponding aspect of accessory state. Thus, for instance, characteristics related to a condition that the accessory is able to directly control (e.g., target temperature characteristic 210) can have read and write permission, while characteristics related to a condition that the accessory cannot directly control (e.g., current temperature characteristic 209) can have only read permission.

Each characteristic 201-229 can have a value that reflects the corresponding attribute or aspect of accessory state. FIGS. 2A-2D specify the format for the value of each characteristic 201-229. As used herein. <boolean> format indicates that the characteristic takes values of true and false; <int> format indicates that the characteristic takes a signed integer value; <float> indicates that the characteristic takes a signed floating-point values); <string> indicates that the characteristic takes a character string value e.g., using UTF-8 encoding); <date> indicates that the characteristic takes a date value (e.g., a UTF-8 date string in ISO 8601 format); and <data> indicates that the characteristic can be used to store a data blob (i.e., a block of data for which the protocol can be agnostic as to its content). The <enum> format indicates that the characteristic takes one of a defined set of values representing specific conditions, and the possible values are listed as "valid values" for that characteristic. In some embodiments, an enumerated value format can be implemented by assigning a different integer to each valid value. The <tlv> format indicates a packed type-length-value data type, where the first byte indicates the type, the second byte indicates the length (N bytes), and the remaining N bytes contain the value. In some embodiments, other formats can be used; examples include a data object format, denoted herein as <object> (the data object can further be defined using a key-value format) and an array format (which can be a fixed-length or variable-length array of values in any of the other formats). In some embodiments, a uniform accessory protocol can specify a closed universe of allowed formats for characteristics such that values of all characteristics (including extension characteristics) are represented in one of the allowed formats.

The value of the characteristic can indicate an attribute or aspect of accessory state. The value can be specified in a format appropriate to the information being represented. In some cases, a characteristic definition can specify a range of values. For instance, "Max" (or "maxValue") can denote an upper limit, "Min" (or "minValue") can denote a lower limit, and "Step" (or "stepSize") can denote a minimum increment for characteristics that take a discrete value. "Units" can be defined to indicate specific units in which the value is measured; this information can facilitate interpretation of the value by a controller.

For example, "on" characteristic 201 can have a Boolean value of "true" if the accessory is powered on and "false" if the accessory is powered off. This characteristic can be used, e.g., in connection with a light bulb, light switch, or other accessory that has on and off states (and that can communicate with a controller while in its off state). As another example, "outlet in use" characteristic 202 can be used with an accessory that has a power outlet, and the Boolean value can indicate whether a power plug is connected to the power outlet or not. In this case, it is assumed that the accessory cannot physically insert or remove a power plug, and accordingly, the characteristic has read-only permission.

As a simple example of accessory control using an accessory model, suppose a power outlet accessory has a control switch that can start or stop the flow of power to the outlet. The power outlet accessory can be modeled as a service having "on" characteristic 201 and "outlet in use" characteristic 202. A controller can read "outlet in use" characteristic 202 to determine whether a power plug is connected to the outlet, then write to "on" characteristic 201 to enable or disable power to the outlet depending on whether a power plug is connected.

Brightness characteristic 203, hue characteristic 204, and saturation characteristic 205 can be used, e.g., in connection with an accessory that provides a light source. Brightness characteristic 203 can have an integer value in a range of 0 to 100 (as indicated in the "Min, Max, Step" field in FIG. 2A) to indicate the brightness level as a percentage of the maximum brightness supported by the accessory. As with all characteristics specified in percentage units, it is to be understood that accessories are not required to support exactly one hundred distinct settings for the corresponding aspect of device state (in this case, brightness); instead, an accessory can map a given percentage value to a setting that is available. Hue characteristic 204 can have a floating point value specifying hue in a range from 0 to 360 degrees; the translation of the value in degrees to a physical hue can follow standard color modeling practices. Saturation characteristic 205 can have a floating-point value in the range from 0 to 100 to define the desired color saturation as a percentage of maximum. A controller can read these characteristics to determine the current settings and write to the characteristics to change the settings. Other color models can also be supported (e.g., CIE 1931 color space, color temperature, etc.).

Audio feedback characteristic 206 can be used where the accessory has optional audio feedback (e.g., beeping) in response to user input or other events detected at the accessory. Audio feedback can be enabled or disabled by writing a Boolean value to this characteristic. Output volume characteristic 207 can be used to read or set output volume on an accessory that produces sounds; the value can indicate a percentage of the maximum volume the accessory us capable of producing.

Logs characteristic 208 can be used where an accessory maintains timestamped logs of activity. The structure of the logs can be defined by the accessory manufacturer, or specified for a particular type of accessory by a promulgator of the uniform accessory protocol. In this example, a controller can obtain the accessory's logs by reading characteristic 208 but does not write to characteristic 208, as it is not the controller's role to update the logs. It is to be understood that the accessory can add records of controller interactions to the log as part of its routine operation, and the controller can receive any such records with the rest of the logs.

FIG. 2B shows examples of characteristics pertaining to a thermostat accessory, which can include any accessory that can monitor the current temperature within an environment (e.g., a house or room) and control a heating and/or cooling system to adjust the temperature toward a target temperature. Current temperature characteristic 209 can be read by a controller to determine the current temperature measured by the accessory. Target temperature characteristic 210 can be read by a controller to determine the target temperature setting of the thermostat accessory and can also be written by a controller to change the target temperature setting. In this example, temperatures are specified in degrees Celsius; other scales (e.g., Fahrenheit, Kelvin) can be substituted. Regardless of what scale is specified by the protocol, a controller or accessory can always convert to a different scale for internal use and/or displaying to a user. For example, temperature units characteristic 211 can be read or written by a controller to indicate which units the accessory should use when displaying the temperature to the user. Further, while temperature characteristics 209 and 210 specify a range of allowed values, other ranges can be used, or the range can be left unspecified.

Some thermostats may be operable to control both heating and cooling. Accordingly, current heat/cool status characteristic 212 can be read to determine whether the thermostat is currently heating (actively warming toward the target temperature), cooling (actively cooling toward the target temperature, or off. Since the controller does note decide when to heat or cool, write permission is not provided. The operating mode of the thermostat can be controlled by writing to target heat/cool mode characteristic 213. In this example, valid values for mode characteristic 213 include heating mode (in which the thermostat warms the environment toward the target temperature), cooling mode (in which the thermostat cols the environment toward the target temperature, auto mode (in which the thermostat can dynamically select heating mode or cooling mode, depending on environmental conditions), and off. When the auto mode is selected, it may be desirable to specify temperature thresholds for switching the thermostat into heating or cooling mode. For example, cooling threshold temperature characteristic 214 can be written by a controller to set a cooling threshold temperature such that the thermostat will enable cooling mode if the current temperature exceeds the cooling threshold temperature, and heating threshold temperature characteristic 215 can be written by a controller to set a heating threshold temperature such that the thermostat will enable heating mode if the current temperature falls below the heating threshold temperature. As shown in FIG. 2B, cooling temperature threshold characteristic 214 and heating temperature threshold characteristic 215 can but need not have different upper and lower limits from each other and from target temperature characteristic 210.

FIG. 2C shows examples of characteristics pertaining to door openers (e.g., a garage-door opener or other automated mechanism that opens and/or closes a door) and door locks. Current door state characteristic 216 can be read by a controller to determine whether the door is currently open, closed, in the process of opening or closing, or stopped (e.g., not fully open or fully closed but not moving). Target door state characteristic 217 can be written by a controller to indicate whether the door should be opened or closed. If a controller writes a value to target door state characteristic 217 that does not match current door state characteristic 216, the accessory can respond by actuating the door-opener mechanism so as to change the current state to match the target. For example, if the door is open (current door state characteristic 216 has the "open" value) and a controller writes a value of "closed" to target door state characteristic 217, the accessory can actuate the door-opener to close the door. Upon actuation of the door-opener, the accessory can update current door state characteristic 216 to "closing," and once the door is fully closed, the accessory can further update current door state characteristic 216 to "closed," matching the target state. The controller can learn the current state of the door at any time by reading target door-state characteristic 217

In some embodiments, a door-opener accessory can provide additional information to a controller. For instance, motion detected characteristic 218 can be used to indicate whether the accessory has detected motion around the door (e.g., knocking on the door). Obstruction-detected characteristic 219 can be used to indicate whether the accessory has detected an obstruction that may prevent movement of the door. A controller can obtain this information by reading these characteristics. In some embodiments, an accessory can send a notification to a controller if a change in these characteristics is detected (e.g., if the door becomes obstructed or if motion is detected).

Locking a door can be treated separately from opening or closing the door. For instance, a "lock mechanism" accessory can be implemented for any device that controls a deadbolt, magnetic lock, or any other physical mechanism that can be engaged to prevent a door from being opened. Lock mechanism current state characteristic 220 can be read by a controller to determine whether the lock mechanism is currently unsecured (unlocked), secured (locked), jammed (unable to be locked or unlocked), or unknown. Lock mechanism target state characteristic 221 can be written by a controller to request locking or unlocking of the door. Lock mechanism last action characteristic 222 can be read by a controller to determine the last known action performed on the lock. Varying levels of detail can be supported. For instance, in one embodiment, the valid values can include: (1) secured from inside using physical movement (e.g., user physically moved a deadbolt lever); (2) secured from outside using physical movement; (3) secured using a keypad; (4) secured remotely (e.g., based on a request from a controller); (5) secured based on a timeout condition; (6) unsecured from inside using physical movement; (7) unsecured from outside using physical movement; (8) unsecured using a keypad; and (9) unsecured remotely. Other combinations of valid values can also be defined, depending on the granularity of information desired.

Additional characteristics can be associated with managing the lock mechanism. For example, lock management auto timeout characteristic 223 can be used to set a timeout period after which the accessory automatically re-locks the lock. The timeout period can start, e.g., when the lock becomes unlocked. In some embodiments, the duration of the timeout period can be the numeric value of the characteristic (e.g., in seconds), and the value 0 can be used to indicate that there is no timeout period (i.e., the lock can remain unlocked until a specific action is taken to lock it). Lock management control point characteristic 224 can be used to invoke specific functions related to the lock, e.g., by writing a value to characteristic 224 that identifies the function. Examples of functions that can be invoked include reading a log of lock activity (which can result in the accessory returning a value for logs characteristic 208), clearing the log, setting a time at the lock, etc. As another example, a vendor may want to allow users to set various policies regarding use of the lock, such as only permitting remote opening of the lock between certain hours of the day. In some embodiments, a controller can provide these policies to the lock accessory by writing to lock management control point characteristic 224. In some embodiments, the uniform accessory protocol does not specify the content of the data written to lock management control point characteristic 224, but may specify that the data be provided in a TLV format or other format such that the data can be reliably communicated from the controller to the accessory using the uniform accessory protocol, and the data can be interpreted by the accessory in a vendor-specific manner.

FIG. 2D shows additional examples of core characteristics. Rotation direction characteristic 225 can be used to control a fan (or any other accessory that has a rotating element) to rotate in either a clockwise or counterclockwise direction. Rotation speed characteristic 226 can be used to control the rotation speed of the fan (or other rotating element), with the speed indicated as a percentage of a maximum speed.

Name characteristic 227 can be used to assign a human-readable name to an accessory or service. The name can be represented as a character string (e.g., in UTF-8 format).

Administrator-only access characteristic 228 can be used to limit access to an accessory or service to a controller that has been established as an administrator (i.e., has administrator permission) for the accessory. Examples of techniques for establishing a controller as an administrator are described below. In some embodiments, only a controller that has been established as an administrator of the accessory can write to characteristic 228.

Version characteristic 229 can be used to provide version information about an accessory or a service.

It is to be understood that the characteristics shown in FIGS. 2A-2D are provided as examples. Any number of core characteristics can be defined. For example, characteristics pertaining to other controllable aspects of an indoor environment (e.g., relative humidity) can be defined. The particular combination of characteristics defined as part of a uniform accessory protocol can be varied as desired. In some embodiments, characteristics not defined as core characteristics can be defined as extension characteristics by a third party (e.g., an accessory manufacturer) using techniques described here.

In some embodiments, the set of characteristics is extensible. An accessory can define a new characteristic (also referred to as an "extension" characteristic) by providing a set of properties (or descriptors) for the characteristic. FIG. 2E shows a set of definable properties of a characteristic according to an embodiment of the present invention. For core characteristics, these properties can be defined by the protocol (e.g., as shown in FIGS. 2A-2D). In some embodiments, an accessory can redefine some of the properties of a core characteristic and thereby override the default properties defined for that characteristic. In some embodiments, an extension characteristic can be defined by providing these properties within an accessory definition record. Examples are described below.

"Type" 230 can be a string identifying the type of the characteristic, e.g., using a reverse domain name convention as described above In some embodiments, a numeric identifier (e.g., a UUID as described above) can be used as a type identifier in addition to or instead of a string.

"Permissions" 231 can be an array of strings identifying the type of access permitted for controllers (e.g., any or all of the permissions in Table 1 above).

"NotificationMode" 232 can be an array of strings used to indicate how a controller should be notified of changes to the characteristic. In some embodiments, a controller can write to this property to subscribe to a particular notification mode. Table 2 lists some examples of notification modes that can be supported. Operation of each these notification modes is described below.

TABLE 2

| Notification Mode | Description |
|---|---|
| Passive | Accessory indicates a change in the characteristic by updating its internal state counter (e.g., "passive" notification as described below). |
| Advertised | Accessory indicates a change in this characteristic by advertising updated information through a device discovery service (e.g., "advertised" notification as described below) |
| Events | Accessory will send notification to connected and subscribed controller when the characteristic changes (e.g., using unsolicited HTTP EVENT response as described below) |
| Active Connect | Accessory indicates a change in this characteristic by initiating a connection to a subscribed controller (e.g., "active" notification as described below) |

In some embodiments, passive notification is supported by all accessories for all characteristics, regardless of any subscription by a controller; other supported notification modes can be selectively enabled based on subscription requests by controllers. In some embodiments, all core characteristics that have "Paired Read" permission also support at least "Events" notification mode.

"Format" 233 can be a string identifying the format for the value of the characteristic, e.g., Boolean, string, integer, floating-point, TLV, etc. In some embodiments, the protocol can define a set of recognized formats, and format 233 can be selected from the defined set.

"Value" 234 can be the current value of the characteristic.

"MinValue" 235 and "MaxValue" 236 can be used to set lower and upper limits on the characteristic, if limits are desired. Similarly, "stepSize" 237 can be used to specify a minimum increment for changing the value of the characteristic, if a minimum increment is desired. Where minValue, maxValue, and stepValue are specified, the accessory is expected to recognize and respond to any valid value in the range. However, as noted above, this does not imply that the number of settings available on the accessory must be equal to the number of valid values. For instance, if a light bulb accessory has brightness characteristic 203, the accessory can control the brightness (e.g., by regulating current supplied to the light bulb) such that brightness is at maximum when the brightness characteristic is set to 100 and at zero when the brightness characteristic is set to 0. It is expected (although not strictly required) that a light bulb for which the brightness characteristic is defined would have at least one intermediate gradation between zero and maximum brightness; if the accessory supports are more or fewer than 100 intermediate gradations, the accessory can define a mapping of brightness characteristic values to its brightness gradations.

In some embodiments, an enumerated value format may be supported, and "validValues" property 238 can be used to list the valid values where format 233 is specified as "enumerated."

"Unit" property 239 can indicate the units to use for the characteristic (e.g., percentage, a specific temperature scale, etc.). In some embodiments, the protocol can specify a preferred system of units, and unit property 239 for a given characteristic can be selected within this system.

"UserDescriptor" property 240 can provide a string that describes the characteristic or its function in a human-readable manner. For instance, a user descriptor for current heat/cool status characteristic 212 might say "Indicates whether the heating/cooling system is currently heating, cooling, or off."

"Owner" property 241 can identify an organizational unit that defined or redefined the characteristic. In some embodiments, this can help a user or developer understand the source of definitions of various characteristics.

Any or all of the properties in FIG. 2E (and optionally other properties) can be defined for a characteristic. As noted above, for core characteristics, the protocol can specify default definitions, and where a core characteristic is used, it is not necessary to include all of the properties of the characteristic in an accessory definition record (e.g., as described below). In some embodiments, an accessory can redefine a core characteristic by including in the accessory definition record those properties that are to be redefined. Extension characteristics can be defined by including all of their defining properties in the accessory definition record.

In some embodiments, properties of a characteristic can be read by a controller and used to determine how to render a graphical user interface for controlling the characteristic and/or presenting a current value. For instance, in the case of brightness characteristic 203 (FIG. 2A) or any other characteristic expressed as a percentage, the controller can render a control as a slider from 0 to 100% and move the slider in steps of 1%. In the case of on characteristic 201 (FIG. 2A) or any other characteristic expressed as a boolean, the controller can render an on/off switch. In the case of temperature-related characteristics, the controller can render a temperature gauge or the like based on the characteristic having units of "Celsius" (or other temperature units), or it can simply display the numerical value. Where user descriptor 240 is defined for a characteristic, the controller can render the text in connection with a user interface control element for the characteristic, and this can facilitate user understanding of the control element. Thus, an accessory can be self-describing such that, given an accessory definition record, a controller can dynamically generate an interface for controlling any accessory without having been specifically programmed for that accessory.

It will be appreciated that the characteristics shown in FIGS. 2A-2D and properties (or descriptors) shown in FIG. 2E are illustrative and that variations and modifications are possible. A uniform accessory protocol can define any number and combination of characteristics, and characteristics can be defined using a different set of properties and values from those shown. For example, a maximum string length property can be used to specify an upper limit on the length of a string, and a maximum data length property can be used to specify an upper limit on data-containing characteristics (e.g., for data objects or data blobs).

Further, as noted, the protocol can allow accessory manufacturers to define customized, or manufacturer-specific, extension characteristics for their accessories. By way of example, suppose a manufacturer (who owns the Internet domain "discoball.com") produces a "disco ball" system that includes a mirrored ball that can be controlled to rotate in different directions and at different speeds, and a light source that can be directed toward the surface of the ball. The light source can be modeled and controlled using core characteristics from FIGS. 2A-2D (e.g., "on" characteristic 201 and brightness characteristic 203). The manufacturer may want to define extension characteristics for further control of the light source and/or the mirrored ball. FIG. 2F shows examples of extension characteristics for this scenario.

Strobe characteristic 242 is an example characteristic for controlling a strobe effect. When true, the light is operated in strobe mode; when false, the light is operated in a steady mode.

Direction characteristic 243 is an example characteristic for controlling direction of rotation of the mirrored ball. The ball can be not rotating (stopped), rotating clockwise, or rotating counterclockwise. In embodiments where the core characteristics include rotation direction characteristic 225, the manufacturer can choose whether to use the core characteristic or define an extension characteristic.

Speed characteristic 244 is an example characteristic for controlling the speed of rotation of the mirrored ball. The speed in this example has two settings (0 for slow rotation, 1 for fast rotation). In embodiments where the core characteristics include rotation speed characteristic 226, the manufacturer can choose whether to use the core characteristic or define an extension characteristic.

As noted above, a uniform accessory protocol can model an accessory as one or more services, where each service is modeled as a collection of characteristics. Accordingly, a service can be defined by identifying its constituent characteristics, which can include any combination of core characteristics and/or extension characteristics. In some embodiments, a uniform accessory protocol can define a set of core services, which can include services that are expected to be frequently used and/or to be useful across a range of accessory types. The set of services can be made extensible; for instance, accessory manufacturers can be allowed to add manufacturer-specific characteristics to a core service or to define additional "extension" services. Using core services where applicable, however, can facilitate system design and operation by allowing system designers to leverage predefined services and characteristics.

FIGS. 2G-2H show examples of core services 251-258 that can be defined according to an embodiment of the present invention. Each service 251-258 can be assigned a "type," which can be a unique name identifying the service. In this example, similarly to the characteristic types, a reverse domain name convention is used to define the types in order to facilitate definitions of new services by accessory manufacturers. Thus, the core service types in FIGS. 2G-2H start with "com.proto.svc" (where "svc" can be used to indicate that the type is for a service rather than a characteristic).

In some embodiments, in addition to or instead of a type, each service can be assigned a unique numerical service identifier (not shown in FIGS. 2G-2H). For example, a UUID as defined by IETF RFC 4122 (an identifier consisting of 36 hexadecimal digits) can be assigned to each service. The uniform accessory protocol can define a common "base" UUID (e.g., the last 28 hexadecimal digits) for all services (which can be the same as or different from the base UUID assigned to all characteristics, as desired) and assign a unique "short" UUID (e.g., first 8 hexadecimal digits) to each service; any numbering scheme can be used. The use of UUIDs, particularly combined with a convention for truncating UUIDs based on the "short" UUID, can allow a controller or accessory to specify a service of interest using a smaller amount of transmitted data relative to using a character string.

Each service 251-258 represents a function that an accessory can implement and is defined by reference to a set of required characteristics ("Required Ch." property in FIGS. 2G-2H) and a set of optional characteristics ("Optional Ch." property in FIGS. 2G-2H). In the examples herein, each service has at least one optional characteristic (the name); in other embodiments, the set of optional characteristics can be empty for at least some services.

In this example, a characteristic is defined as "required" for a given core service in instances where any compliant accessory that claims to provide that core service is expected to recognize and use the "required" characteristic to control the accessory. For example, light bulb service 251 includes the required characteristic "com.proto.ch.on," (characteristic 201 of FIG. 2A); this means that if an accessory claims to provide the "com.proto.svc.lightbulb" service, then the accessory is expected to respond to write requests to characteristic "com.proto.ch.on" by turning the light on (true) or off (false) and to respond to read requests to characteristic "com.proto.ch.on" by returning a Boolean value indicating whether the light is on (true) or off (false). In some embodiments, the accessory may respond only to requests from authorized (or paired) controllers; authorization is described below.

In this example, a characteristic is defined as "optional" for a given core service in instances where the accessory is not required to include the characteristic in its service definition but may do so. For instance, light bulb service 251 includes optional characteristic "com.proto.ch.brightness" (characteristic 203 of FIG. 2A). A light bulb accessory that has only on or off settings (such as many conventional fluorescent light fixtures) would not have any use for a brightness control, and such an accessory need not support the "com.proto.ch.brightness" characteristic. A light bulb accessory that has brightness control (e.g., a dimmable lamp) can include the "com.proto.ch.brightness" characteristic to allow the controller to operate the dimmer. Similarly, hue and saturation can be optional characteristics for light bulb service 251.

Other services 252-258 can be defined similarly, specifying a combination of required and optional characteristics. The characteristics are identified in FIGS. 2G-2H by type and can be defined as shown in FIGS. 2A-2D described above. It should be noted that a characteristic can be required in one core service and optional in another. For instance, lock-mechanism current state and target state are optional characteristics for garage door opener service 253 but required characteristics for lock mechanism service 254.

It is to be understood that the core service examples in FIGS. 2G-2H are provided for purposes of illustration. Any number of core services can be defined, and the particular required and/or optional characteristics associated with a given core service can be varied as desired. Further, in embodiments where extension characteristics are supported, a manufacturer may be allowed to augment a core service by adding extension characteristics. Additionally or instead, in some embodiments, a manufacturer can define an extension service using any combination of core characteristics and/or extension characteristics.

The accessory itself can be described using an "accessory information" service, which can be a core service specified by the protocol. In some embodiments, the protocol can specify that all protocol-compliant accessories include an instance of the accessory information service in their accessory definition records. FIG. 2I shows a definition for an accessory information service 261 according to an embodiment of the present invention (in the same format as FIGS. 2G-2H), and FIG. 2J shows definitions of additional characteristics 271-276 for accessory information service 261 (in the same format as FIGS. 2A-2D).

Identify characteristic 271 can be written by a controller to invoke a self-identification routine of the accessory. This self-identification routine can include the accessory initiating a user-observable action. For example, the accessory might blink a light, emit a sound, vibrate, move a movable component (e.g., open and close a door), display a specific message (e.g., "Here I am"), or perform some other physical action that a user can observe. Invoking an accessory's self-identification routine from a controller can be useful, e.g., in connection with confirming that the controller is communicating with the accessory the user wants to control. In some embodiments, a controller can invoke the accessory's self-identification routine by writing "true" to identify characteristic 271.

Manufacturer name characteristic 272, model name characteristic 273, and serial number characteristic 274 can be read by a controller to obtain identifying information about the accessory. In some embodiments, the values can be human-readable character strings.

Firmware revision characteristic 275, hardware revision characteristic 276, and/or software revision characteristic 277 can be read by a controller to obtain generational information about the accessory, which can be used by a controller to determine how to interact with the accessory. In some embodiments, the revision information can be represented in a standard format, e.g., <x>.<y>.<z>;<w>, where <x> is a major version number, <y> is a minor version number, <z> is a revision version number, and <w> can contain additional information.

It will be appreciated that the foregoing examples of characteristics and services are illustrative and that variations and modifications are possible. A uniform accessory protocol can define any number and combination of core characteristics and core services, and a given service can be defined with a different set of characteristics from those shown. As noted, core services can be augmented with extension characteristics and/or extension services (e.g., as defined by accessory manufacturers), providing a significant degree of flexibility and adaptability to varying needs within a uniform communication and control framework.

In some embodiments, different versions of core service definitions can coexist. To facilitate compatibility between different generations of products, later versions of a core service definition can be restricted to adding new optional characteristics; maintaining a consistent set of required characteristics can facilitate interoperability.

As noted above, in some embodiments, an accessory manufacturer can add extension characteristics to a service. For instance, if the accessory is a light with a strobe option, the manufacturer can add a strobe characteristic (e.g., strobe characteristic 242 of FIG. 2F) to core light bulb service 251. A manufacturer can also define extension services. For example, in the case of the disco ball described above, the manufacturer can define an extension service "com.discoball.svc.discoball" to control the mirrored ball and light. This service can include the following characteristics:

com.proto.ch.on (characteristic 201, FIG. 2A);
com.proto.ch.brightness (characteristic 203, FIG. 2A);
com.proto.ch.hue (characteristic 204, FIG. 2A);
com.discoball.ch.strobe-on (characteristic 242, FIG. 2F);
com.discoball.ch.rotate-direction (characteristic 243, FIG. 2F); and
com.discoball.ch.rotate-speed (characteristic 244, FIG. 2F).

An accessory model that represents an accessory as a collection of services having characteristics can be communicated to a controller as an accessory object. An accessory object can be communicated using JSON or other notations for representing structured data objects (e.g., using nested key-value pairs). FIGS. 3A-3C show an example of an accessory object 300 according to an embodiment of the present invention. Accessory object 300 is represented using JSON; other representations can be substituted. A garage door opener with an attached light is used for purposes of illustration, although accessory models are not limited to any particular accessory.

Accessory object 300 can be represented as an array of service instances 310, 320, 330, each of which can be represented as an array of characteristic instances. Thus, service instance 310 can include characteristic instances 311-315; service instance 320 can include characteristic instances 321-325; and service instance 330 can include characteristic instances 331-332. In this example, service instance 310 is an instance of accessory information service 261 of FIG. 2I, service instance 320 is an instance of garage door opener service 253 of FIG. 2G, and service instance 330 is an instance of light bulb service 251 of FIG. 2G. (The terms "service" and "service instance" may be used interchangeably herein, as may the terms "characteristic" and "characteristic instance.")

Each service instance 310, 320, 330 and each characteristic instance 311-315, 321-325, 331-332 can include a service or characteristic type, identifying the service or characteristic of which it is an instance. In this example, type strings are used. In some embodiments, a UUID or truncated UUID can be used, allowing service and characteristic types to be identified numerically rather than with strings. This can reduce the size of accessory object 300. Each service instance and each characteristic instance is also assigned an instance identifier. In this example, each service instance and characteristic instance of an accessory has a unique instance identifier, which can be assigned sequentially or in any other desired manner. This can allow any service instance or characteristic instance within the accessory to be addressed by reference to its instance identifier, as described below. In some embodiments, different uniqueness rules can be implemented. For example, each service instance can have a unique service instance identifier, and each characteristic instance can have a characteristic instance identifier that is unique among characteristic instances within a service instance. This can allow a service instance to be addressed by reference to its instance identifier and a characteristic instance to be addressed by its instance identifier together with the instance identifier of the service instance to which it belongs. Other schemes can be used.

In FIG. 3A, service instance 310 can be an instance of accessory information service 261 of FIG. 2I. In some embodiments, the protocol can specify that each accessory have a single instance of the accessory information service and that the accessory information service instance have instance ID of 1; different rules can be specified as desired. Characteristic instances 311-315 can be instances of the required characteristics for service 261. In FIG. 3B, service instance 320 can be an instance of garage door opener service 253 of FIG. 2G. Characteristic instances 321-323 can be instances of the required characteristics for service 253. In this example, service instance 320 also includes optional characteristic instances 324, 325 to control a lock mechanism of the garage door opener. In FIG. 3C, service instance 320 can be an instance of light bulb service 251 of FIG. 2G. Characteristic instance 331 can be an instance of the required characteristic for service 251, and characteristic instance 332 can be an instance of the optional brightness characteristic.

For services other than the accessory information service, multiple instances of the same service can coexist within an accessory object. For example, an accessory that operates multiple independently-controllable light bulbs can have a different instance of light bulb service 251 for each light bulb, allowing the state of each light bulb to be independently controlled.

Accessory object 300 can also provide a current value for each characteristic instance that has read permission. For instance, the garage door is currently closed (current door state characteristic instance 321 has value 2, which maps to "closed"), and the light is off (on characteristic instance 331 has value false). Identify characteristic instance 315 has a null value because access to this characteristic is write-only.

Permissions for each characteristic instance can be indicated as an array of"perms" strings. IN this example, the array can include the "Events" string to indicate that the accessory supports event notification as to this characteristic. For instance, as described below, a controller can subscribe to event notifications for any characteristic instance whose permissions include the "Events" string. Examples of event notification mechanisms are described below.

FIG. 3C shows an example of an accessory partially redefining a core characteristic. Brightness characteristic instance 332 is redefined (relative to core characteristic 203) to reduce the number of brightness increments by specifying new minimum, maximum, and step values. The redefinition applies only to instance 332 and would not affect the brightness characteristic of any other service instance defined within accessory object 300 or of any other accessory with which a given controller interoperates.

It will be appreciated that the accessory object of FIGS. 3A-3C is illustrative and that variations and modifications are possible. An accessory can include any number and combination of service instances, and a service instance within an accessory can include any number and combination of characteristic instances. More or fewer properties of a given characteristic instance can be specified within the accessory object; for instance, any or all of the various properties shown in FIG. 2E can be specified. Where an accessory includes multiple service instances, one of the service instances (e.g., the first service instance listed in the accessory object other than the accessory information service instance) can be designated as a primary service.

In addition, while FIGS. 3A-3C show an implementation using JSON, the use of any particular notation or syntax is not required. For example, those skilled in the art with access to the present disclosure will understand that accessory services and characteristics can be represented by leveraging the Bluetooth LE Generic Attribute Profile (GATT), thereby facilitating communication between controllers and accessories using Bluetooth LE. For example, services and characteristics can be identified by UUIDs such that each service and each characteristic has a unique UUID.

Further, in some embodiments, a controller may communicate with a single endpoint (also referred to as an accessory server) to interact with one or more accessories. To support this, an accessory definition record can include an array of one or more accessory objects, where each accessory object can be represented in the manner shown in FIGS. 3A-3C. Each accessory object can be assigned an accessory instance ID that is unique within the array of accessory objects. It is to be understood that a given accessory server may serve one or more accessory objects, all represented in a single accessory definition record for that accessory server. A controller can communicate with any number of accessory servers. In some embodiments, a single endpoint that controls multiple accessories (or that relays messages to another accessory) may be referred to as a "bridge," and the accessory definition record for such an access point can include an accessory object for the bridge as well as an accessory object for each accessory controlled by the bridge. The accessory object for the bridge can include just a single instance of the accessory information service, and the presence of an accessory object for the bridge can indicate to the controller that a bridge is present.

In operation, each accessory (or accessory server) can store its accessory definition record in persistent storage. An accessory can provide all or part of its accessory definition record to a controller on request. As described below, this can occur as part of a device discovery process or at other times (e.g., upon request from a paired controller). In some embodiments, the controller can use information from the accessory definition record to determine whether to pair with or otherwise connect to the accessory. If a pairing or connection is established, the controller can use the accessory definition record to determine how to control the accessory.

The accessory definition record can be self-contained, meaning that the controller does not need any other information about the accessory in order to interact with it. For example, the accessory definition record can include a complete definition of a manufacturer-specific characteristic (e.g., "com.discoball.ch.rotate-direction") and/or a manufacturer-specific service (e.g., "com.discoball.svc.discoball"), and the definition can include human-readable descriptors of the characteristics and services. A controller can be programmed to generate a user interface that presents the human-readable descriptor and a user-operable control element (selected, e.g., based on the "units" property of the characteristic) for various characteristics, and the user can operate the control element to control the accessory as desired. The controller can send control messages (requests) based on the user input (e.g., writing new values to characteristics), thus allowing for control of the accessory without the controller requiring accessory-specific software or other accessory-specific customization.

Example Accessory Discovery Process

Prior to controlling an accessory, a controller first establishes communication with the accessory to be controlled. "Accessory discovery" as used herein refers generally to any process by which a controller can locate an accessory with which it is to communicate. Discovery in some instances can include user verification that communication between the controller and the accessory should occur. In some embodiments, accessory discovery can leverage existing service discovery protocols that facilitate locating devices and/or services on a wireless or other network, such as the Simple Service Discovery Protocol (SSDP), a protocol developed by the UPnP Forum (http://www.upnp.org), or the Bonjour) networking technology developed by Apple Inc. (published as IETF RFC 6762 and IETF RFC 6763 and referred to herein as "Bonjour"). In a device discovery service, one device (e.g., the accessory) can advertise information indicating its existence, address, and optionally additional information about its capabilities. Other devices (e.g., controllers) can browse the advertisements and identify devices of interest based on the broadcast information. Using the address, the browsing device can initiate communication with the advertiser.

Depending on the network and discovery service, advertising can but need not include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository.

Figure 4:
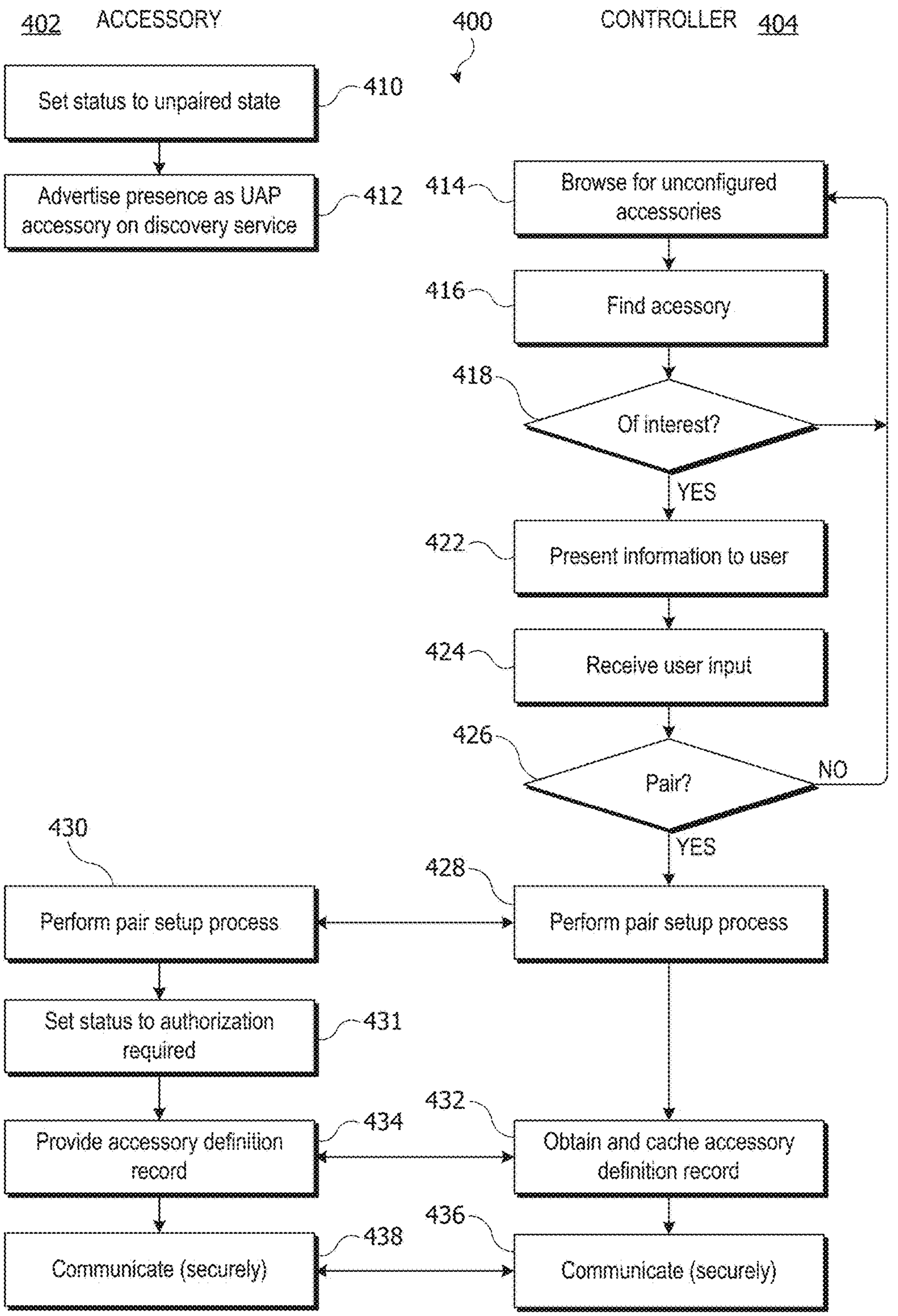
FIG. 4 is a flow diagram of a process for discovering an accessory by a controller according to an embodiment of the present invention.

FIG. 4 is a flow diagram of a process 400 for discovering an accessory 402 by a controller 404 according to an embodiment of the present invention. Accessory 402 can be, e.g., any of the accessories in FIG. 1, and controller 404 can be, e.g., controller 102 of FIG. 1.

At block 410, accessory 402 can set a status bit to indicate that it is currently unpaired (or looking for a controller with which to pair). This can be, e.g., a bit in the status flags indicator "sf#" described below.

At block 412, accessory 402 can advertise its presence as an accessory that supports the uniform accessory protocol ("UAP") on a device discovery service. For instance, using Bonjour, the accessory can advertise itself with a name and a service type. The name can be a user-readable name for the accessory (e.g., "Thermostat"); in some instances the advertised name can be the name specified in the accessory information service instance of the accessory definition record. The service type can be defined for the uniform accessory protocol (e.g., service type "_uap._tcp"). The advertisement can also include additional information. For example, the accessory can provide a Bonjour TXT record with the keys shown in Table 3.

TABLE 2

| Key | Description |
|---|---|
| "c#" | Current configuration number.<br>Updates when accessory definition record is modified (e.g., when accessory, service, or characteristic is added or removed); persists across reboot, power cycle, etc,<br>Can be used by paired controller to detect accessory configuration changes. |
| "ff" | Feature flags<br>Can be a bitmask usable to indicate presence or absence of selected features. |
| "id" | Globally unique ID of the accessory (e.g., primary MAC address) |
| "md" | Accessory model name |
| "ps" | Primary service type of the accessory (e.g., "com.proto.svc.lightbulb")<br>If present, can provide a controller additional information about accessory functions (beyond the name). |
| "pv" | Protocol version string (e.g., in format <major>.<minor>)<br>Can be used to check compatibility. In some embodiments, if the major version the accessory indicates is larger than the major version of the controller's software, the controller can exclude the accessory from the available set. |
| "s#" | Current state number.<br>Increments each time the value of a characteristic changes; persists across reboot, power cycle, etc. |
| "sf#" | Discovery status flags.<br>Can be a bitmask indicating aspects of current status (e.g., unpaired, problem detected on the accessory, authorization required to access the accessory, accessory not configured to join a wireless network). |

Those skilled in the art will appreciate that similar information can be distributed using other service discovery protocols and techniques. For instance, using SSDP, the accessory can advertise a name and service type URI using a multicast HTTP NOTIFY message, and the URI can be used by the controller to retrieve additional information via unicast request to the accessory.

At block 414, controller 404 can browse for unconfigured accessories. No particular timing is required, although in general a controller will only discover an accessory if the accessory's advertisement is detectable at the time the controller browses.

At block 416, controller 404 can find accessory 402, e.g., by detecting the advertisement from block 412. At block 418, controller 404 can determine, based on the advertisement, whether accessory 402 is "of interest," or a potential candidate for interoperation. For example, controller 404 can check the discovery status flags "sf#" in Table 2 to determine whether the accessory is already configured or paired with a controller. As another example, controller 404 can check the protocol version "pv" in Table 2 to determine whether the accessory's protocol version is compatible with the controller's. Further, in some instances, a controller may be browsing for accessories in a particular context (e.g., executing a specific application) and can limit accessories of interest based on advertised name, primary service identifier, accessory model name, feature flags, or any other information available from the accessory's advertisement. If controller 404 determines that the accessory is not of interest, controller 404 can return to block 414 and continue to browse. (In some embodiments, the browsing operation can time out if an accessory of interest is not found.)

At block 422, controller 404 can present information about the accessory to the user, and at block 424, the user can provide input indicating whether the controller should establish a pairing with the accessory. For example, controller 404 can present any or all of the information obtained from the accessory's advertisement to the user and prompt the user to indicate whether controller 404 should connect to accessory 402. While not required, requesting user confirmation can help to avoid spurious or unwanted pairings between a controller and an accessory.

At block 426, controller 404 can interpret the user input received at block 424 and determine whether it should pair with accessory 402. If not, controller 404 can return to block 414 to look for other accessories. If controller 404 and accessory 402 should pair, then at blocks 428 and 430, controller 404 and accessory 402 can execute a pair setup process. In some embodiments, the pair setup process can be used to establish encryption keys to facilitate secure communication between controller 404 and accessory 402; examples of pair setup processes that can be implemented at blocks 428 and 430 are described below. In some embodiments, user confirmation can be incorporated into the pair setup process, and a separate user confirmation prior to initiating pair setup is not required.

Assuming that the pair setup process completes successfully, at block 431, accessory 402 can update its status to indicate that authorization is now required to communicate with the accessory and/or that the accessory is now paired with at least one controller, e.g., by updating the status flags indicator "sf#" described above.

At block 432, controller 404 can obtain and cache the accessory definition record from accessory 402, which can provide the record upon request at block 434. Where controller 404 caches the accessory definition record, the information can be used to facilitate detecting state changes in accessory 402. In some embodiments, controller 404 can also cache information from the accessory's advertisement (e.g., any or all of the information from Table 2 above), and this information can also be used to detect state changes in the accessory, e.g., using the state counter "s#" as described below.

At blocks 436 and 438, controller 402 and accessory 404 can begin to exchange command and control messages, allowing controller 404 to control accessory 404. In some embodiments, these messages can be encrypted using keys established in the pair setup process or in a subsequent pair verify process as described below.

It will be appreciated that the discovery process described herein is illustrative and that variations and modifications are possible. Steps described as sequential may be executed in parallel, order of steps may be varied, and steps may be modified, combined, added or omitted. Further, while the Bonjour service is used as an example of a device discovery service, similar concepts can be applied in the context of other device discovery services.

In some embodiments, prior to determining whether to pair with a particular accessory controller 404 can request the accessory definition record (or a portion thereof) from accessory 402. For instance, controller 404 can send a message (e.g., an HTTP GET request) to the accessory to request its accessory definition record. The URL to use for the HTTP GET request can be specified by a convention of the uniform accessory protocol, or within the accessory's advertisement (e.g., in the TXT record). Depending on configuration, accessory 402 can provide all, some, or none of its accessory definition record in response to a request from an unpaired controller. In some embodiments, accessory 402 can provide a partial accessory definition record. For example, as described above, some characteristics may have properties specifying that they can only be read and/or written by paired controllers, and providing information about such characteristics to an unpaired controller may be undesirable. Accordingly, accessory 402 can identify "public" characteristics, i.e., characteristics that unpaired controllers are permitted to read and/or write, and a partial accessory definition record provided to an unpaired controller can include only service instances that have at least one public characteristic and can include only the public characteristic instances of a service instance that has both public and non-public characteristics. In some embodiments, accessory definition records are not made accessible at all before a pairing is established; in that case, the decision whether to pair can be based on the accessory's advertisement, the controller's context, and/or user input.

In some embodiments, discovery process 400 or a similar process can be used to detect state changes. For example, as noted in Table 2, the state number "s#" can be incremented when state changes. An accessory can advertise a state change, e.g., by broadcasting an updated TXT record, and a paired controller that has previously cached the TXT record (e.g., at block 432 of process 400) can detect the change by comparing the broadcast value of "s#" to its cached value.

The process of FIG. 4 can be used in instances where the controller and accessory communicate using TCP/IP. In some embodiments, a uniform accessory protocol may support other transports, such as Bluetooth LE, in addition to or instead of TCP/IP. Where this is the case, accessories can advertise their services using Bluetooth LE. For example, an accessory can advertise on one or more Bluetooth LE advertising channels. The advertisement data can include, e.g., any or all of: a local name for the accessory; a unique accessory identifier; flags indicating that the accessory is discoverable; UUIDs for at least some of the services (including a pairing service as described below); an indicator of the accessory state (similar to the current state number in Table 2); and an indication of whether the accessory has performed pair setup with at least one controller. This information can be used in a discovery process similar to process 400 described above.

Example Communications

After a controller has established a pairing with an accessory, the controller can send command-and-control messages (requests) to the accessory. These requests can be used to obtain information about the accessory's state and/or to change aspects of the accessory's state. In some embodiments, the command-and-control messages can be HTTP requests addressed to a URL that reflects the path for a particular service or characteristic, as defined in the accessory definition record. In such embodiments, the accessory can act as an HTTP server (receiving and responding to requests for resources) while the controller can act as an HTTP client (generating requests to a server/accessory and receiving responses). It should be noted that some accessories can implement multiple HTTP servers, e.g., for managing communications on different interfaces or domains. In some embodiments, accessories and controller can support multiple HTTP requests through a single TCP connection and/or HTTP pipelining (e.g., sending multiple HTTP requests before receiving a response).

Figure 5A:
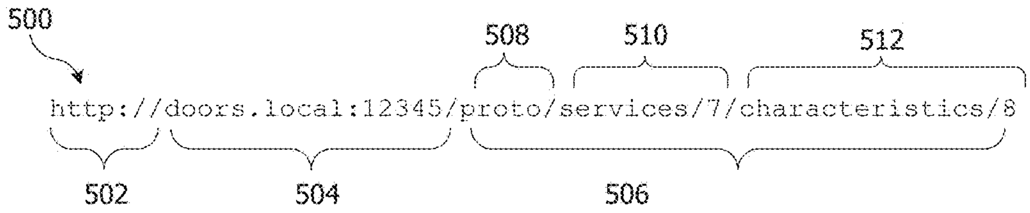

For instance, given accessory object 300 shown in FIGS. 3A-3C, a controller can construct URL 500 of FIG. 5A to represent a resource, in this case door-state characteristic instance 321 of door-opener service instance 320 defined in FIG. 3B. URL 500 includes a protocol-identifying prefix 502 ("http://"), a hostname 504 for the accessory (which can be obtained through the discovery process of FIG. 4 described above), and a local path 506. Local path 506 can include a protocol keyword 508 ("proto/") to indicate a reference to a service exposed through the uniform-accessory protocol, a service instance identifier 510 ("service/<serviceID>") to identify a specific service instance, and a characteristic instance identifier 512 ("characteristic/<characteristicID>") to identify a characteristic instance within the service instance. In FIG. 5A, <serviceID> and <characteristicID> are replaced with instance identifiers defined in the accessory object. Thus, referring to FIGS. 3A-3C, the service instance with instanceID of 7 is garage door opener service instance 320, and the characteristic instance with instanceID of 8 would be current-state characteristic instance 321. Thus, URL 500 can be understood as referencing the current door state of a garage door opener. In a similar manner, other URLs can be generated from accessory definition records using instanceIDs for the services and characteristics. Any characteristic instance of any service instance can be identified in this manner.

A controller can generate an HTTP GET (PUT) request to a URL constructed in this manner to read (write) a characteristic. Further, the hierarchical structure of URL 500 can be exploited to allow the controller to read from or write to multiple characteristics or multiple services in a single transaction. For example, sending a GET request to read all characteristics of a particular service can be accomplished by omitting the characteristic identifier. The response can be a JSON object containing the characteristics, in a similar format to FIGS. 3A-3C.

Figure 5B:
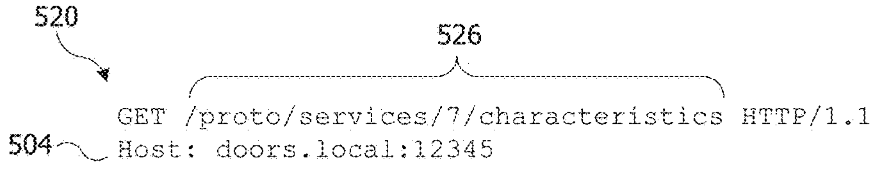

To determine the current state of an accessory resource, a controller can send an HTTP GET request based on URL 500 of FIG. 5A. FIG. 5B shows an example of a GET request 520 constructed from URL 500 of FIG. 5A. GET request 520 is addressed to host 504 of URL 500 and specifies local path 526 (similar to local path 506 of URL 500) as the resource to be retrieved. In this example, local path 526 does not specify a single characteristic; this can be interpreted as a request to read all characteristics of the specified service instance.

Figure 5C:
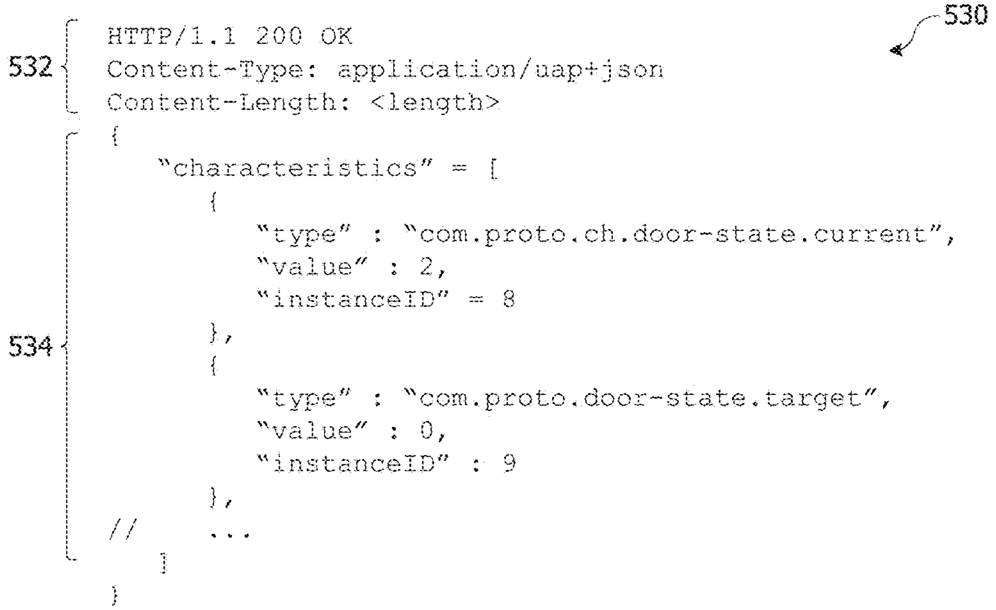

In response to HTTP GET request 520, the accessory can send an HTTP response providing the requested resource (state information). FIG. 5C shows a portion of an example HTTP response 530 that can be provided in response to the request of FIG. SB. The response includes HTTP response header 532 identifying the response and status ("200 OK") and indicating that the content 534 is formatted as a JSON object as defined by the uniform accessory protocol. Content 534 includes the state information for the requested resource, which in this example is door-opener service instance 320 of FIG. 3B. Service instance 320 includes five characteristic instances, and the current state of all five characteristics is reported since the request is to read all characteristics. (Only two characteristics are shown in FIG. 5C; it will be understood that the rest can be presented in a similar manner.) Read requests and responses at other levels of granularity can be constructed (e.g., a single characteristic instance or all service instances) by modifying path 526 to reflect the desired level of granularity.

Similarly, a controller can change state information for an accessory by sending an HTTP PUT request to the appropriate URL. FIG. 5D shows an example of a PUT request 540 constructed from URL 500 of FIG. 5A. PUT request 540 is addressed to host 504 of URL 500 and specifies local path 546 (similar to local path 506 of URL 500) as the resource to which content 542 is to be written. In this example, PUT request 540 writes to one characteristic instance, so path 546 includes the instanceID of the desired characteristic instance (which corresponds to door-opener target state characteristic instance 322 of FIG. 3B). Content 542 specifies the value to be written. In the example of FIG. 3B, characteristic instance 322 is of type "com.proto.ch.door-state.target," and as described above, the value 1 for this characteristic type can map to the "open" state. Accordingly, PUT request 540 can be interpreted by the accessory as an instruction to open the garage door.

The accessory can respond with an empty HTTP "204 No Content" response, and can implement the state update, e.g., by opening the door. (While the door is actively opening, the accessory may update current door state characteristic instance 321 to a value indicating that the door is opening, then update to the value indicating "open" once the door is fully open.) In some embodiments, the accessory response can include content, e.g., as described below with reference to FIG. 5F. For instance, if an error occurs, the accessory can respond with an HTTP error response. For instance, HTTP error code 400 can indicate a bad request (e.g., syntax error or invalid characteristic), error code 403 can indicate a forbidden action (e.g., an attempt to write to a resource for which the controller does not have write permission), and error code 500 can indicate an internal error at the accessory. In some instances, the content of an error response can include a "response" object with information about the error. An example of a response object is described below.

In some embodiments, multiple characteristics can be written using a single PUT request. FIG. 5E shows an example of a PUT request 550 constructed from URL 500 of FIG. 5A. PUT request 550 can be similar to PUT request 540, except that local path 556 is at the service level of granularity, which allows writing multiple characteristics. Referring to accessory definition 300 of FIG. 3 and characteristic definitions in FIG. 2A, PUT request 550 can be interpreted as a request to unlock and open the garage door. As this example shows, it is possible to write to a subset of characteristics of a service using a PUT request. The request can include just the characteristics to be written; the presence of the type and instanceID keys within each characteristic data object can prevent ambiguity. Further, characteristics to be written can be listed in any order.

The accessory can respond with a message that includes the current state of each characteristic. FIG. 5F shows an example response 560 according to an embodiment of the present invention. Response 560 is a non-empty HTTP response, whose content 562 includes the current value of each updated characteristic 563, 564. For each characteristic, a "response" object 565, 566 is included. As shown, the response object can include a "developerMessage." If an error occurred, the developerMessage can provide a plain-language explanation of the error and optionally provide suggestions for correcting the problem. The "errorCode" can be a numerical code (which can be used, e.g., to select controller actions to be taken in response). The "moreInfo" string can provide additional information, such as identifying a section of a protocol specification or other documentation that should be referenced for help with the error. In the example shown in FIG. 5F, no errors occurred, and the state of each characteristic is the state requested in FIG. 5E. If an error occurs, the state might not match the state requested.

In a similar manner, a PUT request similar to request 550 of FIG. 5E can be used to write to a service, or to multiple services, and a response similar to request 506 of FIG. 5F can be generated.

As described, a controller can request a state change in the accessory by sending a PUT request. In some instances, the state change may involve invoking accessory functions (e.g., execution of commands or operations) that can require some time to complete. To allow the accessory flexibility in responding, some embodiments support a deferred-response behavior with respect to some characteristics or services.

When a controller writes to a characteristic using HTTP PUT, the accessory can evaluate the request and choose a response option (e.g., based on the particular characteristic that was written). In some embodiments, two response options are provided: "inline result" and "query result." For an inline result, the accessory performs the requested operation, then returns the result in the HTTP response (e.g., as described above with reference to FIGS. 5E and 5F). The response can be deferred as long as necessary to complete the operation. For a query result, the accessory returns an HTTP response before performing the operation. In this case, the pre-operation HTTP response can include a "transaction ID" (assigned by the accessory) that the controller can use later to send an HTTP GET request to obtain the outcome. The pre-operation HTTP response can also include a "transaction duration" (also assigned by the accessory) that indicates the minimum time the controller should wait before sending the GET request. The accessory can select a response option on a per-request basis.

By way of illustration, consider an accessory that implements functionality to open a configuration port. The port can be modeled as a service having various characteristics. FIG. 5G shows a characteristic instance 571 to which a controller can write Boolean true to request opening a port. FIG. 5H shows a PUT request 572 that can be used by a controller to request opening a port according to an embodiment of the present invention. (It is to be understood that characteristic instance 571 is defined within a service instance that has instanceID 22.) The accessory can either fulfill or deny the request, e.g., depending on controller permissions or the current state of the accessory. The accessory can choose whether to act on the request first, then respond (inline result), or to respond then act (query result).

If the accessory chooses to act on the request first, then the accessory can send an inline response indicating the outcome. For example, fulfilling the request can include creating a socket and starting to listen on a port. The accessory can pass information about the configured port in its HTTP response. FIG. 5I shows an example of an inline HTTP response 573 to request 572 of FIG. 5H. Content 574 can include a port identifier and status indicator for the request.

If the accessory chooses to respond first, the accessory can send a transaction response containing information that the controller can use later to query for the result. FIG. 5J shows an example of a transaction response 575 according to an embodiment of the present invention. Transaction response 575 includes a transaction ID 576, which can be a UUID or other identifier generated by the accessory to identify the transaction, and a transaction duration 577 (e.g., in seconds). Response 575 indicates that the controller should wait 5 seconds, then query the accessory to retrieve the response. During that time, the accessory can perform the action and store the result along with the transaction ID.

After the transaction duration has elapsed, the controller can query the accessory, e.g., by sending an HTTP GET request using the same URL as the first request. FIG. 5K shows an example of an HTTP GET request 578 that can be used for a transaction status query according to an embodiment of the present invention. GET request 578 can include the transaction ID from transaction response 575. This indicates to the accessory that the query is for a specific transaction result that it may have stored. The accessory can respond with an HTTP response that includes the result of the transaction; this response can be similar or identical to inline response 573 of FIG. 5I.

Other techniques for accessing resources can be implemented. One alternative implementation can use a non-hierarchical URL and exploit the unique instance ID of each service instance and characteristic instance of an accessory, which can reduce the length of HTTP messages.

Figure 6A:
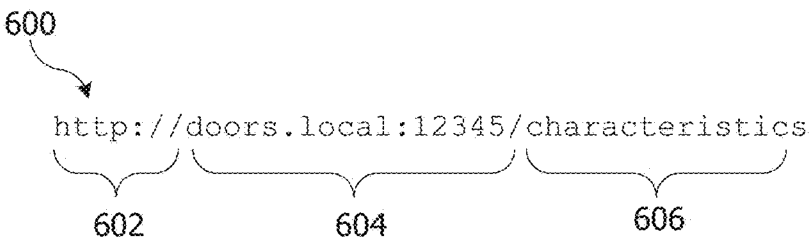

For example, FIG. 6A shows a simplified URL 600 that can be constructed to allow access to an accessory's characteristics and services. URL 600 includes a protocol-identifying prefix 602 ("http://"), a hostname 604 (which can be provided through the discovery process of FIG. 4 described above), and a local URL 606, which in this example is "/characteristics." Local URL 606 can be selected from a set of URLs supported by the accessory. Table 4 lists URLs that a uniform accessory protocol can define according to an embodiment of the present invention.

TABLE 4

| Local URL | Supported Requests |
|---|---|
| /accessories | GET: obtain accessory definition record |
| /characteristics | GET: interrogate characteristic(s)<br>PUT: modify characteristic(s) |
| /identify | POST: invoke accessory self-identification routine (may be ignored or rejected by accessory with at least one established pairing) |
| /pair-setup | POST: pair-setup request |
| /pair-verify | POST: pair-verify request |
| /pairings | POST: request to add, remove, or list pairings |

In this example, a controller can invoke accessory functions by sending requests to URLs constructed in the manner shown in FIG. 6A, with the local URL selected from Table 4 based on the function to be invoked. The /pair-setup, /pair-verify, and /pairings URLs can be used in connection with establishing and verifying pairings between a controller and an accessory; examples are described below. A paired controller can send a GET request to the /accessories URL of an accessory to obtain its accessory definition record. The /characteristics URL can be used for all interactions involving reading or writing accessory characteristics.

The /identify URL can allow an unpaired controller to invoke the accessory's self-identification routine, e.g., before the accessory has established a pairing with any controller. If the accessory is not paired with any controller, the accessory can respond with an HTTP 204 "No Content" response and proceed to invoke the self-identification routine. If the accessory has established a pairing with a controller, the accessory can decline the request (e.g., with an HTTP 400 "Bad Request" response) indicating that the URL is not valid. In some embodiments, a paired controller can invoke the accessory's self-identification routine by writing to identify characteristic 271, which can be included in the accessory identification service as shown in FIGS. 2I and 3A.

Figure 6B:
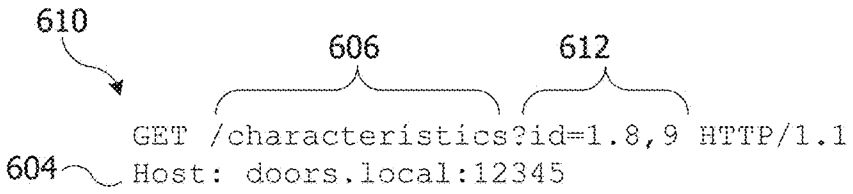

FIG. 6B shows an example of an HTTP GET request 610 that can be sent using URL 600 to read characteristics of an accessory defined by accessory object 300 of FIGS. 3A-3C. GET request 610 is addressed to host 604 of URL 600 and specifies local URL 606. String 612 is a URL parameter that specifies the characteristic instance(s) to be read. The format used is <accessoryIID>.<characteristicIID(s)>, where <accessoryIID> is an instance identifier of the accessory, and <characteristicIID(s)> is a comma-separated list of instance identifiers for the characteristics to be read. Referring to the instance IDs of FIG. 3B, GET request 610 can be understood as a request to read the current door state and target door state. Other formats, such as a range of characteristic instance identifiers (e.g., URL parameter "?1.8-12") can be used. In this example, it is not necessary to specify a service instance identifier because each characteristic of an accessory is assigned a unique instance identifier. In other embodiments, a service instance identifier can be included if desired.

Figure 6C:
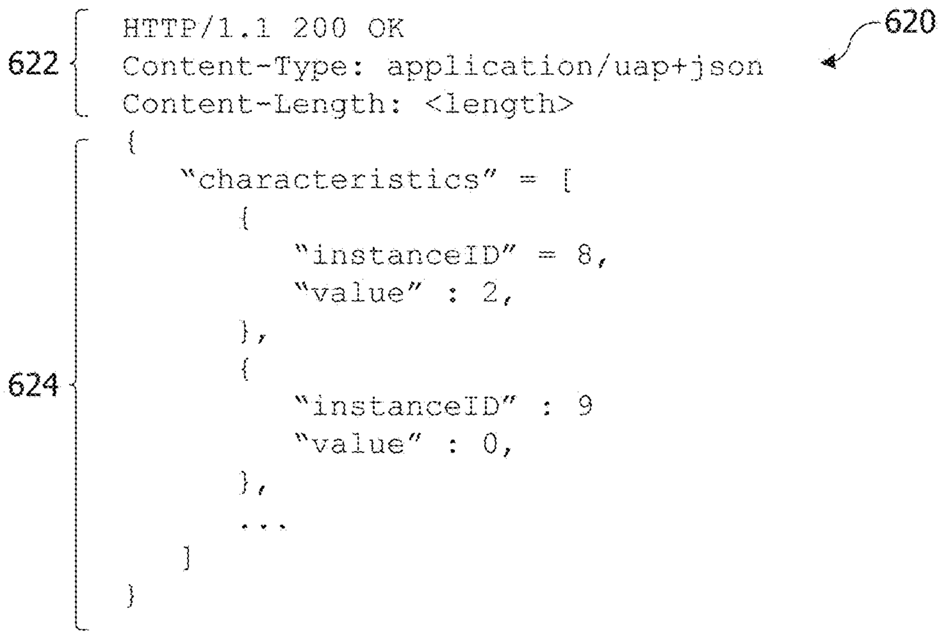

FIG. 6C shows an example of an HTTP response 620 that can be sent in response to GET request 610. Response 620 can include HTTP response header 622 identifying the response and status ("200 OK") and indicating that the content 624 is formatted as a JSON object for the uniform accessory protocol. Content 624 can include the state information (value) for each requested characteristic instance. In this example, the data transmitted for each characteristic includes just the value and the instance ID. As long as each characteristic instance of an accessory has a unique instance ID, this information suffices to respond to the request.

Any number of characteristics of an accessory (including characteristics of different service instances) can be read in this manner using a single GET request and response. Further, if the controller is communicating with an accessory server that serves multiple accessory objects, the controller can send a single GET request to read characteristics of multiple accessories on the server, e.g., by specifying the characteristics as a comma-separated list of <accessoryIID>.<characteristicIID(s)>. For instance, a URL parameter ("?1.8.9,2.6,7") can be understood by an accessory server as a request to read characteristic instances 8 and 9 from the accessory with instance ID 1 and characteristic instances 6 and 7 from the accessory with instance ID 2.

Characteristics can be written using HTTP PUT requests to the accessory's /characteristics URL. FIG. 6D shows an example of a PUT request 630 that can be used to write to any number of characteristics of an accessory. For each characteristic to be written, content 634 can specify the accessory instance ID, characteristic instance ID, and new value. In this example, two characteristics are written, but the array can include any number (one or more) of characteristics, including characteristics of different accessories on the same accessory server.

If no error occurs, the accessory can respond with an empty HTTP "204 No Content" response and can implement the state update by initiating appropriate actions (e.g., triggering a motor in a garage door opener to move the door). If an error occurs, the accessory can respond with an error message. FIG. 6E shows an example of an error message 640 that can be sent in response to PUT request 630. In this example, content 644 identifies each characteristic instance for which a write was attempted is identified (again using accessory instance ID and characteristic instance ID). The new value is not indicated. Status codes 646, 648 are used to communicate which writes failed. In this example, status code 646 (value 0) indicates that no error occurred as to the characteristic with instance ID 8. Status code 648 (value −12345) indicates that an error occurred as to the characteristic with instance ID 9. The value of status code 648 can indicate the type of error. For example, status codes can be defined to indicate insufficient privilege (e.g., the controller is not authorized to write to the characteristic), inability to access the resource (e.g., accessory is powered off), the resource is busy, the request is not supported (e.g., attempted write to a read-only characteristic), the value is invalid (e.g., out of range for a characteristic with minimum and maximum values), and other error conditions as desired.

It will be appreciated that these command and control message formats and sequences of FIGS. 5A-5K and FIGS. 6A-6E are illustrative and that variations and modifications are possible. HTTP allows any resource to be requested at any time; accordingly, a controller can send HTTP requests in any order, and the accessory can respond to HTTP requests in the order received. An accessory can respond with standard HTTP responses (including error messages), and the controller can treat the HTTP responses as acknowledgement (or negative acknowledgement in the event of an error) messages. In some embodiments, mapping of accessory services and characteristics to HTTP resources can allow substantial flexibility in how controllers retrieve information. In some embodiments, use of instance identifiers with a shorter URL can result in shorter requests and responses, which can reduce bandwidth requirements.

Further, while the embodiments shown use HTTP, the invention is not limited to any particular framing protocol; other protocols can be substituted. For example, in embodiments where the controller and accessory communicate using Bluetooth LE, the controller can read from and write to characteristics by leveraging the Bluetooth LE GATT layer and a UUID assigned to each service and characteristic.

In the examples above, a controller can initiate a state change in an accessory by sending a command-and-control message (request) to the accessory, e.g., using an HTTP request. In other instances, an accessory state change can be initiated by a source other than the controller, and the controller might or might not be connected to the accessory when this occurs. For instance, different controllers can be interacting with the same accessory at different times, or a user may operate the accessory manually (e.g., pushing an open/close button in the garage to activate the garage door opener). Thus, accessory state can change without the controller being aware. Accordingly, some implementations of a uniform accessory protocol can provide mechanisms for notifying a controller of a state change. Multiple notification mechanisms can be concurrently supported, and a controller can determine which mechanism it prefers, e.g., on a per-characteristic or per-service basis.

Examples of notification mechanisms are listed in Table 2 above. In some instances, an accessory can maintain an internal state counter that can be incremented each time the accessory's state is changed. A single state counter can be maintained at the accessory level, or different state counters can be maintained for different services or characteristics as desired. Various embodiments can support any or all of the notification mechanisms described below.

Figure 7:
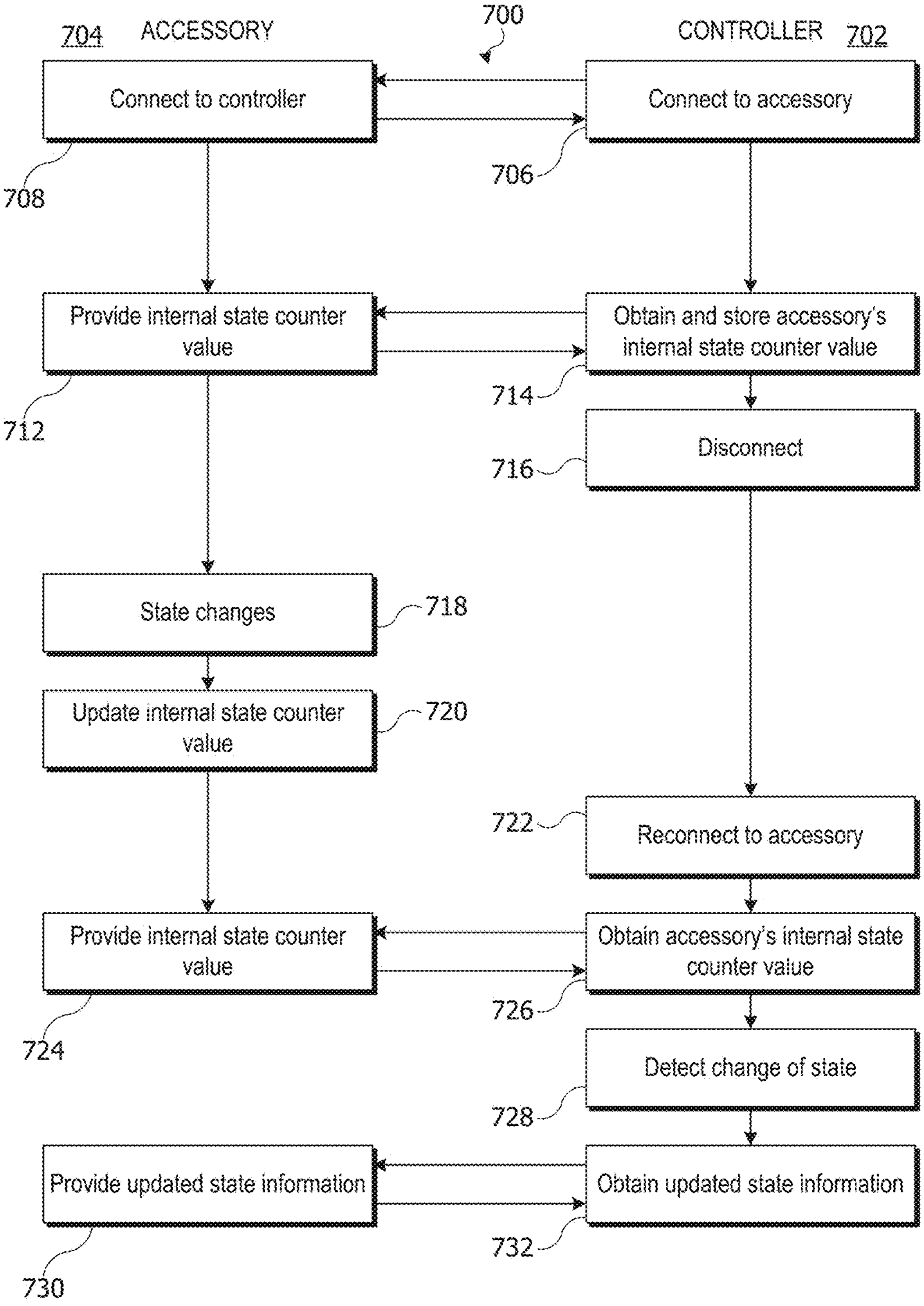
FIG. 7 shows an example of a passive notification process according to an embodiment of the present invention.

FIG. 7 shows an example of a "passive" notification process 700 according to an embodiment of the present invention. Process 700 involves the controller reading the accessory's internal state counter to determine whether a state change has occurred. Accordingly, the fact that a change has occurred while a controller is disconnected from the accessory can be detected by the controller when it subsequently reconnects. In some embodiments, passive notification is enabled by default (e.g., every accessory maintains an internal state counter), and no particular action (e.g., subscribing) is needed to enable it.

At blocks 706 and 708, controller 702 and accessory 704 can establish a connection. In various embodiments, establishing a connection can include performing process 400 and/or other processes described below (e.g., pair verify).

At block 712, accessory 704 can provide its current internal state counter value to controller 702, which can obtain and store the value at block 714. In some embodiments, controller 702 can send an HTTP GET request to an appropriate resource (e.g., a readable state counter characteristic that can be defined in the accessory information service). The response by accessory 704 at block 712 can contain the counter value. Controller 702 can store this value. At some point thereafter, controller 702 can disconnect from accessory 704 (block 716).

At block 718, after controller 702 has disconnected, a state change can occur in accessory 704. In response, accessory 704 can update its state counter at block 720.

Thereafter, controller 702 can reconnect to accessory 704 (block 722). At block 724, accessory 704 can provide the current internal state counter value to controller 702, which obtains the value at block 726. In some embodiments, this can be done through an HTTP GET request by controller 702 directed to an appropriate resource; the response by accessory 704 can contain the counter value. At block 728, controller 702 can detect the state change, e.g., by comparing the counter value obtained at block 726 to the counter value previously obtained and stored at block 714. In some embodiments, controller 702 can overwrite the old stored counter value with the new one. Thereafter, at block 730, accessory 704 can provide the updated state information to controller 702, which obtains the information at block 732. In some embodiments, this can be done using an HTTP GET request by controller 702 and response by accessory 704. The controller can choose to request the accessory definition record or just specific characteristics for which state changes would be of interest to the controller.

Figure 8:
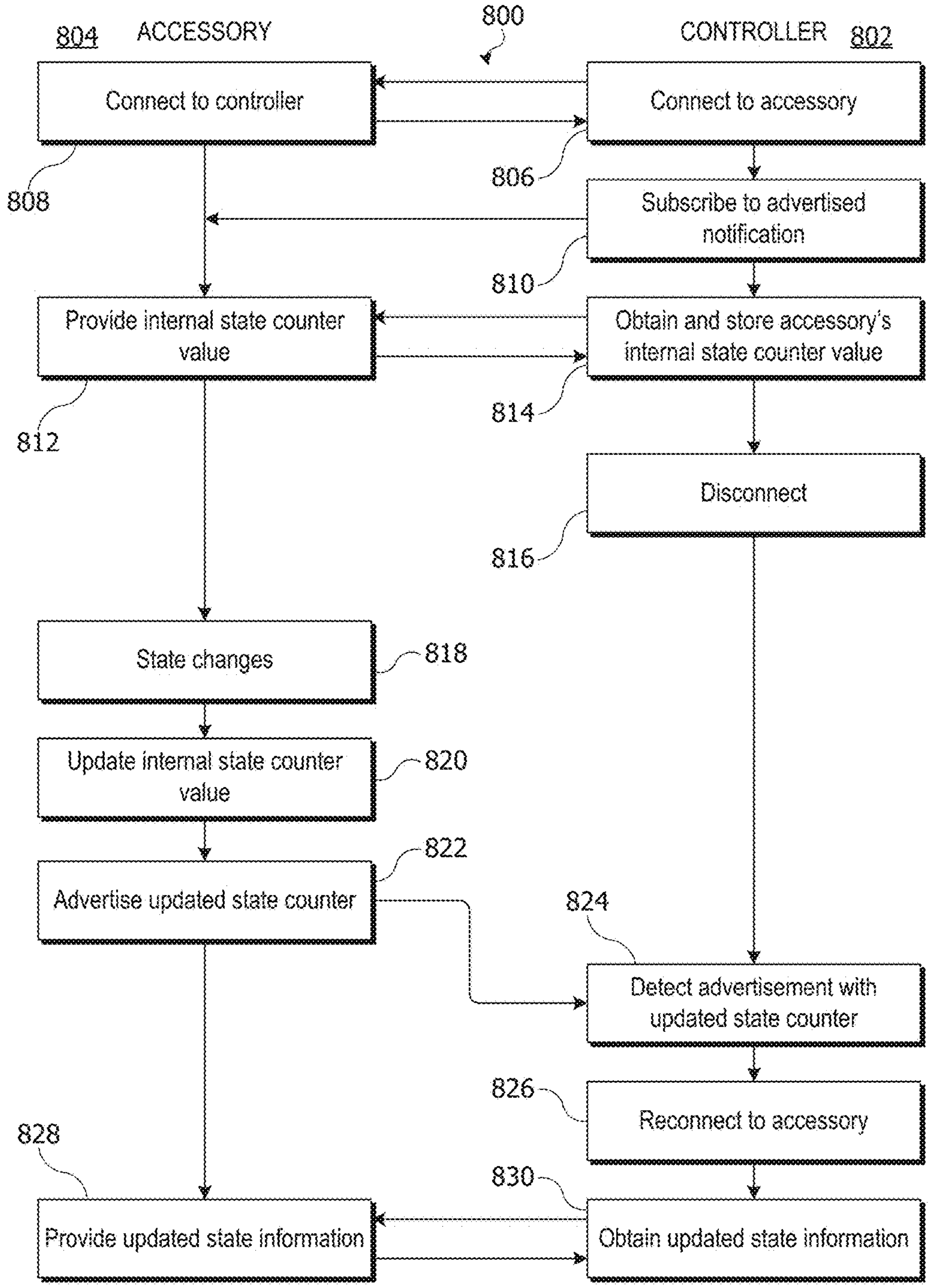
FIG. 8 shows an example of an advertised notification process according to an embodiment of the present invention.

FIG. 8 shows an example of an "advertised" notification process 800 according to an embodiment of the present invention. In process 800, the accessory can use a device discovery service (e.g., as described above) to advertise that a state change has occurred. A controller that detects the advertisement can connect to the accessory and obtain the updated state information.

At blocks 806 and 808, controller 802 and accessory 804 can establish a connection. In various embodiments, establishing a connection can include performing process 400 and/or pairing processes described below. At block 810, controller 802 can indicate a desire to subscribe to advertised notifications. For example, as described above with reference to FIG. 2E, each characteristic can have a notificationMode property, and a controller can specify a notification mode by writing to the notificationMode property. In some embodiments, accessory 804 does not advertise state changes unless at least one controller has subscribed to advertised notifications; this can reduce network traffic.

At block 812, accessory 804 can provide the current internal state counter value to controller 802, which obtains and stores the value at block 814. In some embodiments, this can be done through an HTTP GET request by controller 802 directed to an appropriate resource; the response by accessory 804 can contain the counter value. Controller 802 can store this value. At some point thereafter, controller 802 can disconnect from accessory 804 (block 816).

At block 818, after controller 802 has disconnected, a state change can occur in accessory 804. In response, accessory 804 can update its internal state counter at block 820. At block 822, accessory 804 can also advertise the updated state counter. For instance, as shown in Table 3 above, an accessory can advertise information including a state number "s#," e.g., in a Bonjour TXT record or the like. The accessory can advertise a state change by updating the field and broadcasting the new TXT record.

At block 824, assuming controller 802 is listening for broadcasts, controller 802 can detect the change. For example, controller 802 can extract the current state counter from the broadcast, compare the broadcast state counter to the stored state counter, and detect a discrepancy, which indicates that the accessory's state has changed. At block 826, controller 802 can reconnect to accessory 804 At block 828, accessory 804 can provide the updated state information to controller 802, which obtains the information at block 830. In some embodiments, this can be done through an HTTP GET request by controller 802 and response by accessory 804.

Figure 9:
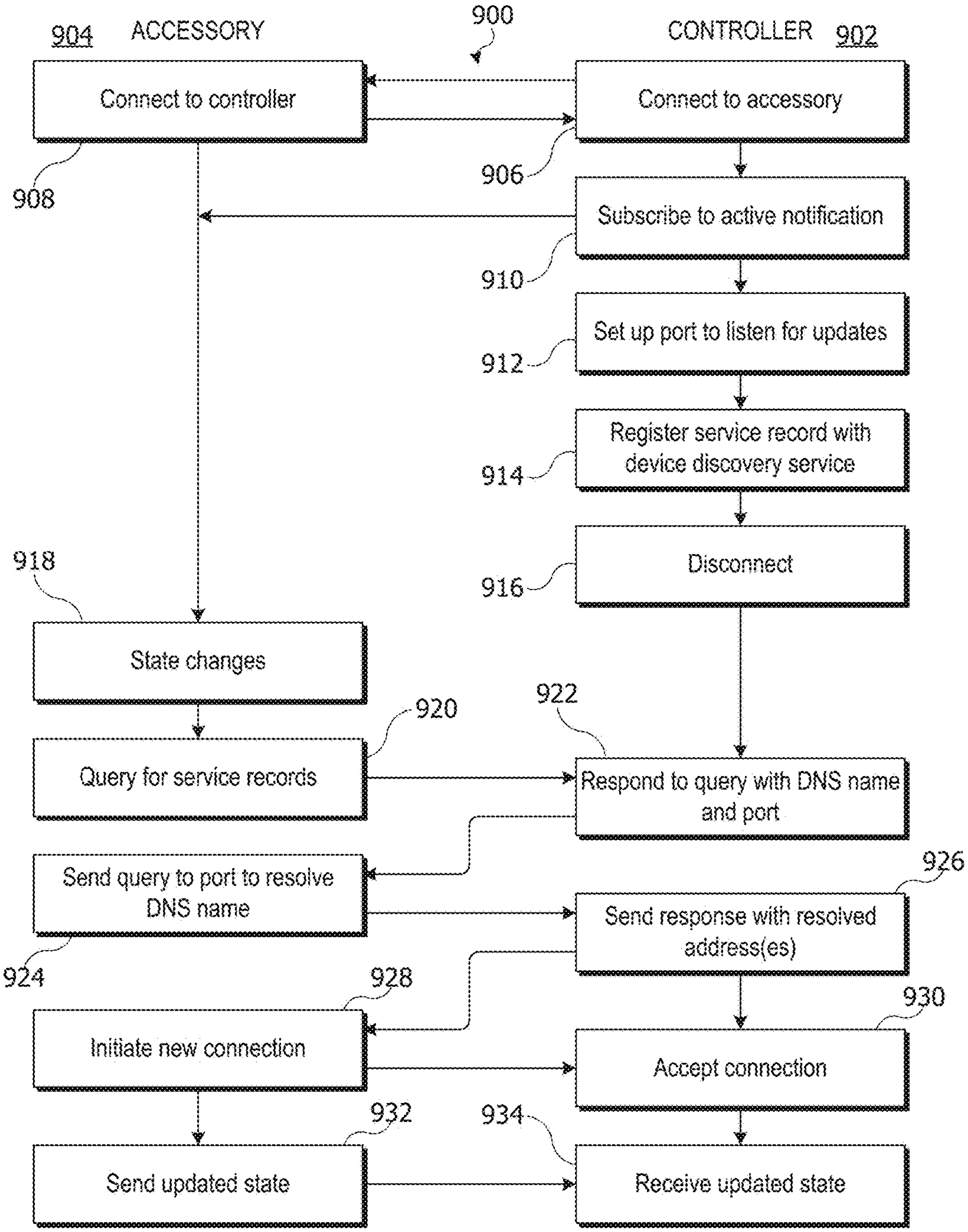
FIG. 9 shows an example of an active notification process according to an embodiment of the present invention.

FIG. 9 shows an example of an "active" notification process 900 according to an embodiment of the present invention. In process 900, the accessory can initiate a connection to a controller to alert the controller when state information is updated. For example, the controller can register a service record with the device discovery service (e.g., Bonjour service) that is dedicated to receiving state updates, and the accessory can use the controller's service record to initiate a connection to the controller.

At blocks 906 and 908, controller 902 and accessory 904 can establish a connection. In various embodiments, establishing a connection can include performing process 400 and/or pairing processes described below. At block 910, controller 902 can indicate a desire to subscribe to active notifications. For example, as described above, each characteristic can have a notificationMode property, and a controller can specify a notification mode by writing to the notificationMode property. In some embodiments, accessory 904 performs operations related to active notification only if at least one controller has subscribed to active notifications; this can reduce network traffic.

At block 912, controller 902 can set up a port to listen for active notifications. At block 914, controller 902 can register a service record with the device discovery service. For example, if the Bonjour service is used, controller 902 can register a unique DNS SRV record. If the SRV record is unique, the controller can avoid operations such as probing, advertising, or providing a TXT record, thereby reducing network traffic. In one embodiment, the DNS SRV record can have the format:

<ID>._guid._tcp.local.<TTL>IN SRV<priority> <weight> <port> <target>, where <ID> is a unique identifier for the controller (e.g., a GUID in lowercase and with dashes removed, a UUID, or other identifier); "._guid._tcp" is the DNS service type; "local" is the domain name; <TTL> is the time to live for the SRV record (which can be, e.g., 120 seconds); <priority> is the priority of the target host (which can be, e.g., the highest priority recognized in the service), <weight> is a relative weight for records with the same priority (which can be, e.g., 0); <port> is the TCP port number of a uniform accessory protocol server running on controller 902 (e.g., the port set up at block 912); and <target> is a DNS name that can be used to obtain an IP address to connect to the uniform accessory protocol server.

At block 916, controller 902 can disconnect.

At block 918, after controller 902 has disconnected, a state change can occur in accessory 904. In response, at block 920, accessory 904 can query the device discovery service to locate the registered service, e.g., by sending a multicast DNS SRV query for the service type "._guid._tcp". (In some embodiments, accessory 904 performs the query at block 920 and ensuing actions only if at least one controller has subscribed to active notifications.) At block 922, controller 904 can respond to the query with the DNS name and port identifier established at blocks 912 and 914. At block 924, accessory 904 can send a unicast query to the port to resolve the DNS name. In some embodiments, an accessory that supports both IPv4 and IPv6 addressing versions can send queries using both IPv4 and IPv6 addressing (e.g., a DNS A query for IPv4 and a DNS AAAA query for IPv6); if the accessory supports only one IP address version, it can send one query.

At block 926, controller 902 can send a unicast response with its resolved addresses. If the accessory sent two queries, the controller can respond to either or both, depending on which IP address version(s) it supports.

At block 928, accessory 904 can initiate a new connection to controller 902 using the resolved address. In some embodiments, if the controller provides both IPv4 and IPv6 addresses, IPv6 can be preferred. At block 930, controller 902 can accept the connection. If the connection attempt fails, the accessory can retry; in some embodiments, retry frequency can be limited, e.g., to once every 60 seconds.

At block 932, accessory 904 can send the updated state information, and at block 934, controller 902 can receive the updated state information. In some embodiments, verification of the previously established pairing (e.g., using the pair verify process described below) can be required prior to sending updated state information. This can provide assurance that the accessory is reporting state information to the same controller that subscribed to the notifications.

Figure 10:
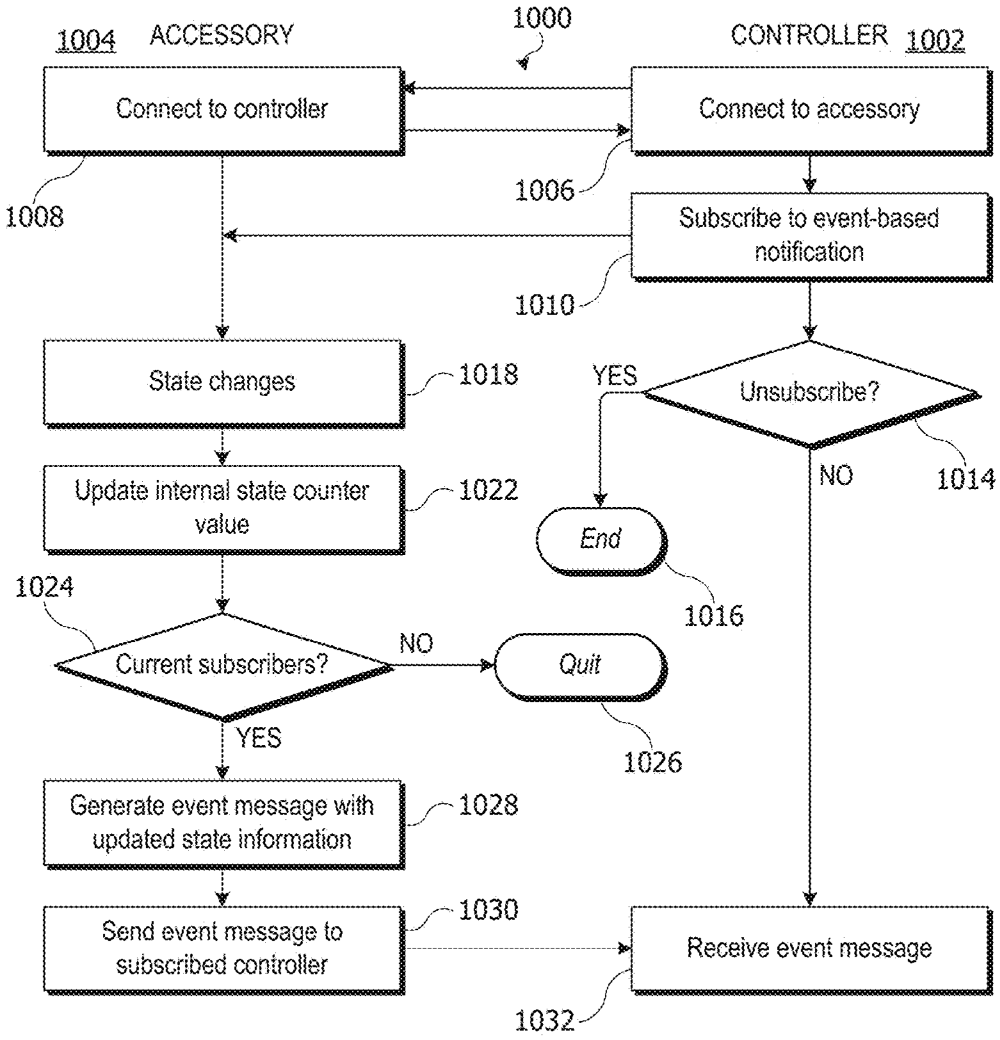
FIG. 10 shows an example of an event notification process according to an embodiment of the present invention.

FIG. 10 shows an example of an "event notification" process 1000 according to an embodiment of the present invention. In process 1000, an accessory can send an unsolicited HTTP response (also referred to herein as an EVENT message) to a controller that is currently subscribed to receive event notifications for the characteristic that has changed. In this example, the controller can subscribe to notifications at any time while it is connected to the accessory and automatically becomes unsubscribed upon disconnecting from the accessory.

At blocks 1006 and 1008, controller 1002 and accessory 1004 can establish a connection. In various embodiments, establishing a connection can include performing process 400 and/or other pairing processes described below. At block 1010, controller 1002 can indicate a desire to subscribe to event notifications. For example, as described above, each characteristic can have a notification-mode property, and a controller can specify a notification mode by writing to this property.

FIG. 11A shows an example of an HTTP PUT request 1100 to subscribe to event notifications for a characteristic. Content 1102 identifies the characteristic (by accessory instance ID and characteristic instance ID) and includes the value "ev" for the notificationMode property. Multiple characteristics can be listed in a single subscription request, and in some embodiments, a subscription request can be combined with a request to write values to one or more characteristics. The accessory can understand request 1100 as a request to subscribe to event notifications for the specified characteristic and can respond with a confirmation (e.g., HTTP 204 "No Content") or an error response (e.g., if event notifications are not supported for the characteristic). A similar message can be used by a controller to subscribe to other types of event notifications (e.g., active or advertised notifications as described above) by specifying the desired notification method(s).

After subscribing, at block 1014, controller 1002 can unsubscribe from event-based notification. In some embodiments, controller 1002 is automatically unsubscribed if it disconnects from accessory 1004. In addition or instead, controller 1002 can expressly unsubscribe by writing a new value to the notification-mode property without disconnecting from accessory 1004. If controller 1002 unsubscribes (either automatically or expressly), any subsequent event notifications will no longer be sent to controller 1002, and process 1000 can end at block 1016. (An unsubscribed controller 1002 can, of course, execute process 1000 to subscribe again.) Automatically or expressly unsubscribing controller 1002 can help to reduce power consumption by accessory 1004, as accessory 1004 can avoid generating or attempting to send event messages to a controller that is not interested (or that is not connected).

At block 1018, a state change can occur in accessory 1004, and at block 1020, accessory 1004 can update its internal state counter; updating the internal state counter can be useful in connection with passive and/or advertised notifications, e.g., as described above. In addition, if controller 1002 is subscribed to event-based notifications, accessory 1004 can generate a notification to controller 1002.

For example, at block 1024, accessory 1004 can determine whether any controllers (e.g., controller 1002) are currently subscribed to event-based notifications for state changes to the affected characteristic.

If no controllers are currently subscribed, then no further action is taken, and process 1000 can end at block 1026. If at least one controller (e.g., controller 1002) is currently subscribed, then at block 1028, accessory 1004 can generate an event message containing the updated state information.

FIG. 11B shows an example of an event message 1120 according to an embodiment of the present invention. Event message 1120 can be similar in structure to an HTTP response; however, unlike an HTTP response, event message 1120 is not sent in response to a specific HTTP request. Header section 1122 can identify message 1120 as an event message and can include version information and a status code. Body 1122 can include the updated value of the characteristic that changed; as in other examples herein, the characteristic can be identified by an accessory identifier and an instance identifier. It should be understood that if multiple characteristics have changed, the accessory can include multiple characteristics in a single event message 1120; that is, event messages can be coalesced. Other formats can also be used.

Referring again to FIG. 10, at block 1030, accessory 1004 can send the event message to controller 1002, and at block 1032, controller 1002 can receive the event message. For example, the HTTP stack in controller 1002 can be modified to recognize event message 1100 (e.g., based on header 1122). Controller 1002 can extract the updated state information from the received event message.

It will be appreciated that the various notification processes described above are illustrative and that variations and modifications are possible. Steps described as sequential may be executed in parallel, order of steps may be varied, and steps may be modified, combined, added or omitted. Further, the same accessory can concurrently support any or all of the notification processes, and the same state change can result in any or all of updating an internal state counter, advertising an updated state counter, initiating a connection with one or more subscribed controllers, and/or sending an event message to a subscribed controller, depending on which notification options various controllers have subscribed to at the time of the state change. Other notification mechanisms and processes can be supported in addition to or instead of those shown in FIGS. 7-10.

As described above, controllers can subscribe to state-change notifications on a per-characteristic basis, e.g., by writing to the notificationMode property of the characteristic. An accessory can determine which notification mechanism(s) to perform based on whether any controllers are subscribed to each notification mechanism in relation to the characteristic in question. In some embodiments, passive notification is the default mechanism and the internal state counter is always updated, regardless of what any controller has specifically requested. Because advertised, event, and/or active notifications can create network traffic, use of these mechanisms can be limited to instances where relying on passive notification would adversely affect the user experience.

In some embodiments, various policies can be imposed to reduce network traffic generated by the announcement of state changes (e.g., via advertised, event, and/or active notifications). For instance, state change advertisement can be limited to instances where at least one controller is subscribed to advertisement notifications, and querying for service records to initiate connections can be limited to instances where at least one controller is subscribed to active notifications. Further, an accessory can be required to coalesce all advertisement, active, or event notifications with a minimum delay period (e.g., 1 second), to further reduce network traffic. As another example, advertisements, event notifications, and/or accessory-initiated connections can be limited in frequency (e.g., to one every 30 seconds). Passive notification, which minimizes network traffic, can be used as a default. Such limitations are matters of design choice and can be varied or eliminated as desired. Where limitations are imposed and an accessory violates the limitations, a controller that detects the violation can alert the user to the misbehavior and/or terminate its pairing with the accessory.

Example Pairing Processes

In some embodiments, securing communications between an accessory and a controller can be useful. For example, referring to FIG. 1, controller 102 can be used to unlock door 104 or open garage 106, e.g., by sending request messages as described above. Those skilled in the art will appreciate that such operations should be limited to specific authorized controllers.

Accordingly, some embodiments of the present invention provide security measures such as authenticated pairing and end-to-end encryption. Authenticated pairing can occur as part of establishing a pairing between an accessory and a controller (also referred to as pair setup), during which the accessory and controller can establish a security framework (e.g., using cryptographic techniques) and can exchange long-term public keys within that framework. In some embodiments, pair setup can incorporate an out-of-band exchange of information (e.g., a setup code), and the out-of-band exchange can incorporate user input (or user action) to verify to the accessory that it should pair with a particular controller and/or to verify to the controller that it should pair with a particular accessory. After exchanging public keys in this manner, the controller and accessory can store the keys and use them later to verify that the pairing was established. End-to-end encryption can include generating session keys within both the accessory and controller (e.g., after verifying the pairing) and using the session keys to encrypt each message before it leaves the sending device, such that if the message is intercepted, the interceptor will not be able to make use of it. Thus it is not necessary to secure the communication network at the link layer or transport layer. For instance, new session keys can be generated each time the accessory and controller reconnect (e.g., using a pair verify process as described below). Further, mechanisms can be provided for removing established pairings (e.g., by removing a stored long-term public key), such that a controller that was once authorized to control a particular accessory becomes unauthorized.

In some embodiments, cryptographic keys (including any or all of the keys described below) can be stored exclusively within a "secure element," such as a dedicated integrated-circuit chip that can securely store data for a device (also referred to as a "secure storage element"). The secure element can be used to provide persistent, secure storage of received long-term public keys and/or other information identifying other devices with which a pairing relationship has been established. This can help prevent an attacker from adding a pairing without going through the appropriate setup process (which could result in illegitimate use of a controller) or from removing a pairing without authorization (which could prevent legitimate use of a controller). Further, in some embodiments, the secure element can also include logic circuitry allowing it to act as a co-processor (or "secure computing element") to a main processor of the accessory or the controller. The secure element can receive various inputs and instructions to perform cryptographic operations on the inputs. The secure element can perform the operations and provide outputs. Any or all of the cryptographic operations described herein (e.g., generating keys, signing with a secret key, and other operations involving keys) can be delegated to a secure computing element. As used herein, a "secure element" can provide any combination of secure storage and/or secure computing.

In some embodiments, an accessory that supports pairing can have a pairing profile as part of its accessory model. Similarly to other services described herein, the pairing profile can be defined as a collection of characteristics. In some embodiments, a uniform accessory protocol can specify that all accessories have a pairing profile. In other embodiments, a pairing profile can be an optional feature, but the protocol can specify that if an accessory has a pairing profile, then a controller can be required to pair with the accessory prior to exchanging any command-and-control messages. Further tailoring of pairing requirements is also possible. For instance, the pairing profile of an accessory can identify specific service instances that require pairing, allowing access to some of the accessory's services without pairing.

FIG. 12 shows example characteristics 1201-1205 for a pairing profile according to an embodiment of the present invention. The format is generally similar to FIG. 2A. As with other characteristics described herein, characteristics 1201-1205 can be read by a controller, e.g., using HTTP GET requests or the like; write (where permitted) can be performed, e.g., using HTTP PUT or HTTP POST requests or the like.

Pairing state request characteristic 1201 can be written to by a controller to request a change in the state of a pairing process (e.g., to send various requests during pair setup, pair verify, pair add, and/or pair remove processes described below). In some embodiments, a controller can request a change in state of the pairing process by sending an HTTP POST request to a pairing URL (e.g., as shown in Table 4 above) rather than writing to characteristic 1201. Examples of pairing process states and requests are described below in connection with specific pairing processes.

Feature flags characteristic 1202 can be a bitmask defining pairing features supported by the accessory. For example, as described below, various accessories can support setup-code-based pairing (which can require a user to enter a setup code, such as a PIN, to confirm that pairing should occur), certificate-based pairing (which can use a certificate infrastructure that can be provided using authentication chips in either or both devices, as described below), and/or delegated pairing (which can allow an already-paired controller to verify that another controller should be paired). In some embodiments, feature flags characteristic 1202 can also include a bit indicating whether the accessory is currently in a mode in which a new pairing can be established using pair setup. Characteristic 1202 can be read but not written by a controller, and the controller can use the information in determining how and whether to perform pair setup.

Pairing current state characteristic 1203 can indicate the current state of a pairing process, e.g., whether an error has occurred or various other states described below. It can be read but not written by a controller.

Pairing list characteristic 1204 can store a list of all pairings that have been established with the accessory. For example, a TLV item can be generated for each pairing that indicates the public key (for setup-code-based pairing) and/or certificate (for certificate-based pairing) of the paired controller as well as which permissions each controller has. These TLV items can be packed together (with separators) as sub-TLVs a single top-level TLV. In some embodiments, the accessory encrypts the top-level TLV prior to sending it to a requesting controller.

Pairing ID characteristic 1205 can be a globally unique identifier for the accessory, such as a MAC address, a portion of the accessory's public key, an accessory "username" (e.g., as describe below), or the like.

In some embodiments, characteristics 1201-1205 can be exposed to controllers by defining an accessory pairing service instance that is visible to unpaired controllers, at least until such time as the accessory has established a pairing with at least one controller. For example, in instances where the accessory uses Bluetooth LE as a communication transport, the accessory can advertise its pairing service via Bluetooth LE.

In addition to or instead of a pairing service, an accessory can define one or more URLs that controllers can reference to access pairing functionality. For example, referring to Table 4 above, a controller can send an HTTP POST request to URL /pair-setup to make requests and provide associated information during a pair setup process. A controller can send an HTTP POST request to URL /pair-verify to make requests and provide associated information during a pair verify process. A controller can send an HTTP POST request to URL /pairings to manage pairings, e.g., to initiate pair add and pair remove processes or to retrieve a list of established pairings for the accessory; the POST request can include a data object indicating the specific request.

Examples of processes for establishing a pairing between an accessory and a controller (referred to as "pair setup") will now be described. Any of these or other processes can be implemented, e.g., at blocks 428 and 430 of process 400 of FIG. 4. Accordingly, in the following, it is assumed that the accessory and the controller have already performed discovery and opened a communication channel, which may be unsecured. It is further assumed that the user has already confirmed to the controller that it should pair with the particular accessory.

In some embodiments, pair setup is permitted only when the accessory is in pairing mode. Placing an accessory in pairing mode can involve physical contact by the user with the accessory. For instance, the user may be required to insert a physical object (e.g., a key) into a receptacle on the accessory, move a switch on the accessory to a "pairing" position, or the like. In some embodiments, pair setup is permitted only if the accessory does not have an established pairing with any controller. Once an accessory has one established pairing, additional pairings can be established using a pair add process (or other delegated pairing process) as described below.

Figure 13A:
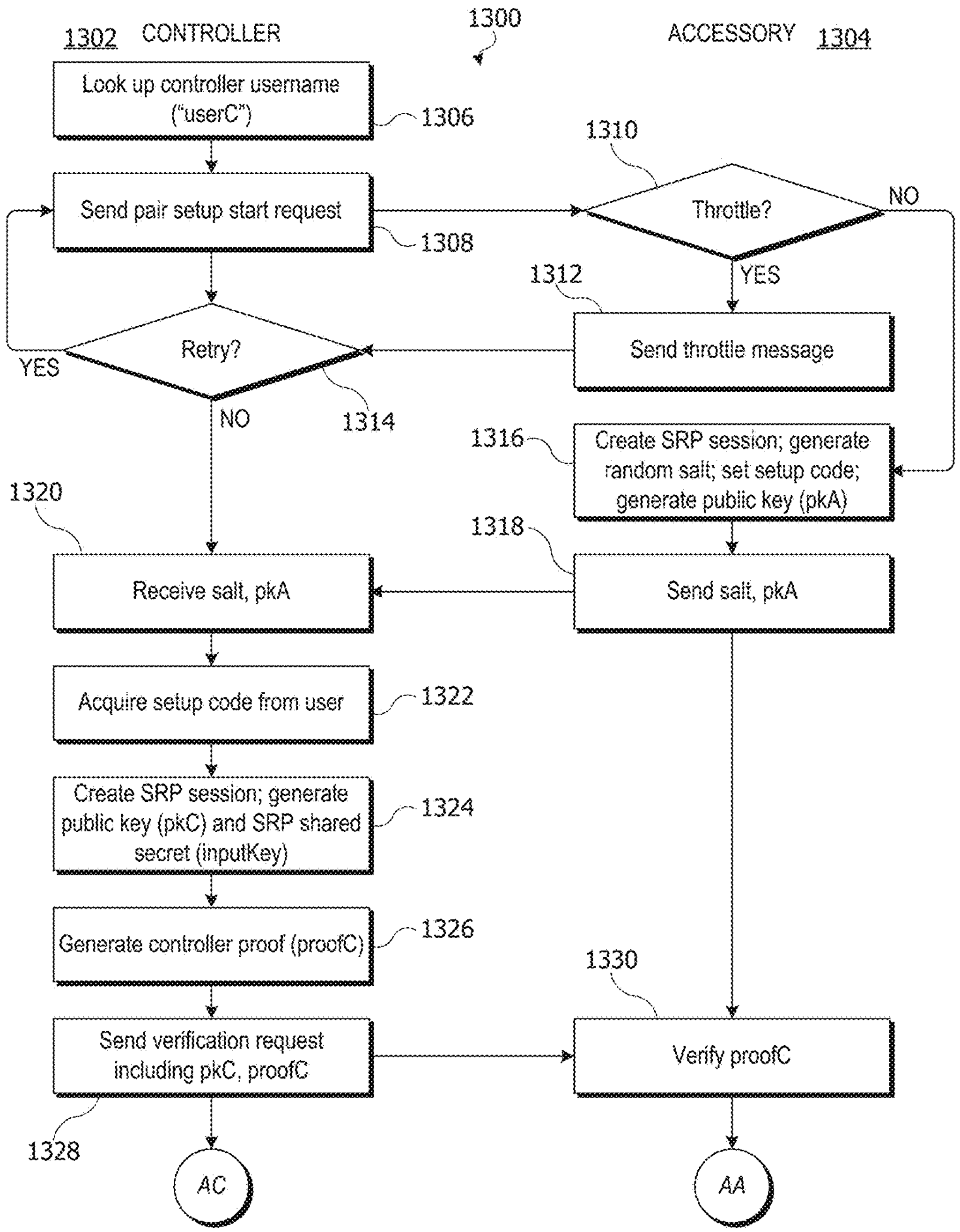
FIGS. 13A-13C show an example of a setup-code-based pair setup process according to an embodiment of the present invention.
Figure 13B:
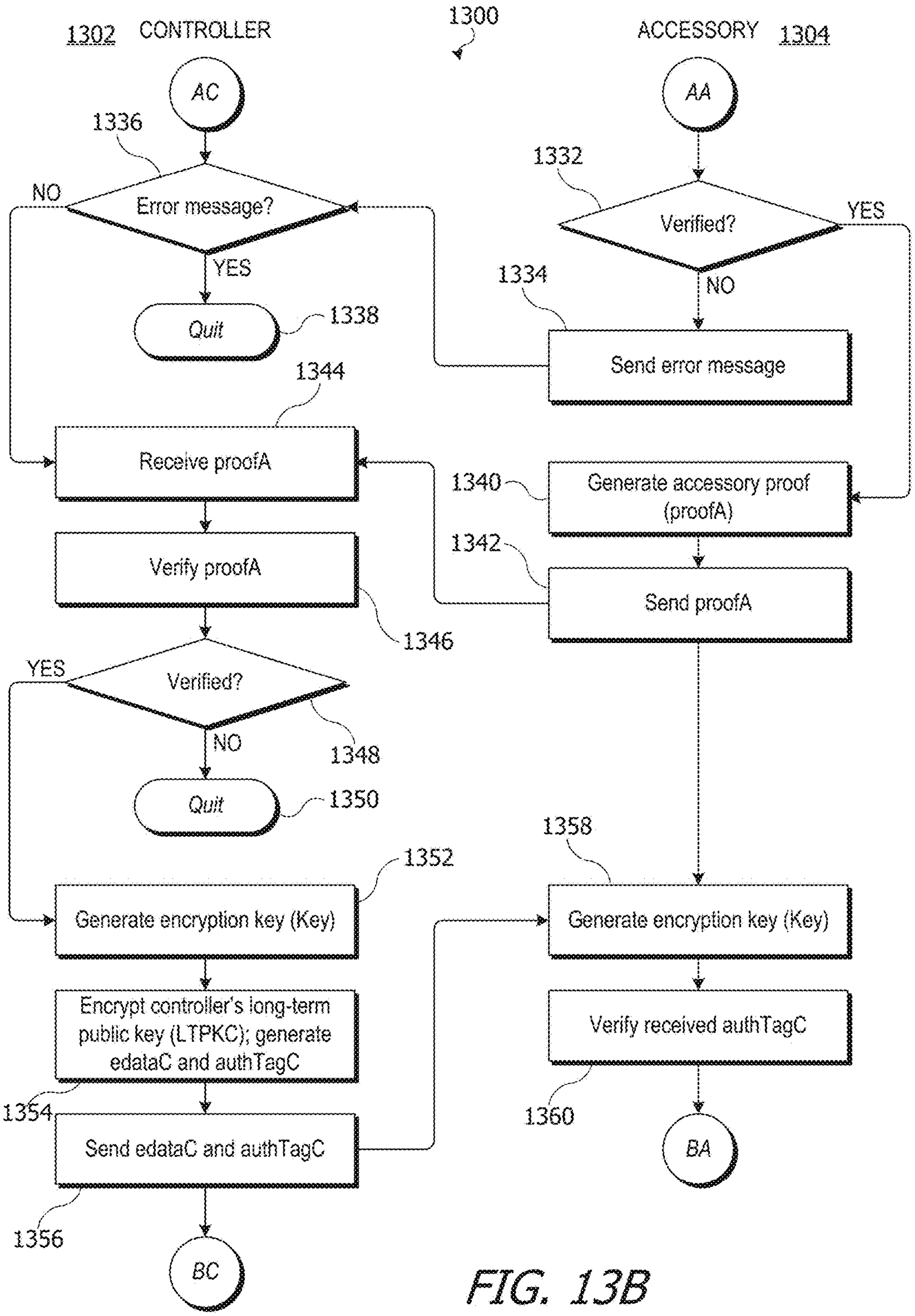
Figure 13C:
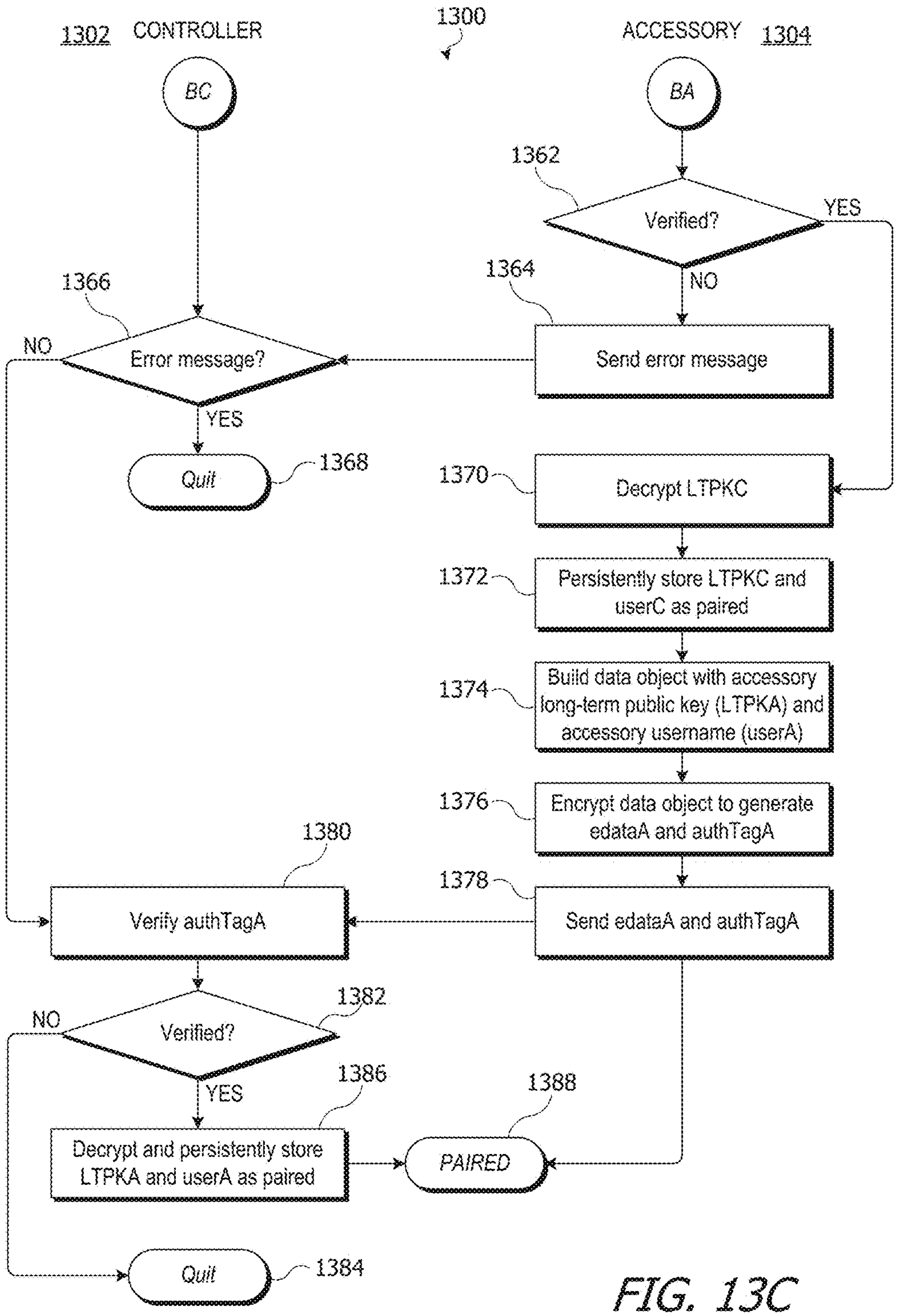

FIGS. 13A-13C show a setup-code-based pair setup process 1300 for a controller 1302 and an accessory 1304 according to an embodiment of the present invention. In setup-code-based pair setup, the user can be required to enter the accessory's setup code (which can be, e.g., an eight-digit identification number that is specific to that accessory and not readily guessable) at the controller to provide bidirectional authentication. For security, the accessory's setup code can be shown by the accessory on a display or manually provided to the accessory by a user (e.g., by setting physical dials on the accessory or typing digits into a keypad), or the setup code can be printed somewhere on or within the accessory housing or packaging (e.g., on a label on an inconspicuous surface). Accessory manufacturers can enhance security by not deriving the setup code from publicly-accessible information (e.g., serial number, MAC address, manufacturer name, date of manufacture, etc.). In examples herein, pair setup leverages the Secure Remote Password ("SRP") protocol (documented at http://srp.standford.edu); however, other protocols can be used.

Referring first to FIG. 13A, at block 1306, controller 1302 can look up an associated username ("userC"). The username can include any identifier of controller 1302 and/or an authorized user of controller 1302 that can be used by the accessory to help distinguish one controller from another. At block 1308, controller 1302 can send a pair setup start request, e.g., as an HTTP POST request to an appropriate URL. The pair setup start request can include a state indicator to indicate that the pair setup start request has been sent (in some embodiments, this and subsequent state indicators can be written by the controller to pairing state request characteristic 1201 of FIG. 12), a method indicator to indicate that the setup-code-based pairing method is in use, and the controller username userC.

At block 1310, accessory 1304 can determine whether to throttle the pair setup start request. For example, to thwart attacks based on random guessing, accessory 1304 can implement exponential throttling, in which the time to wait for the next start request is doubled after each unsuccessful pair setup attempt (e.g., if the last n attempts have been unsuccessful, the (n+1)th attempt must wait at least $2^{n-1}$ seconds). The throttling can be applied globally rather than per-session or per-connection. The throttling time can be reset after a successful pair setup attempt. Accordingly, at block 1310, if throttling is in effect and the throttling time has not elapsed since the last attempt, accessory 1304 can send a throttling message at block 1312. The throttling message can indicate how long the controller needs to wait before retrying. At block 1314, if a throttling message is received, controller 1302 can determine whether to retry (after waiting the appropriate time). If controller 1302 determines to retry, process 1300 can return to block 1308 to send a new pair setup start request after the appropriate wait time.

If, at block 1310, accessory 1304 does not throttle the request, process 1300 can proceed to block 1316, where accessory 1304 can create an SRP session, e.g., by invoking appropriate SRP protocol functions such as SRP_new (SRP6a_server_method( )); set the controller's username to the received value userC (with SRP_set_username or SRP_set_user_raw); generate a random salt (e.g., at least 16 bytes), which can be set with SRP_setparams; select and set its own setup code (e.g., using SRP_set_auth_password or SRP_set_auth_password_raw); and generate a public key ("pkA") (e.g., using SRP_gen_pub). Public key pkA can be part of a short-term key pair (along with a secret key "skA") that is used for the duration of process 1300 and then discarded.

The accessory can select a setup code using various techniques. For instance, the setup code can be preprogrammed in an EEPROM (and printed on the accessory or on a label or the like where the user can find it). Alternatively, in advance of (or during) process 1300, a user-selected setup code can be entered into the accessory by the user using mechanical or electronic input devices provided on or in the accessory. As yet another option, an accessory can generate a random setup code during each instance of executing pair setup process 1300, provided that the accessory has the capability to inform the user of the setup code (e.g., by displaying it or otherwise signaling it to the user). Other techniques can also be used.

At block 1318, accessory 1304 can send the random salt and public key pkA to controller 1302, which can receive them at block 1320. Upon sending the random salt and public key pkA at block 1318, accessory 1304 can update the pairing state to indicate that the accessory's public key has been sent.

At block 1322, controller 1302 can acquire the accessory's setup code from the user. For example, controller 1302 can present a user interface screen that prompts the user to enter the accessory's setup code. Other techniques can be used, as long as the setup code is delivered to controller 1302 out of band, i.e., via a communication channel independent of the communication channel being used to perform the pair setup process. For instance, in some embodiments, the user can operate an onboard camera of controller 1302 to capture an image of the setup code as it appears on the accessory (the image can include a human-readable representation or a machine-readable representation, such as a bar code or quick-response (QR) code or the like), and controller 1302 can perform image processing to extract the setup code. Other examples of techniques usable to provide a setup code from accessory 1304 to controller 1302 include: a near-field communication (NFC) transmission from accessory 1304 to controller 1302 while controller 1302 is placed or held in physical proximity to accessory 1304; sonic or ultrasonic transmission by accessory 1304 detectable by controller 1302; high-speed optical signaling (e.g., a sequence of light pulses generated by accessory 1304 in the field of view of a camera or photodetector of controller 1302); or physically connecting accessory 1304 or an associated device that stores the setup code to a connector interface of controller 1302.

At block 1324, controller 1302 can create an SRP session, e.g., by invoking appropriate SRP protocol functions such as SRP_new (SRP6a_server_method( ) ); set the controller's username (with SRP_set_username or SRP_set_user_raw); set the salt received from the accessory (with SRP_set_params); generate its own public key ("pkC") (e.g., using SRP_gen_pub); set an SRP password using the user-entered setup code (e.g., using SRP_set_auth_password or SRP_set_auth_password_raw); and compute a shared secret ("inputKey") (e.g., using SRP_compute_key). As with accessory public key pkA, public key pkC can be part of a short-term key pair (along with a secret key "skC") that is used for the duration of process 1300 and then discarded.

At block 1326, controller 1302 can generate a controller proof ("proofC") to prove its own identity (e.g., using SRP_respond). At block 1328, controller 1302 can send a verification request to the accessory, including public key pkC and proof proofC, e.g., as an HTTP POST request to an appropriate URL. Upon sending the request at block 1328, controller 1302 can update the pairing state to indicate that the controller's proof has been sent.

At block 1330, accessory 1304 can verify controller proof proofC. For example, accessory 1304 can compute a shared secret ("inputKey") (e.g., using SRP_compute_key) and verify proofC (e.g., using SRP_verify) using the shared secret.

As shown in FIG. 13B, if, at block 1332, the verification at block 1330 fails, then at block 1334, accessory 1304 can send an error message to controller 1302. If, at block 1336, controller 1302 receives the error message, process 1300 can end at block 1338. In some embodiments, the controller can report the error to the user.

If, at block 1332, verification succeeds, then at block 1340, accessory 1304 can generate an accessory proof ("proofA") to prove its own identity (e.g., using SRP_respond). At block 1342, accessory 1304 can send accessory proof proofA to controller 1302, which can receive proofA at block 1344. Upon sending proofA at block 1342, accessory 1304 can update the pairing state to indicate that the accessory's proof has been sent.

At block 1346, controller 1302 can verify proofA (e.g., using SRP_verify). If, at block 1348, the verification fails, process 1300 can quit (block 1350). If verification succeeds at block 1348, the accessory and the controller are now each in possession of an authenticated shared secret.

Accordingly, at block 1352, controller 1302 can generate a new encryption key ("Key") from the shared secret inputKey. For example, controller 1302 can use an HMAC-based key derivation function that implements Secure Hash Algorithm version 2 for 512-bit hashes (HMAC-SHA-512, defined in IETF RFC 2104) using as inputs inputKey, the random salt, and an additional information item (which can be preprogrammed into controller 1302). At block 1354, controller 1302 can encrypt its long-term public key (LTPKC) using Key. The long-term public key can be a key that is persistently stored (e.g., in a secure element as described above) on the controller and is unrelated to the short-term public key pkC generated earlier in process 1300. The encryption can use an encryption-and-authentication algorithm such as ChaCha20-Poly1305 (described in IETF Internet Draft draft-agl-tls-chacha20poly1305-03, available at https://tools.ietf.org/html/draft-agl-tls-chacha20poly1305-03) with Key as the key, LTPKC as the message, and a nonce, to produce encrypted data edataC and an authentication tag authTagC.

At block 1356, controller 1304 can send edataC and authTagC to accessory 1304; controller 1302 can also update the pairing state to indicate that LTPKC has been sent to the accessory.

At block 1358, upon receiving edataC and authTagC, accessory 1302 can generate an encryption key ("Key") using the same method as controller 1302 used at block 1352. If all has gone correctly to this point, it should be the same Key. At block 1360, accessory 1302 can verify the received authTagC.

As shown in FIG. 13C, if, at block 1362, the verification at block 1360 fails, then at block 1364, accessory 1304 can send an error message to controller 1302. If, at block 1366, controller 1302 receives the error message, process 1300 can end at block 1368. In some embodiments, the controller can report the error to the user.

If block 1362 results in success, then at block 1370, accessory 1304 can decrypt LTPKC, and at block 1372, accessory 1304 can persistently store LTPKC and the controller's username userC as a paired controller record. Such storage can be in a secure element as described above.

At block 1374, accessory 1304 can build a data object that includes the accessory's long-term public key (LTPKA) and a username associated with the accessory. The accessory's long-term public key can be a key that is persistently stored (e.g., in a secure element of accessory 1304) and is unrelated to the short-term public key pkA generated earlier in process 1300. Like controller username userC, accessory username userA can include any identifier of accessory 1304 or an authorized user of accessory 1304 that can be used by the controller to help distinguish one accessory from another. At block 1376, accessory 1304 can encrypt the data object generated at block 1374 to generate edataA and authTagA. The same encryption algorithm used by controller 1302 at block 1354 can be used. At block 1378, accessory 1304 can send edataA and authTagA to controller 1302; accessory 1304 can also update the pairing state to indicate that LTPKA has been sent to the controller.

At block 1380, upon receiving edataA and authTagA, controller 1302 can verify the received authTagA.

If, at block 1382, the verification at block 1380 fails, then at block 1384, process 1300 can end, and controller 1304 can report the error to the user. If the verification succeeds, then at block 1386, controller 1304 can decrypt LTPKA and persistently store LTPKA and the accessory's username userA as a paired accessory record. Such storage can be in the secure element described above. At block 1388, pair setup is complete and the pairing status can be updated to so indicate.

It will be appreciated that process 1300 is illustrative and that variations and modifications are possible. Steps described as sequential may be executed in parallel, order of steps may be varied, and steps may be modified, combined, added or omitted. For instance, each time the controller sends a message to the accessory or vice versa (e.g., when the pairing process state changes), errors can be detected. While some error conditions are indicated, it is to be understood that if an error is detected at any point, process 1300 can end, and the controller can notify the user of the error. Further, references to SRP and specific encryption and/or authentication algorithms are for purposes of illustration, and other protocols and algorithms for secure exchange of data over an unsecured communication channel can be substituted.

In some embodiments, a pairing process can leverage an authentication infrastructure. For example, an authentication chip (an integrated-circuit device, or IC) can be incorporated into accessory and/or controller devices. The authentication chip can securely store encryption keys for a device, a security certificate for the device, and information about valid or invalid security certificates that may be presented by other devices. In some embodiments, the authentication chip can implement the secure element described above (or a portion thereof). In instances where a given accessory includes an authentication chip, the authentication chip can be used in a pair setup process.

Figure 14A:
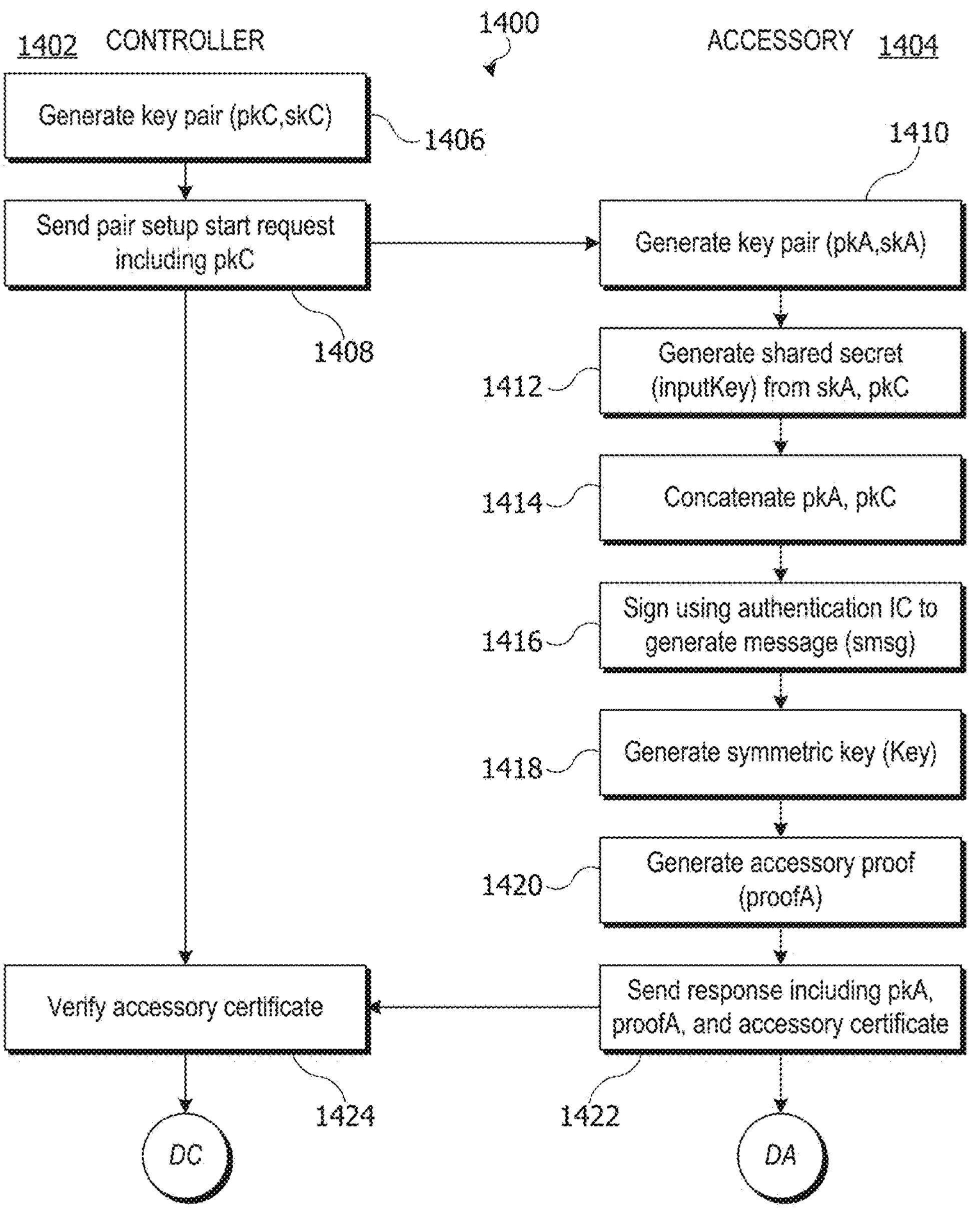
FIGS. 14A-14C show an example of a pair setup process using an authentication chip and a security certificate according to an embodiment of the present invention.
Figure 14B:
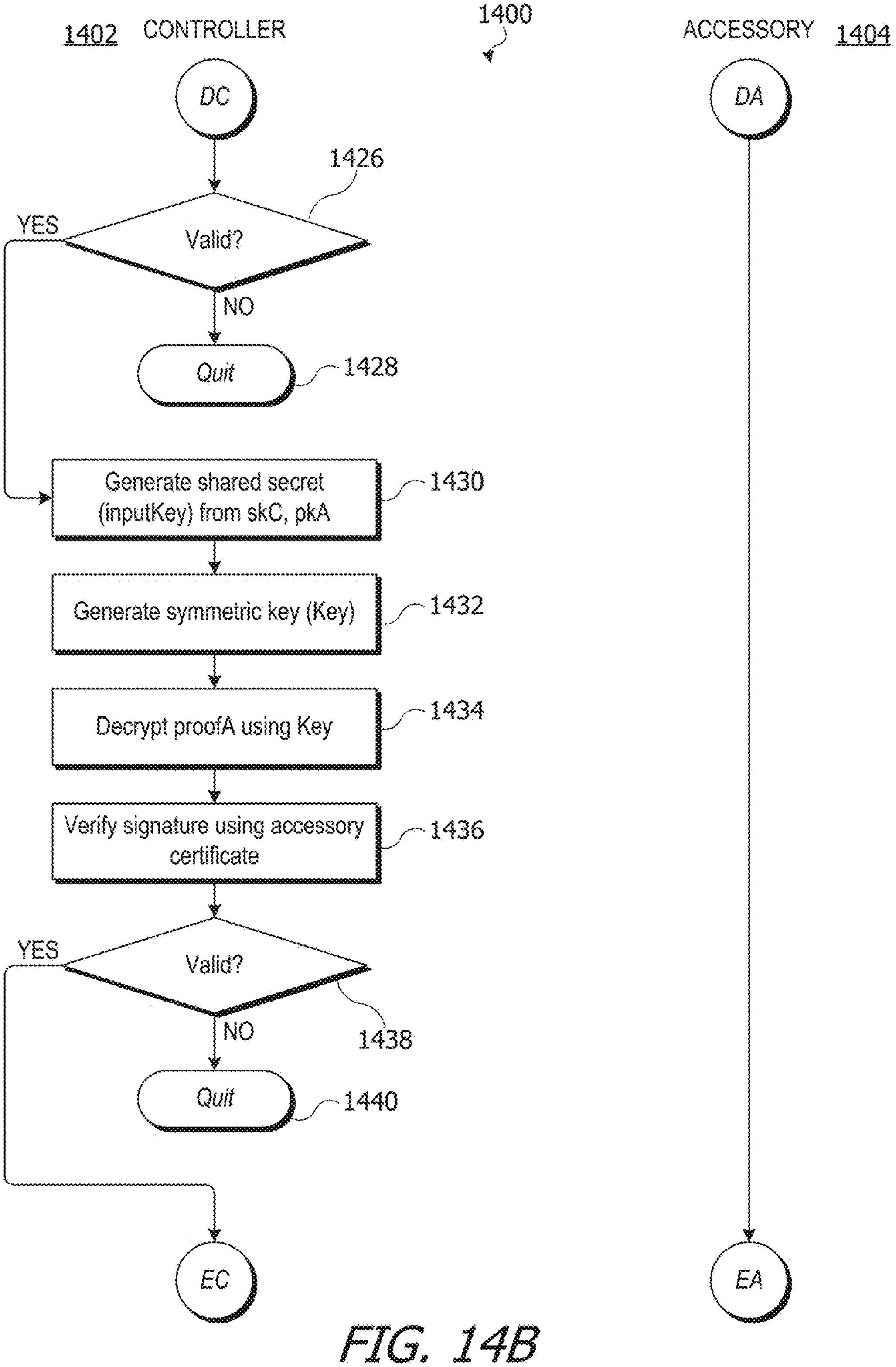
Figure 14C:
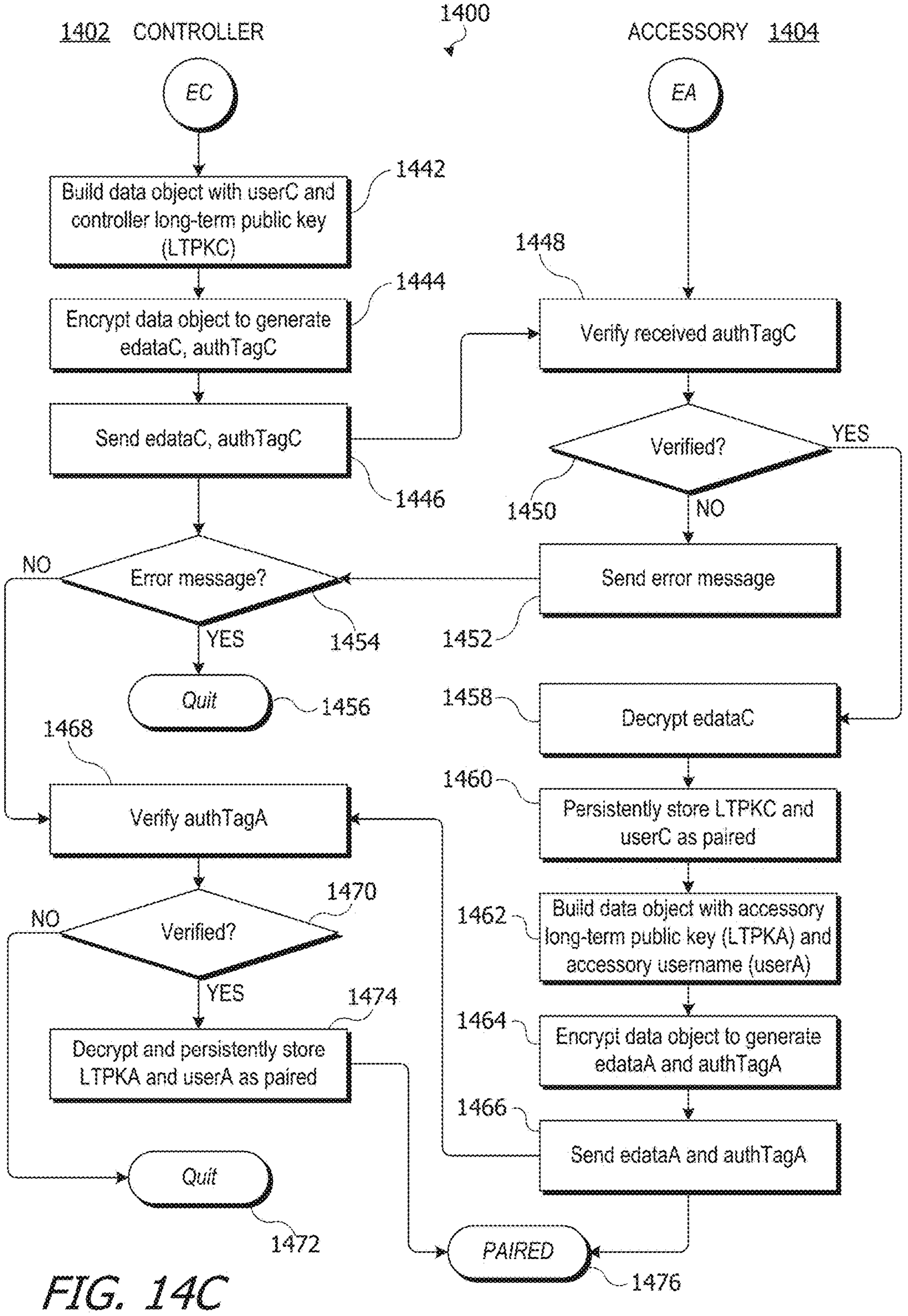

FIGS. 14A-14C show an example of a pair setup process 1400 for a controller 1402 and an accessory 1404 using authentication chips according to an embodiment of the present invention. It is assumed that controller 1402 has confirmed, prior to initiating process 1400, that accessory 1404 has an authentication chip. For example, feature flags characteristic 1202 described above can include a flag indicating whether the accessory supports certificate-based pairing. This can be set for accessories that have an authentication chip. As another example, a flag indicating whether the accessory supports certificate-based pairing can be including in a feature flag field of a service discovery record for the accessory (e.g., the feature flags "ff" field of the Bonjour TXT record in Table 3), which can make the flag more readily accessible to an unpaired controller. (If an accessory lacking an authentication chip nevertheless sets this flag, the controller can detect the absence of the authentication chip in the normal course of executing process 1400 and report an error.)

Referring to FIG. 14A, at block 1406, controller 1402 can generate a public/secret key pair (pkC, skC), e.g., using a Curve25519 algorithm (documented at http://cr.yp.to/ecdh.html) based on the elliptic curve Diffie-Hellman key agreement protocol. This key pair can be a short-term key pair that is used for the duration of process 1400 and then discarded. At block 1408, controller 1402 can send a pair setup start request to accessory 1404, e.g., as an HTTP POST request to an appropriate URL; the request can include public key pkC. The pair setup start request can include a state indicator to indicate that the pair setup start request has been sent (in some embodiments, this and subsequent state indicators can be written to pairing control point characteristic 1201 of FIG. 12).

At block 1410, in response to the pair setup start request, accessory 1404 can generate a public/secret key pair (pkA, skA), e.g., using a Curve25519 algorithm. Like (pkC, skC), this key pair can be a short-term key pair that is used for the duration of process 1400 and then discarded. Although not shown, the throttling behavior described above with reference to process 1300 can be incorporated, and accessory 1404 can refuse a pair setup start request if it is received too soon after an unsuccessful attempt.

At block 1412, accessory 1404 can generate a shared secret ("inputKey") using skA and pkC. At block 1414, accessory 1404 can construct a message by concatenating public keys pkA and pkC, and at block 1416, accessory 1404 can sign the message using its authentication chip to generate a message "smsg". The authentication chip can have its own persistent key pair (independent of pkA and skA) and can implement any algorithm desired, such as SHA-1 or SHA-2 (cryptographic hash functions designed by the U.S. National Security Agency, documented in Federal Information Processing Standards Publication 180-4).

At block 1418, accessory 1404 can generate a symmetric key ("Key"). For example, accessory 1404 can use HMAC-SHA-512 using as inputs inputKey, a salt (e.g., a predefined string), and additional information.

At block 1420, accessory 1404 can encrypt the signed message smsg from block 1416 using the key Key generated at block 1418 to generate a proof "proofA". Any symmetric encryption algorithm can be used.

At block 1422, accessory 1404 can send a response to controller 1402. The response can include public key pkA, accessory proof proofA, and an accessory certificate furnished by the authentication chip. Upon sending the response at block 1422, accessory 1404 can update the pairing state to indicate that the accessory's proof has been sent.

At block 1424, controller 1402 can verify the accessory certificate. For example, controller 1402 can have its own authentication chip or other secure data store that stores information identifying valid accessory certificates; the information can be provided to controller 1402 and in some instances updated by a trusted certificate authority. Controller 1402 can use this information to confirm that the received accessory certificate is valid. In some embodiments, certain certificates may be valid only for certain classes of accessories, and controller 1402 can use information previously received from the accessory (e.g., an accessory definition record or other information provided during device discovery as described above) to determine the class of the accessory and whether the received accessory certificate is valid for the accessory's class.

Referring to FIG. 14B, at block 1426, if the accessory certificate is not valid, process 1400 can terminate (block 1428), and controller 1402 can inform the user of the error. If the accessory certificate is valid, then at block 1430, controller 1402 can generate a shared secret ("inputKey") using skC and pkA. At block 1432, controller 1402 can generate a symmetric key ("Key"). For example, accessory 1404 can use HMAC-SHA-512 using as inputs inputKey, a salt (e.g., a predefined string), and additional information. At block 1434, controller 1404 can use symmetric key Key to decrypt proofA received from the accessory, using the same algorithm that was used by accessory 1404 to encrypt proofA. Controller 1402 thus obtains signed message smsg. At block 1436, controller 1402 can verify the signature on smsg using the accessory certificate. At block 1438, if the signature is not valid, process 1400 can terminate (block 1440), and controller 1402 can inform the user of the error.

Referring to FIG. 14C, if the signature is valid, then at block 1442, controller 1402 can build a data object with the controller username "userC" and controller's long-term public key LTPKC (which can be the same as in process 1300 described above). At block 1444, controller 1402 can encrypt the data object to generate edataC and authTagC. The encryption at block 1442 can use an encryption-and-authentication algorithm such as ChaCha20-Poly1305 with Key as the key, LTPKC as the message, and a nonce, similarly to process 1300 described above. At block 1446, controller 1402 can send an exchange request message to accessory 1404 that includes edataC and authTagC; controller 1402 can also update the pairing state to indicate that LTPKC has been sent to the accessory.

At block 1448, accessory 1404 can verify the received authTagC using its symmetric key Key. If, at block 1450, the verification at block 1448 fails, then at block 1452, accessory 1404 can send an error message to controller 1402. If, at block 1454, controller 1402 receives the error message, process 1400 can end at block 1456. In some embodiments, the controller can report the error to the user.

If block 1450 results in success, then at block 1458, accessory 1404 can decrypt LTPKC, and at block 1460, accessory 1304 can persistently store LTPKC and the controller's username userC as a paired controller record. Such storage can be in the secure element described above.

At block 1462, accessory 1404 can build a data object that includes the accessory's long-term public key (LTPKA) and a username (userA) associated with the accessory, both of which can be the same as in process 1300 described above. The accessory's long-term public/secret key pair can be different from the key pair in the accessory's authentication chip. At block 1464, accessory 1404 can encrypt the data object generated at block 1462 to generate edataA and authTagA. The same encryption algorithm used by controller 1402 at block 1444 can be used. At block 1466, accessory 1304 can send edataA and authTagA to controller 1402; accessory 1404 can also update the pairing state to indicate that LTPKA has been sent to the controller.

At block 1468, upon receiving edataA and authTagA, controller 1402 can verify the received authTagA using the key Key that was previously generated.

If, at block 1470, the verification at block 1468 fails, then at block 1472, process 1400 can end, and controller 1404 can report the error to the user. If the verification succeeds, then at block 1474, controller 1404 can decrypt LTPKA and persistently store LTPKA and the accessory's username userA as a paired accessory record (such storage can be in the secure element described above). At block 1476, pair setup is complete and the pairing status can be updated to so indicate.

It will be appreciated that process 1400 is illustrative and that variations and modifications are possible. Steps described as sequential may be executed in parallel, order of steps may be varied, and steps may be modified, combined, added or omitted. For instance, each time the controller sends a message to the accessory or vice versa (e.g., when the pairing process state changes), errors can be detected. While some error conditions are indicated, it is to be understood that if an error is detected at any point, process 1400 can end, and the controller can notify the user of the error. Further, references to specific encryption and/or authentication algorithms are for purposes of illustration, and other protocols and algorithms for secure exchange of data over an unsecured communication channel can be substituted.

Process 1400 as described is asymmetric in that the accessory sends a certificate to the controller for verification, but the controller does not send a corresponding certificate to the accessory. In some embodiments, bidirectional certificate verification can be implemented. For instance, a controller that has a certificate can implement processing similar to blocks 1412-1416 to generate a controller proof ("proofC"), which can be sent to the accessory along with the controller certificate. The accessory can implement processing similar to blocks 1424-1436 to verify the controller's proof.

In some embodiments, the authentication chip can be specific to a particular device, and each device can have a unique certificate. In other embodiments, accessories (or controllers) in the same class may have identical authentication chips and therefore identical certificates. Where this is the case, the protection against man-in-the-middle attacks during pair setup may be reduced; however, once the long-term public keys are exchanged, these keys can be reliably used for bidirectional authentication during subsequent pair verification.

Other techniques can be used to further reduce the risk of man-in-the-middle attacks or other exploits. For instance, if one (or both) of the two devices in a pair setup process has a proximity sensor that can detect how close the other device is (e.g., using Bluetooth LE or NFC), the device with the sensor can abort the pair setup process if the other device is not or does not remain in close proximity (e.g., within a few inches). This can reduce the likelihood of man-in-the-middle attacks, as an attacking device would need to be physically close to the intended participants in the process, a circumstance that a user would be likely to notice.

Some embodiments can incorporate both security certificates and setup-code-based pairing into a pair setup process. FIGS. 15A-15F show an example of a pair setup process 1500 for a controller 1502 and an accessory 1504 using a security certificate and a setup code according to an embodiment of the present invention. Process 1500 can incorporate features of processes 1300 and 1400 described above.

Figure 15A:
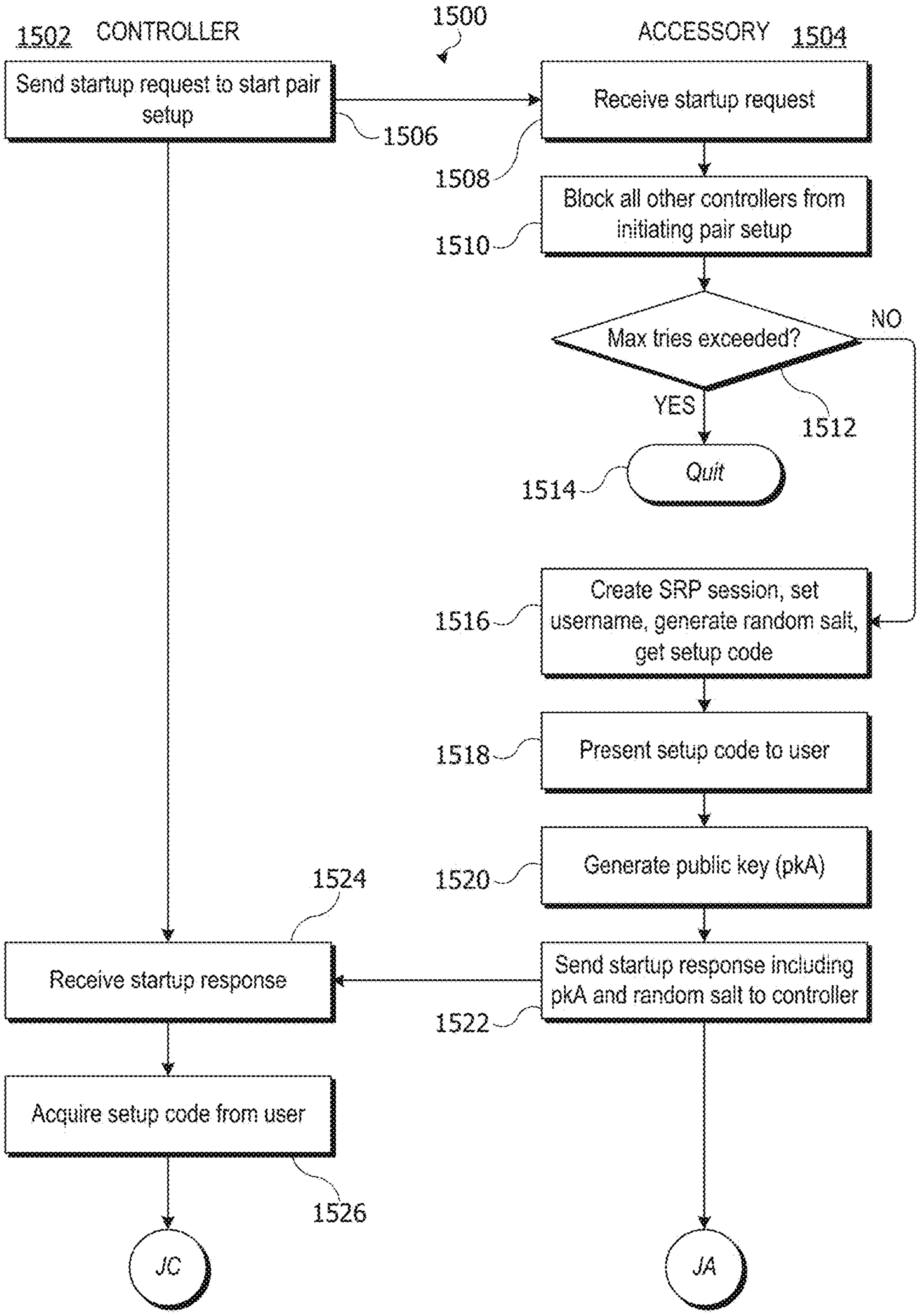
FIGS. 15A-15F show an example of a pair setup process using a setup code and a security certificate according to an embodiment of the present invention.

Referring first to FIG. 15A, at block 1506, controller 1502 can send a startup request to accessory 1504 to start the pair setup process. For example, controller 1502 can send an HTTP POST request to the /pair-setup URL of accessory 1504. The POST request can include a TLV data object indicating the desired pairing state (e.g., "start pair setup")

and a method identifier indicating whether a setup code and/or a certificate will be used. At block 1508, accessory 1504 can receive the startup request and can set the current pairing state accordingly. At block 1510, accessory 1504 can block any other controllers that may be present from initiating pair setup. For example, if a request to start pair setup is received after block 1510, the accessory can return an error response (e.g., an HTTP 429 "Too Many Requests" message). Accessory 1504 can continue to block pair-setup requests in this manner until process 1500 completes (or terminates due to error).

In some embodiments, accessory 1504 can limit the number of unsuccessful pair-setup attempts to a maximum number of tries, either globally or on a per-controller basis. For example, accessory 1504 can define a limit (e.g., 5 tries, 10 tries, or some other limit) and maintain a counter of unsuccessful tries. If the counter reaches or exceeds the limit, then at block 1512, the accessory can reject the request, and process 1500 can quit at block 1514. In some embodiments, accessory 1504 can send an error response to controller 1502 indicating the cause of the error (e.g., too many tries). Alternatively, a throttling technique (e.g., as described above with reference to FIG. 13A) or other techniques can be used to prevent brute-force attempts to perform pair setup by an unauthorized controller.

Assuming the maximum number of tries has not been exceeded, at block 1516, accessory 1504 can begin pair setup. For example, accessory 1504 can create an SRP session, e.g., by invoking appropriate SRP protocol functions such as SRP_new (SRP6a_server_method( )); set the SRP username for the session (e.g., with SRP_set_username, using a fixed string, which can be generic, as the username); generate a random salt (e.g., at least 16 bytes), which can be set with SRP_set_params; and select (e.g., retrieve) a setup code to be set as a an SRP password (e.g., using SRP_set_auth_password or SRP_set_auth_password_raw).

Similarly to process 1300, accessory 1504 can select a setup code using various techniques, including reading a code from an EEPROM, receiving a code from the user, generating a random code (e.g., during execution of process 1500), or the like. At block 1518, accessory 1504 can present the setup code to the user. For example, depending on the accessory and the setup code, the code can be printed on a label attached to accessory 1504 or its packaging, presented on a display of accessory 1504, or the like. In some instances, rather than presenting the setup code to the user, accessory 1504 can deliver the code to controller 1502 using a communication channel independent of the channel being used for pair setup process 1500, such as an NFC channel or other signaling channel with a very short range (e.g., less than 50 cm).

At block 1520, accessory 1504 can generate a public key ("pkA") (e.g., using SRP_gen_pub). Public key pkA can be part of a short-term key pair (along with a secret key "skA") that is used for the duration of process 1500 and then discarded.

At block 1522, accessory 1504 can send a response to the startup request, e.g., using an HTTP response message. The response can include public key pkA and the random salt. Upon sending the response at block 1522, accessory 104 can update the current pairing state to indicate that the accessory's public key has been sent.

At block 1524, controller 1502 can receive the response to the startup request. At block 1526, controller 1502 can acquire the setup code from the user. For example, controller 1502 can present a user interface screen that prompts the user to enter the accessory's setup code. As with block 1322 of process 1300 described above, other techniques can be used, as long as the setup code is delivered to controller 1502 out of band, i.e., via a communication channel independent of the communication channel being used to perform the pair setup process. Depending on the specific technique used, acquiring the setup code by the controller can incorporate some form of user activity (e.g., entering the code, holding the controller in proximity to the accessory, operating a camera of the controller, etc.), and such activity may serve as confirmation that the user intends to establish a pairing between controller 1502 and accessory 1504, in addition to providing out-of-band confirmation of the identity of the devices.

Figure 15B:
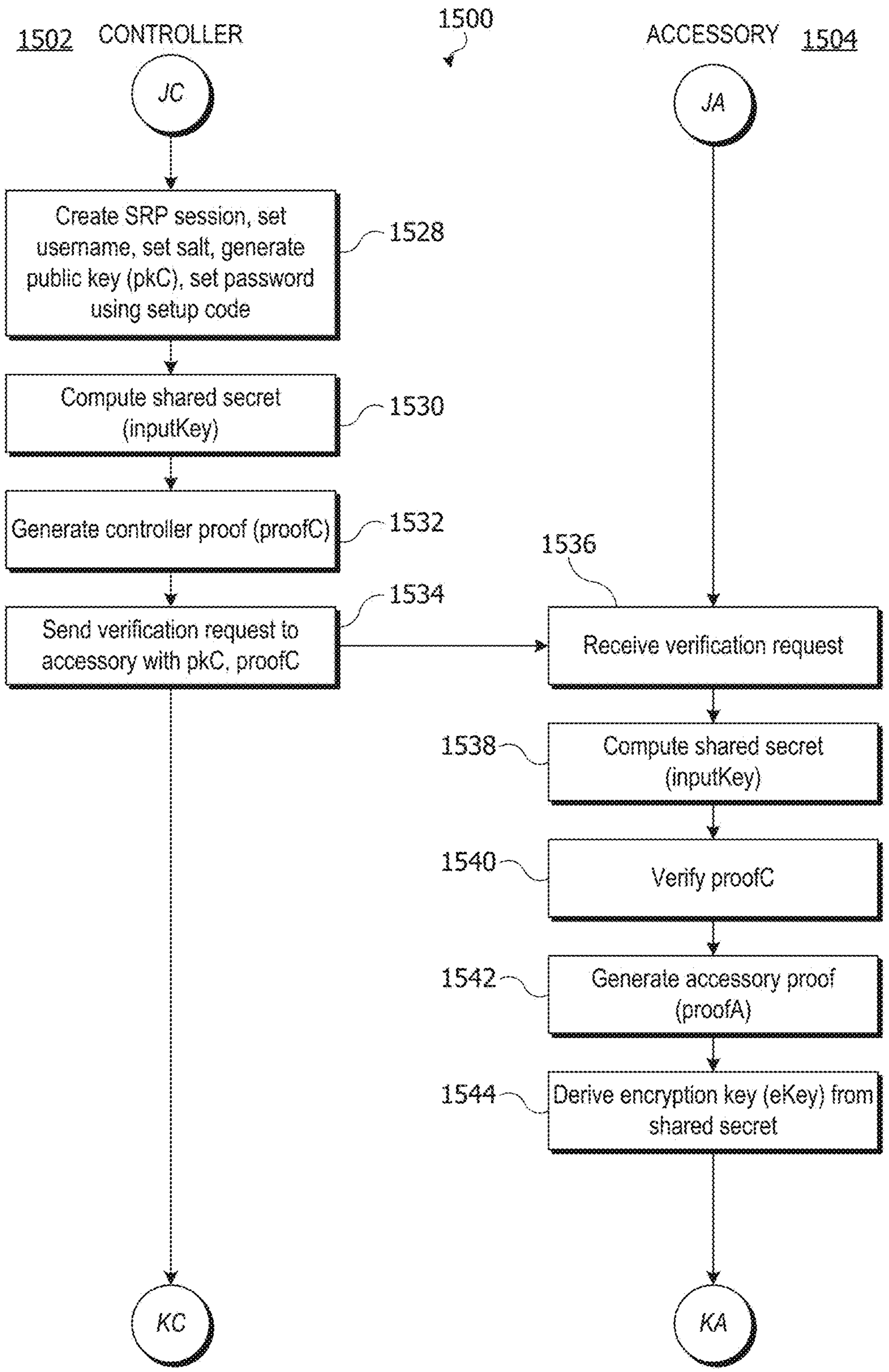

Referring to FIG. 15B, at block 1528, controller 1502 can create an SRP session, e.g., by invoking appropriate SRP protocol functions such as SRP_new (SRP6a_server_method( ) ); set the SRP username (e.g., with SRP_set_username, using a fixed string, which can be generic, as the username); set the salt to the salt received from the accessory (with SRP_set_params); generate its own public key ("pkC") (e.g., using SRP_gen_pub); and set the SRP password using the setup code acquired at block 1526 (e.g., using SRP_set_auth_password or SRP_set_auth_password_raw). As with accessory public key pkA, public key pkC can be part of a short-term key pair (along with a secret key "skC") that is used for the duration of process 1500 and then discarded. At block 1530, controller 1502 can compute a shared secret ("inputKey") (e.g., using SRP_compute_key). At block 1532, controller 1502 can generate proof ("proofC") that it has the shared secret inputKey (e.g., using SRP_Respond).

At block 1534, controller 1502 can send a verification request to accessory 1504. For example, controller 1502 can send an HTTP POST request to the /pair-setup URL of accessory 1504. The POST request can include a TLV data object that indicates the desired pairing state (e.g., "verify pair setup"), the controller's public key pkC, and the controller proof proofC.

At block 1536, accessory 1504 can receive the verification request. At block 1538, accessory 1504 can compute a shared secret ("inputKey") (e.g., using SRP_compute_key); this should match the shared secret computed by controller 1502 at block 1530.

At block 1540, accessory 1504 can use the shared secret computed at block 1538 to verify the controller proof proofC (e.g., using SRP_verify). Although not shown in FIG. 15B, if verification fails, accessory 1504 can terminate process 1500 and send an error message to controller 1502. (As in other pairing processes described herein, controller 1502 can report the error to the user.)

Assuming proofC is verified, at block 1542, accessory 1504 can generate an accessory proof ("proofA") to prove that it possesses the shared secret (e.g., using SRP_respond). At block 1544, accessory 1504 can derive a session encryption key (eKey) from the shared secret. For example, accessory 1504 can use an HKDF-based key derivation function that implements Secure Hash Algorithm version 2 for 512-bit hashes (HKDF-SHA-512, documented at IETF RFC 6234) using as inputs inputKey, a salt, and additional information.

Figure 15C:
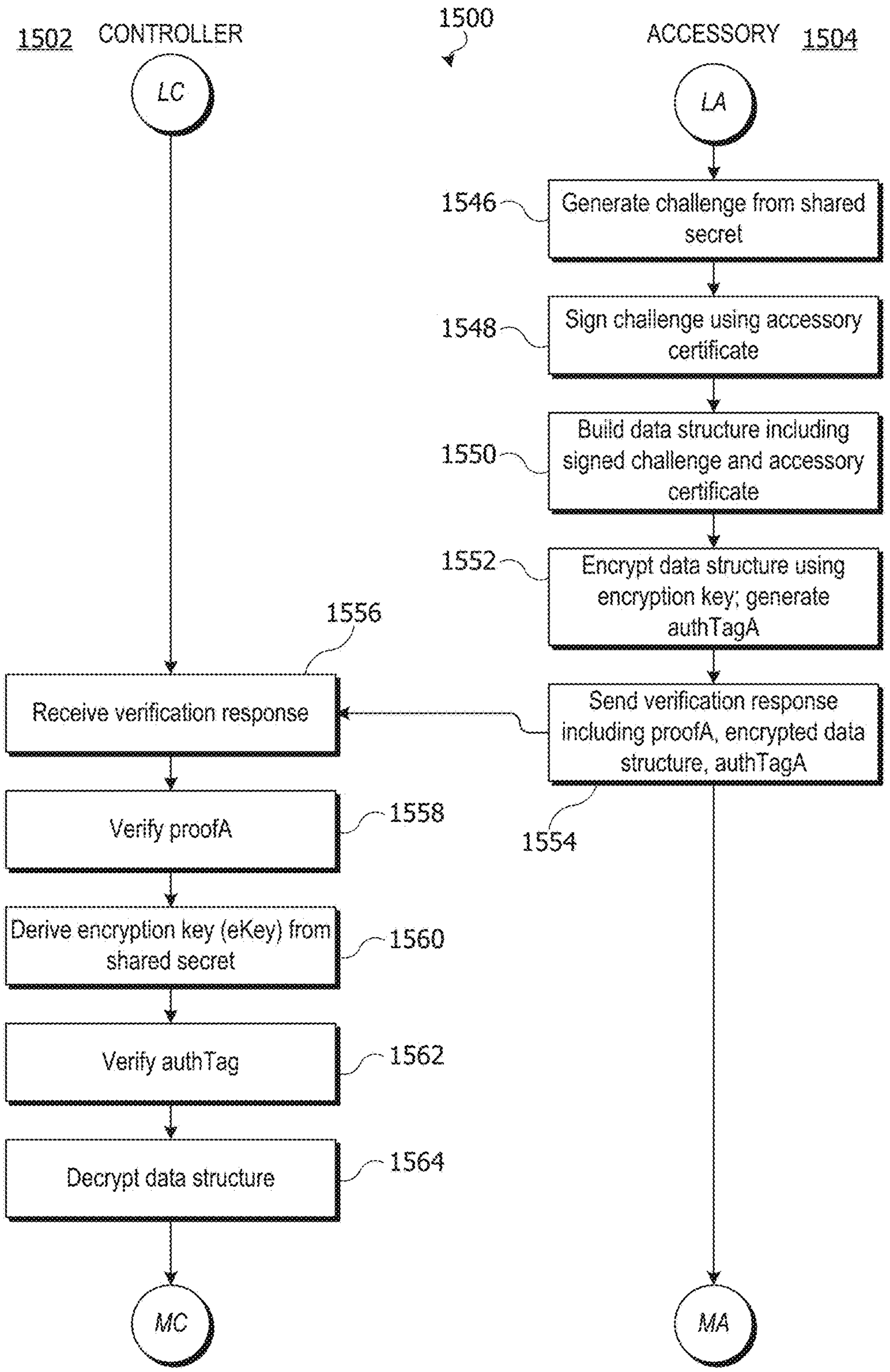

Referring to FIG. 15C, it is assumed in this example that accessory 1504 has a security certificate issued by a trusted certificate authority. In some embodiments, the certificate can be incorporated into an authentication chip as described above with reference to FIGS. 14A-14C. Where this is the case, accessory 1504 can use its certificate to further authenticate its identity to controller 1502. In some embodiments, the startup request sent by controller 1502 at block 1506 or the verification request sent by controller 1502 at block 1534 can include an indication of whether the accessory should authenticate with a certificate.

In instances where accessory 1504 authenticates with a certificate, at block 1546, accessory 1504 can generate a challenge to be signed from the shared secret (inputKey) computed at block 1538. For example, the challenge can be generated by applying a key derivation function such as HKDF-SHA-512 using inputKey, a salt, and an additional information item as inputs. The salt and additional information item can have predefined values that can be programmed into accessory 1504 as part of its operating system or firmware. At block 1548, accessory 1504 can sign the challenge using its certificate. For example, if accessory 1504 includes an authentication chip, the authentication chip can sign the challenge. As described above, the authentication chip can have its own persistent key pair (independent of pkA and skA or LTPKA and LTSKA) and can implement any signature algorithm desired, such as SHA-1.

At block 1550, accessory 1504 can build a data structure that includes the signed challenge and the accessory certificate, which can be retrieved from the authentication chip. At block 1552, accessory 1504 can encrypt the data structure built at block 1550, using the encryption key (eKey) generated at block 1544. Any symmetric encryption algorithm can be used, such as the ChaCha20-Poly1305 AEAD algorithm. The encryption algorithm can generate an encrypted data structure and a tag (authTagA).

At block 1554, accessory 1504 can send a verification response to controller 1502. The verification response can include the accessory proof proofA generated at block 1542, as well as the encrypted data structure and authTagA generated at block 1550. As noted above, in some embodiments, certificate-based authentication can be selectively performed or not (e.g., depending on whether controller 1502 requested certificate-based authentication). In instances where certificate-based authentication is not being performed, the verification response can omit the encrypted data structure and authTagA.

At block 1556, controller 1502 can receive the verification response from accessory 1504. At block 1558, controller 1502 can verify the accessory proof proofA (e.g., using SRP_verify). If the verification fails, process 1500 can terminate with an error. Assuming the verification succeeds, at block 1560, controller 1502 can derive encryption key (eKey) from the shared secret (inputKey) computed at block 1530. Controller 1502 can use the same key derivation algorithm and inputs that accessory 1504 used at block 1544, so that the eKey derived at block 1560 is expected to match the eKey generated by the accessory at block 1544.

At block 1562, controller 1502 can verify the received authTagA, and at block 1564, controller 1502 can decrypt the received data structure.

Figure 15D:
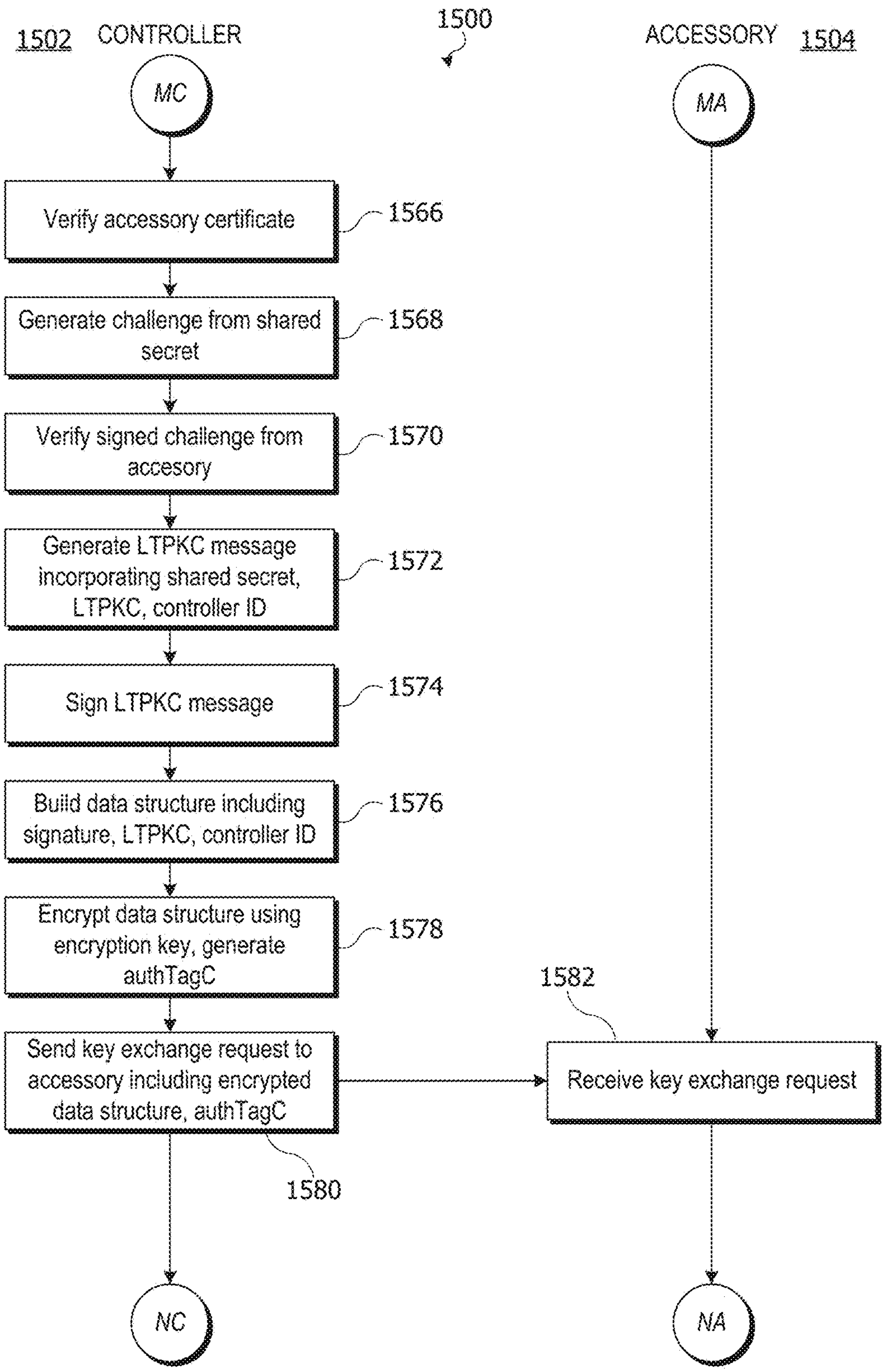

Referring now to FIG. 15D, at block 1566, controller 1502 can verify the accessory certificate extracted from the decrypted data structure. For example, as described above, controller 1502 can have its own authentication chip or other secure data store that stores information identifying valid accessory certificates; the information can be provided and in some instances updated by a trusted certificate authority. Alternatively, controller 1502 may be able to communicate in real time with a trusted certificate authority to verify a received certificate. Controller 1502 can use information from the certificate authority (whether cached locally or obtained in real time) to confirm that the accessory certificate is valid. In some embodiments, certain certificates may be valid only for certain classes of accessories, and controller 1502 can use information previously received from the accessory (e.g., information provided during device discovery as described above) to determine the class of the accessory and whether the accessory certificate is valid for the accessory's class. If the certificate is not valid, process 1500 can terminate with an error.

Assuming the certificate is valid, at block 1568, controller 1502 can generate a challenge from the shared secret inputKey. Controller 1502 can use the same algorithm and inputs (e.g., inputKey with a predefined salt and additional information item) that accessory 1504 used at block 1546, with the result that controller 1502 and accessory 1504 should both generate the same challenge. With this technique, it is not necessary for controller 1502 to send a challenge in the clear to accessory 1504. Further, where the challenge incorporates the shared secret inputKey, it can be difficult for an impostor to guess the challenge. At block 1570, controller 1502 can verify the signed challenge using the public key from the accessory certificate. If the verification fails, process 1500 can terminate with an error.

Assuming verification succeeds, the controller is now ready to exchange long-term public keys with the accessory. At block 1572, controller 1502 can generate an LTPKC message that concatenates a representation of the shared secret (e.g., HDKF-SHA-512 of the shared secret with a salt and additional information item, which can have predefined values that can be programmed into controller 1502 as part of its operating system or firmware), the controller's long-term public key (LTPKC), and the controller's identifier. In some embodiments, the controller has a predefined (LTPKC, LTSKC) key pair that can be used at block 1572; in other embodiments, an (LTPKC, LTSKC) key pair can be generated at block 1572. At block 1574, controller 1502 can sign the LTPKC message using its long-term secret key (LTSKC), e.g., by applying a signature algorithm such as Ed25519 (documented at http://ed25519.cr.yp.to) to the LTPKC message. At block 1576, controller 1502 can build a data structure that includes the signature from the LTPKC message, the LTPKC, and the controller's ID. (The LTPKC message itself can be omitted from this data structure, as accessory 1504 will be able to reconstruct it.) At block 1578, controller 1502 can encrypt the data structure and generate an authentication tag (authTagC) using the encryption key eKey derived at block 1560.

At block 1580, controller 1502 can send a key exchange request to the accessory. For example, controller 1502 can send an HTTP POST request to the /pair-setup URL of accessory 1504. The key exchange request can include the encrypted data structure and authentication tag generated at block 1578. At block 1582, accessory 1504 can receive the key exchange request from controller 1502.

Figure 15E:
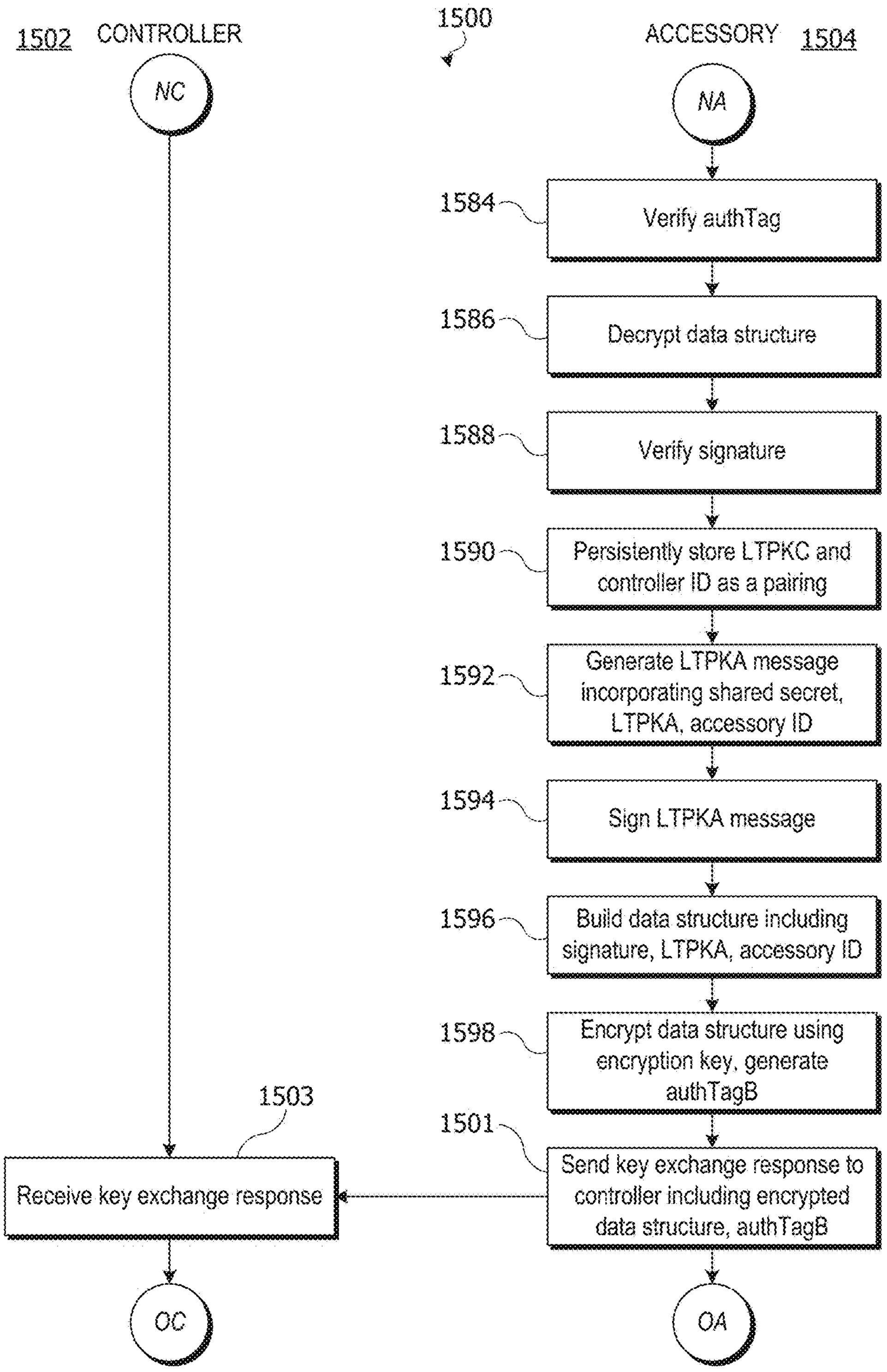

Referring now to FIG. 15E, at block 1584, accessory 1504 can verify the received authentication tag. At block 1586, accessory 1504 can decrypt the data structure, and at block 1588, accessory 1504 can verify the signature contained in the data structure. If any of the verifications fail, process 1500 can terminate with an error.

Assuming the authentication tag and signature are verified, at block 1590, accessory 1504 can persistently store the LTPKC and controller ID extracted from the data structure as a paired controller record. Such storage can be in a secure element described above.

Accessory 1504 can send its own long-term public key (LTPKA) to controller 1502 in a similar manner. For example, at block 1592, accessory 1504 can generate an LTPKA message that concatenates a representation of the shared secret (e.g., HDKF-SHA-512 of the shared secret with a salt and additional information item, which can have predefined values programmed into the accessory's system software or firmware), the accessory's long-term public key (LTPKA), and the accessory's identifier. In some embodiments, the accessory has a predefined (LTPKA, LTSKA) key pair that can be used at block 1592; in other embodiments, an (LTPKA, LTSKA) key pair can be generated at block 1592. At block 1594, accessory 1504 can sign the LTPKA message using its long-term secret key (LTSKA), e.g., by applying a signature algorithm such as Ed25519 to the LTPKA message. At block 1596, accessory 1504 can build a data structure that includes the signature from the LTPKA message, the LTPKA, and the accessory's ID. (The LTPKA message itself can be omitted from this data structure, as controller 1502 will be able to reconstruct it.) At block 1598, accessory 1504 can encrypt the data structure and generate an authentication tag (authTagB) using the encryption key eKey derived at block 1544.

At block 1501, accessory 1504 can send a key exchange response to controller 1502. The key response can include the encrypted data structure and authentication tag generated at block 1598. At block 1503, controller 1502 can receive the key exchange response.

Figure 15F:
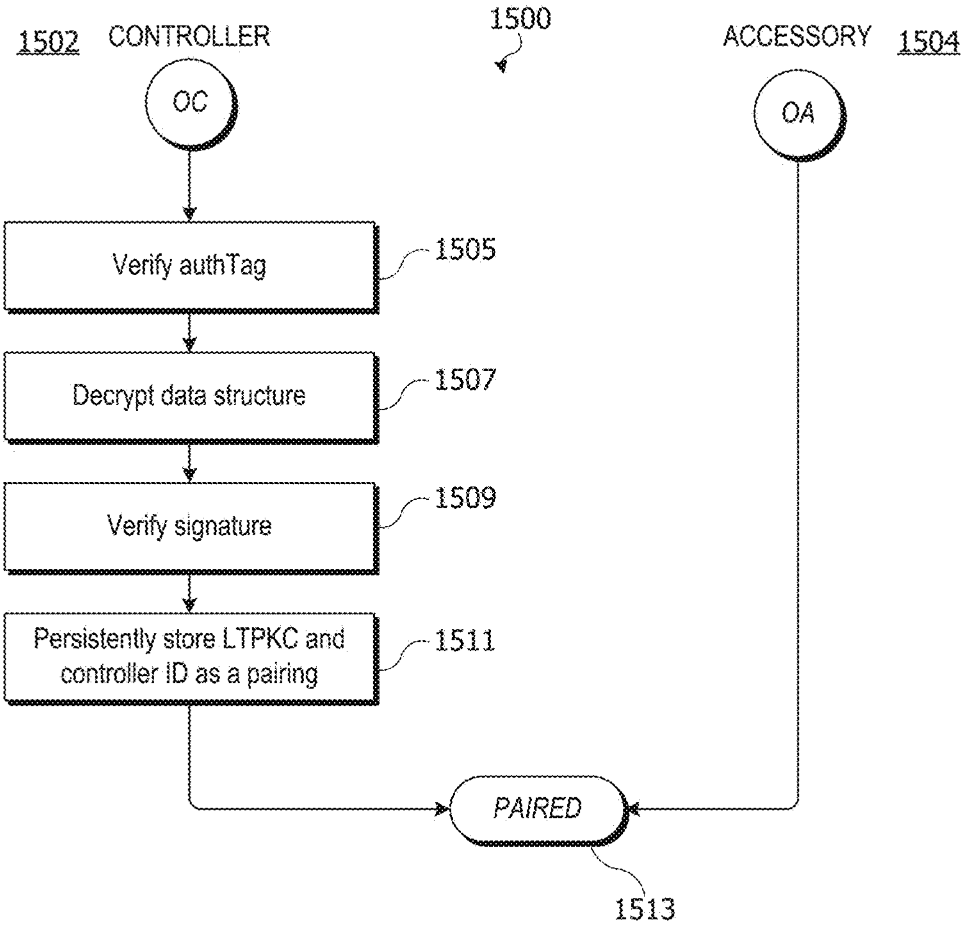

Referring now to FIG. 15F, at block 1505, controller 1502 can verify the received authentication tag. At block 1507, controller 1502 can decrypt the data structure, and at block 1509, controller 1502 can verify the signature contained in the data structure. If any of the verifications fail, process 1500 can terminate with an error.

Assuming the authentication tag and signature are verified, at block 1511, controller 1502 can persistently store the LTPKA and accessory ID extracted from the data structure as a paired accessory record. Such storage can be in a secure element as described above.

At block 1513, pair setup is complete and the pairing status can be updated to so indicate.

It will be appreciated that process 1500 is illustrative and that variations and modifications are possible. Steps described as sequential may be executed in parallel, order of steps may be varied, and steps may be modified, combined, added or omitted. For instance, each time the controller sends a message to the accessory or vice versa (e.g., when the pairing process state changes), errors can be detected. While some error conditions are indicated, it is to be understood that if an error is detected at any point, process 1500 can end, and the controller can notify the user of the error. Further, references to specific encryption and/or authentication algorithms are for purposes of illustration, and other protocols and algorithms for secure exchange of data over an unsecured communication channel can be substituted.

Process 1500 as described is asymmetric in that the accessory sends a certificate to the controller for verification, but the controller does not send a corresponding certificate to the accessory. In some embodiments, bidirectional certificate verification can be implemented. For instance, a controller that has a certificate can implement processing similar to blocks 1546-1552 to generate a challenge and sign it using the controller certificate, and the signed challenge can be sent to the accessory along with the controller certificate. The accessory can implement processing similar to blocks 1566-1570 to verify the controller's proof.

In some embodiments, a given accessory or controller can support any or all of pair setup processes 1300, 1400, 1500 (and/or other processes not specifically described), and the pair setup process to be used can be chosen on a per-pairing basis. For uniformity, a controller can support multiple pair setup processes (e.g., with and without certificates) and can choose the process for a given accessory based on which process(es) the accessory supports. Processes can be assigned a preference order (e.g., based on relative security provided), and the controller can select the most preferred process that a given accessory supports. The controller can specify the process to be used, e.g., by including a process identifier in the startup request message.

Figure 16:
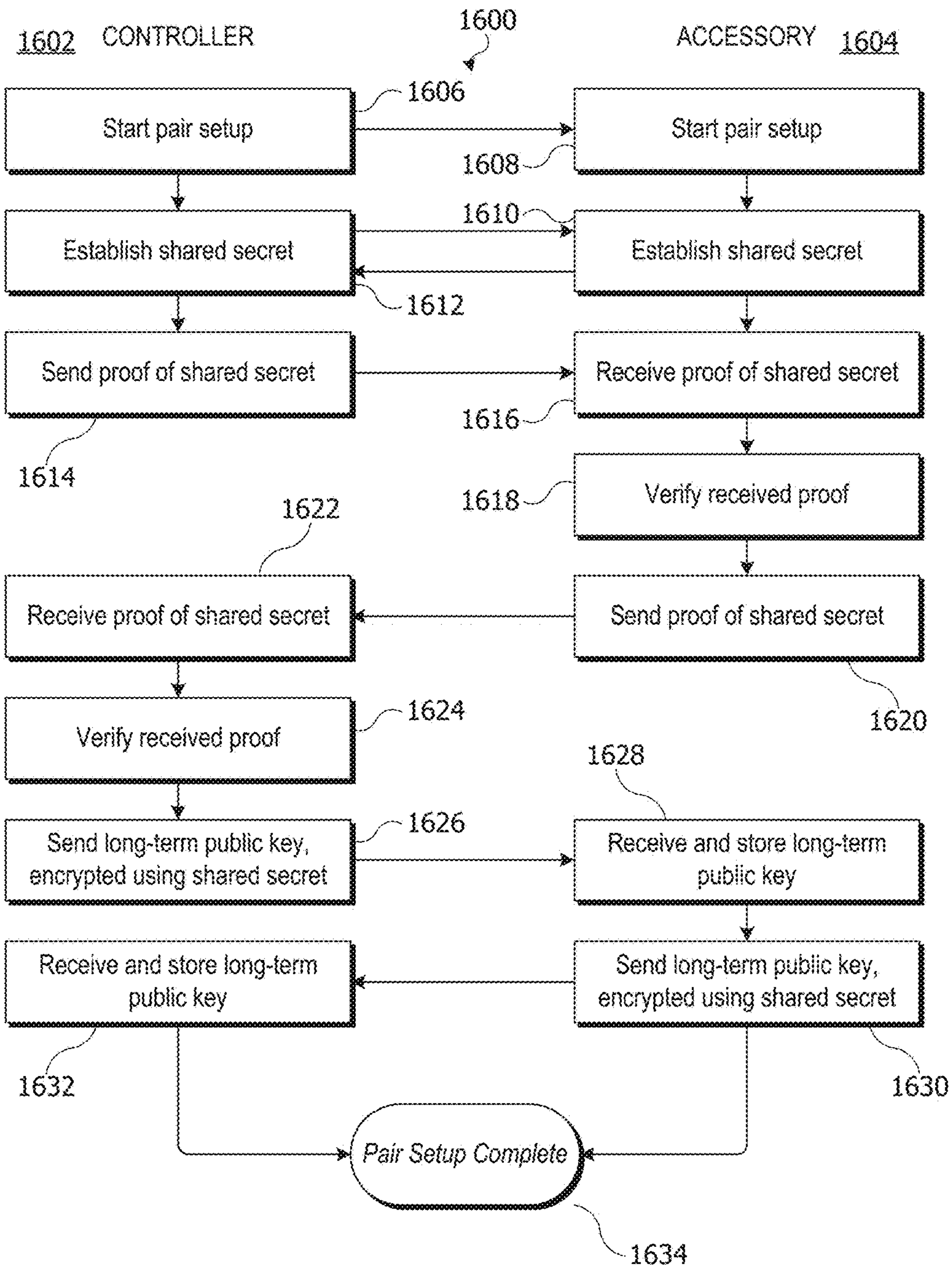
FIG. 16 shows an example of a generalized pair setup process according to an embodiment of the present invention.

A more general view of pair setup can be had by reference to FIG. 16, which shows a generalized pair setup process 1600 between a controller 1602 and an accessory 1604 according to an embodiment of the present invention. Pair setup process 1600 can be initiated by controller 1602 at block 1606. For example, as described above, controller 1602 can execute process 400 (through block 426) to identify an accessory (e.g., accessory 1604) with which pair setup should be performed. Controller 1602 can send a message to accessory 1604 (e.g., a POST request to an appropriate URL) so that accessory 1604 can also start pair setup at block 1608.

At blocks 1610 and 1612, accessory 1604 and controller 1602 can establish a shared secret (e.g., inputKey in processes 1300, 1400, and 1500 described above). Establishing the shared secret can include a bidirectional information exchange. For instance, in process 1300, the accessory provides a salt and a short-term public key, and the controller provides its short-term public key. In processes 1400 and 1500, the accessory provides its short-term public key and a certificate, and the controller provides its short-term public key. In some embodiments, the shared secret may also incorporate other information that is preprogrammed into both devices (e.g., within a secure element or elsewhere). The shared secret can also incorporate out-of-band information, which can provide evidence that the controller is authorized (e.g., by a user) to interoperate with the accessory. For instance, in process 1300 or process 1500, the accessory's setup code is used by the controller and the accessory to construct the shared secret. As described above, the accessory's setup code can be provided to the controller out-of-band, that is, using a communication channel other than the channel being used to send and receive the proofs. Examples of out-of-band channels can include user input (e.g., a user can enter the accessory's setup code at a user interface of the controller, take a photo of the setup code using a camera of the controller), a near-field communication channel, an optical signaling channel, a wired electronic signaling channel, an audio (e.g., ultrasonic) channel, etc. In some instances, the out-of-band channel can incorporate user intervention (e.g., entering a setup code, holding the controller in near-field proximity to the accessory, taking a photo, plugging in a connector), and the fact of communicating the setup code via the out-of-band channel can serve as an indication that the user approves of establishing the pairing.

At block 1614 controller 1602 can generate and send a proof to accessory 1604. As used herein, a "proof," or "cryptographic proof," can include any piece of information that a receiving device in possession of a shared secret (in this case, accessory 1604) can use to verify that a sending device (in this case, controller 1602) is also in possession of the shared secret. Examples of a controller's proof include the messages labeled "proofC" in processes 1300, 1400, 1500.

At block 1616, accessory 1604 can receive the controller's proof, and at block 1618, accessory 1604 can verify the proof, based on its locally generated copy of the shared secret. If the shared secret does not match, the controller's proof would not be verified, and process 1600 can terminate with an error. It should be noted that where a setup code is used to generate the shared secret, verification at block 1618 can also serve as authentication of the controller to the accessory.

Assuming the proof is verified, at block 1620, accessory 1604 can generate and send its own proof to controller 1602, to demonstrate that accessory 1604 is also in possession of the shared secret. The accessory proof can be, e.g., a different encrypted message from the controller's proof that also incorporates the shared secret (as in processes 1300 and 1500). In some embodiments, other proofs of the accessory's identity can be incorporated; for instance, in processes 1400 and 1500, the accessory can sign a message using a certificate that confirms at least some aspects of the accessory's identity.

At block 1624, the controller can verify the received proof. Similarly to block 1618, if the shared secret does not match, the accessory's proof would not be verified, and process 1600 can terminate with an error. It should be noted that where a setup code is used to generate the shared secret, verification at block 1624 can also serve as authentication of the accessory to the controller. Further authentication can be provided, e.g., if the accessory proof incorporates a message signed using a certificate (as in processes 1400 and 1500).

Assuming the proof is verified at block 1624, both devices can be considered authenticated to each other, and the shared secret can be used to exchange additional information, such as the long-term public keys described above, to establish a (persistent) pairing. For example, at block 1626, controller 1602 can send its long-term public key (LTPKC). LTPKC can be sent in an encrypted form, e.g., using a key derived from the shared secret (as in processes 1300, 1400, and 1500). At block 1628, accessory 1604 can receive and persistently store LTPKC (e.g., in a secure element as described above). At block 1630, accessory 1604 can send its long-term public key (LTPKA). LTPKA can also be sent in an encrypted form, e.g., using a key derived from the shared secret (as in processes 1300, 1400, and 1500). At block 1632, controller 1602 can receive and persistently store LTPKA (e.g., in a secure element as described above). Thereafter, pair setup is complete (block 1634), as each device now has an authenticated, persistently stored record establishing a pairing with the other.

It will be appreciated that process 1600 is illustrative and that variations and modifications are possible. Steps described as sequential may be executed in parallel, order of steps may be varied, and steps may be modified, combined, added or omitted. For instance, proofs can be exchanged in either order (accessory-first or controller-first), and long-term public keys can also be exchanged in either order.

It should be noted that the long-term public keys are referred to herein as "public" to indicate that they can be provided to other devices, unlike a private (or secret) key. However, as shown in processes 1300, 1400, 1500, 1600, pair setup can allow the devices to exchange long-term public keys in encrypted form, after a shared secret has been established using other information (e.g., a setup code). In some embodiments, decryption and storage of a long-term public key can take place within a secure computing element in the receiving device, and this can further protect long-term public keys from being exposed to unauthorized devices. This can make it considerably more difficult for an unauthorized device to forge a pair setup record. This level of security allows pair setup records to be used for a simpler pair verification process when devices reconnect, as described below.

A pairing established via any of the pair setup processes described above can be a persistent state, in that an accessory and a controller can store the long-term public keys they receive in persistent storage (e.g., nonvolatile memory, magnetic disk or the like); the persistent storage can be in a secure element. In some embodiments, once an accessory has performed pair setup with one controller, the accessory can prevent any other controller from performing pair setup, e.g., by responding with an error message to any received request to initiate pair setup.

The controller that has performed pair setup with the accessory can be designated as "administrator" for that accessory and can be allowed to instruct the accessory to establish pairings with other controllers, e.g., using a pair add process as described below.

In some embodiments, an accessory can concurrently have established pairings with multiple controllers; each pairing can be established using pair setup, pair add (described below) or the like. For instance, an accessory can persistently store a lookup table or other data structure that includes the identifier and associated LTPKC of each controller that has established a pairing. The data structure can also include other information about the controller. For example, different controllers may be granted different degrees of control over the accessory (referred to as permissions), and the data structure maintained by the accessory can include indicators (e.g., flags) specifying which permissions each controller has. Various permissions can be defined. One permission that can be defined is an "administrator" permission, and in some embodiments, only a controller with administrator permission can add pairing records for other controllers to the accessory (e.g., using a pair add process as described below). In some embodiments, a controller that successfully performs pair setup can be automatically granted administrator permission. Other controllers can selectively be granted administrator permission during pair add (e.g., as described below).

Similarly, a controller can concurrently have established pairings with multiple accessories. For example, a controller can perform pair setup with multiple accessories, or in some instances, a controller can add a pairing with an accessory via a pair add process as described below. A controller can persistently store a lookup table or other data structure that includes the identifier and associated LTPKA of each accessory with which the controller has established a pairing. The data structure can also include information such as what permissions the controller has for that accessory.

It is contemplated that a controller and accessory that have established a pairing might not remain in constant communication with each other thereafter. For example, an accessory or controller can be powered off, or one device can be moved out of range of another. When a controller and an accessory that have established a pairing with each other return to a communicative state, instead of performing pair setup again, the devices can use a different process (referred to herein as pair-verify) to verify the existence of the previously established pairing. Pair verify can use the long-term public key records that were previously created and stored (e.g., during pair setup or pair add). A pair verify process can also generate a new shared secret and/or session key that can be used to encrypt subsequent messages for as long as the devices remain in the pair-verified state. A pair-verified state (also referred to herein as a pair-verified session) can be terminated by either device, e.g., by deleting its own copy of the session key, which will render it unable to decrypt future messages from the other device. In some embodiments, pair verify can be performed each time a controller attempts to open a channel for uniform accessory protocol communication with an accessory with which it has an established pairing.

Figure 17A:
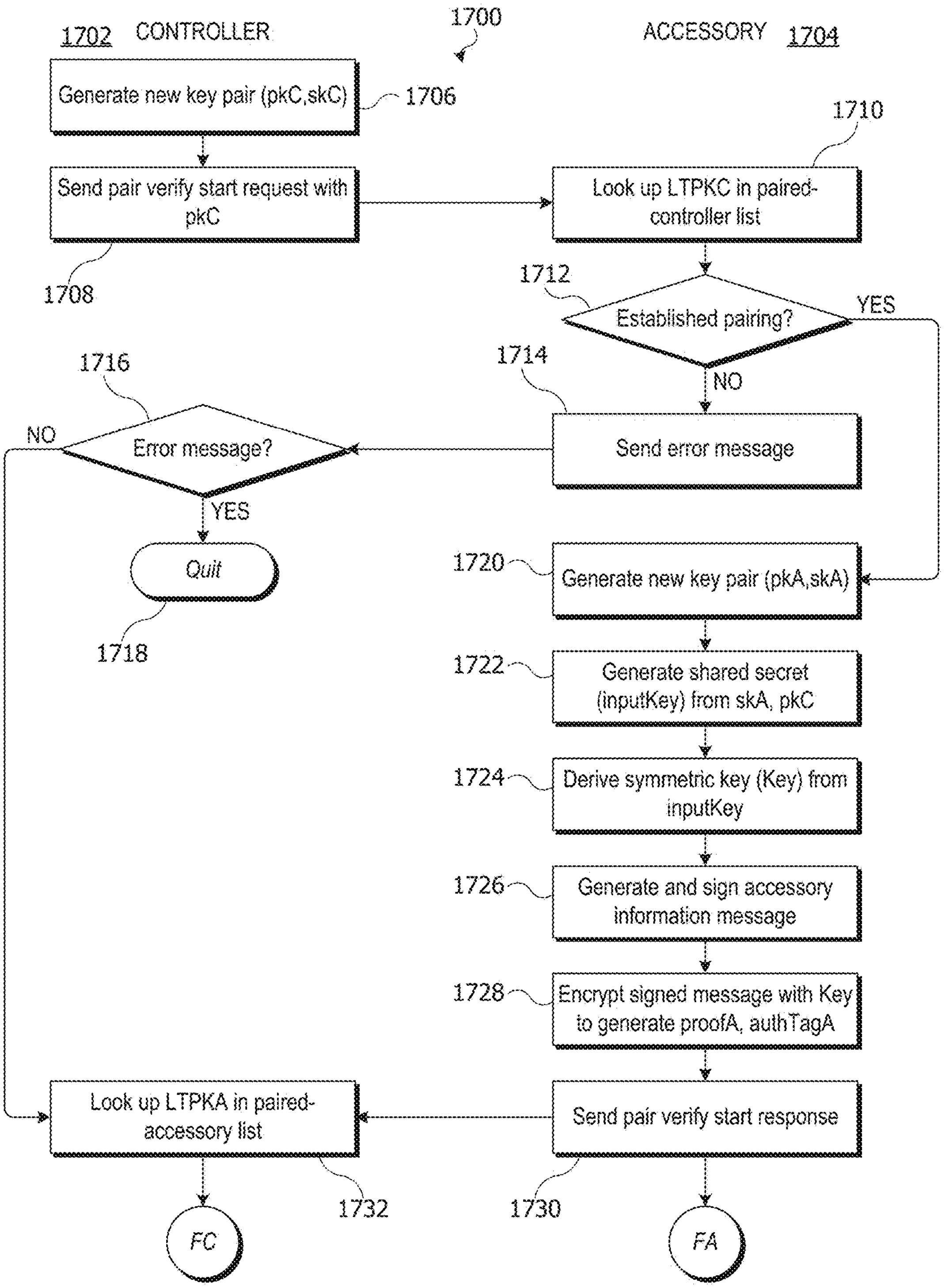
FIGS. 17A-17C show an example of a pair verify process according to an embodiment of the present invention.
Figure 17B:
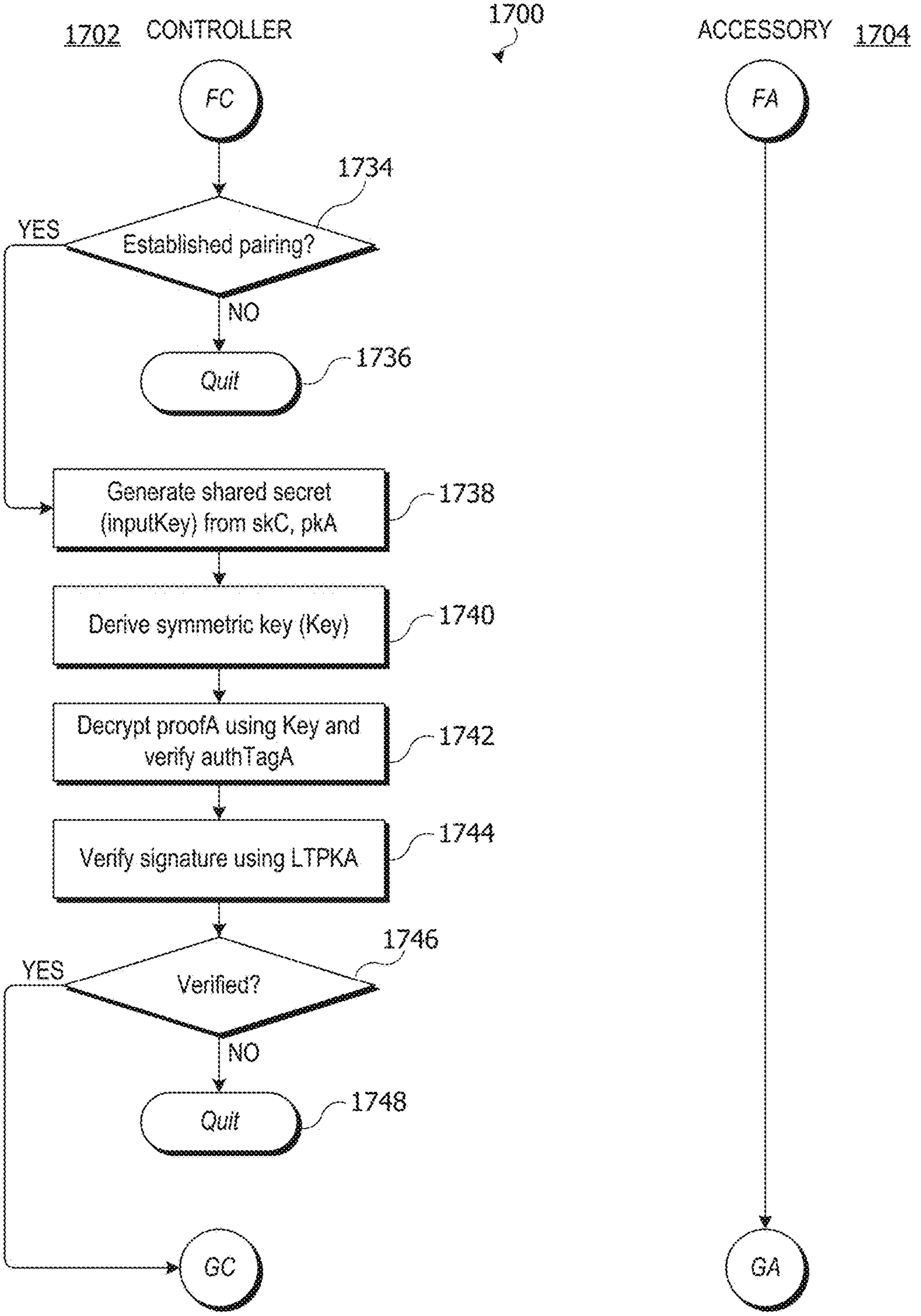
Figure 17C:
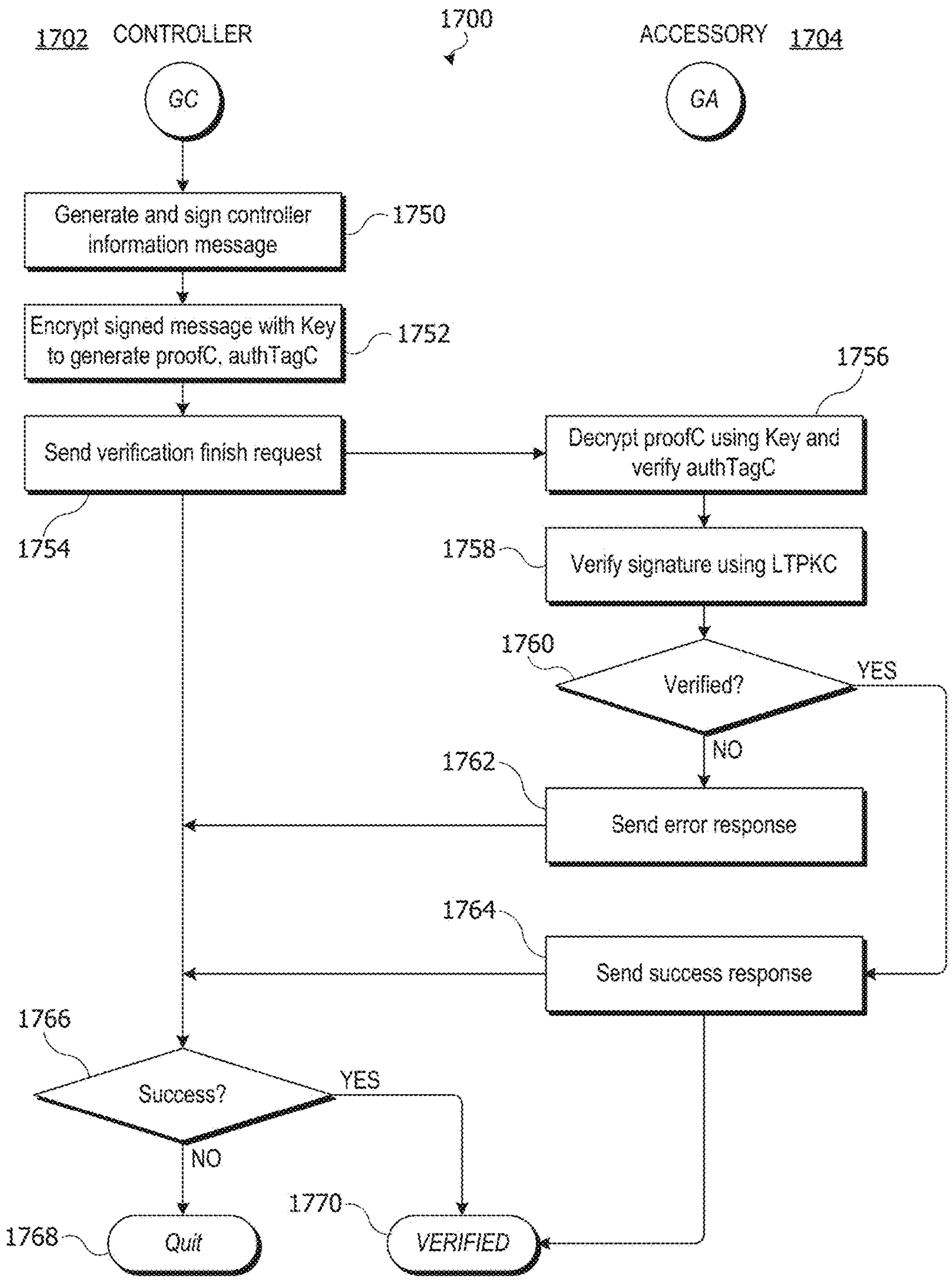

FIGS. 17A-17C show an example of a pair verify process 1700 between a controller 1702 and an accessory 1704 according to an embodiment of the present invention. Process 1700 can start when controller 1702 determines that pair verify is an appropriate action, e.g., when controller 1702 receives a user instruction to control some operation on accessory 1704 and a pair-verified session does not currently exist between controller 1702 and accessory 1704, or when controller 1702 reconnects with accessory 1704.

Referring to FIG. 17A, at block 1706, controller 1704 can generate a new short-term key pair (pkC, skC), e.g., using a Curve25519 algorithm as described above. At block 1708, controller 1704 can send a pair verify start request to accessory 1704; the request can include the short-term public key pkC (and optionally additional information such as the controller ID or controller username userC that was provided to accessory 1704 when the pairing was established). In some embodiments, the pair verify start request can be sent as an HTTP POST request to the /pair-verify URL of the accessory. In some embodiments, a state indicator can be written to pairing state request characteristic 1201 of FIG. 12 to indicate that controller 1704 has requested the pair verify start state.

At block 1710, accessory 1704 can receive the pair verify start request and can look up the long-term public key (LTPKC) in its list of paired controllers. In some embodiments, the lookup can be performed within a secure element, and other logic components of accessory 1704 can simply know whether the lookup succeeded. As described above, a pairing record associating the controller ID (or username userC) with LTPKC can be persistently stored when a pairing is established, so block 1710 can allow accessory 1704 to determine whether a pairing is already established with controller 1702.

At block 1712, if a pairing with controller 1702 is not already established, accessory 1704 can send an error message at block 1714. If, at block 1716, controller 1702 receives the error message, process 1700 can end at block 1718, and controller 1702 can report the error to the user.

If accessory 1704 determines that it has an established pairing with controller 1702, then at block 1720, accessory 1704 can generate a short-term public/secret key pair (pkA, skA), e.g., using a Curve25519 algorithm. At block 1722, accessory 1704 can generate a shared secret ("inputKey") using skA and pkC. At block 1724, accessory 1704 can derive a symmetric key ("Key"). For example, accessory 1704 can use HDKF-SHA-512 using as inputs inputKey, a salt (e.g., a predefined string, which can be different from salts used in pair setup), and additional information.

At block 1726, accessory 1704 can generate and sign an accessory information message. For example, accessory 1704 can concatenate pkA and pkC and sign the concatenation with the accessory's long-term secret key (LTSKA). Additional information can also be concatenated, such as the accessory ID. At block 1728, accessory 1704 can encrypt the signed message using symmetric key Key to generate an accessory proof (proofA) and an authentication tag (authTagA). At block 1730, accessory 1704 can send a pair verify start response to controller 1702. The response can include proofA, the authentication tag, and the short-term public key pkA. Other information can also be included, such as an accessory identifier or username ("userA," which can be the accessory name given to the controller when the pairing was established). Upon sending the response at block 1730, accessory 1704 can update the pairing state to indicate that the accessory's proof has been sent.

At block 1732, after receiving the response, controller 1702 can look up the long-term public key (LTPKA) in its list of paired accessories, e.g., based on the accessory ID or accessory username. In some embodiments, the lookup can be performed within a secure element, and other logic components of controller 1702 can simply know whether the lookup succeeded. As described above, a pairing record associating the accessory ID (or username userA) with LTPKA can be persistently stored when a pairing is established, so block 1732 can allow controller 1702 to determine whether a pairing is already established with accessory 1704.

Referring to FIG. 17B, at block 1734, if a pairing with accessory 1704 is not already established, process 1700 can end at block 1736, and controller 1702 can report the error to the user. In some embodiments, controller 1702 can determine prior to starting process 1700 whether it has a stored record indicating an established pairing with accessory 1704, and the additional check at block 1734 can be omitted.

If controller 1702 determines that it has an established pairing with accessory 1704, then at block 1738, controller 1702 can generate a shared secret ("inputKey") using skC and pkA. At block 1740, controller 1702 can derive a symmetric key ("Key"). For example, controller 1702 can use HDKF-SHA-512 using as inputs inputKey, a salt and an additional information item. In some embodiments, the salt and the additional information item can have predefined values that are different from the predefined values used during pair setup. If no error has occurred, the Key derived at block 1740 should match the Key derived by accessory 1704 at block 1724.

At block 1742, controller 1702 can decrypt the received proofA using symmetric key Key and can also verify authTagA. At block 1744, controller 1702 can verify the accessory's signature on the signed accessory-information message extracted from proofA. This verification can use the stored LTPKA from the established pairing with accessory 1704. If successful, this verification confirms that accessory 1704 is the same accessory that previously provided LTPKA (on the assumption that no other accessory would have the same long-term key pair). At block 1746, if authTagA or the signature is not verified (or if the decryption fails), process 1700 can end at block 1748, and controller 1702 can report the error to the user.

Referring to FIG. 17C, if verification at block 1746 succeeds, then at block 1750, controller 1702 can generate and sign a controller information message. For example, controller 1702 can concatenate pkC and pkA (the order in this example is reversed from the concatenation at block 1724) and sign the concatenation with the controller's long-term secret key. Additional information can also be concatenated, such as the controller ID. At block 1752, controller 1702 can encrypt the signed message using symmetric key Key to generate a controller proof (proofC) and an authentication tag (authTagC). At block 1754, controller 1702 can send a verification finish request to accessory 1704. The request can include proofC and authTagC. Upon sending the request at block 1754, controller 1702 can update the pairing state to indicate that the controller's proof has been sent.

At block 1756, accessory 1704 can receive the verification finish request and can decrypt the received proofC using symmetric key Key and verify authTagC. At block 1758, accessory 1704 can verify the controller's signature on the signed controller-information message extracted from proofC. This verification can use the stored LTPKC from the established pairing with controller 1702. If successful, this verification confirms that controller 1702 is the same controller that previously provided LTPKC (on the assumption that no other controller would have the same long-term key pair). At block 1760, if authTagC or the signature is not verified (or if the decryption fails), accessory 1704 can send an error response to controller 1702 at block 1762. If the verifications succeed, accessory 1704 can send a success response to controller 1702 at block 1764. In either case, upon sending the response, accessory 1704 can update the pairing state to indicate the appropriate response.

At block 1766, controller 1702 can determine which response was received. If error message 1762 was received, process 1700 can end at block 1768, and controller 1702 can report the error to the user. If success message 1764 was received, then pair verify is complete at block 1770, and the pairing state can be updated to so indicate.

It will be appreciated that process 1700 is illustrative and that variations and modifications are possible. Steps described as sequential may be executed in parallel, order of steps may be varied, and steps may be modified, combined, added or omitted. For instance, each time the controller sends a message to the accessory or vice versa (e.g., when the pairing process state changes), errors can be detected. While some error conditions are indicated, it is to be understood that if an error is detected at any point, process 1700 can end, and the controller can notify the user of the error. Further, references to specific encryption and/or authentication algorithms are for purposes of illustration, and other protocols and algorithms for secure exchange of data can be substituted.

It should also be noted that process 1700 is independent of the manner in which long-term public keys were exchanged when the pairing was established (e.g., which pair setup or pair add process was used). An accessory and a controller can pair-verify as long as each device has the other's long-term public key, which can remain stored (e.g., in each device's secure element) at all times.

Further, the usernames ("userA" and "userC") associated with the accessory and the controller can include any information that allows the other device to look up the long-term public key during pair verify. This can but need not include a name or other identifier of an actual user. In some embodiments, the username can incorporate (or be) a device identifier of the device to which a particular long-term public key belongs.

Like the various pair setup processes described above, pair verify process 1700 can include generating a new encryption key (Key). In some embodiments, this key can be used as a session key to encrypt any or all messages (e.g., requests and responses as described above) sent subsequently to completion of pair verify process 1700. The session key can persist until the either device deletes or invalidates its copy of the session key. Thus, either device can unilaterally cut off communication with the other at any time by deleting or invalidating its own copy of the session key. For instance, an accessory can delete a session key if the controller moves outside a proximity threshold or loses connectivity with the accessory, or if no communication occurs within a timeout period, or after a fixed upper limit on session duration (which can be as short or long as the accessory manufacturer or programmer chooses to make it). This allows accessories to limit a controller's access as desired.

In some embodiments, the encryption key derived during pair verify process 1700 is only used during process 1700. For subsequent communication within the pair-verified session, controller 1702 and accessory 1704 can each compute one or more new session keys. For example, an accessory-to-controller session key ("AC session key") can be derived by applying HKDF-SHA-512 (or similar algorithm) to the shared secret (inputKey) generated during pair verify (e.g., at blocks 1722 and 1738 of process 1700) with a control salt and an additional information item (which can have predefined constant values). A controller-to-accessory session key ("CA session key") can be derived by applying HKDF-SHA-512 (or similar algorithm) to the shared secret (inputKey) generated during pair verify, with another control salt and additional information item (which can also have predefined constant values). In some embodiments, different control salts and/or different additional information items can be used to generate the AC session key and the CA session key, so that the two session keys need not be the same. The controller and the accessory can each generate both AC and CA session keys. During subsequent communication within the pair-verified session, the AC session key can be used by the accessory to encrypt messages it sends to the controller and by the controller to decrypt messages it receives from the accessory, while the CA session key can be used by the controller to encrypt messages it sends to the accessory and by the accessory to decrypt messages it receives from the controller. Either device can end the session by invalidating its session keys (e.g., deleting the session keys or responding with an error to any received messages that are encrypted using the session keys).

In addition, in some embodiments, a single controller can define and use multiple long-term key pairs (LTPKC, LTSKC). For instance, a controller that has multiple authorized users (e.g., a shared computer) might have a different long-term key pair for each authorized user, so that different users can interact with different subsets of accessories. As long as the controller has a separate username for each key pair, an accessory need not be aware that the controller has more than one key pair. As another example, a controller can use different long-term key pairs for establishing pairings with different accessories. A controller that uses multiple long-term key pairs can keep track of which (LTPKC, LTSKC) pair was used for each accessory with which a pairing is established. Similarly, an accessory can have multiple long-term key pairs (LTPKA, LTSKA) and can keep track of which pair was used for each controller with which a pairing is established. In some embodiments, a device may restrict the number of other devices to which it gives a particular long-term public key, and having multiple long-term public keys can allow the device to switch to a different key from time to time.

In some embodiments, long-term public keys (or in some instances certificates) can be exchanged between devices at any time after pair setup or pair verify, in a process that can be referred to as "pair add," or adding a pairing. For example, as noted above, an accessory can limit itself to performing pair setup with one controller (which can be referred to as an "administrator" or "admin" for the accessory) and can refuse all subsequent pair setup requests after the first successful pair setup (at least until the pairing is removed, e.g., as described below). To allow other controllers to interact with the accessory, an admin controller can perform a pair add process to establish a pairing between the accessory and a different controller (or in some instances between the accessory and a different long-term public key of the same controller).

Figure 18A:
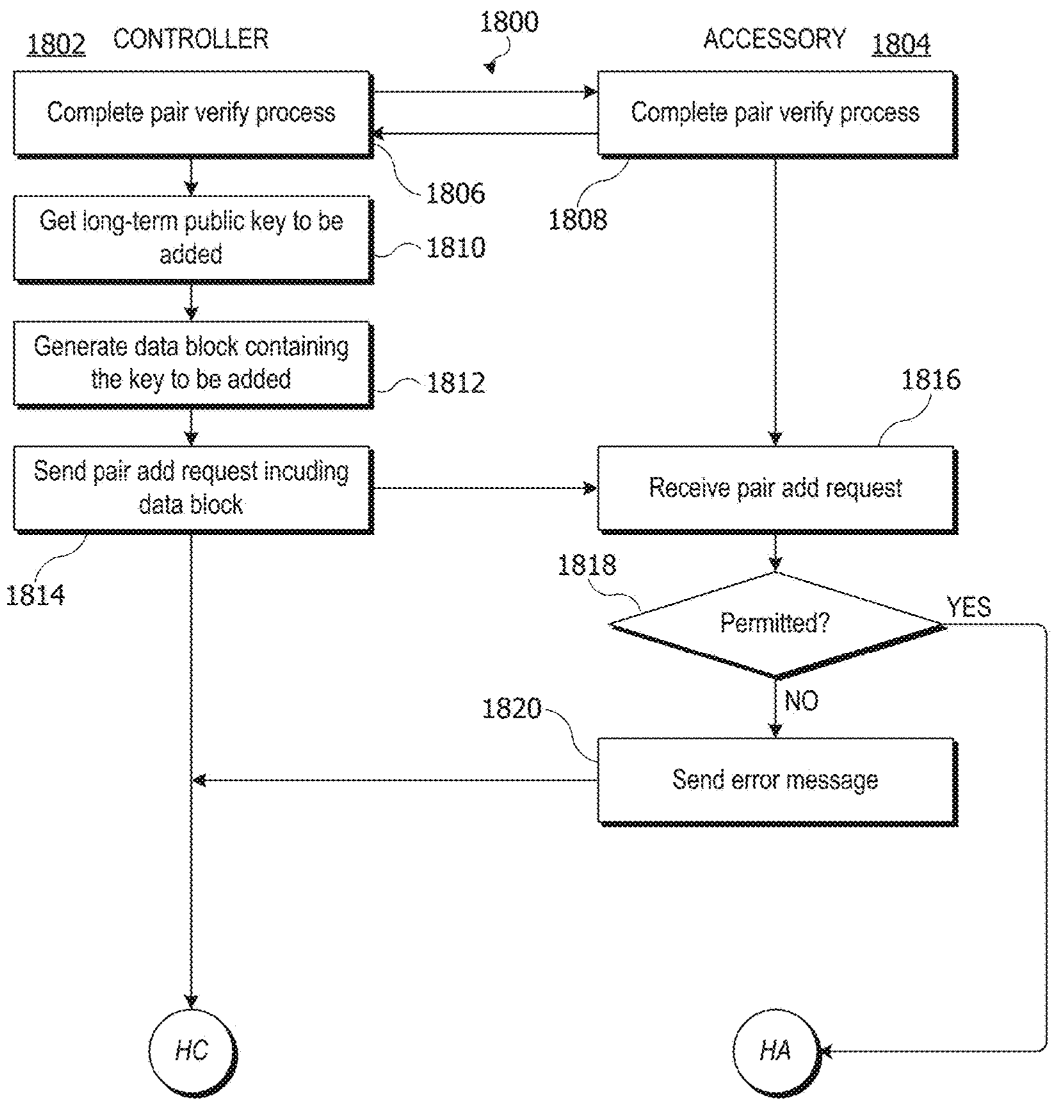
FIGS. 18A-18B show an example of a pair add process according to an embodiment of the present invention.
Figure 18B:
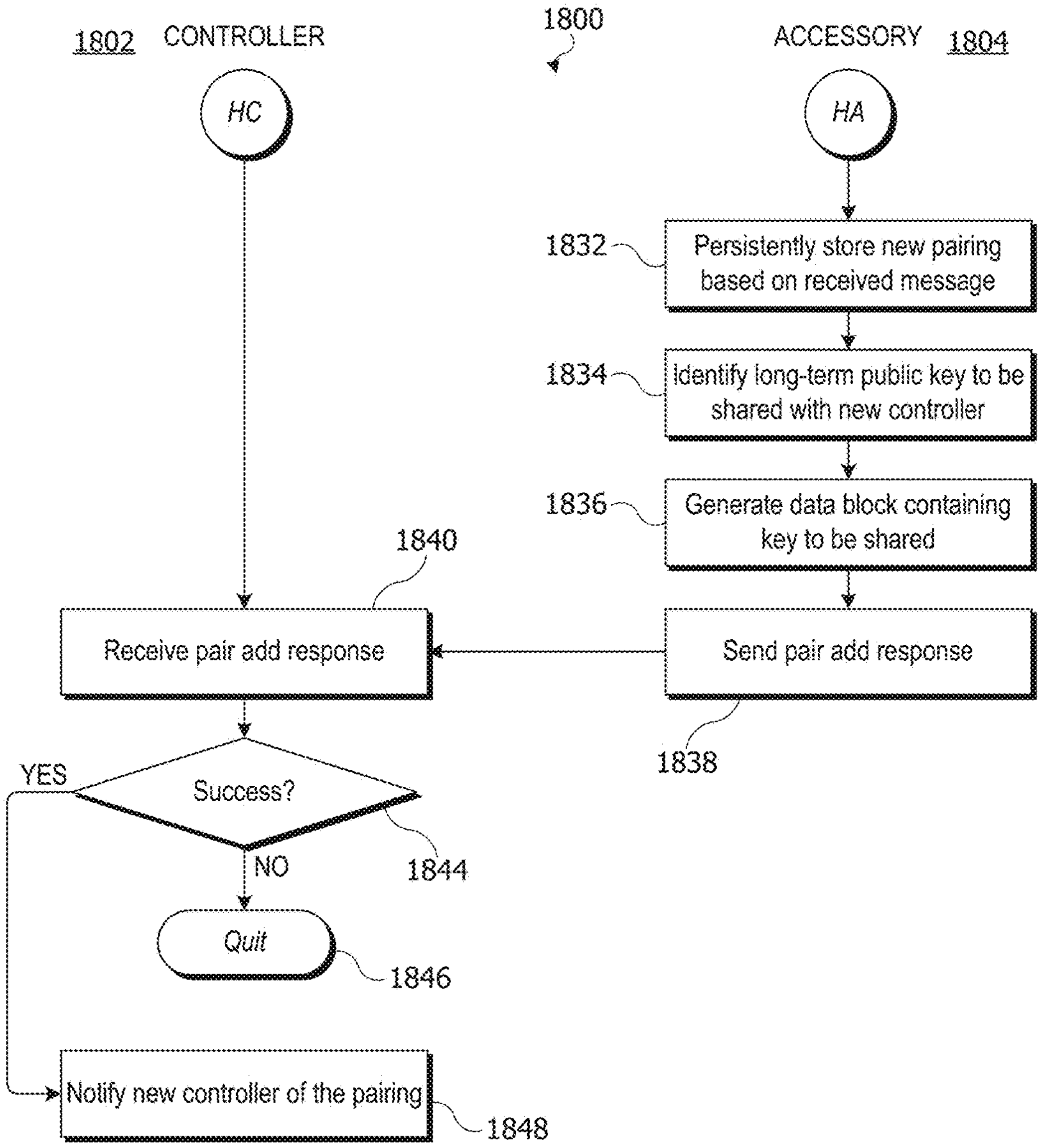

FIGS. 18A-18B show an example of a pair add process 1800 between a controller 1802 (e.g., a controller with administrator permission) and an accessory 1804 according to an embodiment of the present invention. In this process, it is assumed that controller 1802 has previously either performed pair setup with accessory 1804 (and thereby obtained administrator permission) or has been added as an administrator via a previous instance of executing pair add process 1800.

Referring first to FIG. 18A, at blocks 1806 and 1808, controller 1802 and accessory 1804 can complete a pair verify process (e.g., process 1700) to establish a shared secret and session key(s) (e.g., AC key and CA key as described above).

At block 1810, controller 1802 can identify a long-term public key (LTPKN) to exchange with accessory 1804. This can be, e.g., a long-term public key that belongs to a controller with which a pairing is to be established (also referred to herein as a "new" controller); this can be a controller other than controller 1802. In some instances, a security certificate (which can contain a long-term public key) can be obtained for the new controller. At block 1812, controller 1802 can generate a data block containing an indication that the data block pertains to a request to add a pairing, the long-term public key LTPKN, the controller identifier of the new controller, and permissions information (e.g., flags) indicating permissions to be granted to the new controller. For example, as noted above, the first controller to perform pair setup with an accessory can be automatically designated as an administrator for that accessory. For each new controller added via pair add process 1800, the permissions information can specify whether the new controller should also be designated as an administrator. In some embodiments, administrators for an accessory are permitted to perform pair add for that accessory, while controllers that are not administrators are not permitted to perform pair add.

At block 1814, controller 1802 can send a pair add start request to accessory 1804; the request can include the data block generated at block 1812. As with all communications within a pair-verified session, the request can be encrypted using the appropriate session key. In some embodiments, the pair add start request can include a state indicator identifying the pair add start request (this and subsequent state indicators can be written to pairing state request characteristic 1201 of FIG. 12). In some embodiments, the pair add start request can be sent as an HTTP POST request to a /pairings URL (or other appropriate URL) of accessory 1804.

At block 1816, accessory 1804 can receive the pair add start request. As with any received request from a controller in a pair-verified session, accessory 1804 can begin by decrypting the request using the appropriate session key; if decryption fails, accessory 1804 can return an error response (or not respond at all). At block 1818, accessory 1804 can determine whether controller 1802 is permitted to perform pair add. For example, as described above, controllers can selectively be granted administrator permission, and pair add can be restricted to controllers that have administrator permission. As another example, an accessory that has a user interface can prompt the user to indicate whether to permit the pair add request. As still another example, as described above, in some instances a user can put the accessory into a pairing mode via a mechanical operation, and some accessories can be configured to permit a pair add request only while in the pairing mode. As yet another example, in some embodiments, accessory 1804 can have an upper limit on the number of pairings that can simultaneously be stored (e.g., 16 pairings, 32 pairings, or some other limit), and accessory 1804 can treat a pair add request as unpermitted if it would result in exceeding this limit. Other techniques can also be used to determine whether accessory 1804 should permit a particular pair add request. If the request is not permitted, then accessory 1804 can send an error message at block 1820.

Referring to FIG. 18B, if the pair add request is permitted, then at block 1832, accessory 1804 can persistently store (e.g., in its secure element) a new pairing based on the received message. For example, accessory 1804 can store the received long-term public key LTPKN in association with the received controller identifier and permissions for the new controller.

In some embodiments, it is not necessary for accessory 1804 to provide a long-term public key (LTPKA) to controller 1802 during process 1800, since controller 1802 would have received it prior to initiating process 1800. In other embodiments, however, it may be desirable for accessory 1804 to use different long-term public keys with different controllers. Where this is the case, accessory 1804 can prepare a data block containing the long-term public key that should be used by the new controller. For example, at block 1834, accessory 1804 can identify a long-term public key to be used by the new controller, this can be the same as or different from the long-term public key (LTPKA) that was previously provided to controller 1802. At block 1836, accessory 1804 can generate a data block containing the long-term public key identified at block 1834 and an accessory identifier to be used by the new controller (which can be the same as or different from the accessory identifier that was previously provided to controller 1802).

At block 1838, accessory 1804 can send a pair add response to controller 1802. If a data block was generated at block 1836, the data block can be included in the pair add response. As with all communications within a pair-verified session, the response can be encrypted using the appropriate session key. The pair add response can include updating a state indicator to indicate that the pair add response has been sent.

At block 1840, controller 1802 can receive the pair add response. As with any received response from an accessory in a pair-verified session, controller 1802 can begin by decrypting the response using the appropriate session key; if decryption fails, the response can be ignored and process 1800 can terminate with an error.

At block 1844, controller 1802 can determine whether the response indicates success. If not, process 1800 can end at block 1846, and controller 1802 can notify the user of the error. If the response indicates success, then at block 1848, controller 1802 can notify the new controller of the pairing. For example, controller 1802 can communicate the accessory identifier and long-term public key LTPKA for accessory 1804 to the new controller. In some embodiments, controller 1802 can provide the new controller with the previously stored LTPKA and accessory identifier for accessory 1804; in other embodiments, controller 1802 can provide the new controller with information provided by accessory 1804 in the pair add response. The new controller can persistently store the received LTPKA and accessory identifier as a pairing record. Thereafter, the new controller can perform a pair verify process (e.g., process 1700) with accessory 1804 (without further involvement of controller 1802) and can interact with accessory 1804.

It will be appreciated that process 1800 is illustrative and that variations and modifications are possible. Steps described as sequential may be executed in parallel, order of steps may be varied, and steps may be modified, combined, added or omitted. For instance, each time the controller sends a message to the accessory or vice versa (e.g., when the pairing process state changes), errors can be detected. While some error conditions are indicated, it is to be understood that if an error is detected at any point, process 1800 can end, and the controller can notify the user of the error. Further, references to specific encryption and/or authentication algorithms are for purposes of illustration, and other protocols and algorithms for secure exchange of data can be substituted. In some embodiments, pair add process 1800 can be used as a mode of delegated pairing, as described below.

As described above, pair setup and pair add can allow pairings between accessories and controllers to be established by exchanging long-term public keys that can be persistently and securely stored by the receiving devices. In some instances, it may be desirable to remove an established pairing, e.g., by removing the long-term public key from persistent storage. Accordingly, certain embodiments of the present invention provide pair remove processes.

Figure 19A:
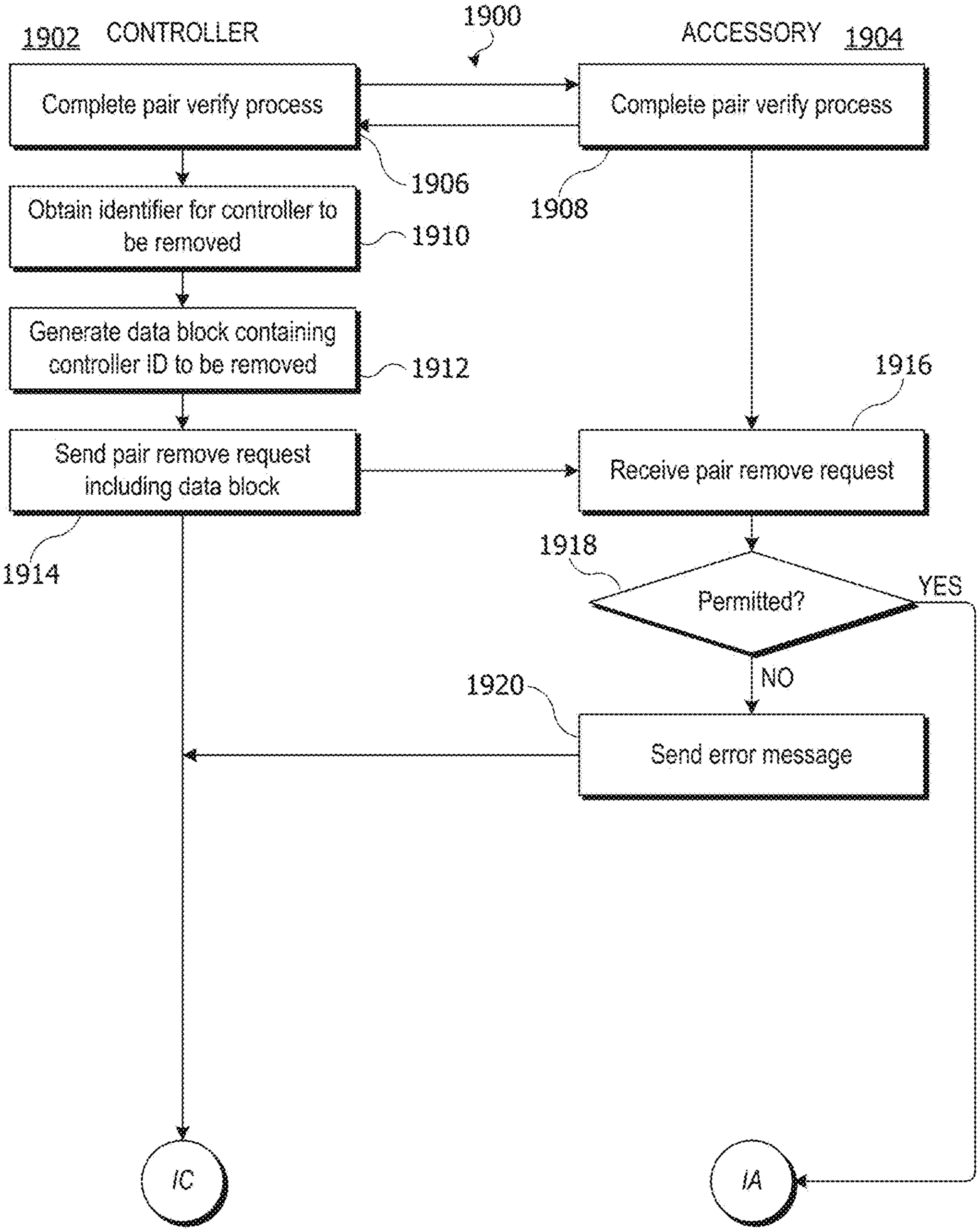
FIGS. 19A-19B show an example of a pair remove process according to an embodiment of the present invention.
Figure 19B:
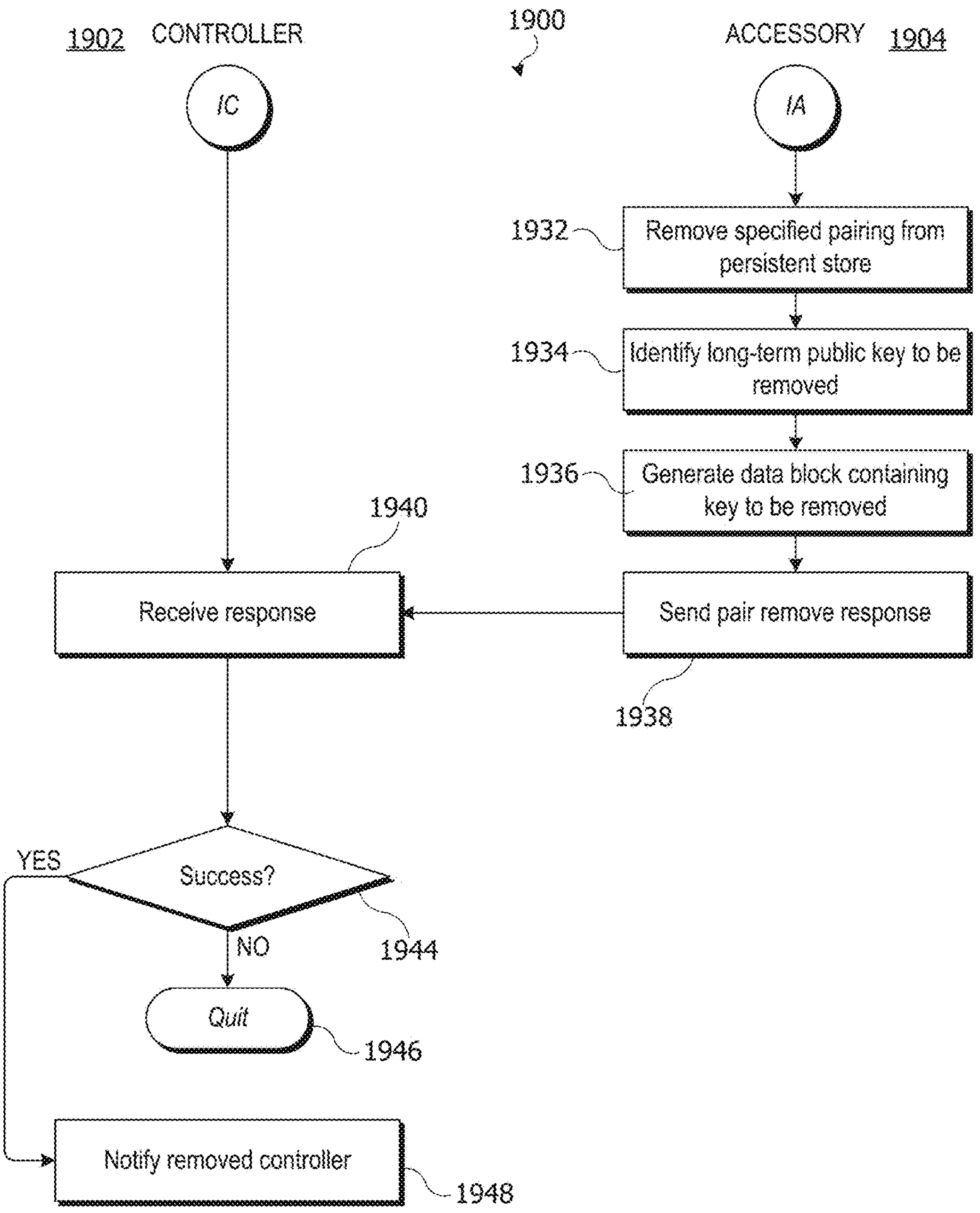

FIGS. 19A-19B show an example of a pair remove process 1900 between a controller 1902 (e.g., a controller with administrator permission) and an accessory 1904 according to an embodiment of the present invention. Process 1900 can be generally similar to process 1800, except that process 1900 results in removing an existing pairing rather than establishing a new one. In this process, it is assumed that controller 1902 has previously either performed pair setup with accessory 1904 (and thereby obtained administrator permission) or has been added as an administrator, e.g., via execution of pair add process 1800.

Referring to FIG. 19A, at blocks 1906 and 1908, controller 1902 and accessory 1904 can complete a pair verify process (e.g., process 1700) to establish a shared secret and session key(s) (e.g., AC key and CA key as described above).

At block 1910, controller 1902 can obtain an identifier of the controller to be removed. This can be the identifier that is stored by accessory 1804 in a pairing record. In some instances, this can be controller 1902's own identifier (a controller can remove its own pairing); in other instances, it can be an identifier of another controller. In some instances, block 1910 can include getting the long-term public key of the controller being removed in addition to the identifier. At block 1912, controller 1902 can generate a data block containing an indication that the data block pertains to a request to remove a pairing and the identifier of the controller whose pairing is to be removed. In some embodiments, the data block can include other information, such as the long-term public key of the controller being removed.

At block 1914, controller 1902 can send a pair remove start request to accessory 1904; the request can include the data block generated at block 1912. As with all communications within a pair-verified session, the request can be encrypted using the appropriate session key. In some embodiments, the pair remove start request can include a state indicator to indicate that the pair remove start request has been sent (this and subsequent state indicators can be written to pairing state request characteristic 1201 of FIG. 12). In some embodiments, the pair remove start request can be sent as an HTTP POST request to a /pairings URL (or other appropriate URL) of accessory 1904.

At block 1916, accessory 1904 can receive the pair remove start request. As with any received request from a controller in a pair-verified session, accessory 1904 can begin by decrypting the request using the appropriate session key; if decryption fails, accessory 1904 can return an error response (or not respond at all). At block 1918, accessory 1904 can determine whether controller 1902 is permitted to perform pair remove. For example, as described above, controllers can selectively be granted administrator permission, and pair remove can be restricted to controllers that have administrator permission. As another example, an accessory that has a user interface can prompt the user to indicate whether to permit the pair remove request. As still another example, as described above, in some instances a user can put an accessory into a pairing mode via a mechanical operation, and some accessories can be configured to permit a pair remove request only while in the pairing mode. Other techniques can also be used to determine whether accessory 1904 should permit a particular pair remove request. If the request is not permitted, then accessory 1904 can send an error message at block 1920.

Referring to FIG. 19B, if the pair remove request is permitted, then at block 1932, accessory 1904 can remove the pairing with the controller specified in the received data block from its list of established pairings (e.g., by deleting the pairing record from the secure storage element).

In some embodiments, it is not necessary for accessory 1904 to provide a reciprocal instruction to remove a long-term public key (LTPKA) during process 1900. After accessory 1904 removes the pairing record, the removed controller will not be able to perform pair verify with accessory 1904, and this can prevent the removed controller from interacting with accessory 1904, regardless of whether the removed controller also removes its pairing record. In other embodiments, however, it may be desirable for accessory 1904 to specify a pairing to be removed. Where this is the case, accessory 1904 can prepare a data block containing the long-term public key and accessory identifier that should be removed by the newly removed controller. For example, at block 1934, accessory 1904 can identify a long-term public key that should be removed from the newly removed controller; this can be, e.g., the key that was identified at block 1834 of process 1800 when the controller was added. At block 1936, accessory 1904 can generate a data block containing the long-term public key identified at block 1934 and an accessory identifier associated with this long-term public key.

At block 1938, accessory 1904 can send a pair remove response to controller 1902. If a data block was generated at block 1936, the data block can be included in the pair remove response. As with all other communications in a pair-verified session, the response can be encrypted using the appropriate session key. The pair remove response can include updating a state indicator to indicate that the pair remove response has been sent.

At block 1940, controller 1902 can receive the pair remove response. As with any received response from an accessory in a pair-verified session, controller 1902 can begin by decrypting the response using the appropriate session key; if decryption fails, the response can be ignored and process 1900 can terminate with an error.

At block 1944, controller 1902 can determine whether the response indicates success. If not, process 1900 can end at block 1946, and controller 1902 can notify the user of the error. If the response indicates success, then at block 1948, controller 1902 can notify the removed controller that its pairing has been removed. In some embodiments, controller 1902 can also communicate the accessory identifier and/or long-term public key LTPKA for accessory 1904 to the removed controller. Thereafter, the removed controller is no longer able to perform a pair verify process with accessory 1904, which can result in the removed controller being unable to interact with accessory 1904. A controller that has been removed via process 1900 can be added again at a later time, e.g., via pair add process 1800. Some embodiments may provide an option for accessory 1904 to "blacklist" a removed controller, which can prevent the removed controller from re-establishing a pairing with accessory 1904. For example, the pair remove request from controller 1902 can includes an indication as to whether the removed controller should be blacklisted, and accessory 1904 can persistently store a list of blacklisted controllers. During pair setup or pair add, accessory 1904 can check the blacklist and return an error if the controller is on the blacklist.

It will be appreciated that process 1900 is illustrative and that variations and modifications are possible. Steps described as sequential may be executed in parallel, order of steps may be varied, and steps may be modified, combined, added or omitted. For instance, each time the controller sends a message to the accessory or vice versa (e.g., when the pairing process state changes), errors can be detected. While some error conditions are indicated, it is to be understood that if an error is detected at any point, process 1900 can end, and the controller can notify the user of the error. Further, references to specific encryption and/or authentication algorithms are for purposes of illustration, and other password protocols and algorithms for secure exchange of data can be substituted. In some embodiments, pair remove process 1900 can be used in connection with delegated pairing, as described below.

Embodiments describe above allow accessories and controllers to create (setup), verify, add, and remove pairings, where a pairing can include persistent storage by each partner device in the pairing of a long-term public key and/or certificate of the other partner device.

In some embodiments, it may be useful for a user to obtain a list of controllers paired with a given accessory, or a list of accessories paired with a given controller. In the latter case (accessories paired with a controller), a program executing on the controller (e.g., an operating system or application program) can generate a list by reading the controller's stored pairing information and can present the list to the user on the controller's own user interface. To provide a list of controllers paired with a given accessory, certain embodiments allow a controller to retrieve a listing of all paired controllers from an accessory; the controller can then present the listing to the user.

For example, as shown in FIG. 12, an accessory can have pairing list characteristic 1204 as part of its pairing profile. Characteristic 1204 can include information about each controller that has an established pairing with the accessory (e.g., controller ID or the like) but need not include any controller's long-term public key. In some embodiments, a controller can read pairing list characteristic 1204 as it would any other characteristic, e.g., using an HTTP GET request or the like. In some embodiments, a controller can obtain an accessory's pairing list by sending an HTTP POST request to a /pairings URL (or other appropriate URL) of the accessory; the POST request can include an item indicating that the pairing list is being requested.

In some embodiments, a controller may be allowed to read pairing list 1204 only within a pair-verified session, so that the accessory response can be encrypted. Further, in some embodiments, reading of pairing list 1204 can be restricted to controllers with administrator permission.

In some embodiments, an accessory can establish a pairing with only one controller at a time, and only the controller that establishes a pairing is permitted to later remove the pairing. This can enhance security. However, for some applications, it can be inconveniently restrictive. For instance, in the case of home environment 100 (FIG. 1), if multiple people live in the home, it may be desirable for each person to have a controller 102 (e.g., mobile phone) that can unlock door lock 104.

Accordingly, certain embodiments of the present invention can allow an accessory to maintain pairings with multiple controllers concurrently. For instance, each controller can separately establish a pairing using pair setup processes described above. Allowing controllers to independently establish pairings, however, may be insufficiently secure for some applications. For instance, in the case of a lock on the front door of a home, the homeowner may want to prevent anyone else from establishing a pairing without the homeowner's express permission.

To allow for managed pairing, certain embodiments can provide "delegated" pairing processes. In a delegated pairing process, a first ("admin" or "master") controller can establish a pairing with an accessory, e.g., using pair setup as described above and thereby obtain administrator permission. Thereafter, an admin controller can be required to participate in a pair setup processes for any subsequent ("delegated") controllers.

One type of delegated pairing can be "direct" delegation. In direct delegation, the master controller can use pair add process 1800 of FIGS. 18A-18B or a similar process to deliver to the accessory a controller public key (and controller user name) for the delegated controller. For direct delegation, the master controller can communicate with the delegated controller to obtain the delegated controller's long-term public key.

Another type of delegated pairing can be "external," or "forwarded," delegation. In external delegation, the accessory can be configured to delegate pair setup and pair verify to an "authorizer" device, which can be incorporated into the master controller or some other device that can communicate with the master controller. The authorizer device can perform pair setup with the accessory as described above, and after pair setup, the authorizer can maintain (or re-establish using pair verify) a secure channel to the accessory. If the accessory receives a pair setup or pair verify request, the accessory can forward the request to the authorizer via the secure channel. The authorizer can perform the operation and/or indicate to the accessory whether the operation should be allowed.

A third type of delegated pairing can be "certificate-based" delegation. In certificate-based delegation, the master controller can configure the accessory with a trust certificate chain. For example, the master controller can use pair add process 1800 of FIGS. 18A-18B or a similar process to securely deliver the trust certificate chain to the accessory. For example, a "set certificate chain request" message can be defined for the controller to send to the accessory (this can be, e.g., an HTTP PUT request to a characteristic or URL defined for receiving certificate chains). The content of this request message can include a TLV item, or series of TLV items, containing the certificate chain, e.g., in order from the root to the deepest sub-authority. The TLV item(s) can be encrypted with a symmetric key established during pair verify and digitally signed using the master controller's long-term secret key LTSKC.

The accessory can verify the signature using the stored LTPKC and decrypt the encrypted TLV item(s) using the symmetric key to extract the certificate chain. In some embodiments, the certificate chain can be stored in the accessory's secure storage element. The accessory can send a response message indicating success or failure.

When another controller attempts to perform pair setup with the accessory, that controller can be required to provide a certificate in addition to or instead of its long-term public key. The accessory can determine whether the certificate is signed by a previously-received trust certificate chain and can accept or reject the pair setup based in part on whether the certificate is or is not so signed. Delegated controllers can become authorized for the accessory by obtaining a properly signed certificate via some other channel (e.g., from the master controller, a trusted certificate authority, or the like) and presenting it to the accessory.

Those skilled in the art will appreciate that the pairing processes and architectures described herein are illustrative and that variations and modifications are possible. Different encryption algorithms, keys, and protocols can be substituted, and multiple different algorithms, keys, and protocols can be concurrently supported in a given operating environment.

Example Accessory: Door Lock

To further illustrate various aspects and features that can be present in embodiments of the invention, specific accessory examples will now be described.

A first example is a door lock accessory, which can include an electronic locking unit coupled to a door lock that can be installed on a door. In some embodiments, the door lock itself can be a mechanical lock (e.g., deadbolt type), and the electronic locking unit can operate electromechanical actuators to move the mechanical lock between locked and unlocked positions. Position sensors or the like can also be provided to allow the electronic locking unit to determine whether the mechanical lock is currently in the locked or unlocked position. In other embodiments, other types of door locks can be used, e.g., magnetic locks, electronic locks, and any other type of lock that can be locked and unlocked by supplying electrical control signals and/or applying mechanical forces. The electronic locking unit can house or be connected to logic circuitry to implement a uniform accessory protocol as described above and communication circuitry to communicate with one or more controllers. The electronic locking unit can generate electrical signals (e.g., voltage or current levels on one or more wires) to operate the door lock, e.g., via electromechanical actuators or the like. In some embodiments, the electronic locking unit and the door lock can be physically located within a common housing, such as a module that attaches to the door, or inside the door or door frame. In other embodiments, the electronic locking unit and the door lock can be in separate housings. For instance, the door lock can be inside the door while the electronic locking unit is mounted on a nearby wall. Wired connections between actuators in the door lock and electronic locking unit can be provided. Wireless connections can also be used without departing from the scope of the present invention, although those skilled in the art will appreciate that a wireless connection in this context may raise additional security concerns.

Figure 20:
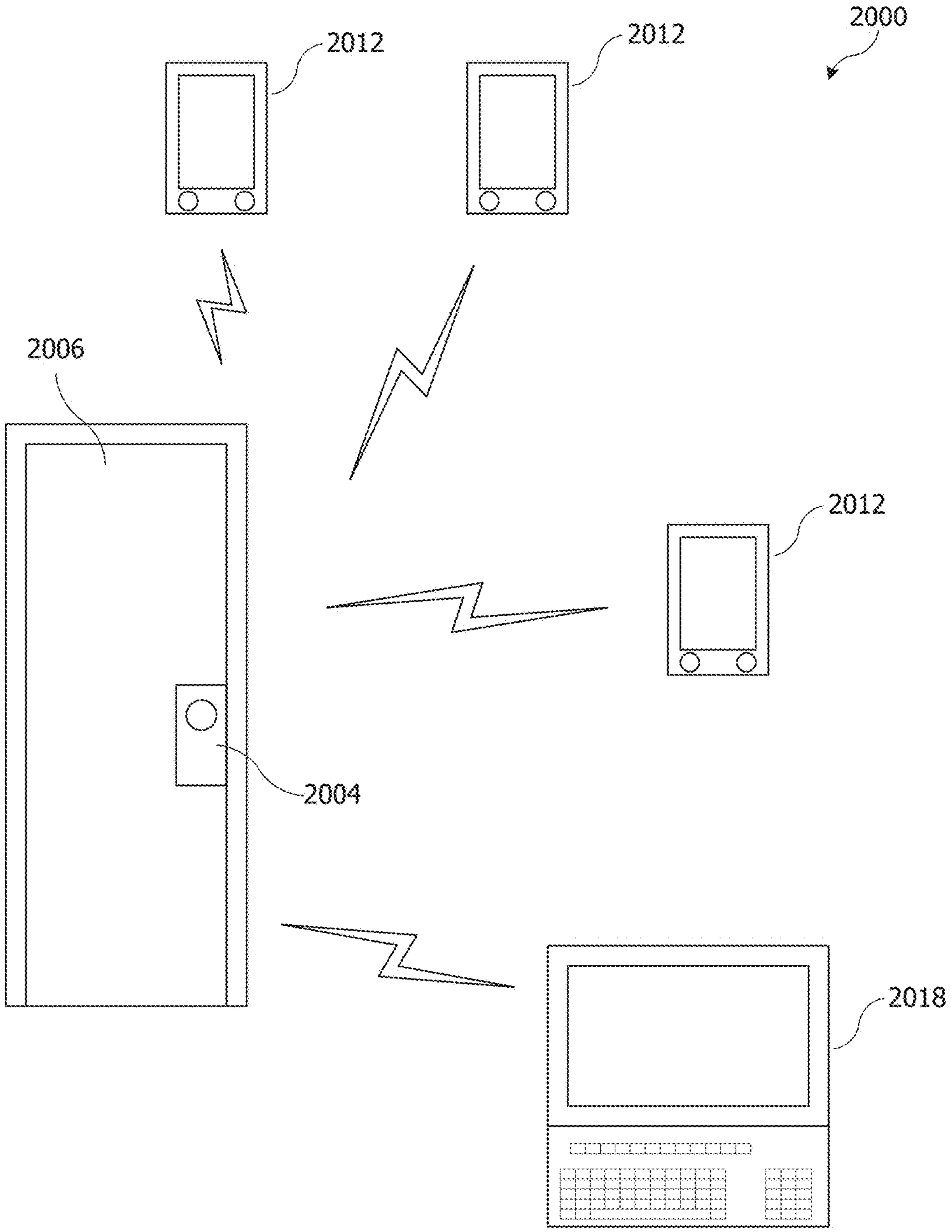
FIG. 20 shows an example operating environment for a door lock accessory according to an embodiment of the present invention.

Referring to FIG. 20, there is shown an operating environment 2000 for a door lock accessory 2004 according to an embodiment of the present invention. Operating environment 2000 can be implemented, for example, in an office building, a home, an apartment or hotel building, or any other structure that has at least one interior or exterior door 2006. For purposes of illustration, it is assumed that it is desirable to provide multiple individuals the ability to lock and unlock door 2006. It is further assumed that door 2006 has an "owner" (i.e., some person or entity that is legally or by agreement entitled to determine who should or should not be allowed to pass through door 2006). For instance, if environment 2000 is implemented in an office building, the owner of the building (or a tenant acting on the authority of the owner) can be the owner of door 2006. If environment 2000 is implemented in a home, the owner can be the homeowner, head of household, or other individual designated by the residents.

In this example, door lock accessory 2004 can be configured to communicate wirelessly with one or more user-operated controllers 2012 (three are shown, but any number can be used). For example, door lock accessory 2004 can provide a sensor 2020 that can be triggered by physical proximity to one of controllers 2012 to initiate communication. Door lock accessory 2004 can also communicate with a master controller (also referred to as an administrator) 2018. In this example, communication with master controller 2018 is by a wireless connection, but wired connections can also be used.

Master controller 2018 can be a computing device that is owned or operated by the owner of door 2006, including a desktop computer, laptop computer, mobile phone, tablet, etc. In the case of an office building, the person who operates master controller 2018 can be a designated security agent. Master controller 2018 can be physically located anywhere relative to door 2006. For example, master controller 2018 can be in a room to which door 2006 provides access, in a security office located elsewhere in the building, or in another building altogether. In some embodiments, master controller 2018 can also act as a user device (e.g., mobile phone).

Following installation of door lock accessory 2004, master controller 2018 can perform a pair setup process as described above to establish itself as the master controller; for instance, master controller 2018 can obtain administrator permission (e.g., as described above) as a result of performing pair setup. Thereafter, delegated pairing techniques (e.g., pair add as described above) can be used to establish pairings between door lock accessory 2004 and each of user devices 2012. Alternatively, door lock accessory 2004 can be configured such that pair setup can only be performed under specific physical conditions (e.g., a key physically inserted into accessory 2004), and door lock accessory 2004 can perform pair setup with each of user devices 2012 at a time when the physical conditions for pairing are obtained.

In some embodiments, an accessory model for door lock accessory 2004 can include a lock mechanism service that provides the ability to lock and unlock the door (e.g., an instance of lock mechanism service 254 of FIG. 2G). The accessory model for door lock accessory 2004 can also include a lock management service (e.g., an instance of lock management service 255 of FIG. 2H), and the lock management service can support other lock-related functions, such as keeping a lock log with entries indicating who has locked or unlocked the door and when. The lock log can be accessed, e.g., by master controller 2018.

FIG. 21 shows an example of an accessory object 2100 for door lock accessory 2004 according to an embodiment of the present invention. Object 2100 is shown in tabular form but can also be represented as a JSON object similar to FIGS. 3A-3C. As shown, door lock accessory 2004 can include an accessory identification service instance 2102, a lock mechanism service instance 2104, and a lock management service instance 2106. Each service instance can include characteristics as shown; the characteristics can be defined in accordance with FIGS. 2A-2D and 2J. For example current state characteristic 2110 can be read by a controller to determine whether the door is currently locked or unlocked (or jammed, etc.), and target state characteristic 2112 can be written by a controller to request locking or unlocking of the door.

Lock logs characteristic 2116 can contain an array of lock-log event records, each of which can be a data object. In this example, each lock log event record can include an identifier of the entity (person or device) that accessed door lock 2004, the time at which the access occurred, and the operation performed (e.g., lock or unlock, read lock log, clear lock log). An optional string element can be provided to provide additional vendor-specific information about the access. In some embodiments, a controller can read characteristic 2116 to access the lock log.

Lock management control point characteristic 2114 can be used, e.g., to send requests to read or clear the lock log. For example, a controller can send request to write a data object to characteristic 2114, and the data object can be interpreted as a specific request. In this example, the supported requests can include reading the lock log (starting from a start time specified in the data object), clearing the lock log (which can delete all entries or a specified range of entries from the lock log, as specified in the data object), and setting a current time that door lock accessory 2004 can use as a basis for recording future lock log entries (setting the time can be useful, e.g., to account for daylight savings time or the like). As described above with reference to FIGS. 5G-5K, in some embodiments, door lock accessory 2004 can choose whether to respond to write requests to control point characteristic 2114 inline or through a query result mechanism. The decision can be on a per-request basis.

Other characteristics shown in FIG. 21 can operate as described above with reference to FIGS. 2A-2D and 2J.

It will be appreciated that the services and characteristics shown in FIG. 21 are illustrative and that variations and modifications are possible. Other sets and subsets of services and characteristics can be defined for a lock accessory, depending on the functionality of the lock.

To further illustrate, a specific implementation scenario will now be described. In this scenario, the owner of door 2006 can purchase and install door lock accessory 2004 on door 2006. (Door lock accessory 2004 can be sold as part of door 2006 or as an after-market upgrade.) The owner of door 2006 can configure master controller 2018 to communicate with door lock accessory 2004. For example, master controller 2018 can be a desktop or portable (e.g., laptop, handheld, mobile, wearable) computer system that can execute a program (e.g., an operating system program or user-installed application program) to send and receive messages complying with the uniform accessory protocol described above and to generate a graphical user interface (or other type of user interface) that allows the owner of door 2006 to interact with door lock accessory 2004.

Figure 22:
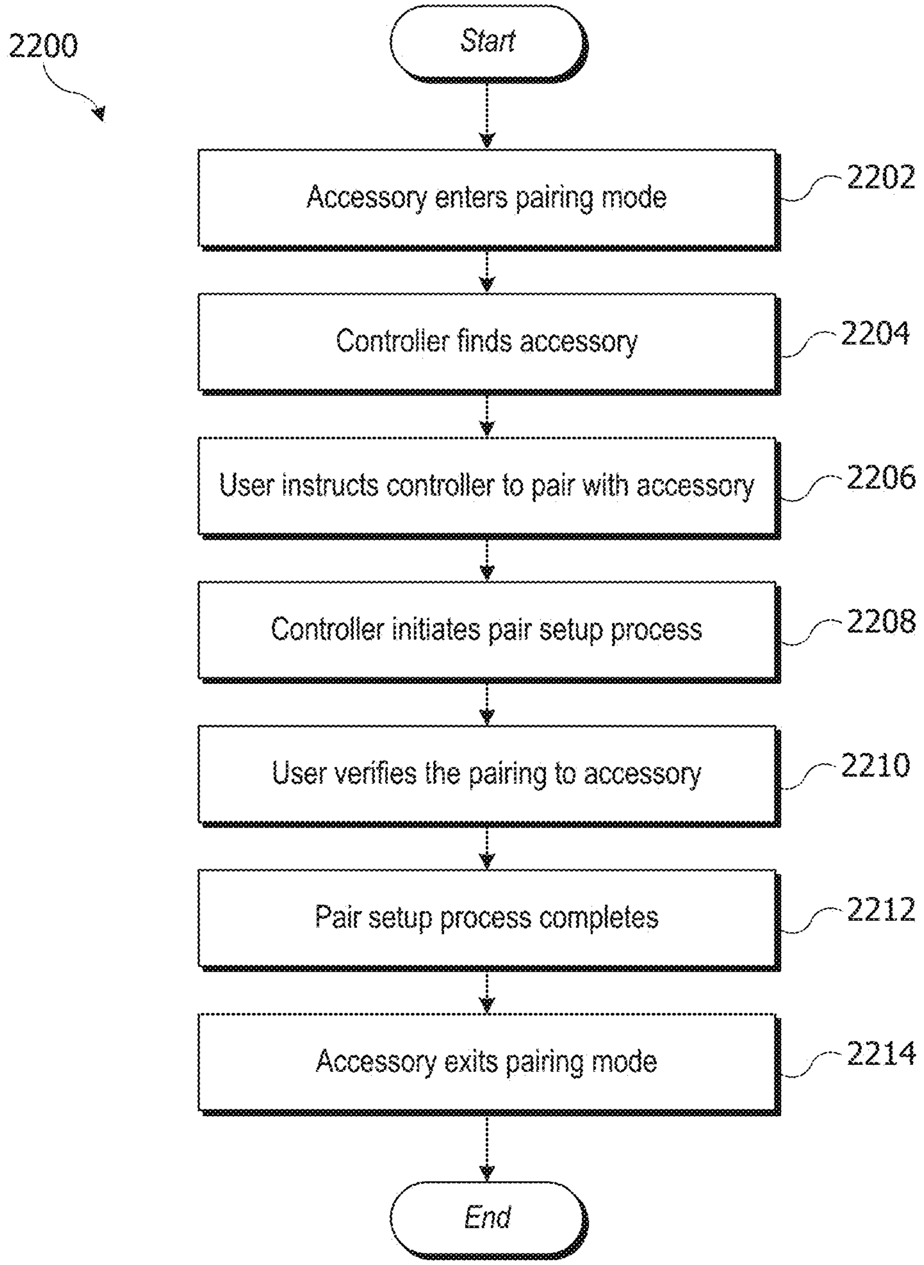
FIG. 22 shows an example of a process to pair a controller with an accessory according to an embodiment of the present invention.

Having performed this installation, the owner of door 2006 can pair master controller 2018 with door lock accessory 2004. FIG. 22 is a flow diagram of a process by which a user, such as the owner of door 2006, can pair master controller 2018 with door lock accessory 2004 (or any other controller with any other accessory) according to an embodiment of the present invention.

At block 2202, door lock accessory 2004 (or any other accessory) can enter pairing mode. In some embodiments, the user can put the accessory into pairing mode. In some embodiments, each accessory manufacturer can define a specific user action to put its accessories into pairing mode. For example, in the case of door lock accessory 2004, the accessory manufacturer can provide a physical keyhole or key slot somewhere in the accessory housing, into which the user inserts a key provided by the accessory manufacturer. As another example, door lock accessory 2004 can have a mechanical switch on or inside its housing to enable or disable pairing mode; this switch can be placed such that it is not accessible when door 2006 is closed. In general, placing the accessory into pairing mode can involve various actions to indicate to the accessory that an authorized user is present and trying to pair a controller with the accessory; however, the use of any particular technique for putting an accessory into pairing mode is not required. Further, in some embodiments, door lock accessory 2004 may automatically enter pairing mode when it is first installed and powered up or whenever it has no established pairings with any controller.

At block 2204, the controller can find the accessory. For example, in the case of door lock accessory 2004 and master controller 2018, accessory 2004 can begin to advertise its availability for pairing, e.g., using a device discovery service as described above, when it is placed into pairing mode. Master controller 2018 can execute a uniform controller program (or other program code) that can locate door lock accessory 2004, e.g., by performing accessory discovery process 400 of FIG. 4, up to block 422. As another example, some controllers can be configured to automatically search for accessories (at regular intervals or in response to events such as entering an area) or to search for accessories in response to a user input such as actuating a "FIND" control provided by the controller.

At block 2206, the user can instruct the controller to pair with the accessory found at block 2204. For example, as described above, accessory discovery process 400 can include the controller presenting information about the accessory to the user and prompting the user to indicate whether pairing should occur. As another example, a controller that performs accessory discovery can present to the user a list of all accessories that were found, and the user can select an accessory to be paired from the list. The user instruction can take various forms. In some instances, the user instruction can include entering the setup code of door lock accessory 2004; in other instances, entry of the setup code can be a separate user action.

At block 2208, in response to the user instruction, the controller can initiate a pair setup process with the accessory found at block 2204. For example, any of the pair setup processes described above (processes 1300, 1400, 1500, 1600) can be initiated at block 2208.

At block 2210, at some point during the pair setup process, the user can provide verification to the accessory that pairing with the specific controller that initiated pair setup should occur. Whether and what verification is required can be determined by the accessory manufacturer. In some embodiments, an accessory does not require any additional verification beyond the fact that it is in pairing mode and a controller is attempting to pair. Further, in some embodiments, the user input at block 2206 (which can include the accessory setup code) may also serve as the verification at block 2210. Where an accessory does require verification, such verification can be implemented, e.g., by including in the pair setup process, a requirement that the user perform some action that is detectable by the accessory, with the accessory generating an error response to the controller if the action is not correctly performed.

For example, pairing processes 1300 and 1500 include a verification to the accessory, in the form of the controller's proof that it has the accessory's setup code. As described above, the controller can obtain the accessory's setup code from the user and use the setup code in generating a shared secret; the fact that the controller correctly generated the shared secret can be verification to the accessory that the controller has the setup code. As another example, if the controller and the accessory are both equipped with Near-Field Communication (NFC) technology (e.g. communication technology conforming to standards promulgated by the NFC Forum (http://nfc-forum.org)), the accessory can require that the user bring the controller into NFC communication range and can exchange information with the controller to confirm that the controller on the NFC channel is the same controller that is performing pair setup on another channel. (For instance, the controller can be required to provide its proof of the shared secret (proofC) via both the NFC channel and the pair-setup channel. Other verification operations can be substituted, and a single user action can provide both the instruction to pair at block 2206 and the verification at block 2210.

At block 2212, the pair setup process can be completed, and (assuming no error has occurred) the user can be informed (e.g., by the controller) that the pairing with the accessory has been established. Thereafter, at block 2214, the accessory can exit the pairing mode. In some embodiments, exiting the pairing mode can include a user action to remove the accessory from pairing mode. Such user action can be a reversal of user action taken at block 2202 to put the accessory into pairing mode, such as removing a physical key, flipping a pairing switch to its disabled position, etc. In some embodiments, the accessory can automatically exit pairing mode once pair setup is complete.

Referring to FIG. 20, in environment 2000, process 2200 can be repeated for each controller 2012 that the owner of door 2006 wishes to pair with door lock accessory 2004. However, in some environments, individually pairing each controller 2012 can be inconvenient. For instance, if pairing requires close physical proximity, each controller 2012 must be brought into such proximity and paired in turn. If a large number of controllers 2012 are to be paired (e.g., if door 2006 is the front door of a large building with many occupants), this can become quite time-consuming. In addition, in some embodiments, door lock accessory 2004 might not permit a second controller to perform pair setup after a first controller has successfully established a pairing.

Accordingly, in some embodiments, process 2200 can be used to establish a pairing between door lock 2004 and one controller (e.g., master controller 2018). Thereafter, master controller 2018 can use delegated pairing processes (e.g., pair add process 1800 or other delegated pairing processes described above) to establish pairings of door lock 2004 and additional controllers 2012. For example, if master controller 2018 has a long-term public key (or a security certificate) for a particular controller 2012, master controller 2018 can provide the key (or certificate) to door lock accessory 2004 using pair add process 1800. As another example, master controller 2018 can provide a trust certificate chain to door lock accessory 2004 (e.g., as described above), and each controller 2012 can have a certificate signed by the trust certificate chain, which can be used to allow a given controller 2012 to establish a pairing and access door lock accessory 2004. As described above, in some embodiments, master controller 2018 can selectively grant admin permission to any added controller 2012, and a controller 2012 with admin permission can perform pair add to establish pairings between accessory 2004 and additional controllers 2012.

Further, the set of users authorized to access door 2006 may change over time. For instance, in an office building, an employee may quit her job, whereupon her access to the building should be terminated. In a home, a roommate may move out. Master controller 2018 (or other controller with administrator permission) can make such updates, e.g., by using pair remove process 1900 described above to remove the pairing of door lock accessory 2004 with any controller 2012 that should no longer be granted access.

In some embodiments, a uniform controller program executing on master controller 2018 (or other controller 2012 that has admin permission for door lock accessory 2004) can provide various user interfaces to facilitate managing access to door 2006. For example, the owner or security agent may be able to view a list of authorized controllers, e.g., using a list pairings request as described above (in some embodiments, the list can also include identifying the users of authorized controllers); identify a new controller to be added to the authorized list; and/or select an authorized controller to be removed from the authorized list. Thus, security operations in an organization or multi-user environment can be streamlined.

Once a particular controller 2012 has established a pairing with door lock accessory 2004 (e.g., using any of the techniques described above, including direct or delegated pairing), that controller 2012 can be used to access door 2006. For example, controller 2012 can be provisioned with program code (e.g., operating system or application code) that enables controller 2012 to send and receive messages complying with a uniform accessory protocol as described above. The program can also define a graphical user interface (or other type of user interface) to allow a user of controller 2012 to interact with the accessory.

Figure 23:
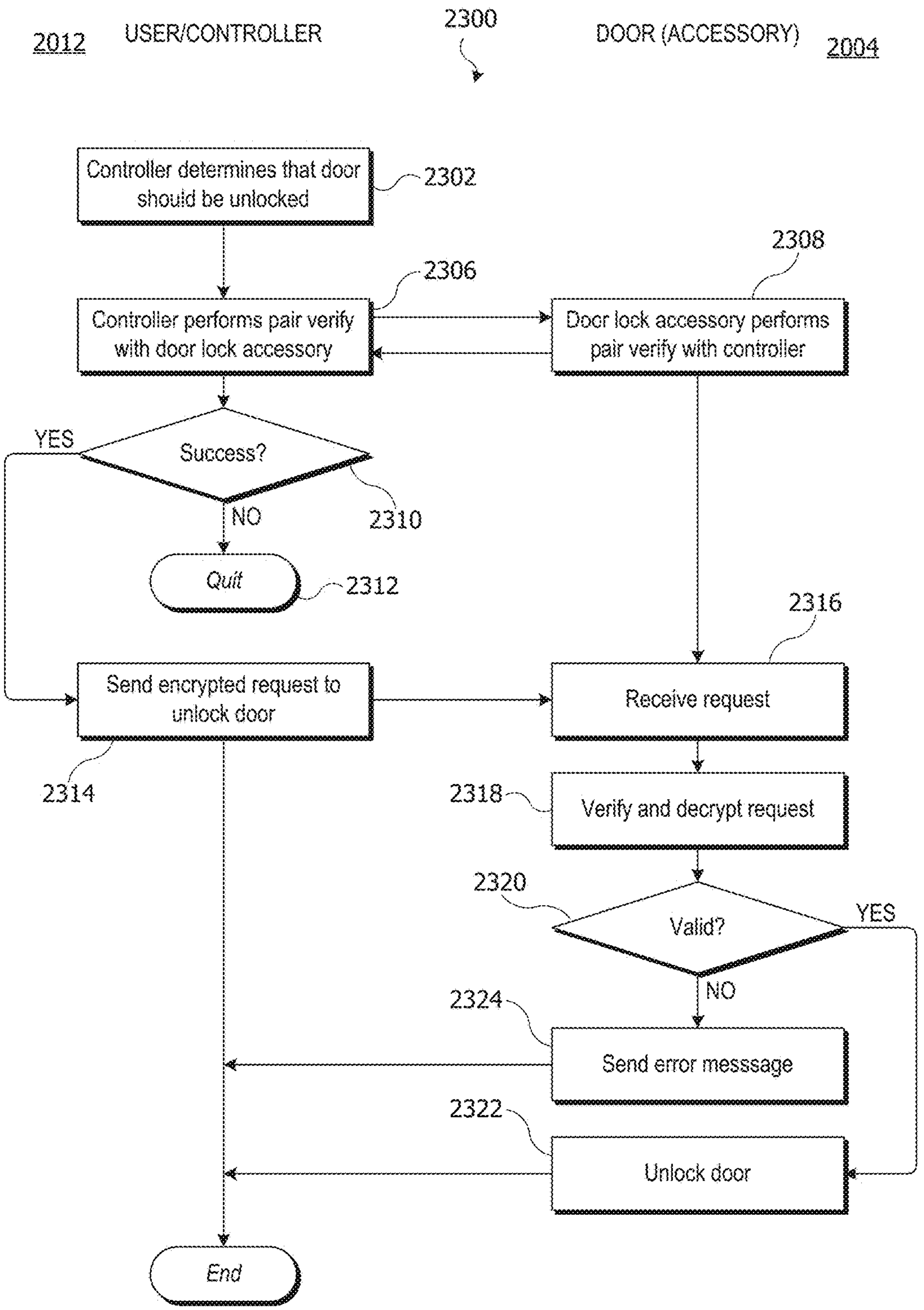
FIG. 23 shows an example of a process for unlocking a door according to an embodiment of the present invention.

FIG. 23 is a flow diagram of a process 2300 for unlocking a door according to an embodiment of the present invention. Process 2300 can be performed, e.g., between any controller 2012 (or controller 2018) and door lock accessory 2004 of FIG. 20.

Process 2300 can begin at block 2302, when controller 2012 determines that door 2006 should be unlocked. For example, a user carrying a portable controller 2012 may come within range of door lock accessory 2004. "Within range" can be defined as within wireless communication range or more narrowly as desired. For example, in order to avoid inadvertent unlocking of doors, controller 2012 and door lock accessory 2004 can be configured with proximity sensing capability (e.g., using Bluetooth LE, NFC, or the like), and controller 2012 can be configured to define a maximum range for attempting to unlock a door (e.g., within a few inches, 2 feet, 6 feet, or some other range). In some embodiments, when controller 2012 detects that door lock accessory 2004 is within range, controller 2012 can interact with the user to confirm that the user wants to unlock door 2006. For instance, the user can launch or otherwise activate an application or system-level program (or portion thereof) to unlock a door upon coming within range. In other embodiments, controller 2012 can execute portions of process 2300 as a background process to scan for door lock accessories with which it has an established pairing; upon detecting such an accessory in range, controller 2012 can generate a prompt to the user. Further, when controller 2012 prompts the user to confirm that a door should be unlocked, controller 2012 can require the user to supply an authentication credential (e.g., password or biometric credential such as a fingerprint) to verify that controller 2012 is being carried by an authorized user. In still other embodiments, controller 2012 can be configured to automatically attempt to unlock door 2006 whenever controller 2012 comes within range of door lock accessory 2004, without user input. Other implementations are also possible. The particular implementation can depend on the level of security desired for a particular door lock accessory 2004, so the same controller can behave differently depending on which door the user has approached.

Further, other techniques can be used to determine that a door should be unlocked, and physical proximity between controller 2012 and door lock accessory 2004 is not required. For example, a user may be able to remotely unlock door 2006 (e.g., from another room or another location entirely) by operating a user interface on controller 2012 to select the door and indicate that it should be unlocked. In some embodiments, prior to performing remote unlocking, controller 2012 can require the user to supply an authentication credential (e.g., password or biometric credential such as a fingerprint) to verify that controller 2012 is being operated by an authorized user.

At blocks 2306 and 2308, controller 2012 and door lock accessory 2004 can perform a pair verify operation (e.g., process 1700 described above). This operation can verify that a pairing was previously established between the two devices. At block 2310, if the pair verify process did not succeed, process 2300 can end at block 2312, and controller 2012 can alert the user to the error. In some embodiments, the user can be prompted to retry. Pair verify can be required each time controller 2012 attempts to unlock door lock accessory 2004.

If the pair verify process did succeed, then at block 2314, controller 2012 can send an encrypted request to door lock accessory 2004 to open the door. For instance, as described above with reference to FIGS. 5A-5D, controller 2012 can send an HTTP PUT request to write a value of Boolean "true" (open) to lock state characteristic 2102 of door lock accessory 2004. As with all communications in a pair-verified session, the request can be encrypted using a session key established during (or after) pair verify. In some embodiments, the request can be signed with the long-term secret key of controller 2012, although this is not required.

At block 2316, door lock accessory 2004 can receive the encrypted request. At block 2318, door lock accessory 2004 can verify and decrypt the request. As with all communications within a pair-verified session, the accessory can ignore the request if it is not encrypted with the correct session key. Further, if the request was signed with the controller's long-term secret key, the accessory can use its copy of the controller's long-term public key (which can be persistently stored for an established pairing) to verify the signature and therefore the controller's identity. Accessory 2004 can also verify that controller 2012 is permitted to unlock the door. For example, in some embodiments, access at certain times can be restricted to controllers with administrator permission. This restriction can be set or removed by a controller with administrator privilege writing to admin-only access characteristic 2122 (FIG. 21), which can be an instance of characteristic 228 of FIG. 2D. Other rules or decision criteria can also be applied.

At block 2320, if the request is valid (e.g., if it was correctly decrypted and is from a permitted controller, door lock accessory 2004 can proceed to unlock the door at block 2322. In some embodiments, door lock accessory 2004 can report the unlocking to controller 2012 (e.g., by sending an HTTP 200 OK response). If desired, controller 2012 and/or door lock accessory 2004 can also provide user-sensible output indicating the success. For example, either or both devices might beep or make a clicking sound, flash a green light, etc. In some embodiments, an accessory's feedback behavior can be made customizable by including appropriate characteristics in the definition of lock service instance 2106, such as audio feedback characteristic 206 (FIG. 2A) or other characteristics as desired.

If, at block 2302, the request is not valid, then at block 2324, door lock accessory 2004 can send an error message to controller 2012 (e.g., by sending an HTTP error response). In some embodiments, controller 2012 can inform the user of the error and/or prompt the user to try again. If desired, controller 2012 and/or door lock accessory 2004 can also provide user-sensible output indicating that the unlock attempt failed. For example, either or both devices might make an error sound (e.g., a different beep from the success sound), flash a red light, etc.

It will be appreciated that process 2300 is illustrative and that variations and modifications are possible. Steps described as sequential may be executed in parallel, order of steps may be varied, and steps may be modified, combined, added or omitted. It should be noted that process 2300 relies on the existence of a previously established pairing but can be independent of the manner in which the pairing was established (e.g., certificate-based or setup-code-based, direct or delegated). Thus, the accessory and the controller in this example would need to know that they have an established pairing but not how or when the pairing was established.

Further, while process 2300 illustrates interaction between a controller and an accessory in the specific context of locking a door, those skilled in the art with access to this disclosure will recognize that similar processes can be implemented to control any operation of any accessory.

In some embodiments, door lock accessory 2004 can leave door 2006 unlocked until an express instruction to lock the door is received (e.g., via a process similar to process 2300). In other embodiments, door lock accessory 2004 can apply an automatic relocking interval. For instance, after unlocking door 2006 at block 2322, accessory 2004 can wait a fixed period of time (e.g., ten seconds) then re-lock. Other security measures can also be implemented, such as automatically relocking door 2006 if the user doesn't open it promptly (e.g., within five seconds) after unlocking at block 2322. An automatic relocking behavior can be implemented, e.g., by writing a nonzero value to auto-timeout characteristic instance 2124 (FIG. 21).

In some embodiments, door lock accessory 2004 can require additional conditions or user actions before unlocking the door. For instance, as noted above, door lock accessory 2004 can incorporate an NFC transceiver, and door lock accessory 2004 can require that controller 2012 be brought into NFC range before unlocking. Or, door lock accessory 2004 can have sensors to detect when a user is touching the door and can decline to unlock if the door is not touched promptly (e.g., within two seconds or five seconds) after the accessory determines the unlock request is valid.

As another example, in some embodiments, a manufacturer or vendor of door locks (or any other accessory) may choose to incorporate manufacturer-specific behavior by use of a "data blob" exchanged between the controller and accessory. As used herein, a "data blob" refers to a block of data that can be stored by a controller (e.g., each of controllers 2012 and master device 2018 of FIG. 20 can store a data blob) and sent to the accessory as part of any request to that accessory or selectively sent with particular requests (e.g., requests to write to specific characteristics). From the perspective of the controller, the data blob can be opaque; an accessory that receives a data blob can interpret its contents in an accessory-specific manner.

By way of illustration, in the case of door lock accessory 2004, a manufacturer can require users of door lock accessory 2004 to register as authorized users of the lock. For example, the manufacturer can provide a server that supports a website where a user can obtain an authorization code for the lock (e.g., by creating an account at the server). An authorization block (which can be a data object containing the authorization code and any additional information desired by the accessory manufacturer) can be generated by the server and delivered to the user's controller 2012. Controller 2012 can store the authorization block as a data blob associated with accessory 2004. When controller 2012 subsequently sends requests to accessory 2004, controller 2012 can include the stored data blob in the request.

In some embodiments, sending the data blob can be dependent on the nature of the request. For example, the accessory definition record can define characteristics (e.g., as shown in FIGS. 3A-3C), including the permissions controllers have with respect to that characteristic. In some embodiments, a permissions string (e.g., "Blob Required") can be defined to indicate that a data blob is required to access the characteristic, and the accessory manufacturer can include this string in the definition of permissions for any characteristic for which the manufacturer desires to receive data blobs. When generating requests to a particular characteristic, controller 2012 can consult the permissions from the accessory definition record (which it can cache) to determine whether a data blob is required; if so, controller 2012 can append the data blob to the request. In other embodiments, the decision whether to send a data blob can be made at the per-accessory level (e.g., if the controller has a data blob stored for a particular accessory, the controller can append the data blob to every request it sends to that accessory).

Example Accessory: IP Camera

A second example of an accessory that can be controlled in accordance with various embodiments of the invention is an IP camera accessory. An IP camera accessory can include a camera capable of capturing video images (with or without audio) and streaming captured media (audio and/or video) to other devices. In some instances, an IP camera can also provide other functionality, such as recording and/or playback of previously recorded content. As with any other accessory that uses a uniform accessory protocol as described herein, these functionalities can be modeled as services and controlled by reading and writing to characteristic instances of the various services.

In embodiments of a uniform accessory protocol described above, communication between a controller and an accessory can take place using HTTP requests and responses. In the case of an IP camera, HTTP requests and responses can be used to set up the camera and control its behavior (e.g., aiming the camera, starting and stopping recording, etc.); however HTTP may not be well suited for real-time streaming of media content between devices. Accordingly, in IP camera embodiments described herein, the IP camera and controller can use a different protocol, such as the RTP protocol (e.g., as defined in IETF RFC 3550) with the SRTP protocol (e.g., as defined in IETF RFC 3711) used for media security. Other media streaming protocols can be substituted, as will be apparent. The uniform accessory protocol can define characteristics usable to establish a streaming session that supports a streaming protocol (which can be distinct from a pair-verified session defined according to the uniform accessory protocol), and delivery of streamed content can take place via the streaming session.

Figure 24:
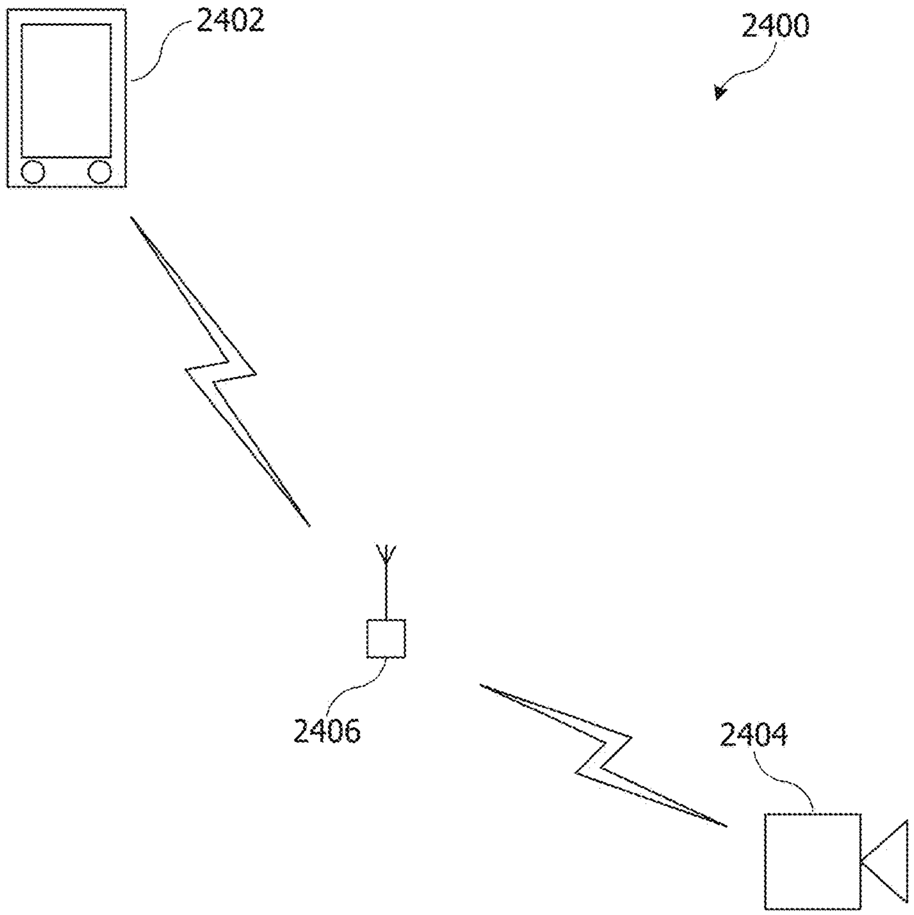
FIG. 24 shows an operating environment for an IP camera accessory according to an embodiment of the present invention.

Referring to FIG. 24, there is shown an operating environment 2400 for an IP camera accessory 2404 according to an embodiment of the present invention. In this example, IP camera accessory 2404 can communicate with a controller 2402, e.g., via a wireless access point 2406. Direct communication can also be supported. IP camera accessory 2404 can be a fixture that is permanently or removably installed in an area (e.g., a security or surveillance camera installed in a room, corridor, or entryway of a building), or it can be a portable camera that can be used to capture video in a variety of different settings. Controller 2402 can be any device that is to control IP camera 2404. For example, if IP camera 2404 is used as a security camera for a building, controller 2402 can be implemented at a security station in the building. As another example, IP camera 2404 can be set up in a child's room, e.g., as a baby monitor, and controller 2402 can be a parent's mobile phone, tablet or other device that the parent would generally carry. As still another example, a user can take IP camera 2404 to a park or wildlife refuge and set it up in an inconspicuous place, then retreat to a remote location to control IP camera 2404 using controller 2402, thereby increasing the likelihood of obtaining quality videos of wildlife or the like. Thus, use of IP camera 2404 is not restricted to any particular environment or any particular controller.

Like other accessories described herein, IP camera accessory 2402 can be modeled as a collection of services. FIGS. 25A-25B show example definitions for services 2501-2505 that can be included in an accessory model for IP camera accessory 2402 according to an embodiment of the present invention. Similarly to service definition examples shown in FIGS. 2G-2H above, service definitions 2501-2505 can specify required and/or optional characteristics. FIGS. 26A-26E show example definitions for characteristics of the services of FIGS. 25A-25B. Example definitions for characteristics listed in FIGS. 25A-25B that are not provided in FIGS. 26A-26E can be found in FIGS. 2A-2D. Any of these services and/or characteristics can be defined as core services and characteristics or, if not so defined, as extension services and characteristics.

Referring to FIG. 25A, IP camera streaming service 2501 can describe a real-time communication service used to manage media sessions. For instance, IP camera streaming service 2501 can include characteristics that facilitate setup and control of media streams between controller 2402 and IP camera accessory 2404, e.g., as described below.

Recording service 2502 can describe a service used to control a recording device, e.g., to start, stop, or schedule a recording. Similarly, playback service 2503 can describe a service used to control playback of stored media by an accessory, e.g., beginning and pausing playback. Although not shown in this example, those skilled in the art will recognize that additional characteristics can be defined for selecting a stored media item to play, either as part of playback service 2503 or as a separate content selection service.

Referring to FIG. 25B, camera service 2504 can provide control of camera settings such as turning the camera on or off. In some embodiments, other characteristics related to camera settings can be included in this service as optional characteristics, such as camera orientation characteristics (e.g., pan, tilt, zoom, rotate). Other optional characteristics can include image-processing characteristics such as night vision (on or off) and mirror mode (enable or disable mirroring of the captured image). Any user-selectable setting that a particular camera accessory provides can have a corresponding characteristic defined and included in camera service 2504.

Microphone service 2505 can provide control of a microphone that is operable to record sounds. Service 2505 can be included in the definition for any camera accessory that has a microphone input and omitted for any camera accessory that does not.

Speaker service 2506 can provide control over a speaker that is operable to output sounds. Service 2506 can be included in the definition for any camera accessory that has a speaker output and omitted for any camera accessory that does not.

Referring to FIGS. 26A-26B, characteristics useful for IP camera management can include session start characteristic 2601, session end characteristic 2602, and additional characteristics 2603-2615. Session start characteristic 2601 and session end characteristic 2602 (shown in FIG. 26A) can be written to by a controller to start and end a streaming session. Additional characteristics 2603-2615 can be read by a controller to obtain information about the properties of the IP camera's video and/or audio streaming.

Session start characteristic 2601 can have as a value a data object (e.g., in TLV format or other key-value format) that a controller can write to provide information usable by an IP camera accessory to start a streaming session. FIG. 26C shows examples of data elements that can be included in session-start characteristic 2601. Session ID 2631 can be a UUID for the streaming session that is to be started. Controller IP address 2632 and controller port 2633 can identify the destination to which streamed data should be sent (e.g., using IPv4 or IPv6 format). Controller SRTP master key 2634 and controller SRTP master salt 2635 can provide a salt and a master encryption key to be used for encrypting media streamed within the session. Video maximum bandwidth 2636 and audio maximum bandwidth 2637 can indicate upper limits on streaming data bandwidth (e.g., in kilobits per second (kbps)).

Referring again to FIG. 26A, session end characteristic 2602 can have as a value a data object (e.g., in TLV format or other key-value format) that provides the session identifier of the session to be ended. In some embodiments, no other information is needed to end a session.

Video codec name 2603 can provide a string representing the media type provided by the video codec of an IP camera service instance. In some embodiments, a set of valid values for the string can be defined (e.g., the set of codec names defined by IANA (Internet Assigned Numbers Authority, accessible via http://www.iana.org). In some embodiments, a given instance of IP camera service 2501 supports one codec (e.g., H.264 codec as defined in IETF RFC 6184), and an IP camera accessory that supports multiple codecs can define multiple instances of IP camera service 2501. A controller can select a desired codec for a session by writing to the session start characteristic of the corresponding instance of IP camera service 2501.

Video codec parameters 2604 can provide additional parameters for the video codec. The particular parameters included can be dependent on video codec name 2603 and can be expressed in a key-value format. For instance, in the case of an H.264 codec, video codec parameters 2604 can include a profile-level ID specifying the sub-profile and level of the H.264 codec and a packetization mode specifying whether the codec supports single NAL unit mode or non-interleaved mode. Other parameters can be defined, depending on the particular video codec supported by the service instance.

Video attributes characteristic 2605 can provide service-level attributes (e.g., SDP attributes). Examples include image attributes and directional attributes (e.g., send only, receive only, or bidirectional (send and receive)). In some embodiments, if a direction is not specified, "send only" can be presumed as the default.

RTP video payload type characteristic 2606 can provide a 7-bit integer payload type, e.g., as specified for RTP.

RTP protocol characteristic 2607 can provide a string identifying the specific RTP-based profile in use. For example, "RTP/SAVP" can refer to the profile defined in IETF RFC 3550 while "RTP/SAVPF" can refer to the profile defined in IETF RFC 5104. Other profiles and strings can also be defined.

RTP extensions characteristic 2608 can provide an array of strings listing RTP extensions supported by this instance of IP camera service 2501. Examples of RTP extensions can include picture loss indication, temporal-spatial tradeoff requests, temporary maximum media streaming bit rate, and so on.

SRTP crypto suite characteristic 2609 can provide a string identifying the cryptographic suite to be used for secure RTP streaming. In some embodiments, the string can conform to an IANA-registered name of a cryptographic suite. In some embodiments, SRTP crypto suite characteristic 2609 can allow a value of "none" to indicate that SRTP is not used (e.g., that streamed video data is not encrypted).

Referring to FIG. 26B, audio codec name characteristic 2610 can provide a string representing the media type provided by an audio codec. In some embodiments, a set of valid values for the string can be defined (e.g., the set of codec names defined by IANA (Internet Assigned Numbers Authority). In some embodiments, a given instance of IP camera service 2501 can support one combination of audio and video codec, and an IP camera accessory can support multiple combinations of codecs by defining multiple instances of IP camera service 2501. A controller can select a desired audio and video codec for a session by writing to the session start characteristic of the corresponding instance of IP camera service 2501.

Audio codec parameters 2611 can provide additional parameters for the audio codec. The particular parameters included can be dependent on audio codec name 2610 and can be expressed in a key-value format. For instance, in the case of an Opus codec, audio codec parameters 2604 can include an indicator as to whether constant bit rate or variable bit rate is enabled. Other parameters can be defined, depending on the particular audio codec.

Audio attributes parameter 2613 can provide media-level attributes (e.g., SDP attributes). Examples include directional attributes (e.g., send only, receive only, or bidirectional (send and receive)). In some embodiments, if a direction is not specified, "send only" can be presumed as the default.

RTP audio clock rate characteristic 2614 can provide an RTP clock rate for the audio, e.g., as specified for RTP.

RTP audio payload type characteristic 2615 can provide a 7-bit integer payload time, e.g., as specified for RTP.

In various embodiments, other characteristics and services can also be defined for streaming media. In some embodiments not all characteristics are used in every service instance. For example, an accessory model for an IP camera accessory that does not receive or stream audio can omit characteristics 2610-2615.

FIG. 26D shows example definitions for various characteristics 2651-2656 of camera service 2503 according to an embodiment of the present invention. These characteristics (which can be optional) can be defined if the camera service supports the corresponding behavior. A controller can write to these characteristics to control camera orientation and imaging behavior. For example, night vision characteristic 2651 can have a Boolean value usable to enable or disable a night-vision imaging mode.

Pan characteristic 2652 can be used to control panning of the camera. For instance, a camera may be rotatable in a horizontal plane. The amount of panning can be specified, e.g., as a percentage of the maximum horizontal rotation of the camera relative to a center position. The center position can be defined as having a pan value of zero, with positive values of pan characteristic 2652 indicating panning to the right and negative values of pan characteristic 2652 indicating panning to the left. Other units, such as degrees, can be used.

Similarly, tilt characteristic 2653 can be used to control a tilt angle of the camera (e.g., angle of the optical axis relative to horizontal). The amount of tilt can be specified, e.g., as a percentage of the maximum tilt of the camera relative to a center position. The center location can be defined as having a tilt value of zero, with positive values of tilt characteristic 2653 indicating upward tilt and negative values of tilt characteristic 2652 indicating negative tilt. Other units, such as degrees, can be used.

Rotation characteristic 2654 can be used to control a rotation angle of the camera about its optical axis. The amount of rotation can be specified, e.g., in degrees. In some embodiments, an enumerated value can be used (e.g., to support rotation settings of 90 degrees right, 90 degrees left, 180 degrees, and no rotation).

Zoom characteristic 2655 can be used to specify a zoom (or magnification) factor for the camera.

Mirror characteristic 2656 can be a Boolean value used to indicate whether the image should be subject to a mirroring transformation (e.g., mirroring about a vertical axis) prior to displaying, streaming, or storing it.

FIG. 26E shows definitions of additional characteristics that can be included in recording service 2502 and playback service 2503 of FIG. 25A. Recording control characteristic 2661 can be written by a controller to start or stop recordings. The value can be a data object (e.g., in TLV format or other key-value format) that can include an identifier of the operation to perform (e.g., start recording, stop recording, schedule recording) and additional parameters appropriate to the operation (e.g., duration of a recording, start and/or stop time for a scheduled recording, etc.). Recording status characteristic 2662 can be read by a controller to determine whether the recording service is recording. The value can be a data object (e.g., in TLV format or other key-value format) that can include an indication of whether the camera is currently recording; other information can also be included (e.g., a scheduled end time for the recording, information about scheduled future recordings, amount of available and/or used storage space for recordings, etc.).

Playback control characteristic 2663 can be written by a controller to control playback of stored media content (e.g., previously recorded content). The value can be a data object (e.g., in TLV format or other key-value format) that can include an identifier of the operation to perform (e.g., start playback, pause playback, end playback, etc.). Additional parameters can also be included, such as an identifier of a content item to be played. Playback status characteristic 2664 can be read by a controller to determine the current playback status. The value can be a data object (e.g., in TLV format or other key-value format) that can include an indication of whether playback is in progress; other information can also be included (e.g., an identifier of the content item being played, duration of the content item, playback position, etc.). Playback speed characteristic 2665 can be used to control playback speed, with the value indicating a speedup factor relative to a normal playback speed of 1.0). In some embodiments, the valid values for playback speed characteristic 2665 can be limited to speeds that a particular instance of playback service 2502 supports.

The services and characteristics described herein are for purposes of illustration. Other services and characteristics can also be defined. For example, to facilitate identifying a specific content item to be played back, it may be desirable to enable a controller to navigate (e.g., browse or search) a database or other listing of available content items. Additional characteristics can be defined to facilitate navigation of a database by a controller. These characteristics can be included in playback service 2502 or a different service (e.g., a content browsing service) as desired.

FIGS. 27A-27D together show an accessory object 2700 for IP camera accessory 2402 according to an embodiment of the present invention. In this example, accessory object 2700 is expressed in JSON and is similar in structure to accessory object 300 of FIGS. 3A-3C. Other formats and languages can also be used.

Accessory information service instance 2702 shown in FIG. 27A can be similar or identical to accessory information service 261 defined above. In this example, accessory object 2700 includes instances of three other services: IP camera streaming service 2704 shown in FIGS. 27B-27C (conforming to service definition 2501 of FIG. 25A), camera service 2706 shown in FIG. 27D (conforming to service definition 2503 of FIG. 25B), and microphone service 2708 shown in FIG. 27D (conforming to service definition 2504 of FIG. 25B). In this example, IP camera accessory 2402 does not have a speaker, nor does it have local recording or playback capability, and consequently instances of these services are not defined. (Those skilled in the art with access to the present disclosure will be able to construct appropriate accessory objects for instances of those services.) In this example, the current value of each characteristic instance is specified in accessory object 2700; a null value is specified for write-only characteristics.

Figure 28:
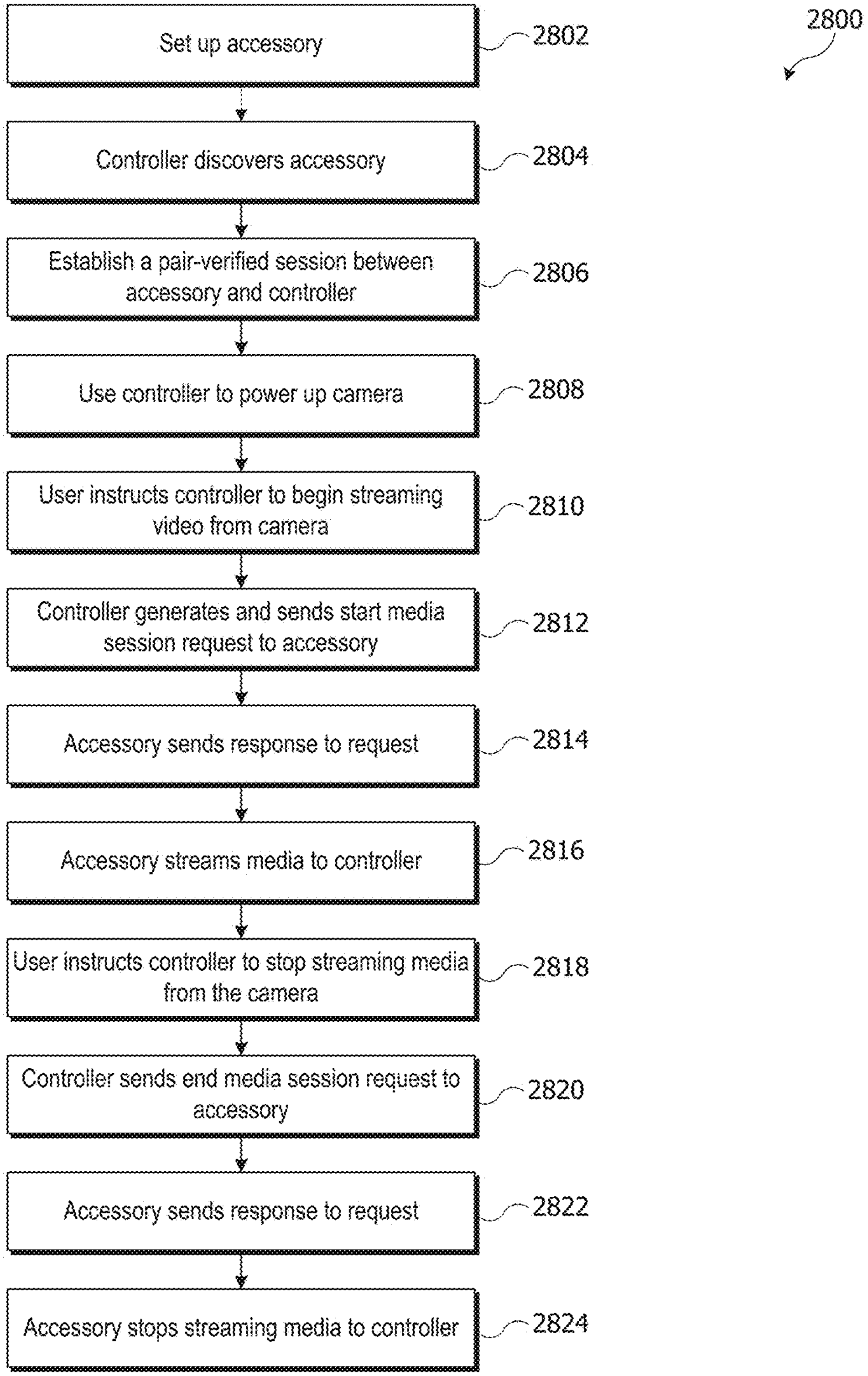
FIG. 28 show an example of a process for controlling an IP camera accessory according to an embodiment of the present invention.

User interaction with IP camera accessory 2404 and controller 2402 of FIG. 24 can be similar to interactions described above. For instance, a user can operate controller 2402 to indicate a desired behavior, and controller 2402 can send requests (e.g., HTTP requests) to accessory 2404 to effect the desired behavior. FIG. 28 is a flow diagram of a process 2800 showing an interaction scenario according to an embodiment of the present invention.

At block 2802, the user can set up IP camera accessory 2404. For instance, the user can place or mount the camera in a desired operating location and orientation, connect power cables, put accessory 2404 in pairing mode (if accessory 2404 does not automatically enter pairing mode), and so on. At block 2804, controller 2402 can discover IP camera accessory 2404. For instance, as described above controller 2402 can execute an application program that can implement controller-executable portions of process 400 of FIG. 4. The application program can be executed in response to an express user instruction or as a background process, and the user can be prompted to confirm that the desired accessory has been found or to select accessory 2404 from a list of accessories available to pair. At block 2806, controller 2402 and IP camera accessory 2404 can establish a pair-verified session. For example, controller 2402 and IP camera accessory 2404 can perform any of the pair setup processes described above, followed by a pair verify process as described above. Verification requirements during pair setup can be applied as desired; for instance, any of the options described above with reference to door lock accessory 2004 can be used. The particular verification requirements can depend on the nature or intended use of the particular IP camera accessory. For instance, a building security camera may require multiple forms of verification, while a consumer "webcam" type of camera may require only that the camera be in pairing mode and that the user enter a setup code printed on a label on the camera.

At block 2808, the user can use paired controller 2402 to power up IP camera accessory 2404, e.g., by sending a request to write the value "true" to the "on" characteristic (instance ID 8) of IP camera streaming service 2704. In this example, IP camera accessory 2404 can have a lower power mode in which its transceiver is capable of receiving signals from a paired controller but other services (e.g., the services listed in accessory object 2700) are powered down.

As shown in FIGS. 25A-25B, different ones of services 2501-2505 can each have a separate "on" characteristic. This can allow the controller to manage power consumption by selectively powering up service instances when they are to be used. In some embodiments, changing an "on" characteristic of one service can affect other services. For example, powering off IP camera streaming service 2501 can result in stopping transmission of all video streams but need not stop operation of microphone service 2505 or speaker service 2506. IP camera streaming service 2501 can be powered on while other services remain off, although if a media stream is active, any service instances associated with that stream should remain powered on or streaming may stop. Also, in some embodiments, IP camera streaming service 2501 does not allow a new session to be started if a service instance associated with one of the streams for the new session is powered off. Powering off IP camera service 2501 can terminate all media sessions and automatically power off other related service instances (e.g., microphone service 2506, speaker service 2506). Powering on IP camera service 2501 can result in powering on all related service instances (they can be powered off subsequently if not being used), although any previous media sessions need not be restored. Other power management rules can also be implemented.

At block 2810, the user can instruct controller 2402 to begin streaming video from IP camera accessory 2404, e.g., by interacting with a user interface of controller 2402. For example, the user may indicate that the camera is to stream video to controller 2402 (in some embodiments, the user can specify a different destination device). In response, at block 2812, controller 2402 can generate and send a request to IP camera accessory 2404 to start a media session.

In some embodiments, the start media session request can be sent as an HTTP PUT request to the /characteristics URL of IP camera accessory 2404. An example is shown in FIG. 29 for an embodiment using accessory object 2700 of FIGS. 27A-27D. Request message 2900 can have a message body 2902. Message body 2902 can include an instance identifier 2904 of the instance to be written (instance ID 9 corresponds to the session start characteristic for IP camera service instance 2704 (FIG. 27B). Value 2906 can include information usable by IP camera accessory 2404 to establish a streaming session with controller 2402, such as session ID, an IP address and port for controller 2402 (or other destination device), and an encryption key and salt to be used for SRTP streaming data.

At block 2814, IP camera accessory 2404 can send a response to the start media session request. In some embodiments, the response can be sent as an HTTP response. An example is shown in FIG. 30 for an embodiment where the start media session request is as shown in FIG. 29. Response message 3000 can have a message body 3002. Message body 3002 can include a value 3004. Value 3004 can include an error code 3002, which can have a value indicating successful completion (e.g., error code 0) or the specific error that occurred (e.g., invalid parameters, resource busy, access denied, etc.). Assuming no error, value 3004 can provide additional information usable by controller 2402 to connect to the streaming session with IP camera accessory 2404, such as the accessory's IP address and port, and the accessory's SRTP encryption parameters.

In this example, SRTP encryption parameters can be included in the start session request and response. It should be understood that these parameters need not be sent in the clear. In embodiments where request 2900 and response 3000 are exchanged within a pair-verified session between controller 2402 and accessory 2404, the parameters are sent in an encrypted form (using the session key of the pair-verified session) and are thus protected against interlopers.

Alternative embodiments of the request and response can also be implemented. In the example service definition described above, a given instance of IP camera streaming service 2501 has an associated codec, attributes, payload, etc.; these can be fixed characteristics of the service instance, and a different set of characteristics can be defined as a different instance of the service. In other embodiments, a different implementation can be used. For example, the streaming session start request can leverage SDP to configure media streams that can be delivered using RTP or SRTP, depending on desired security. As used herein, a "media stream" can be made up of one or more "media flows," where each media flow is a transfer of either audio or video data in one direction. For example, a "one-way video" stream can contain one video flow from IP camera accessory 2404 to controller 2402. A "one-way audio" stream can contain one audio flow from IP camera accessory 2404 to controller 2402. A "one-way audio and video" stream can contain one audio flow and one video flow from IP camera accessory 2404 to controller 2402; the two flows can be synchronized. A "one-way video and two-way audio" stream can contain one audio flow from controller 2402 to IP camera accessory 2404 and two media flows (one video, one audio) from IP camera accessory 2404 to controller 2402; the latter two flows can be synchronized. SDP can provide a nomenclature and syntax for describing a media session, including media capabilities and transport parameters. For example, SDP supports describing the following information: media types (e.g., audio, video); media codecs (e.g., LPCM audio, H.264 video); network transport (e.g., receiving IP address and port); stream attributes (e.g., receive-only, send-only, send-and-receive); and media security (e.g., whether to use SRTP). SDP can also provide a convenient model for negotiating a media session between a controller and a camera accessory in which the devices converge on mutually acceptable media settings, such as media types, media codecs, and so on.

Accordingly, in some alternative implementations of an IP camera streaming service, a controller (e.g., controller 2402) can include an SDP offer within a start media session request (e.g., within the data object included in request 2900). The accessory that receives the request (e.g., IP camera accessory 2404) can include an SDP response within its response to the start media session request (e.g., within a data object included in response 3000) as part of a response to a media session request.

Referring again to FIG. 28, once a streaming session has been established, at block 2816, IP camera accessory 2404 can begin streaming media to controller 2404 (or other destination device as specified in the start media session request). The particular media streamed and streaming format can depend on the characteristics of the accessory's IP streaming service; for instance, streaming can include video and/or audio. Further, in some instances, the streaming service can support a flow in the opposite direction, and that flow can begin at the same time. Controller 2402 (or other destination device) can present the received media to the user and/or store the received media for later presentation. Streaming of media content can continue indefinitely.

At some point, the user can instruct controller 2402 to stop the media streaming at block 2818, e.g., by operating a "stop" control of the user interface. In response, at block 2820, controller 2402 can generate and send an end media session request to IP camera accessory 2404. FIG. 31 shows an example of an end media session request message 3100 for an embodiment where request 2900 and response 3000 were exchanged. Like start media session request 2900, end media session request 3000 can be an HTTP PUT request. Request message 3100 can have a message body 3102. Message body 3102 can include an instance identifier 3104 of the instance to be written (instance ID 10 corresponds to the session end characteristic for IP camera service instance 2704 (FIG. 27B). Value 3106 can include information usable by IP camera accessory 2404 to terminate a streaming session with controller 2402; in this example, the session identifier suffices.

Referring again to FIG. 28, at block 2822, accessory 2404 can send a response to the request. FIG. 32 shows an example of an end media session response 3200 that accessory 2404 can generate in response to request 3100 of FIG. 31. Response message 3200 can have a message body 3202. Message body 3202 can include a value 3204. Value 3204 can include an error code indicating whether an error occurred. The error codes can be defined similarly to the error codes for responding to a media session start request.

At block 2824, IP camera accessory 2404 can stop streaming media to controller 2402. (If the defined stream includes a flow in the opposite direction, that flow can end at the same time.) After block 2824, controller 2402 and accessory 2404 can remain in a pair-verified session, and controller 2402 can initiate streaming again and/or invoke other functions of controller 2402 within the pair-verified session.

It will be appreciated that process 2800 is illustrative and that variations and modifications are possible. Steps described as sequential may be executed in parallel, order of steps may be varied, and steps may be modified, combined, added or omitted. In different contexts, a user can interact with IP camera accessory 2404 using appropriate portions of process 2800. In some embodiments, pair verify can be required prior to performing certain actions, such as starting or terminating a media session, or pair verify can be a precondition of any interaction with an IP camera streaming service. Within a pair-verified session, all requests and responses can be encrypted. Further, while specific media-related protocols such as SDP, RTP, and SRTP are used for purposes of illustration, other protocols can be substituted.

Process 2800 can be understood as an example of a wide variety of interactive control operations that can be performed by a user operating a controller to control a paired accessory, including but not limited to media capture operations. Any type of function or operation that an accessory is capable of performing can be controlled using processes similar to those described herein.

Example: Streaming Interface

Some accessories can support IP streaming between themselves and a controller. Real-time media streaming, as in the IP camera example above, is one option, but other types of data streaming can also be supported. For example, TCP or UDP streaming can be supported. In some embodiments, accessories can be required to stream all data in encrypted form. For instance, for TCP streams. TLS-PSK (ChaCha20/Poly1305) can be used, while for UDP streams, DTLS-PSK (ChaCha20/Poly1305) can be used. In some embodiments, implementation of IP streaming can be similar to the IP camera service example described above. Alternative implementations are also possible. An example will now be described.

FIG. 33 shows an example service definition for an IP streaming service 3301 according to an embodiment of the present invention. The characteristics are defined in FIG. 34 as streaming capabilities characteristic 3401, streaming control input characteristic 3402, and streaming control result 3403. Each of these characteristics can be a data object, whose keys and values can be as indicated. An optional "protocol-info" key (whose value is an object) is included in each characteristic 3401-3403, and this can be used to provide additional protocol-specific metadata.

In this example, a controller can write to streaming control input characteristic 3402 to open or close a stream and can obtain the status of streaming by reading streaming control result characteristic 3403. For example, as described above, a paired controller can subscribe to event notifications for streaming control result characteristic 3403, and the accessory can send an unsolicited event response to the controller whenever the value of streaming control result characteristic 3403 changes. In addition, a paired controller can also read streaming control result characteristic 3403 (e.g., using an HTTP GET request as described above).

In some embodiments, the accessory can have the option to determine, on a per-request basis, whether to respond with an inline result or a query result. Examples of inline and query results are described above with reference to FIGS. 5G-5K and can be applied in this context. In this example, "on" is not shown as a characteristic of IP streaming service 3301; if desired, it can be included in the definition.

An accessory that supports IP streaming can include an IP streaming service in its accessory model. Those skilled in the art with access to the present disclosure will be able to compose an appropriate representation in JSON or other description languages or notations.

Figure 35:
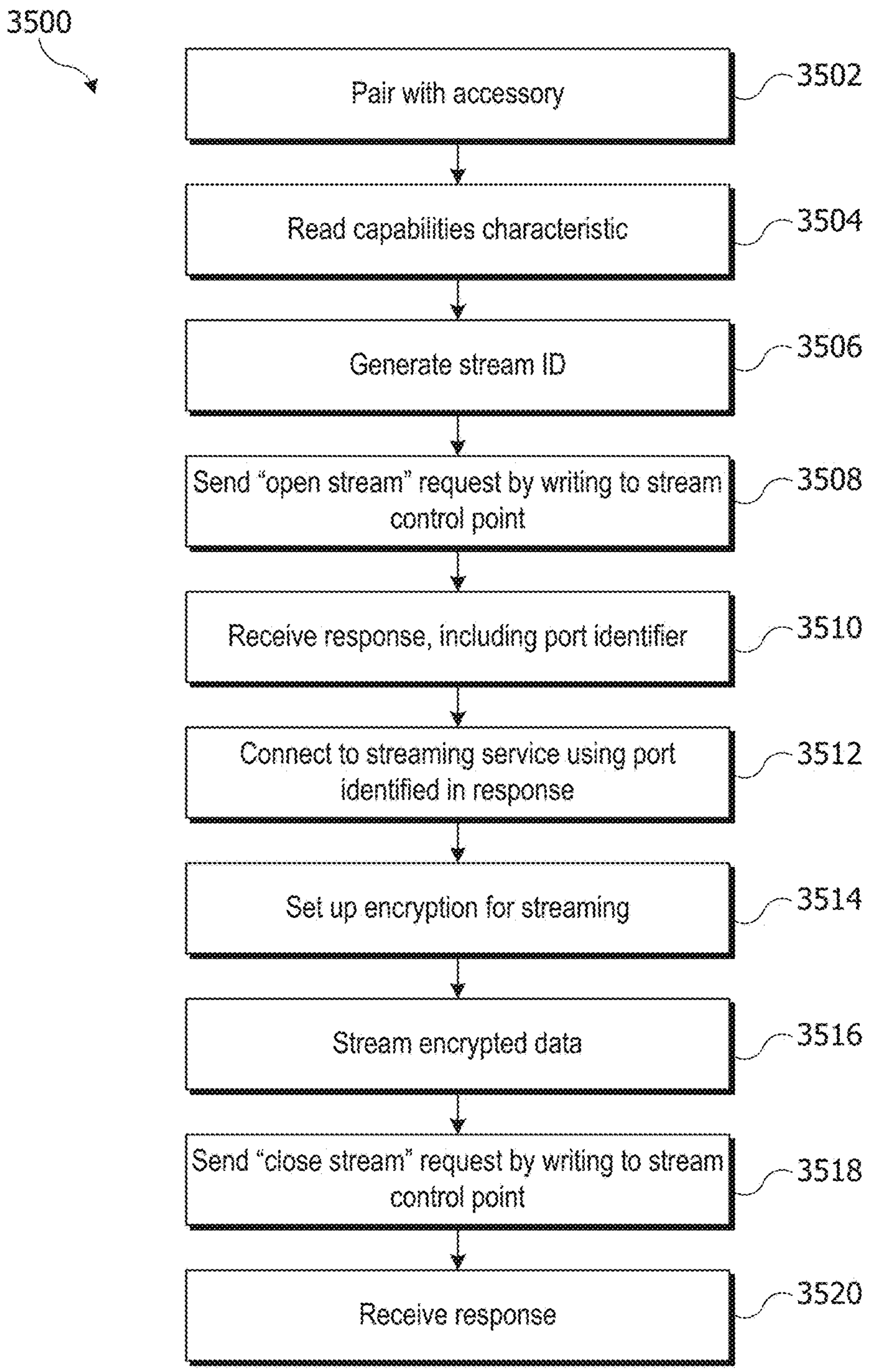
FIG. 35 shows an example of a process for IP streaming according to an embodiment of the present invention.

FIG. 35 is a flow diagram of a process 3500 for IP streaming that can be executed by a controller according to an embodiment of the present invention. At block 3502, the controller can pair with an accessory that has an IP streaming service as defined in FIGS. 33 and 34. For example, pair setup and pair verify processes described above can be used, and the controller can read the accessory definition record to determine that the accessory has an IP streaming service.

At block 3504 the controller can read streaming capabilities characteristic 3401 from the accessory, e.g., by sending an HTTP GET request directed to streaming capabilities characteristic 3401. This request can be constructed in accordance with examples described above. At block 3506, the controller can generate a stream identifier, conventional techniques for generating identifiers (e.g., a UUID) can be used. At block 3508, the controller can send an "open stream" request to the accessory, e.g., by sending an HTTP PUT request to streaming control input characteristic 3402 with request-type of 1 and stream-id set to the stream identifier generated at block 3506. Other information, such as an IP address and port to use for the streaming session, can be included, e.g., in the protocol-info object. The request can be constructed in accordance with examples described above.

At block 3510, the controller can receive a response from the accessory. In some embodiments, the response can be either an inline result response (e.g., similar to response 573 of FIG. 5I) or a query result response establishing a transaction-id followed by the controller reading streaming control result characteristic 3403 and referencing the established transaction-id (e.g., similar to responses 574 of FIG. 5J and subsequent request 578 of FIG. 5K). In either case, the response can include a port identifier and any other information usable by the controller to connect to the streaming session.

At block 3512, the controller can connect to the streaming session using the information provided in the response. At block 3514, the controller can set up encryption for the data stream. For example, keys for TLS or DTLS encryption (transport layer security or datagram transport layer security, e.g., as documented at IETF RFC 4279 or IETF Internet Draft draft-keoh-lwig-dtls-iot-01, available at https://tools.ietf.org/htmlidraft-keoho-lwig-dtls-iot-01) can be derived from the shared secret generated during pair setup or pair verify (at block 3502) and the stream ID (generated at block 3506). The accessory can derive keys from the same information. At block 3516, the devices can stream the encrypted data. Data can flow in either or both directions (from controller to accessory and/or from accessory to controller) as desired.

When the controller decides to discontinue the stream, at block 3518, the controller can send a "close stream" request e.g., by sending an HTTP PUT request to streaming input point characteristic 3402 with request-type of 2 and stream-id set to the stream identifier generated at block 3506. This request can also be constructed in accordance with examples described above. At block 3520, the controller can receive a response confirming that the accessory has closed the port. This can be provided in the same manner as the response at block 3510.

It will be appreciated that process 3500 is illustrative and that variations and modifications are possible. Steps described as sequential may be executed in parallel, order of steps may be varied, and steps may be modified, combined, added or omitted. The streaming service can provide a general IP streaming interface for securely streaming data of any kind in either direction between an accessory and a controller. In the example shown, TCP and UDP are not real-time protocols. Other embodiments can provide real time streaming, e.g., using the IP camera streaming service described above or similar services.

In some embodiments, a controller can subscribe to notifications to allow the accessory to alert the controller if its status changes (e.g., if an error occurs during streaming). For example, referring to FIG. 34, a controller can subscribe to event notifications (or other types of notifications that may be supported) for streaming control result characteristic 3403. If the streaming status changes at the accessory end, the accessory can update the status code and generate a notification (e.g., an unsolicited event message as described above) to the controller.

Example Devices

Embodiments described herein can be implemented in electronic devices that can be of generally conventional design and adapted to conform to a uniform accessory protocol to support command-and-control operations by which a controller (a first electronic device) can control operation of an accessory (a second electronic device).

Figure 36:
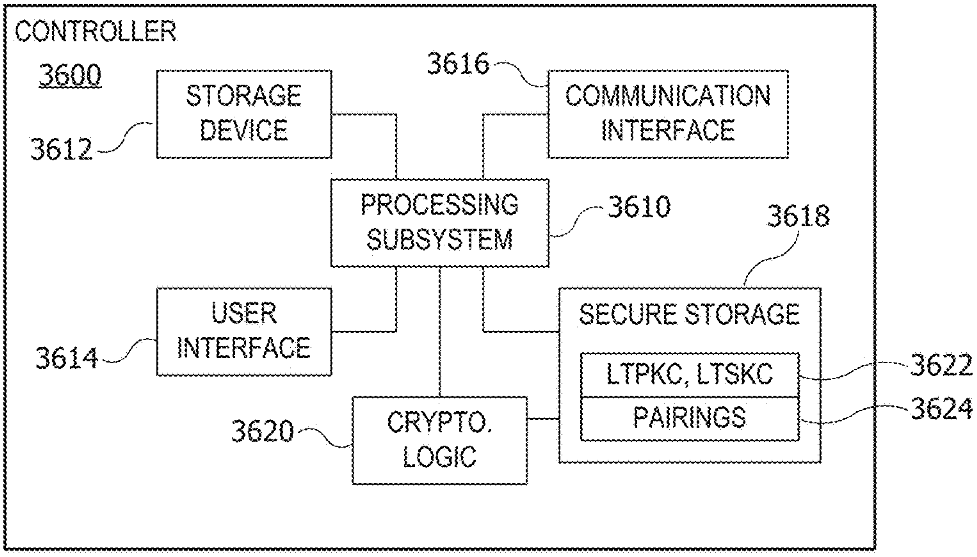
FIG. 36 is a simplified block diagram of a controller according to an embodiment of the present invention.

FIG. 36 is a simplified block diagram of a controller 3600 according to an embodiment of the present invention. Controller 3600 can implement any or all of the controller functions, behaviors, and capabilities described herein, as well as other functions, behaviors, and capabilities not expressly described. Controller 3600 can include processing subsystem 3610, storage device 3612, user interface 3614, communication interface 3616, secure element 3618, and cryptographic logic module 3620. Controller 3600 can also include other components (not explicitly shown) such as a battery, power controllers, and other components operable to provide various enhanced capabilities. In various embodiments, controller 3600 can be implemented in a desktop computer, laptop computer, tablet computer, smart phone, wearable computing device, or other systems having any desired form factor. Further, as noted above, controller 3600 can be implemented partly in a base station and partly in a mobile unit that communicates with the base station and provides a user interface.

Storage device 3612 can be implemented, e.g., using disk, flash memory, or any other non-transitory storage medium, or a combination of media, and can include volatile and/or non-volatile media. In some embodiments, storage device 3612 can store one or more application and/or operating system programs to be executed by processing subsystem 3610, including programs to implement any or all operations described herein as being performed by a controller. For example, storage device 3612 can store a uniform controller application that can read an accessory definition record and generate a graphical user interface for controlling the accessory based on information therein. In some embodiments, portions (or all) of the controller functionality described herein can be implemented in operating system programs rather than applications. In some embodiments, storage device 3612 can also store apps designed for specific accessories or specific categories of accessories (e.g., an IP camera app to manage an IP camera accessory or a security app to interact with door lock accessories).

User interface 3614 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 3614 to invoke the functionality of controller 3600 and can view and/or hear output from controller 3600 via output devices of user interface 3614.

Processing subsystem 3610 can be implemented as one or more integrated circuits, e.g., one or more single-core or multi-core microprocessors or microcontrollers, examples of which are known in the art. In operation, processing system 3610 can control the operation of controller 3600. In various embodiments, processing subsystem 3610 can execute a variety of programs in response to program code and can maintain multiple concurrently executing programs or processes. At any given time, some or all of the program code to be executed can be resident in processing subsystem 3610 and/or in storage media such as storage device 3612.

Through suitable programming, processing subsystem 3610 can provide various functionality for controller 3600. For example, in some embodiments, processing subsystem 3610 can implement various processes (or portions thereof) described above as being implemented by a controller. Processing subsystem 3610 can also execute other programs to control other functions of controller 3600, including programs that may be stored in storage device 3612. In some embodiments, these programs may interact with an accessory, e.g., by generating messages to be sent to the accessory and/or receiving messages from the accessory. Such messages can conform to a uniform accessory protocol as described above.

Communication interface 3616 can provide voice and/or data communication capability for controller 3600. In some embodiments communication interface 3616 can include radio frequency (RF) transceiver components for accessing wireless voice and/or data networks (e.g., using cellular telephone technology, data network technology such as 3G, 4G/LTE, Wi-Fi (IEEE 802.11 family standards), or other mobile communication technologies, or any combination thereof), components for short-range wireless communication (e.g., using Bluetooth and/or Bluetooth LE standards, NFC, etc.), and/or other components. In some embodiments communication interface 3616 can provide wired network connectivity (e.g., Ethernet) in addition to or instead of a wireless interface. Communication interface 3616 can be implemented using a combination of hardware (e.g., driver circuits, antennas, modulators/demodulators, encoders/decoders, and other analog and/or digital signal processing circuits) and software components. In some embodiments, communication interface 3616 can support multiple communication channels concurrently, using the same transport or different transports.

Secure storage module 3618 can be an integrated circuit or the like that can securely store cryptographic information for controller 3600. Examples of information that can be stored within secure storage module 3618 include the controller's long-term public and secret keys 3622 (LTPKC, LTSKC as described above), and a list of paired accessories 3627 (e.g., a lookup table that maps accessory ID to accessory long-term public key LTPKA for accessories that have completed a pair setup or pair add process as described above).

In some embodiments, cryptographic operations can be implemented in a cryptographic logic module 3620 that communicates with secure storage module 3618. Physically, cryptographic logic module 3620 can be implemented in the same integrated circuit with secure storage module 3618 or a different integrated circuit (e.g., a processor in processing subsystem 3610) as desired. Cryptographic logic module 3620 can include various logic circuits (fixed or programmable as desired) that implement or support cryptographic operations of controller 3600, including any or all cryptographic operations described above. Secure storage module 3618 and/or cryptographic logic module 3620 can appear as a "black box" to the rest of controller 3600. Thus, for instance, communication interface 3616 can receive a message in encrypted form that it cannot decrypt and can simply deliver the message to processing subsystem 3610. Processing subsystem 3610 may also be unable to decrypt the message, but it can recognize the message as encrypted and deliver it to cryptographic logic module 3620. Cryptographic logic module 3620 can decrypt the message (e.g., using information extracted from secure storage module 3618) and determine what information to return to processing subsystem 3610. As a result, certain information can be available only within secure storage module 3618 and cryptographic logic module 3620. If secure storage module 3618 and cryptographic logic module 3620 are implemented on a single integrated circuit that executes code only from an internal secure repository, this can make extraction of the information extremely difficult, which can provide a high degree of security. Other implementations are also possible.

Figure 37:
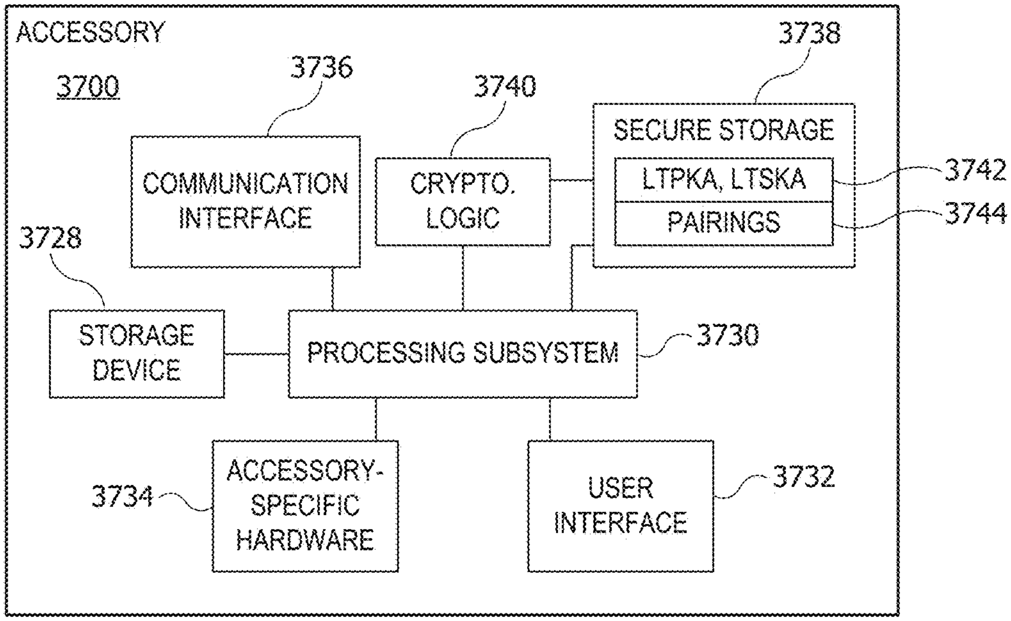
FIG. 37 is a simplified block diagram of an accessory according to an embodiment of the present invention.

FIG. 37 is a simplified block diagram of an accessory 3700 according to an embodiment of the present invention. Accessory 3700 can implement any or all of the accessory functions, behaviors, and capabilities described herein, as well as other functions, behaviors, and capabilities not expressly described. Accessory 3700 can include storage device 3728, processing subsystem 3730, user interface 3732, accessory-specific hardware 3734, communication interface 3736, secure element 3738, and cryptographic logic module 3740. Accessory 3700 can also include other components (not explicitly shown) such as a battery, power controllers, and other components operable to provide various enhanced capabilities.

Accessory 3700 is representative of a broad class of accessories that can be operated by a controller such as controller 3600, and such accessories can vary widely in capability, complexity, and form factor. Various accessories may include components not explicitly shown in FIG. 37, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 3728 can be implemented, e.g., using disk, flash memory, or any other non-transitory storage medium, or a combination of media, and can include volatile and/or non-volatile media. In some embodiments, storage device 3728 can store one or more programs to be executed by processing subsystem 3730, including programs to implement various operations described above as being performed by an accessory, as well as operations related to particular accessory behaviors. Storage device 3728 can also store an accessory object or accessory definition record (e.g., as described above) that can be furnished to controller devices, e.g., as described above. Storage device 3728 can also store accessory state information and any other data that may be used during operation of accessory 3700.

Processing subsystem 3730 can include, e.g., one or more single-core or multi-core microprocessors and/or microcontrollers executing program code to perform various functions associated with accessory 3700. For example, processing subsystem 3730 can implement any or all operations described herein as being implemented by an accessory, e.g., by executing program code stored in storage device 3728. Processing subsystem 3730 can also execute other programs to control other functions of accessory 3730. In some instances programs executed by processing subsystem 3730 can interact with a controller (e.g., controller 3600), e.g., by generating messages to be sent to the controller and/or receiving messages from the controller. Such messages can conform to a uniform accessory protocol as described above.

User interface 3732 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 3700, a user can operate input devices of user interface 3732 to invoke functionality of accessory 3700 and can view and/or hear output from accessory 3700 via output devices of user interface 3734. Some accessories may provide a minimal or no user interface.

Accessory-specific hardware 3734 can include any other components that may be present in accessory 3700 to enable or support its functionality. For example, in various embodiments accessory-specific hardware 3734 can include one or more storage devices using fixed or removable storage media; GPS receiver; power supply and/or power management circuitry; a camera; a microphone; one or more actuators; environmental sensors (e.g., temperature sensor, pressure sensor, accelerometer, chemical sensor, etc.); and so on. It is to be understood that any type of accessory functionality can be supported by providing appropriate accessory-specific hardware 3734.

Communication interface 3736 can provide voice and/or data communication capability for accessory 3700. In some embodiments communication interface 3736 can include radio frequency (RF) transceiver components for accessing wireless voice and/or data networks (e.g., using cellular telephone technology, data network technology such as 3G, 4G/LTE, Wi-Fi (IEEE 802.11 family standards), or other mobile communication technologies, or any combination thereof), components for short-range wireless communication (e.g., using Bluetooth and/or Bluetooth LE standards, NFC, etc.), and/or other components. In some embodiments communication interface 3736 can provide wired network connectivity (e.g., Ethernet) in addition to or instead of a wireless interface. Communication interface 3736 can be implemented using a combination of hardware (e.g., driver circuits, antennas, modulators/demodulators, encoders/decoders, and other analog and/or digital signal processing circuits) and software components. In some embodiments, communication interface 3736 can support multiple communication channels concurrently, using the same transport or different transports.

Secure storage module 3738 can be an integrated circuit or the like that can securely store cryptographic information for accessory 3700. Examples of information that can be stored within secure storage module 3738 include the accessory's long-term public and secret keys 3742 (LTPKA, LTSKA as described above), and a list of paired controllers 3744 (e.g., a lookup table that maps controller ID to controller long-term public key LTPKC for controllers that have completed a pair setup or pair add process as described above).

In some embodiments, cryptographic operations can be implemented in a cryptographic logic module 3740 that communicates with secure storage module 3738. Physically, cryptographic logic module 3740 can be implemented in the same integrated circuit with secure storage module 3738 or a different integrated circuit (e.g., a processor in processing subsystem 3730) as desired. Cryptographic logic module 3740 can include various logic circuits (fixed or programmable as desired) that implement or support cryptographic operations of accessory 3700, including any or all cryptographic operations described above. Secure storage module 3738 and/or cryptographic logic module 3740 can appear as a "black box" to the rest of accessory 3700. Thus, for instance, communication interface 3736 can receive a message in encrypted form that it cannot decrypt and can simply deliver the message to processing subsystem 3730. Processing subsystem 3730 may also be unable to decrypt the message, but it can recognize the message as encrypted and deliver it to cryptographic logic module 3740. Cryptographic logic module 3740 can decrypt the message (e.g., using information extracted from secure storage module 3738) and determine what information to return to processing subsystem 3730. As a result, certain information can be available only within secure storage module 3738 and cryptographic logic module 3740. If secure storage module 3738 and cryptographic logic module 3740 are implemented on a single integrated circuit that executes code only from an internal secure repository, this can make extraction of the information extremely difficult, which can provide a high degree of security. Other implementations are also possible.

Accessory 3700 can be any electronic apparatus that interacts with a controller such as controller 3600. In some embodiments, controller 3600 can provide remote control over operations of accessory 3700 as described above. For example controller 3600 can provide a remote user interface for accessory 3700 that can include both input and output controls (e.g., a display screen to display current status information obtained from accessory 3700 and an input control such as a touchscreen overlay to allow changes to the status information). Controller 3600 in various embodiments can control any function of accessory 3700 and can also receive data from accessory 3700.

Figure 38:
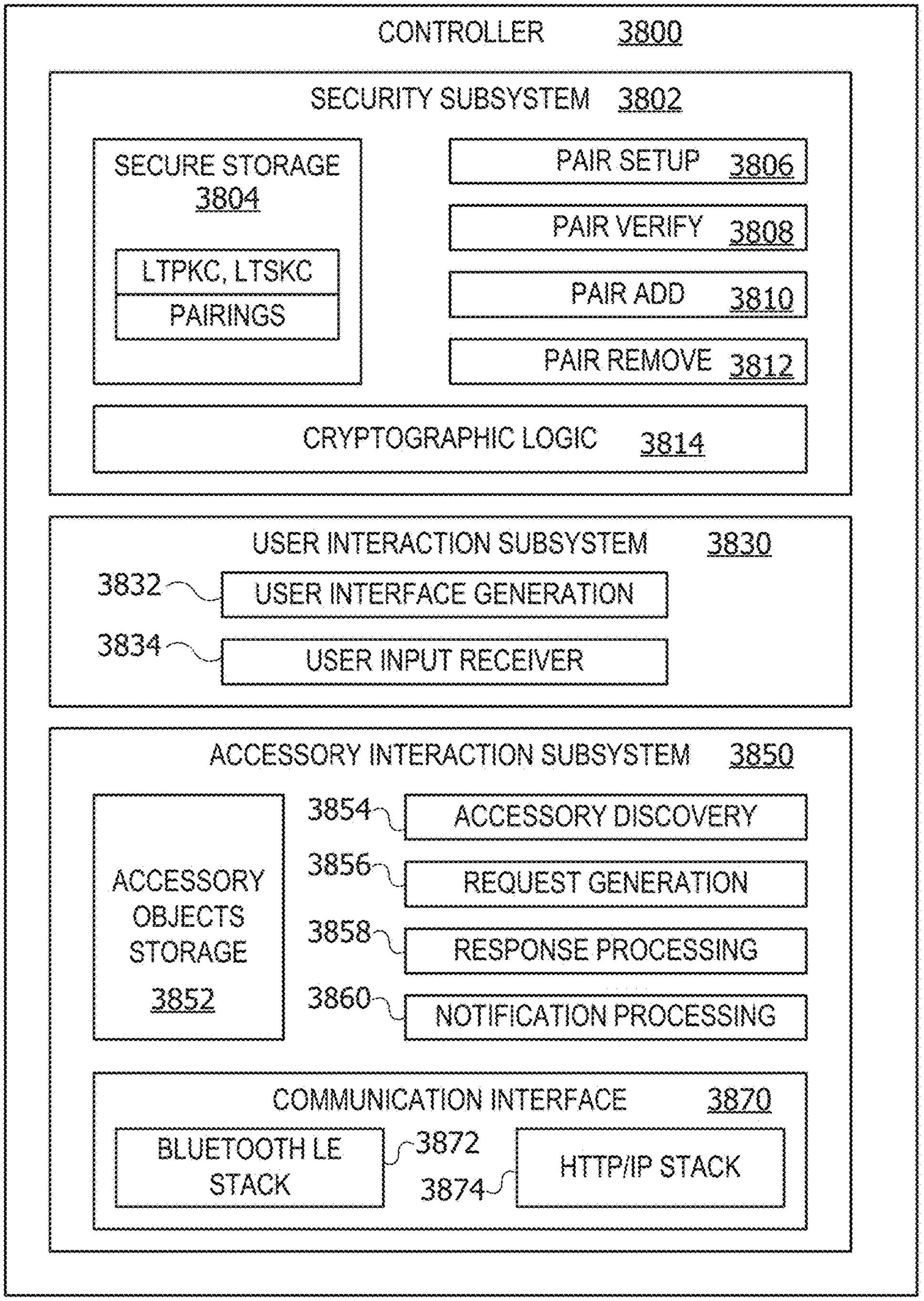
FIG. 38 is a simplified block diagram of a controller architecture according to an embodiment of the present invention.

FIG. 38 shows an example of a controller architecture for a controller 3800 according to an embodiment of the present invention. The controller architecture is shown as a set of interacting subsystems, where each subsystem includes one or more modules. It is to be understood that each of the modules can be implemented using program code executing on one or more programmable processors and/or in one or more fixed-function processors and that the processor(s) can include output signaling to control other hardware devices (e.g., actuators, displays, etc.) and/or input signaling to receive signals from other hardware devices (e.g., keyboards; touchscreens; feedback or status signals from actuators, motors, or sensors; etc.). Some of the subsystems can include persistent data storage, which can be implemented using any type of nonvolatile storage device (e.g., semiconductor flash memory, EEPROM, magnetic or optical disk, etc.). Although not shown, some or all of the subsystems can include additional hardware elements, such as displays, keyboards, touchscreens, microphones, speakers, sensors, etc.

Security subsystem 3802 can include secure storage element 3804, pair setup module 3806, pair verify module 3808, pair add module 3810, pair remove module 3812, and cryptographic logic module 3814. Secure storage element 3804 can be similar or identical to secure storage element 3618 or other secure storage elements described above. In some embodiments, secure storage element 3804 is used to securely store a long-term public/secret key pair for controller 3800 (e.g., LTPKC, LTSKC as described above) as well as pairing records for each accessory with which controller 3800 has an established pairing. As described above, each pairing record can include an identifier of a paired accessory, a long-term public key of the paired accessory, and optionally other information such as permission settings for interactions of controller 3800 with the paired accessory (e.g., whether controller 3800 has administrator permission). In embodiments where controller 3800 uses different long-term public keys in connection with different accessories, each pairing record can also include an indicator of the long-term public key to be used with the paired accessory. Other information can be included if desired.

Pair setup module 3806 can implement controller portions of a pair setup process. A pair setup process can be any process by which controller 3800 and an accessory securely exchange long-term public keys that each device can subsequently use to verify the other's identity. In some embodiments, a pair setup process can include an out-of-band exchange of an information item between controller 3800 and the accessory (e.g., a setup code, a validation of an accessory's security certificate) to verify the identity of the accessory. Any of the pair setup processes described above (e.g., processes 1300, 1400, 1500, and/or 1600) or other processes can be used. In some embodiments, pair setup module 3806 can interact with accessory interaction subsystem 3850 (described below) to effect communication with the accessory during pair setup. In some embodiments, pair setup module 3806 can invoke functions of cryptographic logic module 3814 to perform cryptographic operations in connection with a pair setup process.

Pair verify module 3808 can implement controller portions of a pair verify process. A pair verify process can be any process by which controller 3800 and an accessory use previously stored long-term public keys to verify the other device's identity. Any of the pair verify processes described above (e.g., process 1700) or other processes can be used. In some embodiments, pair verify module 3808 can interact with accessory interaction subsystem 3850 (described below) to effect communication with the accessory during pair verify. In some embodiments, pair verify module 3808 can invoke functions of cryptographic logic module 3814 to perform cryptographic operations in connection with a pair verify process.

Pair add module 3810 can implement controller portions of a pair add process. A pair add process can be any process by which controller 3800, after establishing a pairing with an accessory, provides to the accessory a long-term public key for a "new" controller with which the accessory is to establish a pairing; the new controller can be a different device from controller 3800. Any of the pair add processes described above (e.g., process 1800) or other processes can be used. In some embodiments, pair add module 3810 can interact with accessory interaction subsystem 3850 (described below) to effect communication with the accessory during pair add. In some embodiments, pair add module 3810 can also communicate with another controller or other external source of key information to obtain a long-term public key (or certificate) for a new controller to be added. In some embodiments, pair add module 3810 can invoke functions of cryptographic logic module 3814 to perform cryptographic operations in connection with a pair verify process.

Pair remove module 3812 can implement controller portions of a pair remove process. A pair remove process can be any process by which controller 3800, after establishing a pairing with an accessory, provides to the accessory an identifier of a controller whose pairing is to be removed by the accessory; the removed controller can be a different device from controller 3800. Any of the pair remove processes described above (e.g., process 1900) or other processes can be used. In some embodiments, pair remove module 3812 can interact with accessory interaction subsystem 3850 (described below) to effect communication with the accessory during pair remove. In some embodiments, pair remove module 3812 can also communicate with another controller or other external source of information to obtain identifying information for a controller to be removed. In some embodiments, pair remove module 3808 can invoke functions of cryptographic logic module 3812 to perform cryptographic operations in connection with a pair remove process.

Cryptographic logic module 3814 can implement cryptographic algorithms usable by controller 3800. Examples include: key generation algorithms; algorithms and functions used in SRP; hash algorithms; key-based encryption/decryption algorithms such as ChaCha20-Poly1305, Curve25519, Ed25519, and/or other algorithms. In some embodiments, cryptographic logic module 3814 can provide an API (application program interface) that is usable by other modules of controller 3800 to invoke cryptographic algorithms and related services. Any number and combination of cryptographic algorithms and related services can be supported.

User interaction subsystem 3830 can manage interactions with a user of controller 3800. For example, user interface generation module 3832 can generate a user interface to be presented to the user, e.g., on a display device. The user interface can include control elements operable by the user to interact with an accessory. For example, as described above, controller 3800 can render a graphical user interface based on information provided in an accessory object. User input receiver module 3834 can receive input from the user interface and process the input to determine an action to be taken in response to the input (e.g., generating messages to be sent to an accessory). In some embodiments, user input receiver module 3834 can invoke functions of other modules of controller 3800 in response to the user input.

Accessory interaction subsystem 3850 can support interactions between controller 3800 and an accessory. Accessory objects storage element 3852 can be implemented using volatile or nonvolatile storage media (e.g., semiconductor flash memory, EEPROM, DRAM, SRAM, magnetic or optical disk, etc.). In some embodiments, accessory objects storage element 3852 can be used to store a representation of each accessory for which controller 3800 has information. For example, as described above, after establishing a pairing with an accessory, a controller such as controller 3800 can obtain an accessory definition record from the accessory, which can include one or more accessory objects. Controller 3800 can store the accessory objects thus obtained in accessory objects storage element 3852. Stored accessory objects can be used in a number of ways, including generating user interfaces (e.g., by user interface generation module 3832), interpreting user input (e.g., by user input receiver module 3834), generating requests to an accessory, and/or receiving responses or notifications from an accessory.

Accessory discovery module 3854 can perform operations related to discovering an accessory, e.g., listening to broadcasts, determining whether to pair with a discovered accessory, and so on. For example, accessory discovery module 3854 can implement controller operations described above with reference to FIG. 4.

Request generation module 3856 can generate and send requests to accessories. For example, in response to an instruction from user input receiver module 3834 (e.g., to unlock a door), request generation module 3856 can generate an appropriate request message to the accessory (e.g., writing to a lock-state characteristic as described above). Examples of request messages are described above. In some embodiments, generating the message can include encrypting the message, and request generation module 3856 can invoke functions supported by cryptographic logic module 3814 in connection with generating the request. In some embodiments, request generation module 3856 can interact with security subsystem 3802 to generate and send requests to an accessory during a pair setup, pair verify, pair add, or pair remove operation (e.g., any of the requests described above with reference to FIGS. 13-19).

Response processing module 3858 can receive and process any responses to request messages that may be received from accessories. For example, after request generation module 3856 sends a request message to an accessory (e.g., to write to a lock-state characteristic as described above), response processing module 3858 can receive a response message from the accessory and can interpret the message. In some embodiments, the response message can be received in encrypted form, and response processing module 3858 can invoke functions supported by cryptographic logic module 3814 in connection with interpreting the response. Response processing module 3858 can also provide information to user interface subsystem 3830 based on the response (e.g., status codes, whether error occurred, etc.), and user interface subsystem 3830 can generate feedback to the user based on this information. In some embodiments, response processing module 3858 can also update accessory objects storage element 3852 based on information included in the response message. In some embodiments, response processing module 3858 can interact with security subsystem 3802 to receive and process responses received from an accessory during a pair setup, pair verify, pair add, or pair remove operation (e.g., any of the responses described above with reference to FIGS. 13-19).

Notification processing module 3860 can receive and process notification messages that may be received from accessories. As described above, various notification mechanisms can be supported, and notification processing module 3860 can support any or all of these notification mechanisms (e.g., any or all of processes 700, 800, 900, 1000 described above). For example, in the case of a passive notification, notification processing module 3860 can compare a state counter value reported by the accessory to a stored state counter value (e.g., in accessory objects storage element 3852) and can detect a discrepancy. In some embodiments, upon detecting a discrepancy, notification processing module 3860 can instruct request generation module 3856 to generate and send a request to the accessory to obtain additional state information (e.g., an updated accessory definition record or portions thereof). In the case of an advertised notification, notification processing module 3860 can process advertisements received via accessory discovery module 3854 to detect a known accessory with a state change (e.g., based on state counters of accessory objects stored in accessory storage element 3852). In the case of an event notification, an unsolicited response message can be received by response processing module 3858, which can recognize the message as an unsolicited response (e.g., an EVENT message as described above) and can provide the message to notification module 3860 for further processing. Regardless of the particular notification mechanism, notification module 3860 can determine the nature of the changed state information and provide appropriate information to user interaction subsystem 3830. In some embodiments, notification module 3860 can also update stored accessory objects in accessory objects storage element 3852.

Communication interface module 3870 can provide services to support communication with other devices, including accessories. In some embodiments, communication interface module 3870 can implement a Bluetooth LE protocol stack 3872 and/or an HTTP/IP protocol stack 3874. Bluetooth LE protocol stack 3872 can provide formatting of outgoing messages and interpretation of received messages in accordance with Bluetooth LE transport protocols. HTTP/IP protocol stack 3874 can provide formatting of outgoing messages and interpretation of received messages in accordance with HTTP and IP transport protocols. While Bluetooth LE and HTTP/IP are used as examples, it is to be understood that any combination of transport protocols can be supported within communication interface module 3870 and that a given instance of controller 3800 can support one or more transport protocols. As described above, controller 3800 can act as a client device in a client/server model of device interaction, and Bluetooth LE protocol stack 3872 and/or an HTTP/IP protocol stack 3874 can be configured to support client behavior.

In some embodiments, a protocol stack within communication interface module 3870 can be modified to recognize certain nonstandard messages. For example, as described above, HTTP/IP protocol stack 3874 can be configured to recognize an unsolicited "event" message from an accessory (e.g., event message 1120 of FIG. 11B described above).

In some embodiments, communication interface module 3870 can provide an API that is usable by other modules to send and/or receive messages to external devices. The API can be designed to be transport-agnostic, and the selection of a transport for a particular message can be made within communication interface module 3870, transparently to other modules within controller 3800. Messages received at a communication port (not shown) of controller 3800 can be sent to Bluetooth LE stack 3872 or HTTP/IP stack 3874 based on the port configuration, and each of Bluetooth LE stack 3872 and HTTP/IP stack 3874 can send outgoing messages to an appropriately configured communication port.

Figure 39:
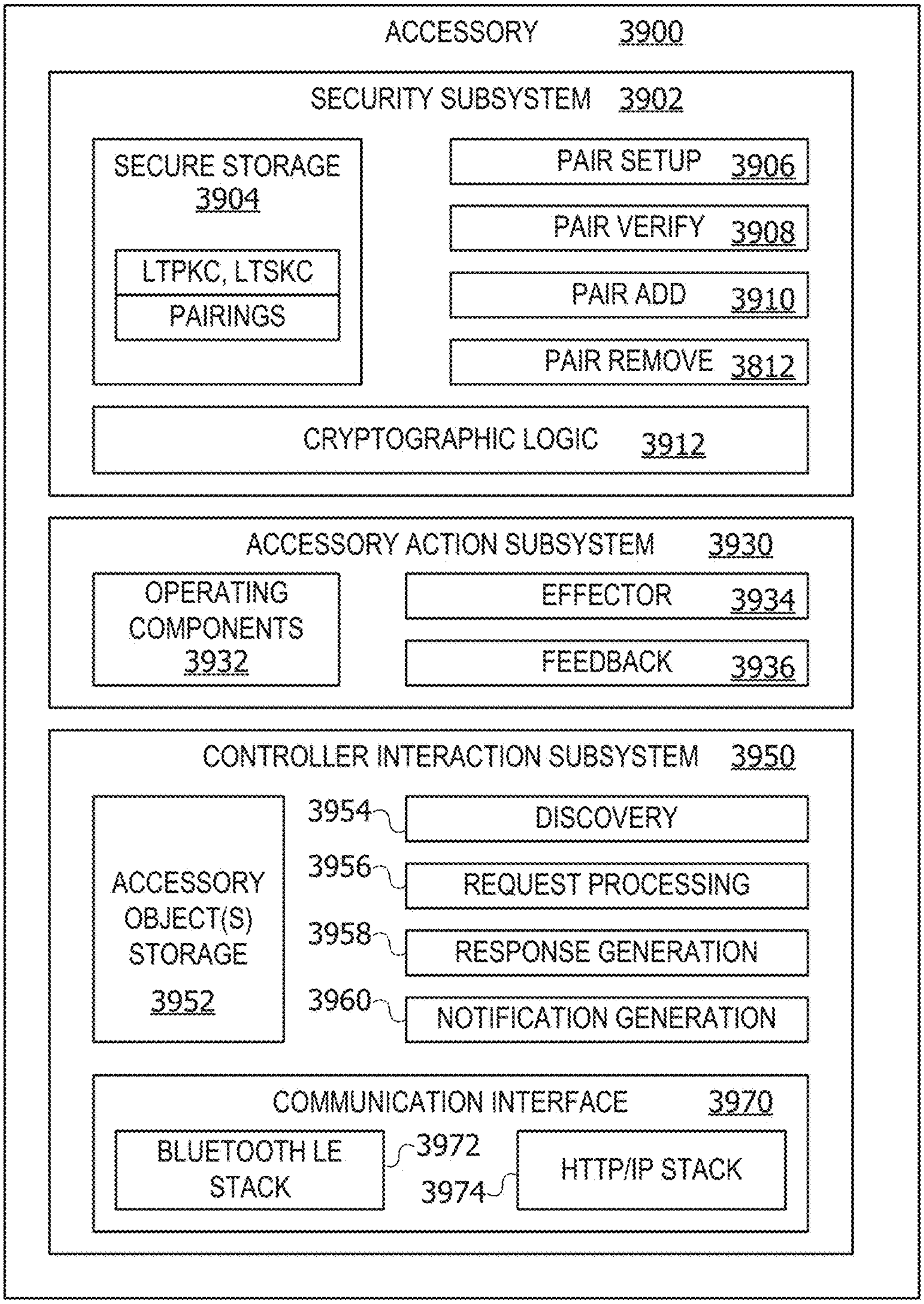
FIG. 39 is a simplified block diagram of an accessory architecture according to an embodiment of the present invention.

FIG. 39 shows an example of an accessory architecture for an accessory 3900 according to an embodiment of the present invention. The accessory architecture is shown as a set of interacting subsystems, where each subsystem includes one or more modules. It is to be understood that each of the modules can be implemented using program code executing on one or more programmable processors and/or in one or more fixed-function processors and that the processor(s) can include output signaling to control other hardware devices (e.g., actuators, displays, etc.) and/or input signaling to receive signals from other hardware devices (e.g., keyboards; touchscreens; feedback or status signals from actuators, motors, or sensors; etc.). Some of the subsystems can include persistent data storage, which can be implemented using any type of nonvolatile storage device (e.g., semiconductor flash memory, EEPROM, magnetic or optical disk, etc.). Although not shown, some or all of the subsystems can include additional hardware elements, such as displays, keyboards, touchscreens, microphones, speakers, motors, actuators, sensors, etc.

Security subsystem 3902 can include secure storage element 3904, pair setup module 3906, pair verify module 3908, pair add module 3910, pair remove module 3912, and cryptographic logic module 3914. Secure storage element 3904 can be similar or identical to secure storage element 3738 or other secure storage elements described above. In some embodiments, secure storage element 3904 is used to securely store a long-term public/secret key pair for accessory 3900 (e.g., LTPKA, LTSKA as described above) as well as pairing records for each controller with which accessory 3900 has an established pairing. As described above, each pairing record can include an identifier of a paired controller, a long-term public key of the paired controller, and optionally other information such as permission settings for interactions of the paired controller with accessory 3900 (e.g., whether a particular paired controller has administrator permission) and/or subscription settings for the paired controller (e.g., an indicator of whether the controller has subscribed to a particular notification mode other than the passive mode). In embodiments where accessory 3900 uses different long-term public keys in connection with different controllers, each pairing record can also include an indicator of the long-term public key to be used with the paired controller. Other information can be included if desired.

Pair setup module 3906 can implement accessory portions of a pair setup process. A pair setup process can be any process by which accessory 3900 and a controller securely exchange long-term public keys that each device can subsequently use to verify the other's identity. In some embodiments, a pair setup process can include an out-of-band exchange of an information item between accessory 3900 and the controller (e.g., a setup code, a validation of accessory's security certificate) to verify the identity of accessory 3900. Any of the pair setup processes described above (e.g., processes 1300, 1400, 1500, and/or 1600) or other processes can be used. In some embodiments, pair setup module 3806 can interact with controller interaction subsystem 3950 (described below) to effect communication with the controller during pair setup. In some embodiments, pair setup module 3906 can invoke functions of cryptographic logic module 3914 to perform cryptographic operations in connection with a pair setup process.

Pair verify module 3908 can implement accessory portions of a pair verify process. A pair verify process can be any process by which accessory 3900 and a controller use previously stored long-term public keys to verify the other device's identity. Any of the pair verify processes described above (e.g., process 1700) or other processes can be used. In some embodiments, pair verify module 3908 can interact with controller interaction subsystem 3950 (described below) to effect communication with the accessory during pair verify. In some embodiments, pair verify module 3908 can invoke functions of cryptographic logic module 3914 to perform cryptographic operations in connection with a pair verify process.

Pair add module 3910 can implement accessory portions of a pair add process. A pair add process can be any process by which a controller that has an established pairing with accessory 3900 provides to accessory 3900 a long-term public key for a "new" controller with which accessory 3900 is to establish a pairing. Any of the pair add processes described above (e.g., process 1800) or other processes can be used. In some embodiments, pair add module 3910 can interact with controller interaction subsystem 3950 (described below) to effect communication with the previously paired controller during pair add. In some embodiments, pair add module 3910 can also communicate with an external source of key information to obtain a long-term public key (or certificate) for a new controller to be added. In some embodiments, pair add module 3910 can invoke functions of cryptographic logic module 3914 to perform cryptographic operations in connection with a pair verify process.

Pair remove module 3912 can implement accessory portions of a pair remove process. A pair remove process can be any process by which a controller that has an established pairing with accessory 3900 provides to accessory 3900 an identifier of a controller whose pairing is to be removed by accessory 3900; the removed controller can be a different device from the controller that invokes the pair remove process. Any of the pair remove processes described above (e.g., process 1900) or other processes can be used. In some embodiments, pair remove module 3912 can interact with accessory interaction subsystem 3950 (described below) to effect communication with the accessory during pair remove. In some embodiments, pair remove module 3912 can also communicate with another controller or other external source of information to obtain identifying information for a controller to be removed. In some embodiments, pair remove module 3908 can invoke functions of cryptographic logic module 3912 to perform cryptographic operations in connection with a pair remove process.

Cryptographic logic module 3914 can implement cryptographic algorithms usable by accessory 3900. Examples include: key generation algorithms; algorithms and functions used in SRP; hash algorithms; key-based encryption/decryption algorithms such as ChaCha20-Poly1305, Curve25519, Ed25519, and/or other algorithms. In some embodiments, cryptographic logic module 3914 can provide an API (application program interface) that is usable by other modules of accessory 3900 to invoke cryptographic algorithms and related services. Any number and combination of cryptographic algorithms and related services can be supported.

Accessory action subsystem 3930 can manage various operations of hardware and/or software components of accessory 3900, e.g., in response to requests received from a controller via controller interaction subsystem 3950. For example, accessory 3900 can incorporate (or communicate with) various operating components 3932 that can take specific actions (e.g., opening or closing a door, operating a camera, etc.). Operating components 3932 can include hardware and/or software components, and a given operating component 3932 can respond to received control signals (e.g., electrical signals in digital or analog form) from effector module 3934 and/or generate feedback signals (e.g., electrical signals in digital or analog form) to feedback module 3936.

Effector module 3934 can generate control signals to operating components 3932, e.g., to effect or implement an operation requested by the user. The particular signals can depend on the particular operating component 3932 being addressed. By way of illustration, operating components 3932 can include a switching circuit that can switch power on or off, and effector module 3932 can generate a signal to the switching circuit to turn on or off power. As another example, operating components 3932 can include an electromechanical actuator that can produce motion of a physical object (e.g., latching or unlatching a deadbolt, opening or closing a door) in response to an electrical control signal, and effector module 3932 can generate a signal to the actuator. As still another example, operating components 3932 can include an API for controlling a digital camera (the camera itself might or might not be an operating component, depending on implementation), and effector module 3932 can invoke API calls to control the digital camera. In various embodiments, effector module 3934 can operate in response to requests from a controller received via controller interface subsystem 3950 and/or inputs received at a user interface of accessory 3900.

Feedback module 3936 can receive feedback signals from operating components 3932. The particular signals can depend on the particular operating component 3932. For example, a switching circuit can provide a feedback signal indicating the current state of the switch. An electromechanical actuator can provide feedback signals indicating current status (e.g., position and/or motion of the physical object). An API can provide error or status codes (e.g., upon return from an API call). As yet another example, operating components 3932 can include one or more sensors for various environmental conditions (e.g., motion sensors, position sensors, temperature sensors, obstruction sensors, etc.), and feedback module 3936 can receive sensor data signals from the sensors. In some embodiments, feedback module 3936 can provide feedback information based on the received feedback signals to controller interaction subsystem 3950.

Controller interaction subsystem 3950 can support interactions between accessory 3900 and a controller. Accessory object(s) storage element 3952 can be implemented using volatile or nonvolatile storage media (e.g., semiconductor flash memory, EEPROM, DRAM, SRAM, magnetic or optical disk, etc.). In some embodiments, accessory objects storage element 3852 can be used to store a representation of one or more accessory objects that can be used by a controller to interact with accessory 3900. The stored accessory object(s) can be served to controllers upon request (e.g., after performing a pair verify process with the controller), and the stored accessory object(s) can be updated as the state of the accessory changes. For example, feedback module 3936 can update the stored accessory object(s) based on feedback signals received from operating components 3932.

Discovery module 3954 can perform operations related to making accessory 3900 discoverable to a controller, such as broadcasting an advertisement, receiving a request to perform pair setup from a controller that does not have an established pairing, and so on. For example, discovery module 3954 can implement accessory operations described above with reference to FIG. 4.

Request processing module 3956 can receive and process request messages from controllers. For example, in response to a received request message (e.g., to write to a lock-state characteristic as described above), request processing module 3956 can determine whether the request is permitted (e.g., whether a pair-verified state exists with the controller, whether the message is encrypted using a valid session key, and whether the controller has permission to perform the requested action). Assuming the request is valid, request processing module 3956 can generate instructions to effector module 3934 (e.g., to actuate a lock mechanism). In some embodiments, determining whether the request is permitted can include decrypting the message, and request processing module 3956 can invoke functions supported by cryptographic logic module 3914 in connection with processing the request. In some embodiments, request processing module 3956 can interact with security subsystem 3902 to receive and process requests received from a controller during a pair setup, pair verify, pair add, or pair remove operation (e.g., any of the requests described above with reference to FIGS. 13-19).

Response generation module 3958 can generate and send responses to request messages and send response messages to controllers. For example, if request processing module 3956 receives a request and determines that it is not permitted, request processing module 3956 can so inform response generation module 3958, and response generation module 3958 can generate an error response. On the other hand, if request processing module 3956 receives a request and determines that it is permitted, request processing module 3956 can inform response generation module 3958 that a permitted request was received and is being processed by effector module 3934. In some embodiments, response module 3958 can wait to receive feedback information from feedback module 3936, then generate a response message that incorporates the feedback information. For example, if response generation module 3958 receives a request to read a sensor or open a lock, response generation module 3958 can wait to receive the sensor reading or a confirmation of the lock opening from feedback module 3936, then generate an appropriate response message. In some embodiments, the response message can be encrypted prior to sending, and response generation module 3958 can invoke functions supported by cryptographic logic module 3914 in connection with encrypting the message. In some embodiments, response generation module 3958 can interact with security subsystem 3902 to generate and send responses to a controller during a pair setup, pair verify, pair add, or pair remove operation (e.g., any of the responses described above with reference to FIGS. 13-19).

Notification generation module 3960 can receive information from feedback module 3936 (e.g., whenever an accessory object stored in accessory object(s) storage element 3952 is updated) and can generate notification messages to controllers based on the information. As described above, various notification mechanisms can be supported, and notification generation module 3960 can support any or all of these notification mechanisms (e.g., any or all of processes 700, 800, 900, 1000 described above). For example, in the case of a passive notification, notification processing module 3960 can simply update an internal state counter maintained in accessory object(s) storage element 3952. In the case of an advertised notification, notification generation module 3960 can update a state counter and instruct discovery module 3954 to generate an advertisement including the updated state counter value. In the case of an event notification, notification module 3960 can instruct response generation module 3958 to generate an unsolicited response (e.g., an EVENT message as described above) to be sent to a subscribed controller as described above. In some embodiments, notification module 3960 can maintain a list of subscribed controllers for various notification mechanisms and/or various characteristics and can instigate one or more mechanisms depending on whether any controllers are subscribed. In some embodiments, the subscription information can be maintained in accessory object(s) storage element 3952.

Communication interface module 3970 can provide services to support communication with other devices, including controllers. In some embodiments, communication interface module 3970 can implement a Bluetooth LE protocol stack 3972 and/or an HTTP/IP protocol stack 3974. Bluetooth LE protocol stack 3972 can provide formatting of outgoing messages and interpretation of received messages in accordance with Bluetooth LE transport protocols. HTTP/IP protocol stack 3974 can provide formatting of outgoing messages and interpretation of received messages in accordance with HTTP and IP transport protocols. While Bluetooth LE and HTTP/IP are used as examples, it is to be understood that any combination of transport protocols can be supported within communication interface module 3970 and that a given instance of controller 3900 can support one or more transport protocols. As described above, accessory 3900 can act as a server device in a client/server model of device interaction, and Bluetooth LE protocol stack 3872 and/or an HTTP/IP protocol stack 3874 can be configured to support server behavior.

In some embodiments, a protocol stack within communication interface module 3970 can be modified to generate certain nonstandard messages. For example, as described above, HTTP/IP protocol stack 3974 can be configured to generate an unsolicited "event" message from an accessory (e.g., event message 1120 of FIG. 11B described above).

In some embodiments, communication interface module 3970 can provide an API that is usable by other modules to send and/or receive messages to external devices. The API can be designed to be transport-agnostic, and the selection of a transport for a particular message can be made within communication interface module 3970, transparently to other modules within accessory 3900. Messages received at a communication port (not shown) of accessory 3900 can be sent to Bluetooth LE stack 3972 or HTTP/IP stack 3974 based on the port configuration, and each of Bluetooth LE stack 3972 and HTTP/IP stack 3974 can send outgoing messages to an appropriately configured communication port.

It will be appreciated that the system configurations and components described herein are illustrative and that variations and modifications are possible. It is to be understood that an implementation of controller 3600 (or controller 3800) can perform any or all of the operations described above as being performed by a controller and that an implementation of accessory 3700 (or accessory 3800) can perform any or all of the operations described above as being performed by an accessory; the use of different reference numbers in connection with different drawings is not intended to imply otherwise. A controller and/or an accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Numerous operations and interactions can be supported. For example, in some embodiments, an accessory can broadcast an advertisement on a device discovery service, indicating that it is available to pair with a controller. A controller can find the accessory, e.g., by detecting the advertisement, and can initiate a pair setup process (e.g., any of the processes described above with reference to FIGS. 13-16) to establish a pairing, e.g., by securely exchanging long-term keys and an out-of-band information item such as a setup code or security certificate. Once the pair setup process is complete, the accessory can make itself unavailable to perform pair setup with any additional controllers (e.g., by ignoring or returning an error in response to any pair setup start requests), and the controller that performed pair setup can be granted administrator permission. A controller with administrator permission can instruct the accessory to establish pairings with one or more additional controllers by performing a pair add process (e.g., as described above with reference to FIG. 18) or using other delegated pairing processes described above (e.g., furnishing a trust certificate chain to the accessory). A controller with administrator permission can also instruct the accessory to remove established pairings with one or more other controllers (or with the controller with administrator permission) by performing a pair remove process (e.g., as described above with reference to FIGS. 19A-19B).

In this manner, a user of a controller and accessory can maintain control over what other controllers pair with the accessory, as the user's controller can be required to participate in establishing any additional pairings. In some embodiments, the user can share that control with others, e.g., by instructing the accessory to grant administrator permission to one or more additional controllers. A user of a controller with administrator permission can also instruct an accessory to remove an established pairing, including any pairings that are no longer desired.

A controller that has established a pairing with an accessory (also referred to as a "paired controller") can exercise control over the accessory, without necessarily maintaining a continuous connection to the accessory. For example, when a paired controller reconnects to an accessory, the controller can initiate a pair verify process (e.g., as described above with reference to FIG. 17) that allows the accessory and the controller to verify that an established pairing exists between them. The pair verify process can also provide one or more session keys usable to secure any subsequent messages that may be sent while the accessory and controller remain connected; this condition can be referred to as a "pair-verified session."

While connected, the controller can send command-and-control messages (or request messages) to the accessory. By using appropriate request messages, the controller can determine the accessory's current state, and in some instances can instruct the accessory to change an aspect of its current state. For example, the accessory can maintain an accessory model (e.g., as an accessory object) that describes its state as a collection of characteristics and services. The controller can determine aspects of the accessory's current state by reading or otherwise interrogating one or more of the characteristics (which can include all of the characteristics or any subset thereof) and can instruct the accessory to change an aspect of its current state by writing to or otherwise modifying one or more of the characteristics. If the accessory requires that all such requests be sent as encrypted messages within a pair-verified session, then operation of the accessory can be restricted to authorized controllers.

The accessory can be self-defining. For instance, after establishing a pairing, a paired controller can request an accessory definition record from the accessory. The accessory definition record can define an accessory object for each accessory that can be controlled via the accessory with which the controller is paired. In some embodiments, all or part of the accessory definition record can be made available to a controller before the accessory has established any pairings, allowing information from the accessory definition record to be used in determining whether to establish a pairing. In other embodiments, a controller can determine whether to establish a pairing based on information included in the accessory's advertisement (e.g., a TXT record as described above), and the accessory definition record can be made available to a controller only after a pairing has been established. A paired controller can use the accessory definition record to generate requests to interrogate and or modify characteristics, thereby enabling control of the accessory. The controller can generate such requests in response to user input or automatically (e.g., based on the controller detecting various conditions), as desired. In some embodiments, the controller can be capable of dynamically generating a user interface operable to control the accessory, with the user interface being based on information provided in the accessory definition record.

In some embodiments, the accessory can notify any paired controllers of changes in its state. For example, any combination of passive notification processes (e.g., as shown in FIG. 7), advertised notification processes (e.g., as shown in FIG. 8), active notification processes (e.g., as shown in FIG. 9), and/or event-message notification processes (e.g., as shown in FIG. 10) can be supported. In some embodiments, a paired controller can send a request to the accessory to subscribe to a particular notification method (e.g., advertised, active, and/or event-message) with regard to a specific characteristic. The accessory can maintain subscription status information for various controllers and can generate notifications of a particular type based on the current subscription status.

Further Embodiments

While the invention has been described with respect to specific embodiments, one skilled in the art will recognize that numerous modifications are possible. A single controller can use processes described herein to establish pairings with any number of accessories and to selectively communicate with different accessories at different times. Similarly, a single accessory can be controlled by multiple controllers with which it has established pairings (e.g., using pair setup and pair add as described above). Any function of an accessory can be controlled by modeling the function as a service having one or more characteristics and allowing a controller to interact with (e.g., read, modify, receive updates) the service and/or its characteristics. Accordingly, protocols and communication processes as described herein can be "uniform," meaning that they can be applied in any context with one or more controllers and one or more accessories regardless of accessory function or controller form factor or specific interfaces.

Further, some examples above make specific reference to HTTP, a protocol that can be used over local-area and wide-area networks that support a standard internet-protocol (IP transmission stack (e.g., TCP/IP). However, other transmission protocols can also be used. For example, the Bluetooth LE protocol stack includes a generic attribute (GATT) layer that allows one device to interrogate and modify attributes of another device. In some embodiments, instances of accessory characteristics can be exposed to controllers as attributes based on the GATT model. Accordingly, a controller can also interrogate (e.g., read) and modify (e.g., write) accessory characteristics using Bluetooth LE. In some embodiments, a particular accessory can support either or both of IP and/or Bluetooth LE transmission protocols, and a controller can interact with some accessories using IP and other accessories using Bluetooth LE, depending on the accessory's capabilities and on preferences established by the controller.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:

detecting, by a controller, an accessory that is available for pairing;

performing, by the controller, a pair setup operation to establish a pairing with the accessory, the pair setup operation including:

establishing a shared secret using an out-of-band information item exchanged between the accessory and the controller;

using the shared secret to securely exchange a long-term public key of the accessory and a long-term public key of the controller; and securely and persistently storing, by the controller, the long-term public key of the accessory in association with an identifier of the accessory;

obtaining, by the controller, an accessory definition record from the paired accessory device, the accessory definition record identifying a set of services for performing operations of the paired accessory device, each service of the set of services having a set of operation characteristics, each operation characteristic of the set of operation characteristics representing an aspect of accessory state with respect to an operation of the operations of the paired accessory device;

receiving, at a user interface of the controller, an input that identifies a requested function of the paired accessory device to be performed;

determining, based at least in part on the input, an operation characteristic of the paired accessory device to modify that will instruct the paired accessory device to perform the operation of the paired accessory device that corresponds to the requested function;

performing a pair verify operation including generating a session key, wherein the session key is used to encrypt a request to modify the operation characteristic specified in the accessory definition record that corresponds to the requested function; and communicating, by the controller, a request to the paired accessory to modify the operation characteristic specified in the accessory definition record that corresponds to the requested function, the communicated request being interpretable by the paired accessory device as an instruction to invoke the operation of the paired accessory device.

2. The method of claim 1 further comprising, prior to invoking the operation of the accessory:

performing, by the controller, the pair verify operation with the paired accessory, the pair verify operation including:

sending, to the paired accessory, a proof that the controller has the long-term public key of the paired accessory and a long-term secret key corresponding to the long-term public key of the controller; and receiving, from the paired accessory, a proof that the paired accessory has the long-term public key of the controller and a long-term secret key corresponding to the long-term public key of the paired accessory, wherein the controller invokes the operation of the paired accessory only if the pair verify operation succeeds.

3. The method of claim 1 further comprising:

sending, by the controller, a request to the paired accessory to subscribe to notifications of a change in a particular operation characteristic from the set of operation characteristics defined in the accessory definition record, wherein the request to subscribe specifies the particular operation characteristic and further specifies a notification mode.

4. The method of claim 3 wherein the specified notification mode is an event-message notification mode, the method further comprising:

subsequently to sending the request to subscribe, receiving, by the controller an unsolicited response message from the accessory, the unsolicited response message including a notification of a change in the operation characteristic specified by the controller.

5. The method of claim 1 wherein the out-of-band information item comprises digital certificate verification information obtained by the controller from a source other than the accessory, the digital certificate verification information usable to verify a digital certificate and signature received by the controller from the accessory.

6. The method of claim 1 further comprising:

performing, by the controller, a pair add operation with the paired accessory on behalf of another controller, wherein the pair add operation includes providing to the accessory, by the controller, one or both of a long-term public key of the other controller or a certificate usable by the accessory to verify the other controller.

7. A controller comprising:

a communication interface to communicate with one or more accessories;

a secure storage element to securely store pairing records for one or more paired accessories;

a data storage element configured to store accessory definition records for one or more paired accessories; and a processing subsystem coupled to the communication interface, the secure storage element, and the data storage element, the processing subsystem configured to:

detect an accessory that is available for pairing;

perform a pair setup operation to establish a pairing with one or more accessories, wherein establishing the pairing with an accessory of the one or more accessories includes:

establishing a shared secret using an out-of-band information item exchanged between the accessory and the controller;

securely obtaining, from the accessory, a long-term public key of the accessory and a proof that the accessory has the out-of-band information item;

securely providing a long-term public key of the controller to the accessory; and creating and persistently storing a pairing record for the accessory in the secure storage element, the pairing record including the long-term public key of the accessory;

obtain, after establishing the pairing with the accessory, an accessory definition record from the paired accessory, the accessory definition record identifying a set of services for performing operations of the paired accessory, each service of the set of services having a set of operation characteristics, each operation characteristic of the set of operation characteristics representing an aspect of accessory state with respect to an operation of the operations of the paired accessory device;

receive, at a user interface of the controller, an input that identifies a requested function of the paired accessory to be performed;

determine, based at least in part on the input, an operation characteristic of the paired accessory to modify that will instruct the paired accessory to perform the operation of the paired accessory that corresponds to the requested function;

perform a pair verify operation including generating a session key, wherein the session key is used to encrypt a request to modify the operation characteristic specified in the accessory definition record that corresponds to the requested function; and invoke the operation of the paired accessory by communicating to the paired accessory a request to modify operation characteristic specified in the accessory definition record that corresponds to the requested function.

8. The controller of claim 7 wherein the communication interface includes at least two different transport protocol stacks and wherein the communication interface selects one of the transport protocol stacks to be used for communicating with a particular accessory.

9. The controller of claim 8 wherein the at least two different transport protocol stacks include a Bluetooth LE protocol stack and an HTTP/IP protocol stack.

10. The controller of claim 7 wherein the processing subsystem is further configured to establish a pair-verified session with the paired accessory, wherein establishing the pair verified session includes:

sending, to the paired accessory, a proof that the controller has the long-term public key of the paired accessory and a long-term secret key corresponding to the long-term public key of the controller;

receiving, from the paired accessory, a proof that the paired accessory has the long-term public key of the controller and a long-term secret key corresponding to the securely stored long-term public key of the paired accessory; and establishing one or more session keys usable to encrypt subsequent messages exchanged between the controller and the paired accessory.

11. The controller of claim 10 wherein the processing subsystem is further configured to perform a pair add operation within an established pair-verified session, wherein performing the pair add operation includes sending to the paired accessory a long-term public key of another controller with which the paired accessory is to establish a pairing.

12. A non-transitory computer-readable storage medium storing computer-executable instructions that, when executed by a controller device, configure the controller device to perform operations comprising:

detecting an accessory that is available for pairing;

performing a pair setup operation to establish a pairing with the accessory, the pair setup operation including:

establishing a shared secret using an out-of-band information item exchanged between the accessory and the controller device;

using the shared secret to securely exchange a long-term public key of the accessory and a long-term public key of the controller device; and securely and persistently storing the long-term public key of the accessory in association with an identifier of the accessory;

obtaining an accessory definition record from the paired accessory device, the accessory definition record identifying a set of services for performing operations of the paired accessory device, each service of the set of services having a set of operation characteristics, each operation characteristic of the set of operation characteristics representing an aspect of accessory state with respect to an operation of the operations of the paired accessory device;

receiving, via a user interface, an input that identifies a requested function of the paired accessory device to be performed;

determining, based at least in part on the input, an operation characteristic of the paired accessory device to modify that will instruct the paired accessory device to perform the operation of the paired accessory device that corresponds to the requested function;

performing a pair verify operation including generating a session key, wherein the session key is used to encrypt a request to modify the operation characteristic specified in the accessory definition record that corresponds to the requested function; and communicating a request to the paired accessory to modify the operation characteristic specified in the accessory definition record that corresponds to the requested function, the communicated request being interpretable by the paired accessory device as an instruction to invoke the operation of the paired accessory device.

13. The non-transitory computer-readable storage medium of claim 12 wherein the operations further comprise, prior to invoking the operation of the accessory:

performing, by the controller device, the pair verify operation with the paired accessory, the pair verify operation including:

sending, to the paired accessory, a proof that the controller has the long-term public key of the paired accessory and a long-term secret key corresponding to the long-term public key of the controller; and receiving, from the paired accessory, a proof that the paired accessory has the long-term public key of the controller and a long-term secret key corresponding to the long-term public key of the paired accessory, wherein the controller invokes the operation of the paired accessory only if the pair verify operation succeeds.

14. The non-transitory computer-readable storage medium of claim 12 wherein the operations further comprise:

sending, by the controller, a request to the paired accessory to subscribe to notifications of a change in a particular operation characteristic from the set of operation characteristics defined in the accessory definition record, wherein the request to subscribe specifies the particular operation characteristic and further specifies a notification mode.

15. The non-transitory computer-readable storage medium of claim 14 wherein the specified notification mode is an event-message notification mode, the method further comprising:

subsequently to sending the request to subscribe, receiving, by the controller an unsolicited response message from the accessory, the unsolicited response message including a notification of a change in the operation characteristic specified by the controller.

16. The non-transitory computer-readable storage medium of claim 12 wherein the out-of-band information item comprises digital certificate verification information obtained by the controller from a source other than the accessory, the digital certificate verification information usable to verify a digital certificate and signature received by the controller from the accessory.

17. The non-transitory computer-readable storage medium of claim 12 wherein the operations further comprise:

performing, by the controller, a pair add operation with the paired accessory on behalf of another controller, wherein the pair add operation includes providing to the accessory, by the controller, one or both of a long-term public key of the other controller or a certificate usable by the accessory to verify the other controller.

18. A controller comprising:

a communication interface to communicate with one or more accessories;

a secure storage element to securely store pairing records for one or more paired accessories;

a data storage element configured to store accessory definition records for one or more paired accessories; and a processing subsystem coupled to the communication interface, the secure storage element, and the data storage element, the processing subsystem configured to:

detect an accessory that is available for pairing:

perform a pair setup operation to establish a pairing with one or more accessories, wherein establishing the pairing with an accessory of the one or more accessories includes:

establishing a shared secret using an out-of-band information item exchanged between the accessory and the controller, wherein the information item comprises digital certificate verification information obtained by the controller from a source other than the accessory, the digital certificate verification information usable to verify a digital certificate and signature received by the controller from the accessory;

securely obtaining, from the accessory, a long-term public key of the accessory and a proof that the accessory has the out-of-band information item;

securely providing a long-term public key of the controller to the accessory; and creating and persistently storing a pairing record for the accessory in the secure storage element, the pairing record including a the long-term public key of the accessory;

obtaining, after establishing a pairing with an accessory, an accessory definition record from the paired accessory, the accessory definition record including a set of services for performing operations of the paired accessory, each service of the set of services having a set of operation characteristics, each operation characteristic of the set of operation characteristics representing an aspect of accessory state with respect to an operation of the operations of the paired accessory device;

receiving, at a user interface of the controller, an input that identifies a requested function of the paired accessory to be performed;

determining, based at least in part on the input, an operation characteristic of the paired accessory to modify that will instruct the paired accessory to perform the operation of the paired accessory that corresponds to the requested function;

performing a pair verify operation including generating a session key, wherein the session key is used to encrypt a request to modify the operation characteristic specified in the accessory definition record that corresponds to the requested function; and invoking an operation of the paired accessory by communicating to the paired accessory a request to modify one or more of the operation characteristics specified in the accessory definition record that corresponds to the requested function.

19. The controller of claim 18 wherein the communication interface includes at least two different transport protocol stacks and wherein the communication interface selects one of the transport protocol stacks to be used for communicating with a particular accessory.

20. The controller of claim 19 wherein the at least two different transport protocol stacks include a Bluetooth LE protocol stack and an HTTP/IP protocol stack.

21. The controller of claim 18 wherein the processing subsystem is further configured to establish a pair-verified session with the paired accessory, wherein establishing the pair verified session includes:

sending, to the paired accessory, a proof that the controller has the long-term public key of the paired accessory and a long-term secret key corresponding to the long-term public key of the controller;

receiving, from the paired accessory, a proof that the paired accessory has the long-term public key of the controller and a long-term secret key corresponding to the securely stored long-term public key of the paired accessory; and establishing one or more session keys usable to encrypt subsequent messages exchanged between the controller and the paired accessory.

22. The controller of claim 21 wherein the processing subsystem is further configured to perform a pair add operation within an established pair-verified session, wherein performing the pair add operation includes sending to the paired accessory a long-term public key of another controller with which the paired accessory is to establish a pairing.

* * * * *